US011278908B2

(12) United States Patent
Crepeau et al.

(10) Patent No.: US 11,278,908 B2
(45) Date of Patent: *Mar. 22, 2022

(54) SYSTEM AND METHOD FOR INFUSION AND DESICCATION OF FOODSTUFFS

(71) Applicant: Food Cycle Science Corporation, Cornwall (CA)

(72) Inventors: Bradley Crepeau, Cornwall (CA); Mark Jonathan Brice Hayman, Ottawa (CA); Meng Wang, Ottawa (CA); Timothy John Maxwell, Stittsville (CA)

(73) Assignee: FOOD CYCLE SCIENCE CORPORATION, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/164,078

(22) Filed: Feb. 1, 2021

(65) Prior Publication Data

US 2021/0154676 A1 May 27, 2021

Related U.S. Application Data

(63) Continuation of application No. 16/868,482, filed on May 6, 2020, now Pat. No. 10,906,046.
(Continued)

(51) Int. Cl.
*B01D 46/00* (2006.01)
*B02C 18/00* (2006.01)
(Continued)

(52) U.S. Cl.
CPC ...... *B02C 18/0092* (2013.01); *B01D 46/0038* (2013.01); *B01D 46/0043* (2013.01);
(Continued)

(58) Field of Classification Search
CPC ............ B01D 46/0038; B01D 46/0043; B01D 46/02; B01D 46/4227; B02C 18/0092;
(Continued)

(56) References Cited

U.S. PATENT DOCUMENTS 7,240,865 B2  7/2007 Choi
9,597,620 B2 * 3/2017 Verdegan ............... G06Q 10/06
(Continued)

FOREIGN PATENT DOCUMENTS

JP    2006255592    9/2006
KR    19980047631   9/1998
(Continued)

OTHER PUBLICATIONS

FoodCycler Manual designated for Model FC-30. The date is based on the youtube (Model FC-30) Previously submitted. (Year: 2019).
(Continued)

*Primary Examiner* — Minh Chau T Pham

(57) ABSTRACT

A food recycler can include a case having a case volume between 8.79 liters and 35 liters, a control system, a user interface in electrical communication with the control system, and a bucket being configured with a bucket volume, wherein a ratio of the bucket volume to the case volume is between 0.0717 and 0.2857. The recycler can include a motor in communication with the control system, the motor being configured adjacent at least in part to the bucket, a gearbox configured below the bucket and in mechanical communication with the motor, a filter system and a drying component configured to remove water from waste food items.

29 Claims, 64 Drawing Sheets

Related U.S. Application Data

(60) Provisional application No. 62/946,655, filed on Dec. 11, 2019, provisional application No. 62/844,454, filed on May 7, 2019, provisional application No. 62/844,421, filed on May 7, 2019.

(51) Int. Cl.
| | | |
|---|---|---|
| *B02C 18/06* | (2006.01) | |
| *B02C 18/12* | (2006.01) | |
| *B02C 18/24* | (2006.01) | |
| *B02C 23/18* | (2006.01) | |
| *C05F 5/00* | (2006.01) | |
| *B01D 46/02* | (2006.01) | |
| *B01D 46/42* | (2006.01) | |
| *C05F 17/986* | (2020.01) | |
| *B02C 23/26* | (2006.01) | |
| *C05F 17/907* | (2020.01) | |

(52) U.S. Cl.
CPC ......... *B01D 46/02* (2013.01); *B01D 46/4227* (2013.01); *B02C 18/067* (2013.01); *B02C 18/12* (2013.01); *B02C 18/24* (2013.01); *B02C 23/18* (2013.01); *B02C 23/26* (2013.01); *C05F 5/002* (2013.01); *C05F 17/907* (2020.01); *C05F 17/986* (2020.01)

(58) Field of Classification Search
CPC ......... B02C 23/26; B02C 18/24; B02C 18/12; C05F 17/986; C05F 17/907; C05F 5/002
USPC .............. 55/385.1, DIG. 34; 16/DIG. 14; 126/194; 232/43.1; 312/109, 204, 228; 434/72
See application file for complete search history.

(56) References Cited

U.S. PATENT DOCUMENTS

| | | | |
|---|---|---|---|
| 10,065,196 B1 | 9/2018 | Tran | |
| 10,906,046 B2* | 2/2021 | Crepeau | B02C 18/12 |
| 2004/0251339 A1 | 12/2004 | Strutz | |
| 2008/0067270 A1 | 3/2008 | Strutz | |
| 2009/0113791 A1* | 5/2009 | Bertin | A01G 24/44 47/9 |
| 2010/0140248 A1 | 6/2010 | Yi et al. | |
| 2011/0151553 A1* | 6/2011 | Cruson | C05F 17/907 435/290.2 |
| 2012/0021504 A1* | 1/2012 | Bradlee | C05F 17/986 435/290.4 |
| 2012/0034350 A1 | 2/2012 | Gard | |
| 2012/0298658 A1* | 11/2012 | Bosetti | B65D 77/225 220/89.1 |
| 2013/0263786 A1* | 10/2013 | Meisel, III | C05F 17/60 119/6.7 |
| 2014/0117126 A1 | 5/2014 | Ceru | |
| 2016/0022112 A1* | 1/2016 | Davenport | B65F 1/16 15/257.6 |
| 2016/0207845 A1* | 7/2016 | Delgado | C05F 17/993 |
| 2016/0295906 A1 | 10/2016 | Jacobsen | |
| 2017/0226466 A1 | 8/2017 | Grillo | |
| 2017/0260111 A1* | 9/2017 | Maghas | C05F 17/979 |
| 2017/0349501 A1* | 12/2017 | Buzruk | C05F 17/964 |
| 2018/0093814 A1 | 4/2018 | Espinosa | |
| 2018/0148391 A1* | 5/2018 | Ashbee | B01F 7/00141 |
| 2019/0083989 A1 | 3/2019 | Tran | |
| 2020/0147617 A1* | 5/2020 | Atkinson | B02C 18/0092 |
| 2020/0148604 A1* | 5/2020 | Atkinson | B02C 18/2216 |
| 2020/0353474 A1* | 11/2020 | Crepeau | B02C 18/24 |

FOREIGN PATENT DOCUMENTS

| | | |
|---|---|---|
| KR | 100692243 | 3/2007 |
| KR | 20090103453 | 10/2009 |
| KR | 2009157744 | 12/2009 |
| KR | 20090123375 | 12/2009 |
| KR | 101332453 | 11/2013 |
| KR | 101461608 | 12/2014 |
| KR | 2017083944 | 5/2017 |

OTHER PUBLICATIONS

Globosoft Food Cycler Processing Youtube.com—(https://www.youtube.com/watch?v=0QgiQ2puLJw) Mar. 9, 2019 (Year: 2019).

* cited by examiner

SECTION A-A

SYSTEM AND METHOD FOR INFUSION AND DESICCATION OF FOODSTUFFS

PRIORITY CLAIM TO RELATED APPLICATIONS

This application is a continuation application of U.S. patent application Ser. No. 16/868,482, filed May 6, 2020, now U.S. Pat. No. 10,906,046, issued Feb. 2, 2021, which claims priority to U.S. Provisional Patent Application No. 62/844,421, filed May 7, 2019, U.S. Provisional Patent Application No. 62/844,454, filed May 7, 2019, and U.S. Provisional Patent Application No. 62/946,655, filed Dec. 11, 2019, the contents of which are incorporated herein by reference in their entirety.

TECHNICAL FIELD

The present disclosure relates to food recyclers and particularly to a design or system that enables infusion of foodstuffs to a liquid food solution and/or desiccation of food waste into granular media in a food recycler having volumetric efficiency.

BACKGROUND

Organic whole foodstuffs can include edible components, edible non-palatable components, and inedible components. Edible components can include the palatable portion of the foodstuff that, in general, makes up the serving portion. Edible non-palatable components generally consists of the foodstuff portion that is not served, such as: trimmings, off-cuts, leaves, peels, skins, rinds, pulp, stems, seeds, oxidized foods (e.g., avocados, apples, etc.), limp or wilted vegetation, bone components, connective tissues, fibrous components, poorly textured foods, malformed foods, discolored foods, previously cooked foods, expired foods, or any other foodstuff that, while safe for consumption, may not be palatable. Inedible components can include foodstuff components that are not fit for consumption due to an unpleasant taste, poor nutritional value, or are a hazard to the health of those that would consume these components (e.g., apple seeds, foodstuffs infested or infected by non-beneficial components, toxins, or pathogenic materials).

In traditional culinary arts, a high value is placed on precious foodstuffs. For instance, traditional techniques often call for maximizing consumable nutritional value and flavor while minimizing waste. In classic French cooking, for example, the nutrients and flavor of unpalatable foods are transferred to a liquid to create stock or fond de cuisine, the treasured underpinning of broths, soups, and sauces. Stock making is a core culinary skill of the saucier or sauce chef, the highest line cook position in the traditional French Brigade restaurant kitchen. In such a kitchen, a hierarchy of foodstuffs as described in the previous paragraph supplies the core flavor and nutritional elements to the saucier for infusion into a water solvent to form suspended solutions of stocks or broths. Flavor and nutrient rich stocks and broths form the foundational input elements for sauces, soups, and stews. Further, these stocks and broths serve as poaching liquids to enhance the flavor of sauté cooking methods. The contributory nutritional and flavor elements of bones, trimmings and vegetable discard can best be measured against the high regard French cuisine places on remouillage, a stock made by re-simmering bones a second time. However, over time, food entertainment has turned food ingredients into aesthetic elements that are specifically selected for their pleasant appearance rather than for its nutritional value and flavor. This shift in focus has led to an abundance of food waste.

Food waste accounts for one-third of garbage that is deposited in landfills. This presents a growing environmental issue due to the anaerobic production of methane and other greenhouse gases via the decomposition of such organic food waste. Thus, various entities have opted to compost food waste in order to divert such food waste away from landfills and to reduce the production of methane and other greenhouse gases.

Composting is most effective for low density waste management and in rural areas, where there is no scarcity of land for composting large amounts of food waste. However, composting can be logistically complex and costly in urban environments, where the majority of organic food waste is created. While consumer behavioral change and voluntary compliance can result in the reduction of food waste, this traditionally has not been sufficient. Additionally, composting solely focuses on waste management and does not present an avenue for re-using edible components that would otherwise be discarded. In light of this, it would be advantageous to provide a kitchen-based organic food conversion process and apparatus that would extract flavor and nutrients for reuse in the kitchen and for conversion of organic food waste into nutrient preserved grow media for reintroduction into the food cycle.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope. The principles herein are described and explained with additional specificity and detail through the use of the accompanying drawings in which.

DETAILED DESCRIPTION

Figure 1:
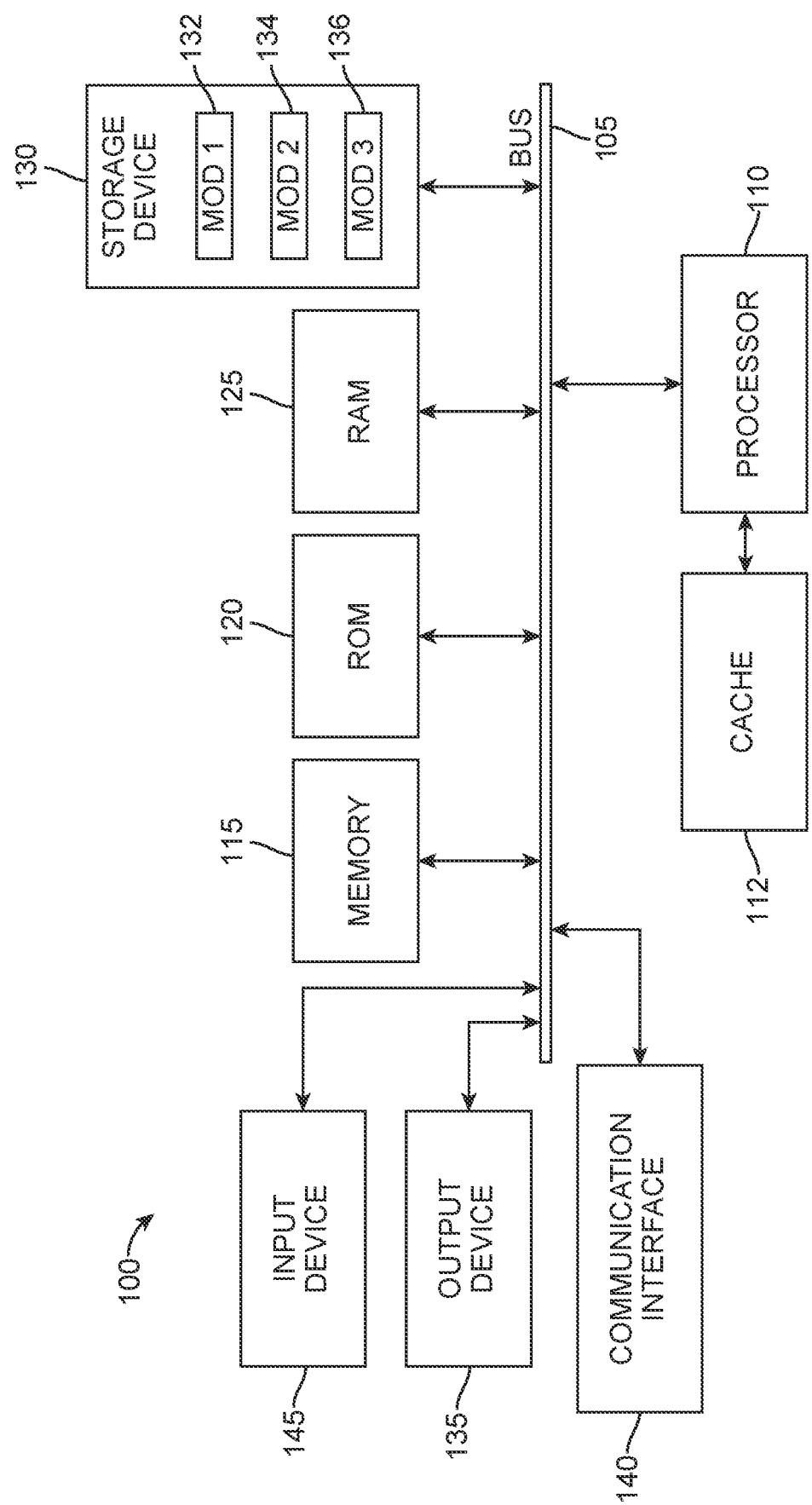
FIG. 1 illustrates an example system configuration, according to an aspect of the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The following description is organized around a number of different technologies. It is noted that this is not meant to imply that the present application is focused on particular separate embodiments. Any of the features described in any of the examples below can be combined with any other feature in order to arrive at an improved food recycling appliance. The features are generally organized in terms of an example that focuses on volumetric efficiency, another example that focuses on energy efficiency, yet another example that focuses on a grinding tool configured within a bucket of the food recycling appliance, another example focusing on an Internet of Things (IoT) aspect of this disclosure which enables identification of contents within a bucket of a food recycling appliance, a communication of that identification to a central server and for other control mechanisms, as well as an example focusing on an improvement with respect to odor control by introducing a replaceable filter and various configurations for utilizing replaceable filters within the context of the food recycling appliance, and another example focusing on a design which enables infusion of foodstuffs to a liquid food solution and desiccation of food waste into granular media. As noted above, various features could be combined to arrive at particular examples. For example, a food recycling appliance could include one of the described new grinding components in connection with a replaceable filter contained within the lid of the food recycling appliance. Another example improvement could include an improved size of the bucket with the components configured internally to enable for a larger bucket in the horizontal XY direction, with the addition of an RF heating component configured within the lid of the food recycling appliance.

This disclosure now turns to an introductory description of the various new features associated with an improved food recycling appliance. One feature needed in the art is a food recycler that has a certain volumetric efficiency. A food recycler in this regard can include a housing having a housing volume, a motor in electrical communication with a controller, a grinding mechanism in mechanical communication with the motor and a bucket having a bucket volume, the bucket being configured with the grinding mechanism contained therein. A ratio of the bucket volume to the housing volume can be between 0.0717 and 0.2857, inclusive. The motor can be configured within the housing adjacent, at least in part, to the bucket. The food recycler can include a drying component configured to remove water from waste food items placed within the bucket.

The food recycler can further include a controller comprising a set of indicators and at least one user interface component usable to at least initiate food recycling and a gearbox configured below the bucket and in mechanical communication with the motor and the grinding mechanism. In one aspect, the bucket volume can include between 2.51 and 10 liters, inclusive. The food recycler may consume 0.1 kilowatt hours of energy per 100 grams of the waste food items. The housing volume can include between 8.79 liters and 35 liters.

In another aspect, a food recycler can include a case having a case volume between 8.79 liters and 35 liters, a control system, a user interface in electrical communication with the control system, a bucket being configured with a bucket volume, a motor in communication with the control system, the motor being configured adjacent at least in part to the bucket, a gearbox configured below the bucket and in mechanical communication with the motor, a filter system and a drying component configured to remove water from waste food items. The user interface is usable to cause the control system to initiate a food recycling cycle. In one aspect, a ratio of the bucket volume to the case volume can be between 0.0717 and 0.2857.

Another feature that is needed in the art is an improved system that is reconfigured and reengineered to enable infusion of foodstuffs to a liquid food solution and desiccation of food waste into granular media. In one aspect, different buckets can have a particular structural component that indicates whether the food items contained within the respective bucket are to be prepared as a liquid food solution or processed to be compost. The unit can be capable of identifying the structure and purpose of each of the buckets that can be inserted into the unit in order to determine whether a user desired to infuse foodstuffs to a liquid food solution or desiccate food waste into granular media, such as compost. Thus, the unit is to perform the primary functions of infusing nutrients and flavors from waste food into a liquid food solution and of desiccating food waste into granular media, as requested by a user of the unit. Accordingly, the following description provides an improved configuration for a food recycler designed for home use and which performs these functions. In another aspect, the bucket can be the same and the user interface can confirm from the user which mode to operate in. A graphical interface can present options or buttons or other interactive features can enable the user to choose the mode.

To enable improved desiccation of waste food items, the unit is reconfigured to include vacuum accelerated dryers. Vacuum accelerated dryers have a long industrial history of accelerated desiccation covering a wide spectrum of material drying processes. For instance, such vacuum accelerated dryers have been used for low temperature vacuum freeze drying of food stuffs, ambient temperature desiccation of pharmaceutical compounds, medium temperature desiccation of feed and foodstuffs (e.g., fruits, vegetables, meats, etc.), and high-temperature industrial desiccation for the creation of polymer and ceramic materials. The unit uses a combination of heat and vacuum to accelerate desiccation of organic materials, thus reducing the amount of time required to desiccate food waste and improving the overall energy efficiency of the unit.

The improved food recycling unit further includes two classes of vessels that may be inserted into the unit: a pot vessel for the collection of foodstuffs appropriate for processing into a food solution (e.g., stocks, broths, etc.) and a bucket vessel for the collection of organic waste that is to be processed into dry, granular media. Both vessels are distinct in appearance and purpose, but share a dual function as receptacle and processing environment. For instance, the pot vessel and the bucket vessel can both serve as receptacles for organic food and organic food waste at the point of creation. Once filled, the bucket vessel or the pot vessel is placed in the unit for processing using the appropriate function for the contents and for the desired outcome. In some examples, placement of a vessel into the unit causes the unit to mechanically identify the structure and purpose of the vessel. This causes the unit to determine which function to perform for the contents and for the desired outcome.

If a user introduces a pot vessel into the unit, the user can select, via a user interface on the unit, a program that when executed by the unit identifies the contents and desired outcome. The program can include a formula and/or recipe that the unit can use to produce a specific stock or broth by grinding, heating, holding at a specified temperature, stirring and holding at safe temperatures the organic food items introduced into the vessel. During this process, the unit can provide, to the user, feedback and alerts.

If a user introduces a bucket vessel into the unit, the user can select, via the user interface, from a variety of different processing profiles, which can be based on the desired time to complete the desiccation of the contents, desired energy usage, or other factors external to the unit (e.g., temperature, odor, etc.). The unit, during the desiccation cycle can perform various operations such as grinding, stirring, mixing, heating, using vacuum, using air movement, condensing, using air filtration, and humidity and temperature sensing to create a specified granular media output.

In addition to the vessels, the unit can include a bucket vessel lid with odor control features, a pot vessel lid with fluid containment features, a pot vessel dual concentric strainer to create a clear liquid column void of solids and non-aqueous fats and containment of solids and fats for separation and diversion to appropriate waste streams, filters, additional pot vessels and bucket vessels, external thermostat interface, food ingredients supporting the infusion process, dry bacterial culture to recolonize beneficial bacteria in dry granular media when used as soil or as a soil supplement.

In an example, the food recycler includes a housing, a pot vessel that includes a first feature that serves to indicate a request to execute an infusion cycle using the contents within the pot vessel, a bucket vessel that includes a second feature that serves to indicate a request to execute a desiccation cycle using the contents within the bucket vessel, and an interior wall that forms a cavity within the housing and that is configured to receive the pot vessel and the bucket vessel. The food recycler further includes a controller within the housing that includes a set of indicators and one or more user interface (UI) components that can be used to configure the cycles. The food recycler also includes a set of sensors positioned within the interior wall to detect when the pot vessel or the bucket vessel are inserted into the cavity, a motor in electrical communication with the controller, and a set of components within the housing that can perform the infusion cycle and the desiccation cycle as needed.

In an example, the pot vessel is constructed from a ferromagnetic material to allow for generation of heat within the pot vessel while in an electromagnetic field.

In an example, the set of components of the food recycler include a vacuum and purge air pump that produces a negative pressure within the bucket vessel during the desiccation cycle and removes moisture laden air resulting from the desiccation cycle.

In another example, the food recycler further includes a hall effect sensor that is configured to detect a jam within the food recycler resulting from either the desiccation cycle or the infusion cycle.

In an example, the food recycler further includes an RF component that is used to control the temperature within the pot vessel during an infusion cycle and within the bucket vessel during a desiccation cycle.

In an example, the food recycler further includes a humidity sensor that is used by the controller to obtain humidity readings within the bucket vessel during a desiccation cycle to determine whether the desiccation cycle has been completed.

In another example, the interior wall that forms the cavity within the food recycle is constructed to include a thermal layer and an acoustic insulation layer to reduce heat transfer from the pot vessel and the bucket vessel and to reduce acoustic transmission resulting from the infusion cycle and the desiccation cycle, respectively.

In yet another example, the bucket vessel includes a rotor that is used to pulverize the contents within the bucket vessel and generates a mix flow of these contents in the bucket vessel during the desiccation cycle.

In an example, the set of sensors within the food recycler include a first sensor positioned to a first side of the interior wall and configured to detect the unique feature of the pot vessel and a second sensor positioned to a second side of the interior wall and configured to detect the unique feature of the bucket vessel.

In an example, a method is implemented that includes the steps of detecting insertion of a vessel into a food recycler, determining a cycle to be performed to convert the contents within the vessel into a product based on one or more features of the vessel, identifying the contents within the vessel, initiating one or more components of the food recycler to perform the cycle based on the contents within the vessel, detecting completion of the cycle, and indicating the completion of the cycle and providing the product resulting from the cycle. The cycle is one of a desiccation cycle to generate granular material and an infusion cycle to generate an edible food solution.

In an example, the one or more features of the vessel correspond to the desiccation cycle. As such, the method further includes identifying, based on these features, that the desiccation cycle is to be performed. In an alternative example, the one or more features of the vessel correspond to the infusion cycle. Thus, for the purpose of this alternative example, the method further includes identifying, based on these features, that the infusion cycle is to be performed.

In an example, the method further includes determining the volume and water content of the contents within the vessel. Based on the contents, the volume of these contents, and the water content, the duration of the cycle is determined and set.

In an example, once the final product has been produced at the end of either the infusion or desiccation cycle, the temperature within the vessel is maintained at a specific temperature to ensure stable storage of the product.

In another example, the method further includes detecting a jam within the vessel, stopping the one or more components of the food recycler, initiating a rotor within the vessel in a particular direction to eliminate the jam, detecting that the jam has been cleared from the vessel, and re-initiating the one or more components of the food recycler to resume performance of the cycle.

In yet another example, the method includes obtaining, via a UI of the food recycler, one or more parameters for converting the contents in the vessel into the product, and identifying, based on these parameters, the one or more components of the food recycler that are to be used in order to perform the cycle in accordance with the obtained parameters.

In an example, the method further includes monitoring agitation of the contents, heat application within vessel, and the temperature within the vessel to generate a temperature hysteresis range, and maintaining, based on this temperature hysteresis range, a cycle temperature within the vessel to produce the product.

In an example, the method includes monitoring the humidity within the vessel during the cycle to determine whether the cycle has been completed. If the humidity within the vessel falls below a minimum threshold value, the cycle is complete.

Another example structure for an updated food cycler can include a base component including and a base rim, at least one air intake opening, a gearbox, and a motor component having a motor and a top surface, the motor being in mechanical communication with the gearbox, an airflow component configured to be positioned on the top surface of the motor component, a fan component including a fan and positioned on an intake port of the airflow component and a filter component having an air filter configured therein. The filter component can be configured on an output port of the airflow component.

The food cycler can further include a bucket receptacle configured on the gearbox of the base component and configured to receive a bucket, wherein the fan component and the filter component are configured adjacent to an upper portion of the bucket receptacle, a casing having a lower rim complimentary to the base rim and configured such that the casing sits on the base rim, the casing having a first interior volume complimentary to the bucket receptacle, a second interior volume complimentary to the fan component, and a third interior volume complimentary to the filter component, a control switch configured in the casing, a lid configured with a hinge to the casing such that access to the bucket receptacle is provided by opening the lid and a controller configured to be in electrical communication with the motor, the fan and the control switch for operating the food recycler.

The motor can be configured in the base component to be at least in part to a side of a lower portion of the bucket receptacle. The lid can further be configured to enable air to flow from a top portion of the bucket receptacle through the lid and down to the fan component. A control switch and a lid latch can be configured in a front surface of the casing and further can be configured adjacent to each other with the latch on top and the control button within 2 mm of and below the latch. A benefit to the control button and latch configuration is that the user interaction with the system is focused on a single area of the system and is simplified for the user.

Upon an operation of the fan, air can be drawn into the casing via the at least one air intake opening in the base component, up an interior wall of the bucket receptacle, into the lid, down through the fan component, through the airflow component, and up through the filter component.

The air can flow from the filter component into the lid and the lid further can include an exhaust opening in a top of the lid and optionally at a rear portion of the lid. The exhaust opening can be configured on the top of the lid and within 2 cm of a hinge. The system can also be configured such that air can flow from the filter component to an exhaust opening on a rear surface of the food recycler, the exhaust opening being either in the lid or below the lid.

A ratio of a first volume of the bucket relative to a second volume including an overall volume of the food recycler can be between 0.0717 and 0.2857.

In one aspect, the control switch can be tilted and configured on a front surface of the casing. The food recycler further can include a latching mechanism configured to open the lid upon a user interacting with the latching mechanism, wherein the latching mechanism is configured above and adjacent to the control switch. The control switch can have a front surface configured in a first plane that is at a 5-30 degree angle relative to a second plane defined by the front surface of the casing. The casing can include a rear surface that is configured at an angle and the rear surface of the casing can include an exhaust opening. The angle can be defined between a vertical plane and a rear surface plane associated with the rear surface of the food recycler. In one aspect, the exhaust opening in the rear surface of the casing is configured at a top portion of the rear surface.

The bucket can include a cutting blade system having a central column, at least one cutting member each extending at a different level from the central column and at least one cross blade attached to opposite sides of the bucket, the at least one cross blade configured between two of the at least one cutting member. Where there is only one cutting member, it can pass above or below the cross-blade. The blade system can include a first cross blade and a second cross blade, and even a third cross blade. These blades can be configured in an arc shape, partially circular or can be configured as shown in the figures. Other configurations are contemplated as well.

The first cross blade can be configured between a first cutting member and a second cutting member, and the second cross blade is configured between the second cutting member and a third cutting member.

In one aspect, the air filter can be a compostable filter and have a side wall configured not to allow air to travel therethrough, a bottom opening, a top opening, and a handle for removing the air filter from the filter component.

A food recycler in another aspect can include a casing having a casing front surface and a lid, a motor configured in mechanical communication with a gearbox, the motor configured within the casing, and a tilted switch in communication with a control system for turning the food recycler on and off. The tilted switch can be configured in the casing front surface of the food recycler and has a switch front surface configured in a first plane that is 5-30 degrees relative to a second plane defined by the casing front surface and a latch positioned adjacent to and above the tilted switch. The latch can be configured to open the lid upon a user operating the latch.

An example method of recycling food in a food recycler includes drawing air, via a fan, through an air intake opening at a base of the food recycler according to a first air path, drawing the air, via the fan, from the first air path across a motor compartment according to a second air path, drawing the air, via the fan, from the second air path across a gearbox and up through a channel between a bucket and a bucket receptacle of the food recycler according to a third air path, drawing the air, via the fan, from the third air path and into the bucket according to a fourth air path, drawing the air, via the fan, from the fourth air path out of the bucket and into a lid of the food recycler according to a fifth air path, drawing the air, via the fan, from the fifth air path to a filter component according to a sixth air path and drawing the air, via the fan, from the sixth air path to away from the food recycler according to a seventh air path. The bucket receptacle can have a heater or heating component built in to provide heat to the bucket.

DETAILED DESCRIPTION

The present disclosure addresses the issues raised above. In this disclosure, a food recycler will be presented that covers different types of re-configurations of internal components such that the food recycler can process organic food waste to generate either nutrient preserved stable granular media via desiccation of the food waste or a nutrient and flavor infused foodstuff (e.g., stocks, broths, etc.). As noted above, an important feature of the new food recycler disclosed herein is that it is able to detect and identify which process, either for desiccation of food waste or for infusion of the nutrients and flavors of the food waste into a foodstuff, that is to be performed based on the placement of an appropriate bucket into the food recycler. Accordingly, the new configurations present innovative solutions to enable either process through a single device that is sized to permit use in the home, particularly on a kitchen counter top, for example.

One aspect of this disclosure will relate to the control system that is used to manage and control the recycling process. Part of this disclosure can include changes or improvements to the control system such that the food recycling process takes less time or is performed in a more energy efficient manner. The disclosure provides a system, method and computer-readable storage device related to the control system. As will be described in more detail herein, the control system will manage the various components such as the motor, a heater, a dehumidification system, a fan, and the user interface.

First, a general example computer system shall be disclosed in FIG. 1, which can provide some basic hardware components making up a server, a node, a controller, or other computer system or system for controlling cycles and processing of waste food according to the concepts disclosed herein. FIG. 1 illustrates computing system architecture 100, according to an aspect of the present disclosure. As shown in FIG. 1, the components of the system architecture 100 (or simply system 100) are in electrical communication with each other using a connector 105. Exemplary system 100 includes a processing unit (CPU or processor) 110 and a system connector 105 that couples various system components including the system memory 115, such as read only memory (ROM) 120 and random access memory (RAM) 125, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules/services can control or be configured to control the processor 110 to perform various actions. Other system memory 115 may be available for use as well. The memory 115 can include multiple different types of memory with different The processor 110 can include any general purpose processor and a hardware module or software module/service, such as service 1 132, service 2 134, and service 3 136 stored in storage device 130, configured to control the processor 110 as well as a special-purpose processor where software instructions are incorporated into the actual processor design. The processor 110 may be a self-contained computing system, for example, containing multiple cores or processors, a bus (connector), memory controller, cache, etc. A multi-core processor may be symmetric or asymmetric.

To enable user interaction with the computing device 100, an input device 145 can represent a variety of input mechanisms, such as a microphone for speech, a touch-sensitive screen for gesture or graphical input, a keyboard and/or mouse, e.g., for motion input and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and/or hybrids thereof.

The storage device 130 can include software services 132, 134, 136 for controlling the processor 110. Other hardware or software modules/services are contemplated. The storage device 130 can be connected to the system connector 105. In one aspect, a hardware module that performs a particular function can include the software component stored in a computer-readable medium in connection with the necessary hardware components, such as the processor 110, connector 105, display 135, and so forth, to carry out the function.

Figure 2A:
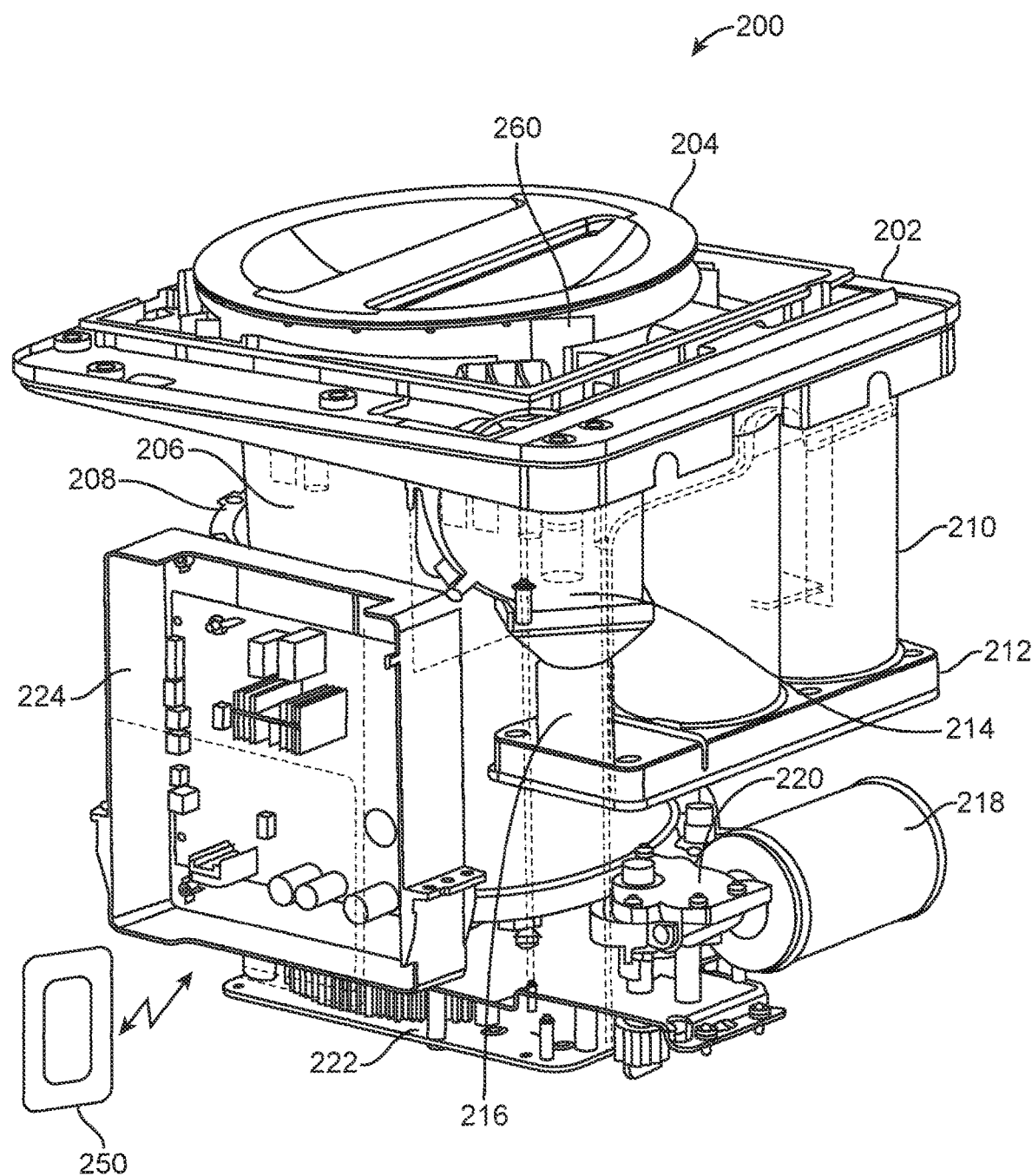
FIGS. 2A and 2B illustrate a first example of a food recycler.

FIG. 2A illustrates one example configurations for food recycler. It is noted that in the various examples shown, that any particular feature shown in any example can be combined with any other example and that the discussion around the respective figures is not intended to describe separate embodiments that are not interchangeable with respect to individual features.

FIG. 2A shows one optional example in which the internal configuration of the food recycler 200 is shown such that the motor and gearbox layout positions are changed as well as the configuration of the air filters in the same overall volume size. A goal of this example is to provide more space in the horizontal or Z direction that can enable an increase of the debt of the bucket to be larger than existing configurations. The food recycler 200 includes a lid 204 that can be twisted into an open and unlocked position from a closed and locked position. A handle is shown on the lid with a concave surface to enable user to be able to grab the handle.

Figure 2B:
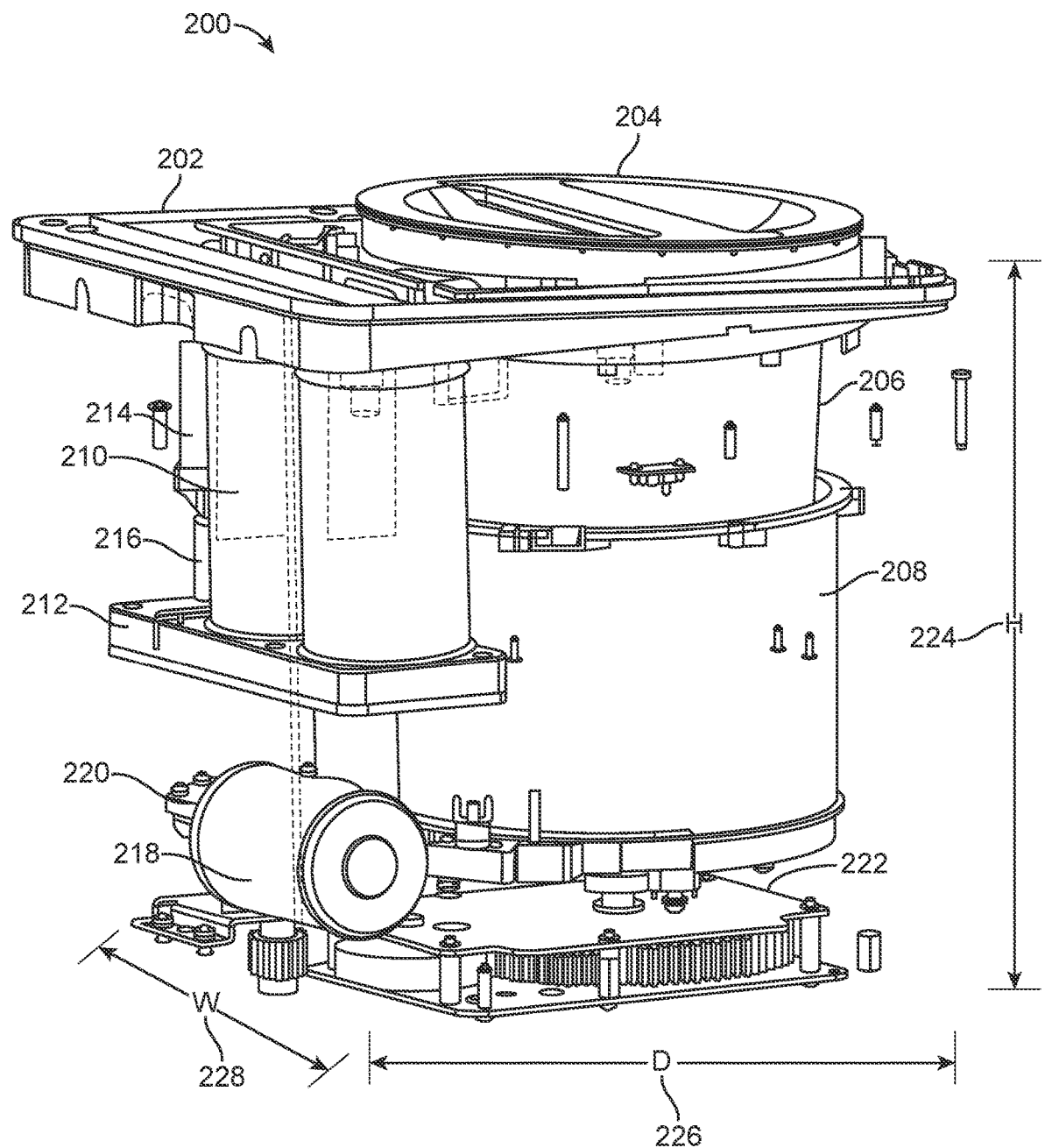

A top supporting structure 202 is shown in FIGS. 2A and 2B. FIGS. 2A and 2B do not show the exterior surface of a cover to the food recycler 200, only the supporting structure. Indicators can be provided to the user on the cover of the food recycler 200. The user interface for the food recycler 200 can include a number of different types of user interface. Typically, a button is pressed by the user to start the cycle. Lights can be presented to the user to identify the status of a cycle. The user interface could also be graphical in nature or through a touch sensitive screen that can present data about the status of the cycle and enable the user to initiate or stop the cycle.

The configuration of components within FIGS. 2A and 2B are as follows. The motor 218 is positioned low in the food recycler and to the side of the expanded bucket 206. The bucket 206 is within a bucket container 208. A fan 214 and an air duct 216 connect through another air duct 212 with one or more air filters 210. The air filters contain a material through which the air flows for deodorizing. An exhaust port can be configured at one end of the air filters 210 for releasing the odorless air into the room.

A transfer case 220 is positioned also next to the motor 218 and to the side of the bucket container 208. The transfer case enables mechanical energy to be transferred from the motor 218 to the gearbox 222. The gearbox is connected to a grinding mechanism that is configured within the bucket. The grinding component can be of any configuration.

A controller 224 is electrically connected to the various components so as to control the cycle of operation for drying waste food, grinding waste food, heating waste food, infusing nutrients and other elements of waste food into a liquid food solution, and the like.

The volumetric size of the food recycler 200 is preferably a width of approximately 270 mm 328, a length of approximately 310 mm 326, and a height of approximately 360 mm 330. The height is an important component as the food recycler 300 is designed to be a countertop in a kitchen or some other home environment. Typically, if there are cupboards above the countertop in a kitchen, there is approximately 18 inches of space between the countertop and the covered. Accordingly, providing a countertop appliance of approximately 14 inches is preferable for enabling the user to access the bucket 206 through removing the lid 204.

In one aspect, this disclosure may refer to an approximate measurement or an approximate length. In this scenario, the measurement can be +/−10% of the given height. Thus, providing a height of a food recycler 200 of approximately 360 mm and can include a range of 324 mm-396 mm. As described above, the components within the food recycler 200 are redesigned and reconfigured such that a ratio of a first volume of a bucket 206 that receives waste food relative to the overall volume of the food recycler case is between 0.0717 and 0.2857. Further, as noted above, as a result of this redesign and reconfiguration of the components of the food recycler 200, the bucket 206 can have a capacity to receive waste food of between 2.51 liters to 10 liters, resulting in a possible volumetric capacity of the food recycler 300 being between 8.79 liters and 35 liters.

While the height of the food recycler 200 can be of approximately 360 mm and can include a range of 324 mm-396 mm, the approximate length and width of the food recycler 200 can vary in accordance with the volumetric capacity of the bucket 306 (e.g., 2.51 liters to 10 liters) and of the food recycler 200 (e.g., 8.79 liters to 35 liters), subject to the ratio between the volumetric capacity of the bucket 306 and the volumetric capacity of the food recycler 200.

This can result in each of the length and width of the food recycler 200 being within a range of 165 mm-329 mm.

Accordingly, the food recycler 200 includes a housing that is configured with: a height between 324 mm and 396 mm, a length between 165 mm and 329 mm, and a width between 165 mm and 329 mm. Further, the food recycler 200 includes a controller 224 that includes a set of indicators and at least one user interface (UI) component that can be used to initiate a food recycling cycle. The controller 224 can be located within a first interior side of the housing and the UI component is configured to be accessible from the exterior of the housing. The UI component can include one or more of tactile buttons, touchscreens, dials, knobs, and the like. The food recycler 200 further includes a motor 218 that is in electrical communication with the controller 224 and is also located within the first interior side of the housing. Along with the motor 218, the food recycler 200 includes a grinding mechanism in mechanical communication with the motor 218. As noted above, the food recycler 200 includes a bucket 206 that has a volumetric capacity between 2.51 liters and 10 liters. This bucket 306 is positioned to a second interior side of the housing and opposite the first interior side where the motor 218, controller 224, and UI component are located.

As shown in FIGS. 2A and 2B, the air filters 210 are configured in the upper portion of the internal volume of the food recycler 200. The motor 218 is positioned in the lower portion of the food recycler 200 with at least a portion of the motor overlapping the bucket container 208.

In one aspect, the user could download an app on a mobile device 250 or a desktop device that can be used to control the food recycler 200. The controller 224 can include an antenna or a controlled connection with an antenna configured within the food recycler 200 such that the user device 250 can communicate with the device 200 wirelessly. Any wireless protocol such as Wi-Fi, cellular, Bluetooth, near Field communication, and so forth, are contemplated as being potential to medication protocols between a device 250 and the food recycler 200. In this regard, the user could remotely, either within the same building or from any location outside the building, either initiate a cycle, receive status reports on the progress of the cycle, receive error reports, and so forth through communication with the food recycler 200.

For example, in one aspect, the food recycler 200 could include in the lid 204 or some other location within the food recycler 200, a light and a camera (not shown) which can enable the user to view the contents of the bucket 206. Images or video to be received by the camera and transmitted as instructed by the controller 224 to a network node such that the user could retrieve those images through an app or through a website to visually see the progress of the cycle and the state of the waste food in the recycle process.

Figure 2C:
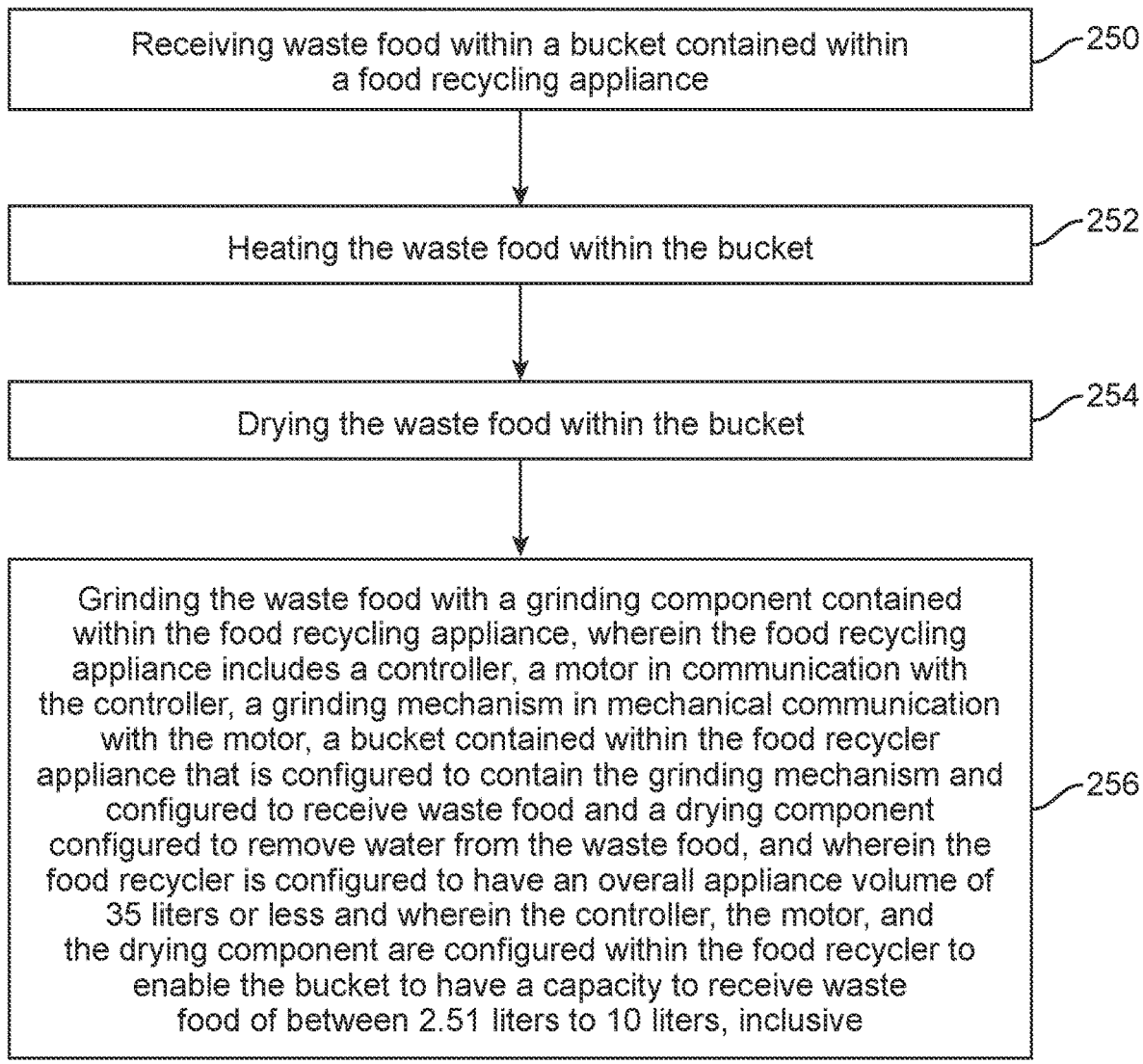
FIG. 2C illustrates an example method.

FIG. 2C illustrates a method example of processing waste food. The method includes receiving waste food within a bucket contained within a food recycling appliance (250), heating the waste food within the bucket (252), drying the waste food within the bucket (254), and grinding the waste food with a grinding component contained within the food recycling appliance, wherein the food recycling appliance includes a controller, a motor in communication with the controller, a grinding mechanism in mechanical communication with the motor, a bucket contained within the food recycler appliance that is configured to contain the grinding mechanism and configured to receive waste food and a drying component configured to remove water from the waste food, and wherein the food recycler is configured to have an overall appliance volume of 35 liters or less and wherein the controller, the motor, and the drying component are configured within the food recycler to enable the bucket to have a capacity to receive waste food of between 2.51 liters to 10 liters, inclusive (256). The volume of the bucket can be between 2.51 liters or 10 liters, in size.

Figure 3A:
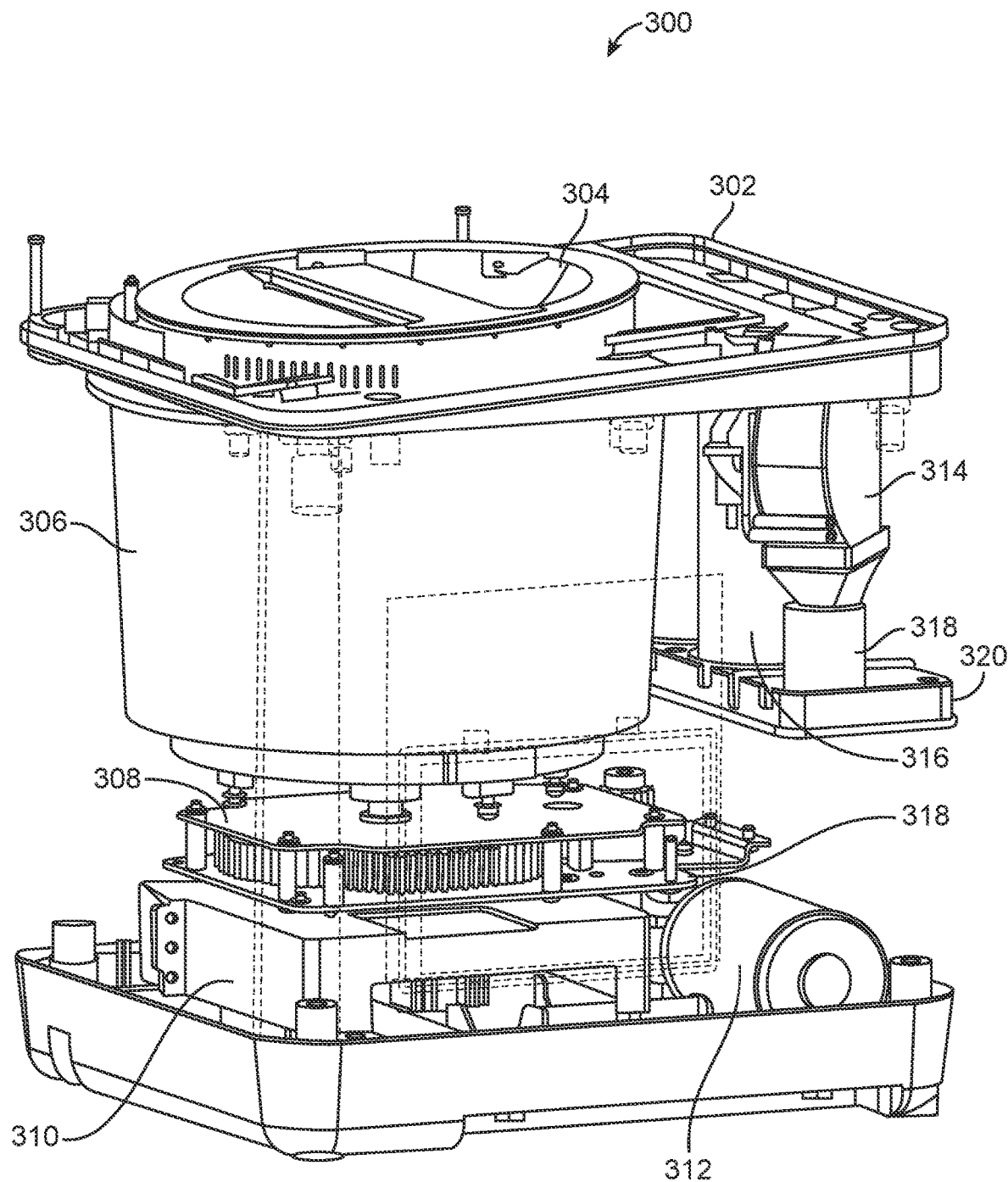
FIGS. 3A and 3B illustrate a second example of a food recycler.
Figure 3B:
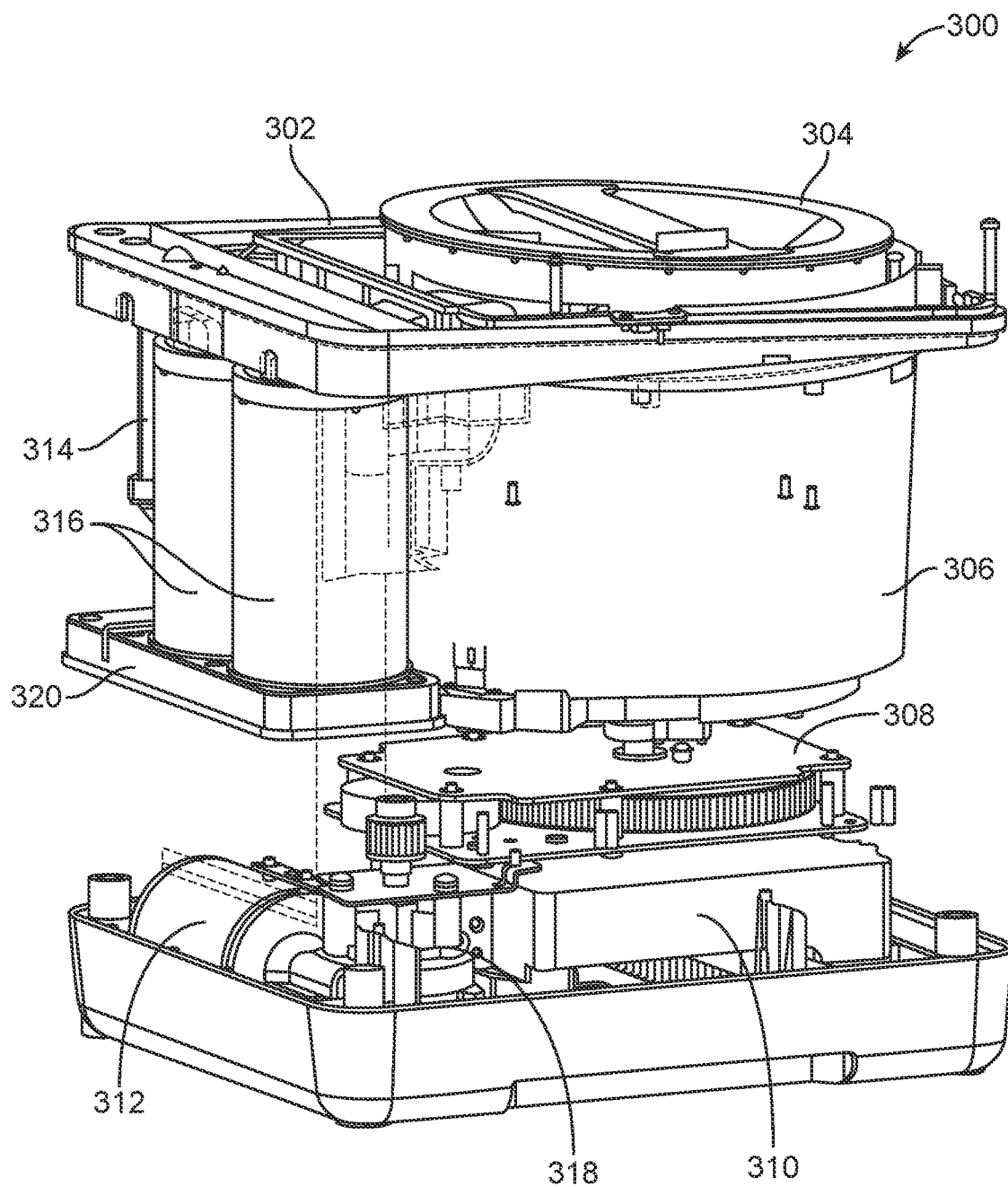

FIGS. 3A and 3B illustrate other example configurations for a food recycler 300. FIG. 3A shows a food recycler 300 having a lid 304 and a supporting structure 302 for a cover (not shown) of the food recycler 300. This configuration seeks to improve the volumetric efficiency in the XY direction for the bucket contained within the bucket container 306. In this example, the fan 314 and air filters 316, air duct 318 and second air duct 320 are positioned near the top of the unit. The motor 312 is positioned below the bucket and along a side, and even approaching a corner of the unit. The transfer case 322 is also positioned below the bucket and adjacent to the motor 418. The controller 310 is also configured below the bucket as well as the gearbox 308. Using this configuration, the bucket diameter can be increased.

Another aspect of this disclosure relates to an improvement in the chopping component or the grinding component. There are a variety of different improved configurations that will be discussed. One of the problems with other chopping or grinding components is that these may not adequately chop or grind all of the different types of waste food that are possible. For example, bones from animal waste can be difficult to chop or grind and other configurations currently used may not be sufficient to handled bones.

Figure 3C:
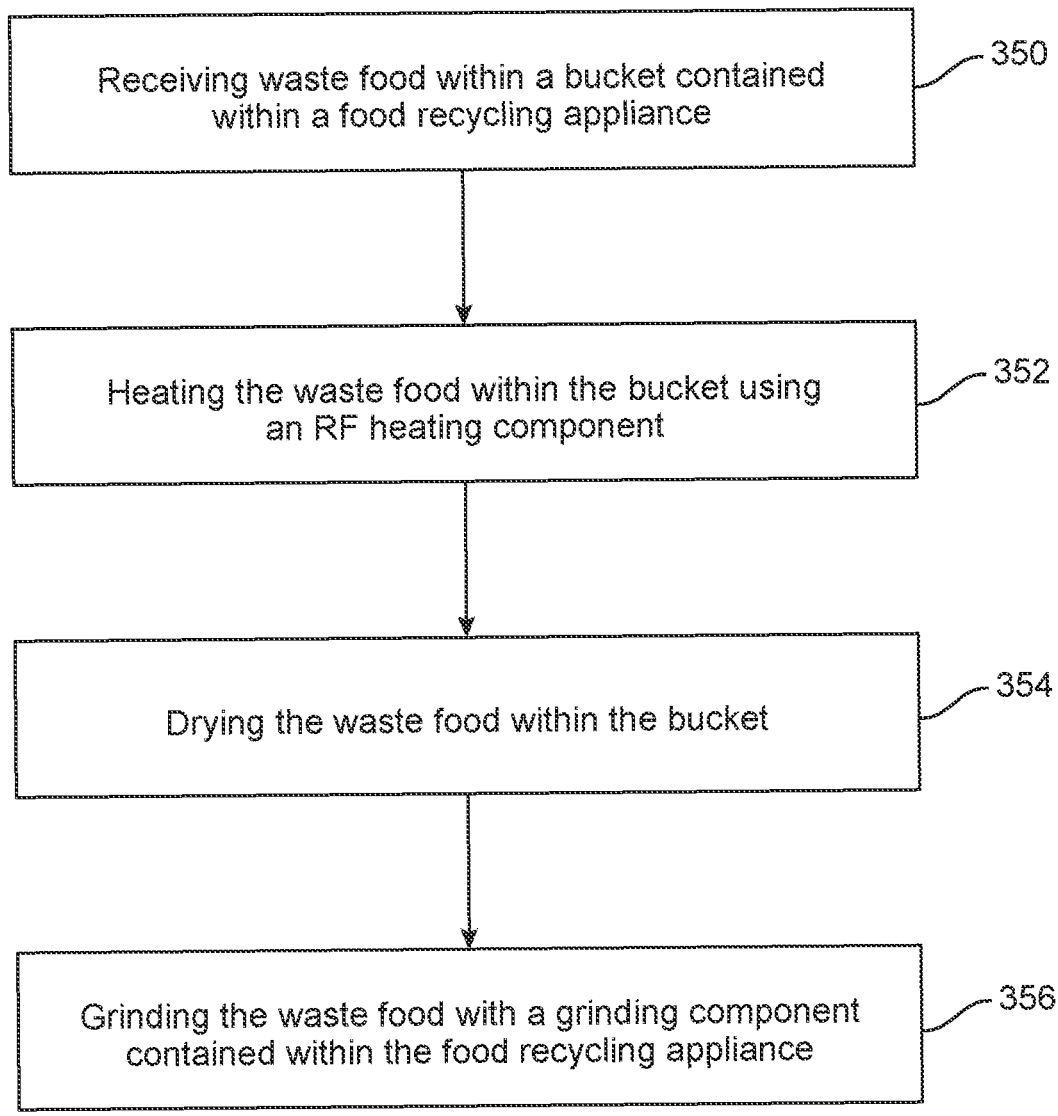
FIG. 3C illustrates an example method for operating a food recycler.

FIG. 3C illustrates an example method of operating a food recycling appliance. A food recycling method includes receiving waste food within a bucket contained within a food recycling appliance (350), heating the waste food within the bucket using an RF heating component (352), drying the waste food within the bucket (354) and grinding the waste food with a grinding component contained within the food recycling appliance (356).

Figure 4A:
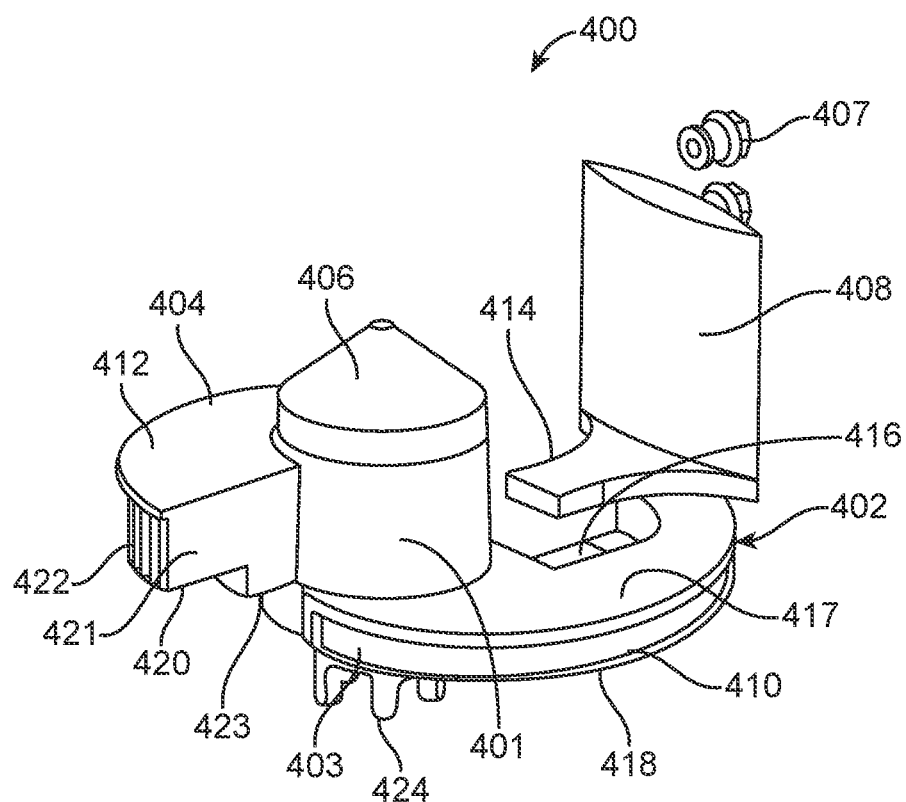
FIGS. 4A-4E illustrates an example grinding component.

FIGS. 4A-4E illustrate the improved configuration. With reference to FIG. 4A, a chopping component or grinding component 400 is disclosed. The component includes a primary column 401 that is mechanically attached to the motor system 424 of the food recycler. The controller described herein provides instructions to the motor for rotating the primary column 401 and a first direction as part of a cycle and then in a second direction as part of the food recycling cycle. A first arm 418 extends from the primary column 401. A first end of the first arm can be characterized as the end that attaches to the primary column 401. A first vertical surface 403 is shown as being part of or near the first and of the first arm 418. A second vertical surface 402 is shown at a distal end of the first arm 418. The overall curved vertical surface 410 extends along the entire length of the first arm 418. A top surface 417 can be flat such that the first arm 418 travels below a fixed chopping projection 414 which is connected to a supporting structure 408 that is attached 407 to a wall of a bucket 430 (See FIG. 4B). The first arm 418 extends at a certain elevation such that it travels below the fixed chopping projection 414.

The first arm 418 includes a blade 416 that is configured to extend from the top surface 517 of the first arm and in a direction opposite the curve surface 410. The blade 416 can be straight or curved and is configured to be complementary to a portion of the chopping projection 414 such that food can be chopped by the action of the first arm 418 rotating in a counterclockwise direction and moving beneath the chopping projection 414.

A second arm 404 extends at a higher elevation, relative to the certain elevation associated with the first arm 418 from the primary column 401. The second arm 404 has a flattop surface 412 and a curved vertical surface 411 and a flat vertical surface 421. The second arm 404 includes a first curved vertical surface configured near the primary column 401 where the second arm 404 attaches to the primary column 401. At a distal end, there is a second curved vertical surface that, in one aspect, can include teeth 422 or another configured surface that can be used to grip or grind waste food. The second arm 404 can have a first component 420 and a second component 423 that are configured such that the first component 420 travels over the chopping projection 414 as the component 400 rotates as part of a food recycling cycle. The second component 423 can be configured to travel adjacent to the chopping projection 414 as the component rotates.

Figure 4B:
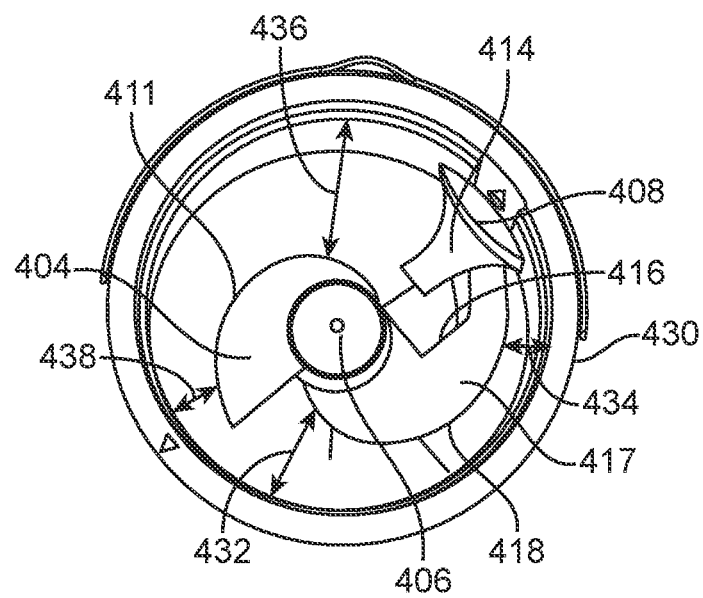

FIG. 4B shows a top view of the grinding component 400. The first arm has a first distance 432 configured between a first end of the first arm 418 and a wall of the bucket 430. The curved nature of the first arm 418 results in the distance 432 being greater than a second distance 434 which is identified as the distance between a second end or a second portion of the first arm 418 that is distal to the first end. In this regard, as the grinding component 400 rotates in the clockwise direction, waste food can be compressed inasmuch as the relative distance between a vertical edge 410 (shown in FIG. 4A) of the first arm 418 and the wall of the bucket become shorter as the first arm 418 rotates. Thus, food can be compressed against the wall of the bucket in an improved manner over the prior grinding component.

Similarly, the second arm 404 includes a curved vertical surface 411 such that a first distance 436 between the wall of the bucket and a first end of the second curved arm 404 is greater than a second distance 438 between a distal vertical surface of the second curved arm 404 and the wall of the bucket. Again, food can be compressed between the curve surface 411 and the wall of the bucket as the grinding component 400 rotates in a clockwise direction.

A top surface 406 of the primary column can have a sloped surface as shown in the figures such that waste food does not remain or settle on top of the primary column 401 or can have other configurations.

A shape of the chopping projection 414 can include a flat upper surface and a flat lower surface and a first curved vertical edge with a second curved vertical edge each meeting at a distal end with a flat vertical edge as shown in the figures. Other configurations are contemplated as well. Generally speaking, the configuration of the chopping projection 414 is complementary to the first arm 418 and the second arm 404.

Figure 4C:
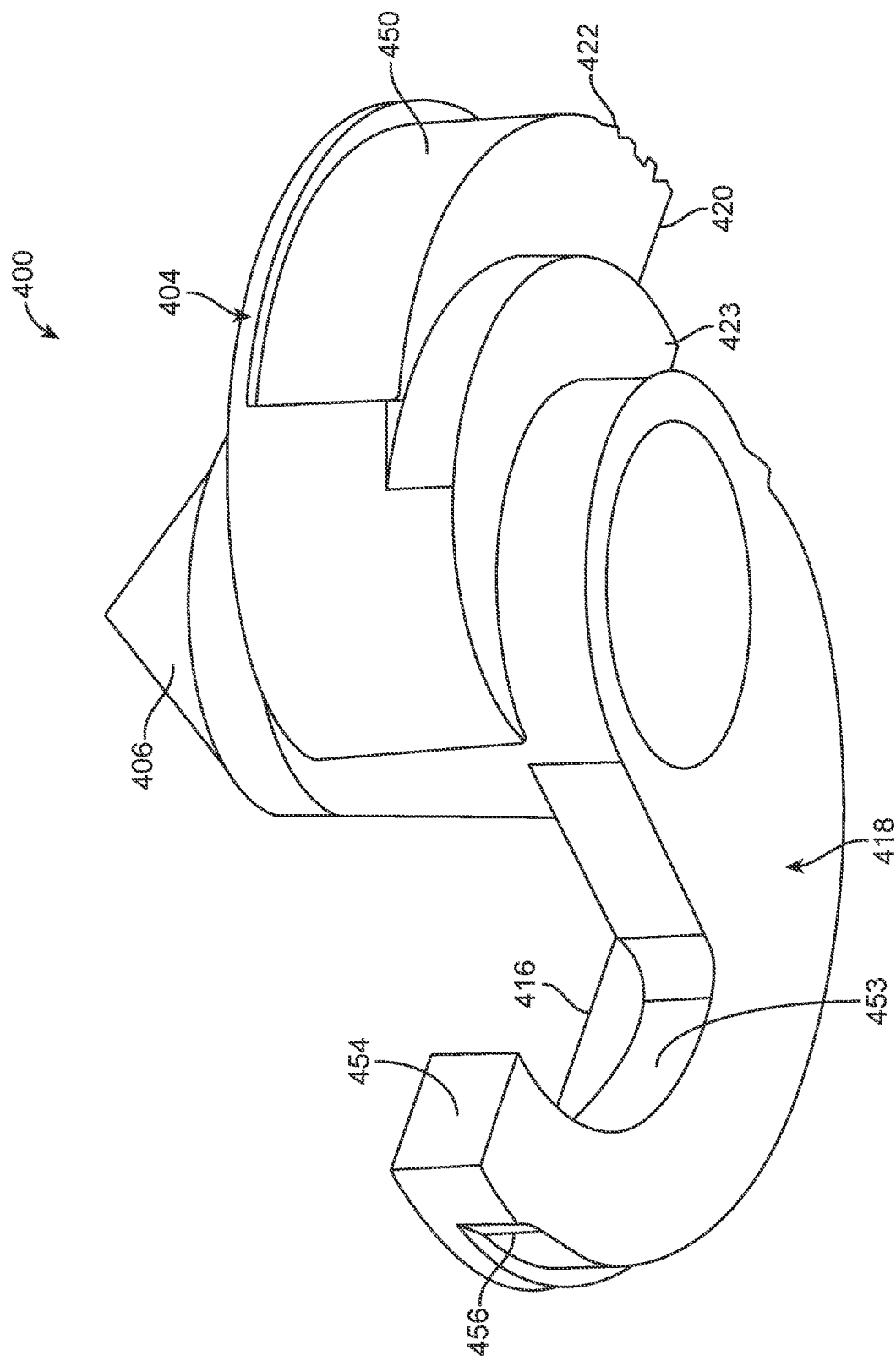

FIG. 4C illustrates a view from below the grinding component 400. The first component 420 and the second from component 423 of the second arm 404 are shown in more detail. The teeth 422 are shown as part of the distal end of the second arm 404. The exterior vertical surface 450 of the second arm is also shown. Feature 456 shows the vertical surface of the distal end of the first arm 418. In this figure, a slight variation on the configuration of the curved surfaces 450 and 456 are shown. In one aspect, the surfaces may be flat or may have a portion of the vertical surface extending further than another portion of the vertical surface as shown in FIG. 4C. These services may also include additional grinding teeth similar to the teeth 422 shown distributed in various positions along the surface. For example, teeth 422 may be configured along the entire vertical surface or in portions of the vertical surface for strategic grinding capabilities.

FIG. 4C also shows the blade 416 which can be beneficial for cutting high fiber food waste. The blade 416 is generally configured as an extension of the top surface of the first arm 418. A vertical surface 453 is also shown as part of the curved first arm 418. The blade 416 can be an extension of this surface and could be considered also as a further extension of the top surface 417 (Shown in FIG. 4A) of the first arm 418.

Figure 4D:
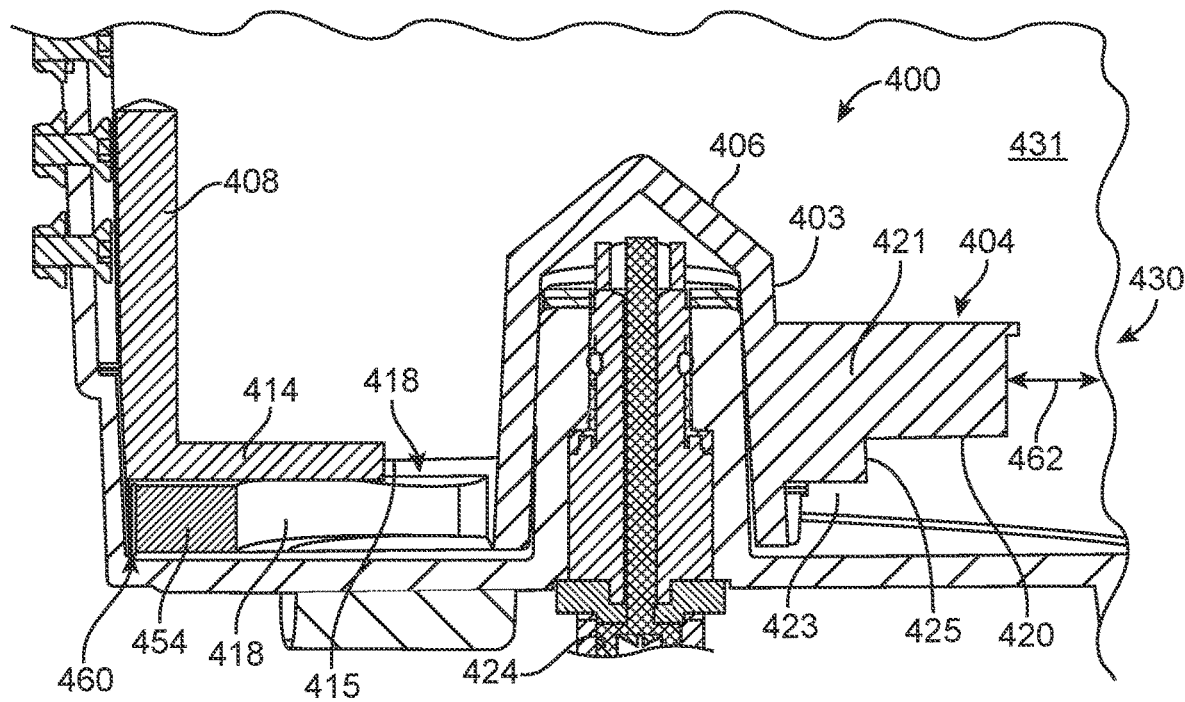

FIG. 4D illustrates another view of the grinding component 400. Shown are some example structures for mechanically attaching 424 the grinding component 400 to a motor system. The chopping projection 414 is shown with its supporting mechanism 408. Some example distances between arm components and the interior wall 431 of the bucket 430 are shown. For example, a distance 460 between the vertical surface of the distal and of the first arm 418 can be approximately 1 mm. A distance 462 between the distal end of the second arm 404 and the wall 430 can be approximately 15 mm. These are example distances and a range of distances may be employed.

Figure 4E:
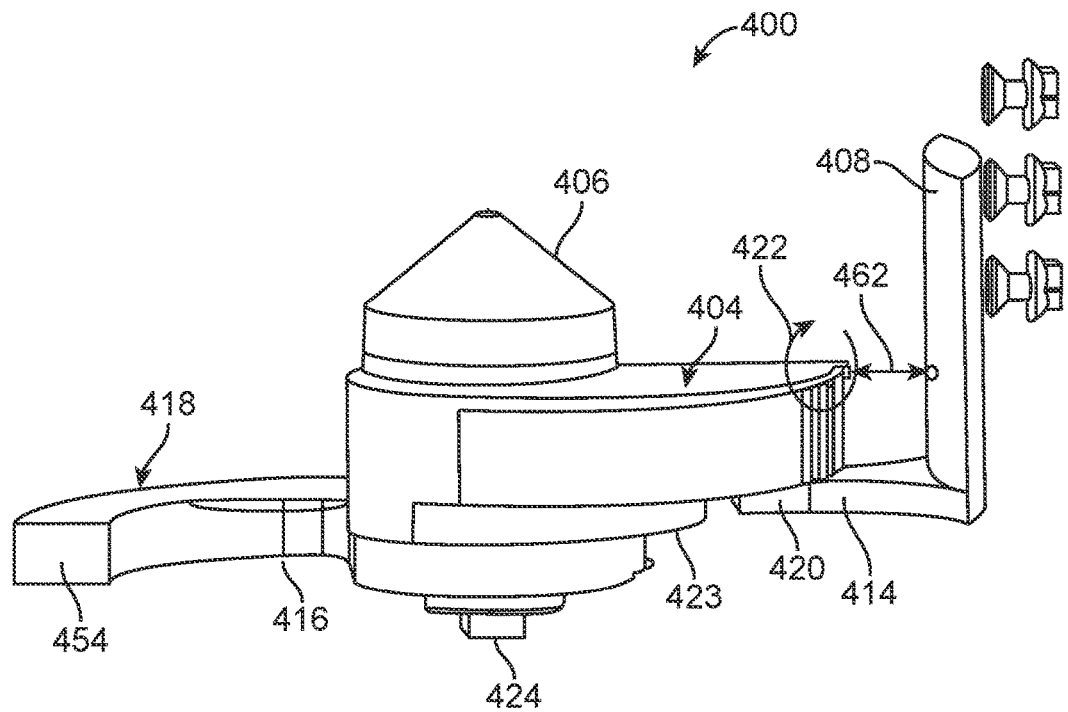

FIG. 4E illustrates yet another view of the grinding component 400 with the various features shown including an end vertical surface 454 of the first arm 418. The distance 462 between the distal end of the second arm 404 and the wall of the bucket is shown as well. This figure also shows the relative positions of the second arm 404 with its first component 420 positioned above the chopping projection 414 upon rotation. The second component 423 is shown as being adjacent to the distal end of the chopping projection 414.

Figure 5A:
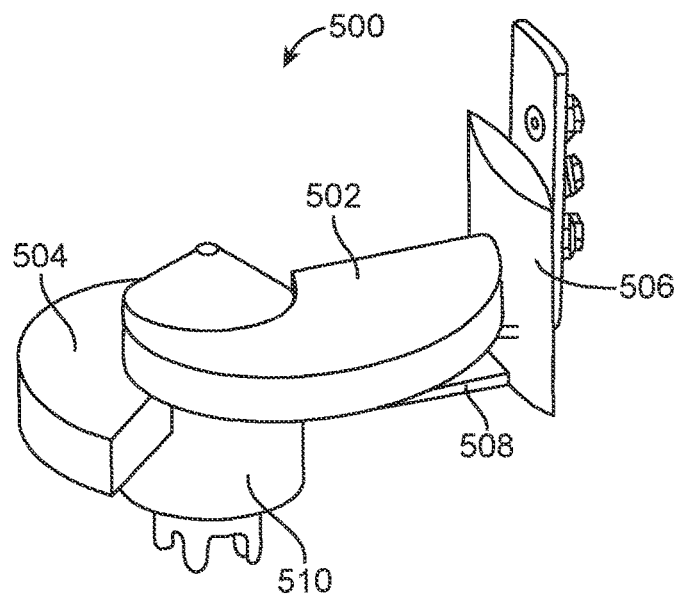
FIGS. 5A-5C illustrate example alternate grinding component configurations.

The particular configurations of the arms extending from the primary column can also vary in several respects. For example, FIG. 5A illustrates a different configuration 500 in which the upper arm 502 extends further towards the wall of the bucket than the lower arm 504. The chopping projection 508 in this configuration is shown as being beneath the upper arm 502. Note the partial overlap between the upper arm 502 and the lower arm 504. A supporting structure 506 for the chopping projection 508 is shown as well. A primary column 510 is used to attach the arms.

Figure 5B:
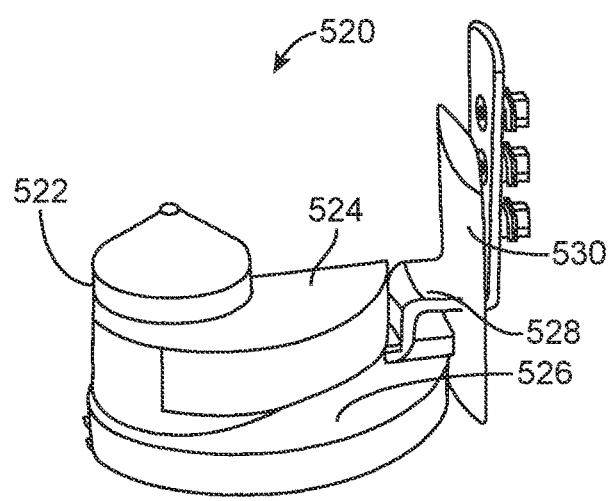

FIG. 5B illustrates another alternate example 520 in which an upper arm 524 is configured to have a substantial amount of overlap with a lower arm 526. The chopping projection 528 is configured such that upon rotation a portion of the upper arm 524 passes above a portion of the chopping projection 528 while simultaneously a portion of the lower arm 526 passes below the chopping projection 528. A supporting structure 530 enables the chopping projection 528 to be configured in the wall of the bucket. A primary column 522 is used to attach the arms.

Figure 5C:
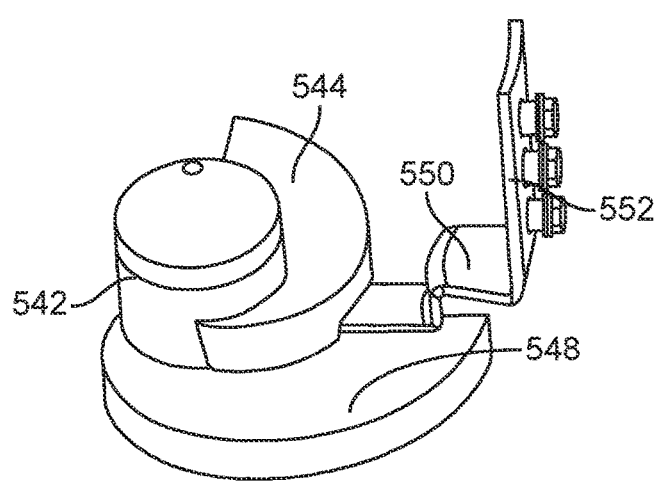

FIG. 5C illustrates yet another example 540 which shows a first upper arm 544 partially overlapping a lower extending arm 548. A chopping projection 550 is shown with a horizontal portion that first extends from the supporting structure 552, a second portion that is vertical and the last distal portion that again is horizontal. The lower arm 548 is configured to rotate below the entire chopping projection 550 and the upper arm 544 is configured to rotate adjacent to an above the distal horizontal portion of the chopping projection 550.

Figure 6A:
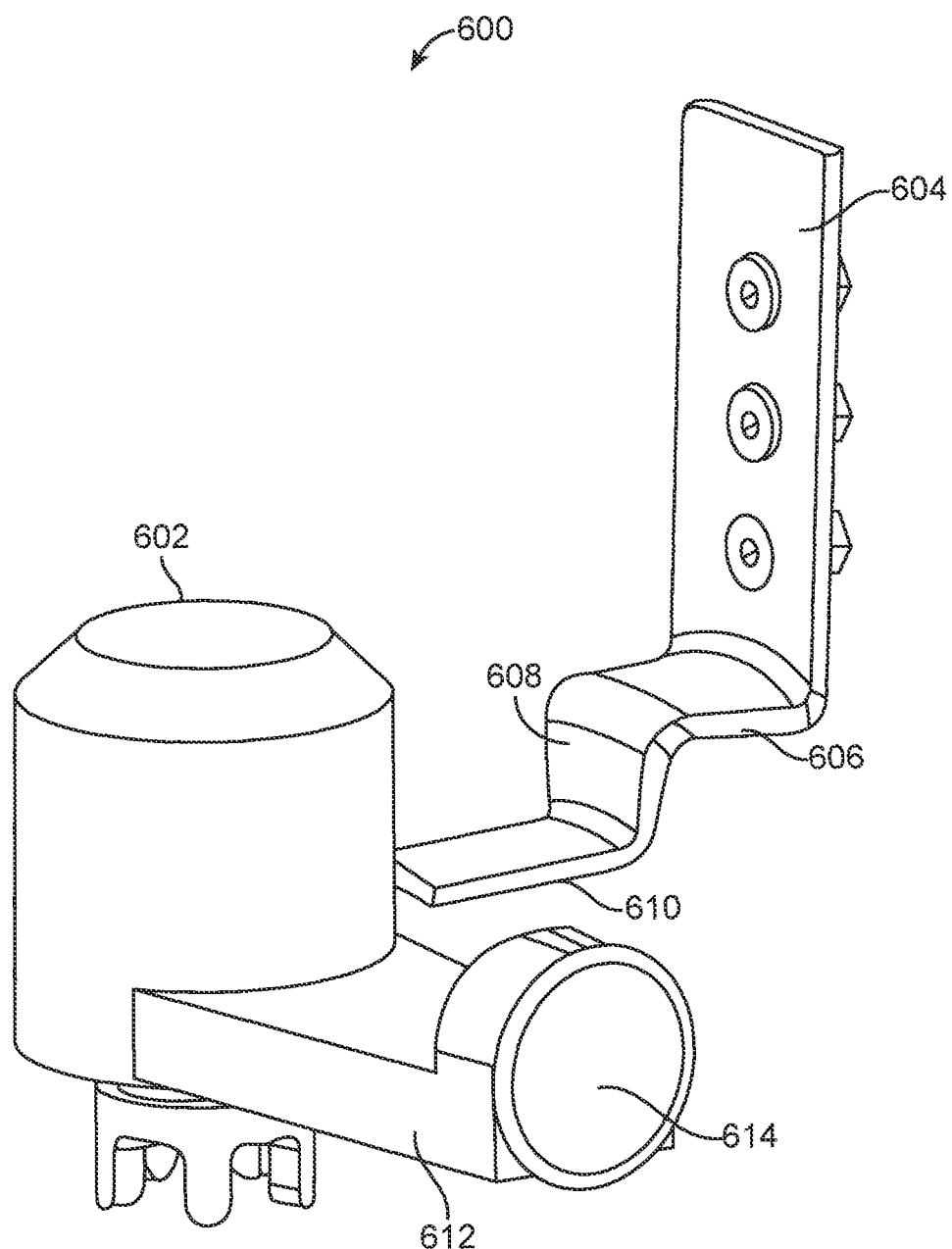
FIGS. 6A-6B illustrate alternate grinding component configurations.

FIG. 6A illustrates yet another example configuration 600 which includes a chopping projection supporting structure 604 from which a first horizontal segment projects 606 which connects to a vertical portion 608 and a final horizontal distal projection 610. A primary column 602 includes an extension arm 612 which includes a vertical cutting wheel 614. The configuration of the arm 612 is such that a first portion of the arm is configured to be complementary to and rotate below the distal horizontal projection 610 of the chopping projection. A distal end of the arm 612 is configured to hold the vertical cutting wheel 614 and also to travel under the first portion of the chopping projection 606 upon rotation of the grinding component 600. While the arm 612 is shown generally to be straight in FIG. 6A, the configuration could also be curved as well in a similar nature to the other structures disclosed herein.

Figure 6B:
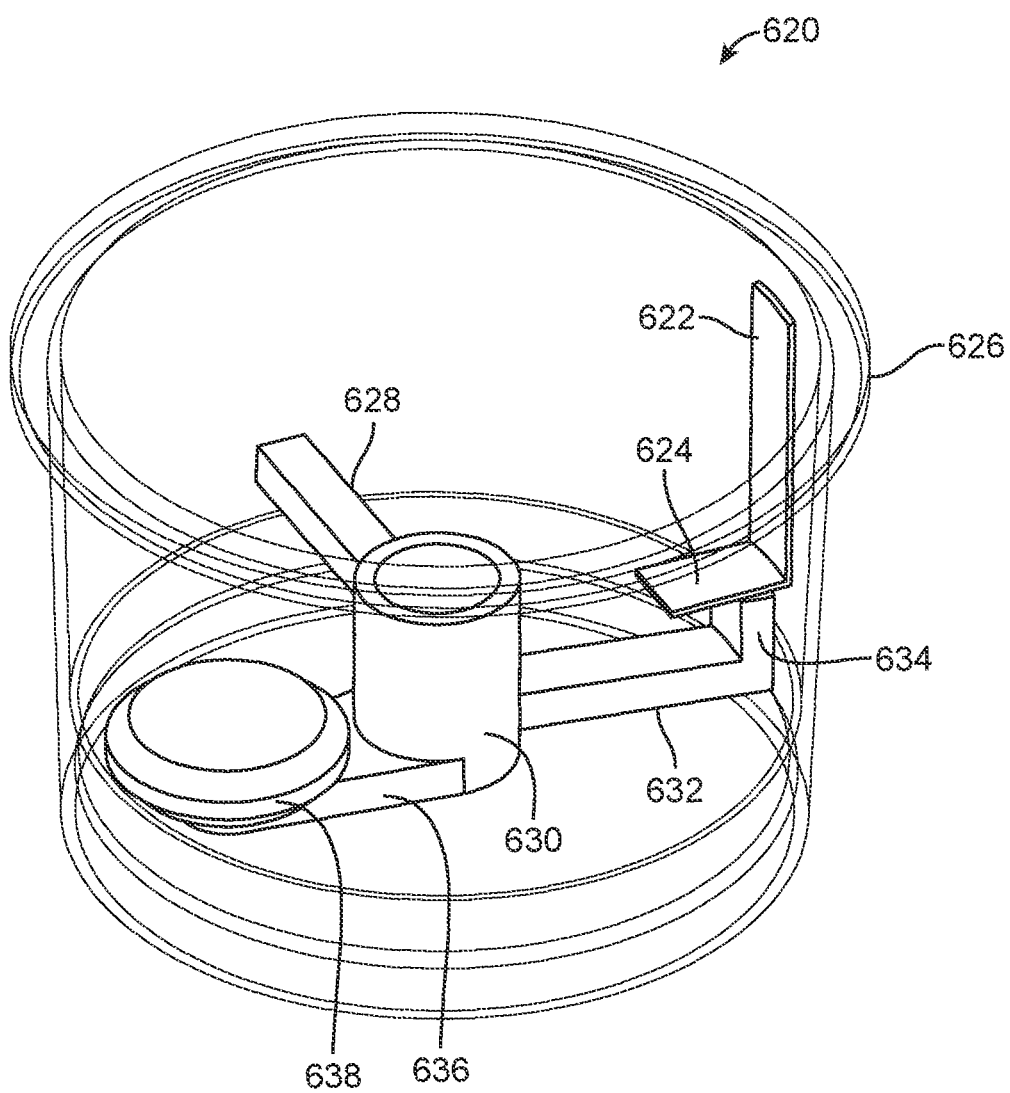

FIG. 6B illustrates another example structure 620 in which a chopping component supporting structure 622 provide support for an example chopping projection 624. A primary column 630 supports a first leg 628 which is a straight projection from the column 630. A second leg 632 projects from the column 630 and includes a distal end 634 which has a vertical projection which is complementary to a lower surface of the chopping projection 624. A third leg 636 extends from the lower portion of the column 630 and includes a horizontal cutting wheel 638. In this example, the horizontal cutting wheel 638 is configured to travel below the chopping projection 624 upon rotation of the grinding component 620. A bucket 626 is shown as supporting the chopping projection 624 and supporting structure 622. The arm 628 is configured to pass above the chopping projection 624 in this example.

Figure 7:
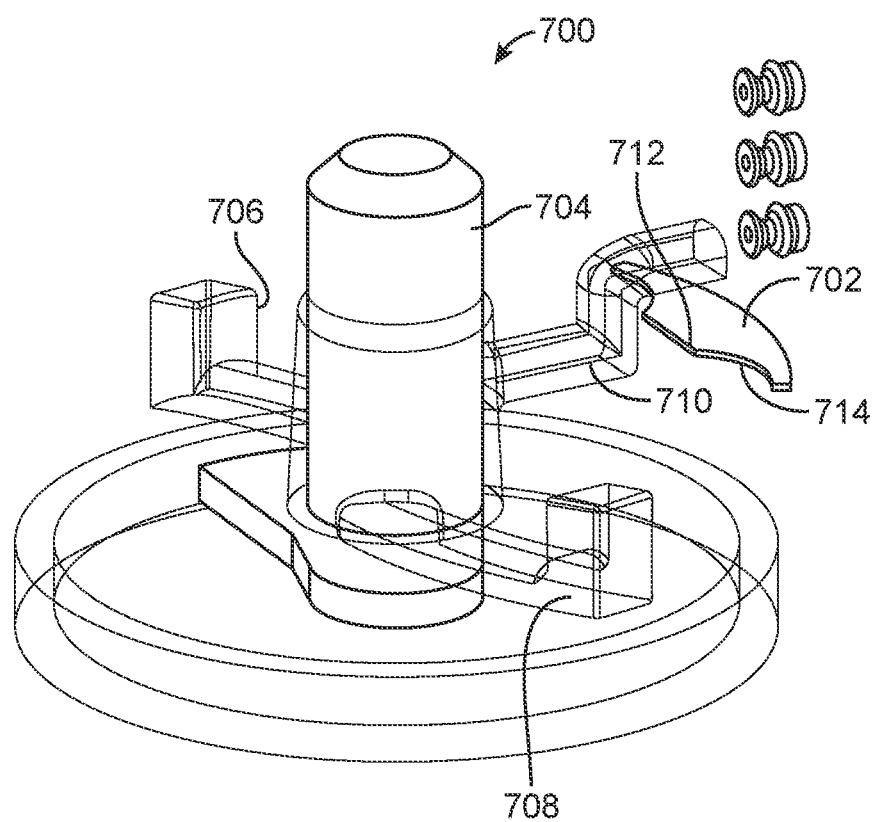
FIG. 7 illustrates a stopper configuration.

FIG. 7 illustrates another variation in which the traditional arms 706, 708 and 710 can be used as projecting from a primary column 704 but that a modified stopper 702 is provided. In this scenario, the distal end of the arm 710 travels above the stopper 702 while the distal end of leg 706 and the distal end of leg 708 each travel underneath the stopper 702. The modified stopper has a first curve surface 714 on a first side of the stopper 702 as well as a second corresponding and similar curve surface (not numbered) on an opposite side of the stopper 702. A distal end of the stopper 712 can have a curved or straight surface. The services described herein can, in one example, be sharpened such that as waste food is brought into contact with the stopper 702 it can be cut via the movement of one or more of the arms 706, 708, 710 against the stopper 702. It is also noted that while the traditional arms are included in FIG. 7, any of the arm structures disclosed herein could be applied to this example. This is a general principle as well that any of the stopper or chopper projection structures could be combined with any of the leg configurations disclosed herein.

Figure 8:
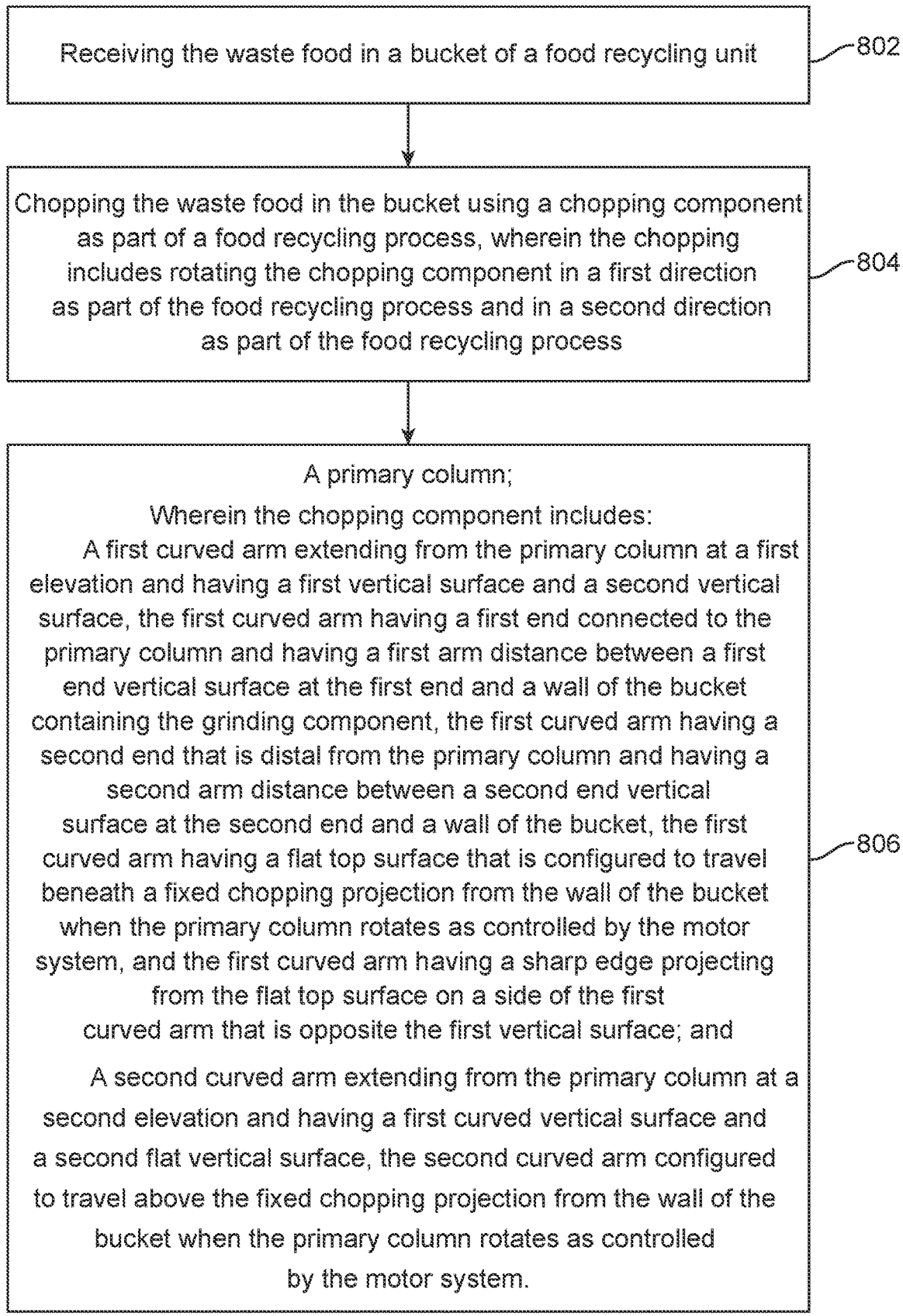
FIG. 8 illustrates an example method related to using a grinding component.

FIG. 8 illustrates an example method of using a chopping or grinding component for processing waste food. The method includes receiving the waste food in a bucket of a food recycling unit (802) and chopping the waste food in the bucket using a chopping component as part of a food recycling process, wherein the chopping includes rotating the chopping component in a first direction as part of the food recycling process and in a second direction as part of the food recycling process (804).

The chopping component, by way of example, includes one or more of: (1) a primary column, (2) a first curved arm extending from the primary column at a first elevation and having a first vertical surface and a second vertical surface, the first curved arm having a first end connected to the primary column and having a first arm distance between a first end vertical surface at the first end and a wall of the bucket containing the grinding component, the first curved arm having a second end that is distal from the primary column and having a second arm distance between a second end vertical surface at the second end and a wall of the bucket, the first curved arm having a flat top surface that is configured to travel beneath a fixed chopping projection from the wall of the bucket when the primary column rotates as controlled by the motor system, and the first curved arm having a sharp edge projecting from the flat top surface on a side of the first curved arm that is opposite the first vertical surface and (3) a second curved arm extending from the primary column at a second elevation and having a first curved vertical surface and a second flat vertical surface, the second curved arm configured to travel above the fixed chopping projection from the wall of the bucket when the primary column rotates as controlled by the motor system (806).

Energy Savings

Another aspect of this disclosure relates to providing an alternate form of heat which differs from current configurations. The existing food recyclers utilize a heat plate which causes heat to be transferred to the bucket and which heats the food as part of the food recycling process. This disclosure now introduces a new approach to heating waste food as part of the recycling process. This disclosure first introduces microwaves and microwave ovens and then applies some of these principles to a new context and a new structure with respect to utilizing an RF component to at least, in part, heat waste food as part of the food recycling process.

FIGS. 9A-9D illustrate examples of introduction of an RF component into a food recycling appliance. Microwaves have a frequency that can penetrate water, fat and sugar molecules and excite them. For molecules to be excited, the electrons orbiting the nucleus have to jump up into a higher energy level. When this occurs, the atom starts to vibrate faster than normal. When this happens in a glass of water, for example, all the atoms that make up the water start to move and run into each other and create friction. When friction is created, energy is given off in the form of heat. The generation of heat using microwave technology is part of the dehydration process in connection with food recycling. The food recycling process preferably heats the waste food as part of the process. Previously, a heat plate was deployed within the food recycling appliance that was physically connected to the bucket and, when heated, would transfer heat from the heat plate to the bucket and thereby heat the waste food. The introduction of an RF component, in whole or in part, to heat the food results in a more efficient food recycling process in comparison to just heating the food via of heat plate.

Figure 9A:
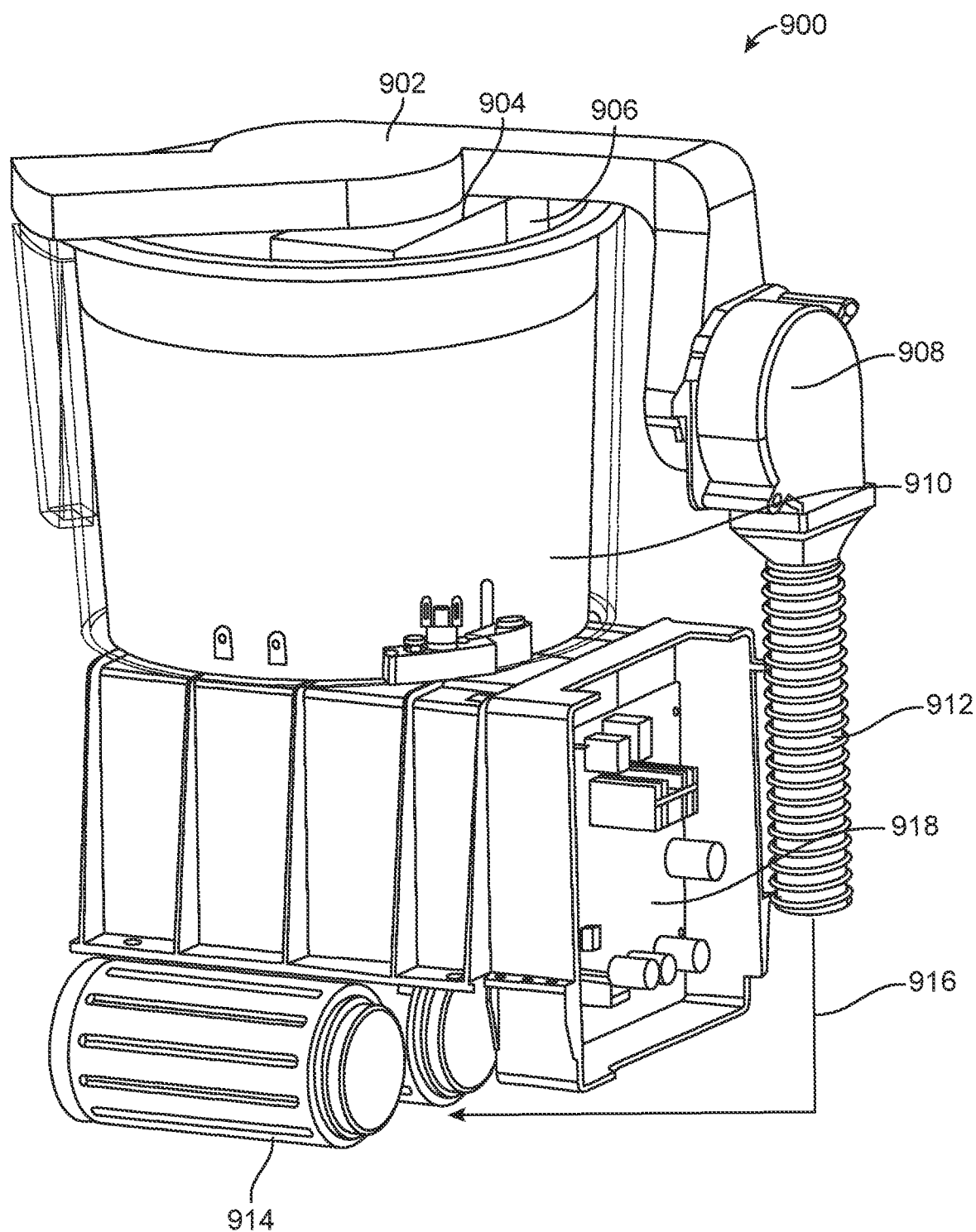
FIGS. 9A-9D illustrate an RF component example.
Figure 9B:
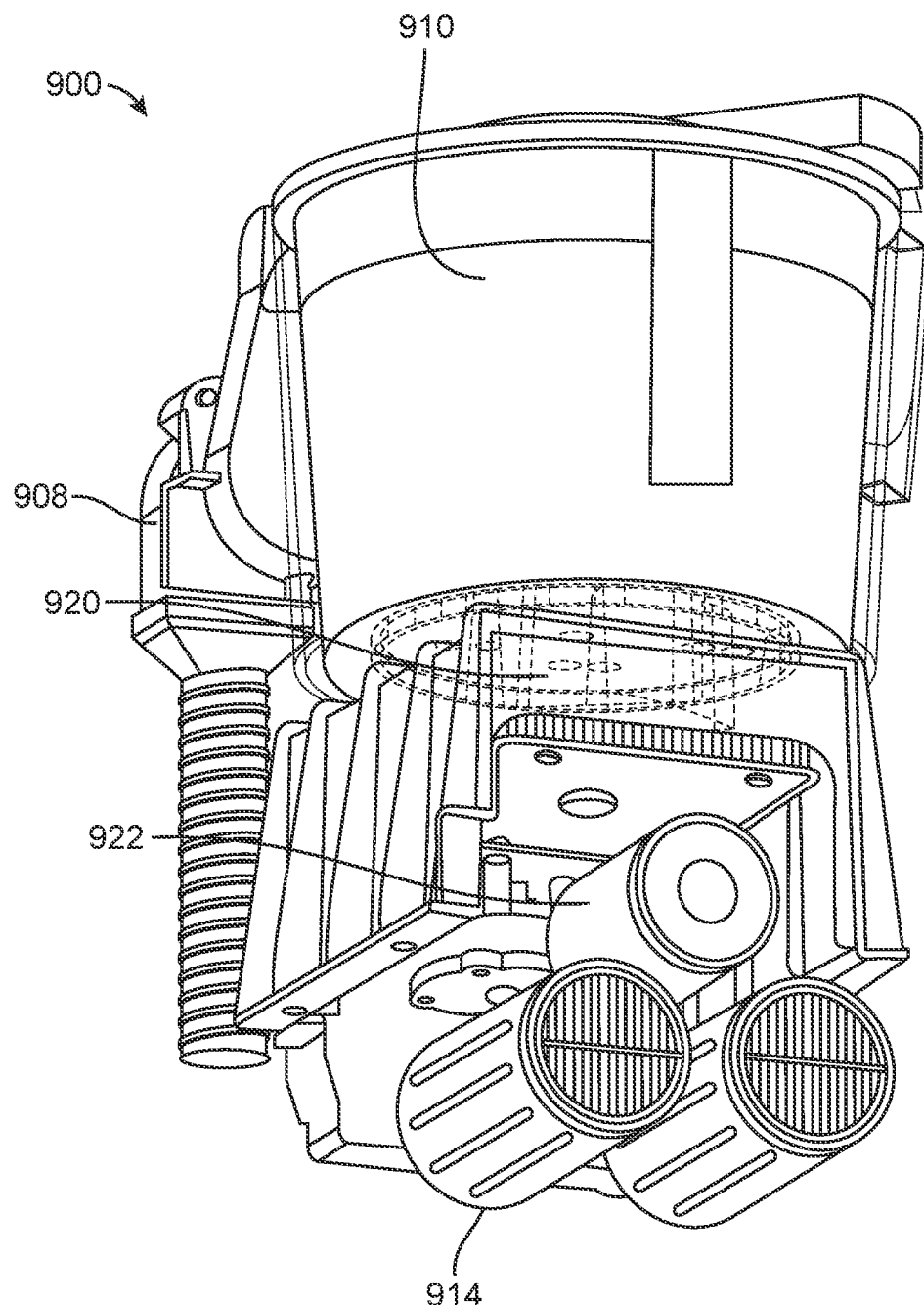

FIG. 9A illustrates a food recycler 900 that includes an air circulation components 902, a waveguide 904, and RF component 906, a fan 908 connected to the air circulation component 902, a control system 918, an air guide 912, an airflow path 916 and the filtering system 914. FIG. 9B further shows the food recycler system 900 with the bucket 910, the fan 908, and a heated plate 920. A grinding system 922 is also shown which includes a motor, transfer case, and gearbox for controlling the motion of a grinding component within the bucket 910.

Figure 9C:
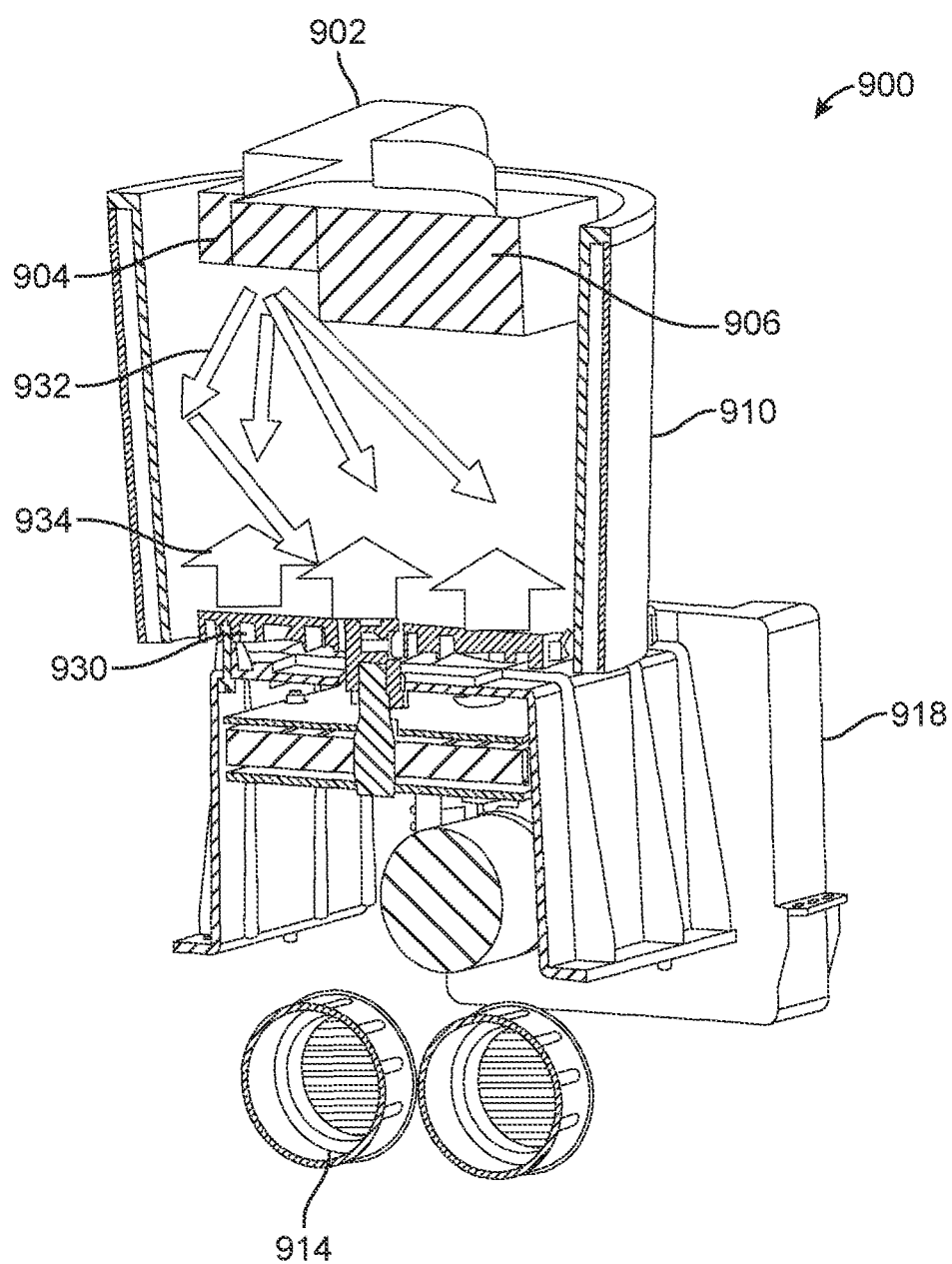

FIG. 9C further shows details of the waveguide 904 within the food recycling system 900. Air ducts 902 are shown for retrieving air from the interior portion of the bucket 910. The heated plate 930 is in electrical communication with the control system 918 such that heating of the bucket 910 can occur at the appropriate time within the food recycling process. The RF component can be a magnetron 906 which can provide microwaves to the waveguide 904 for introduction 932 into the interior of the bucket 910. Heat can be generated from the heat plate and introduced 934 also into the interior of the bucket 910 to heat food.

Figure 9D:
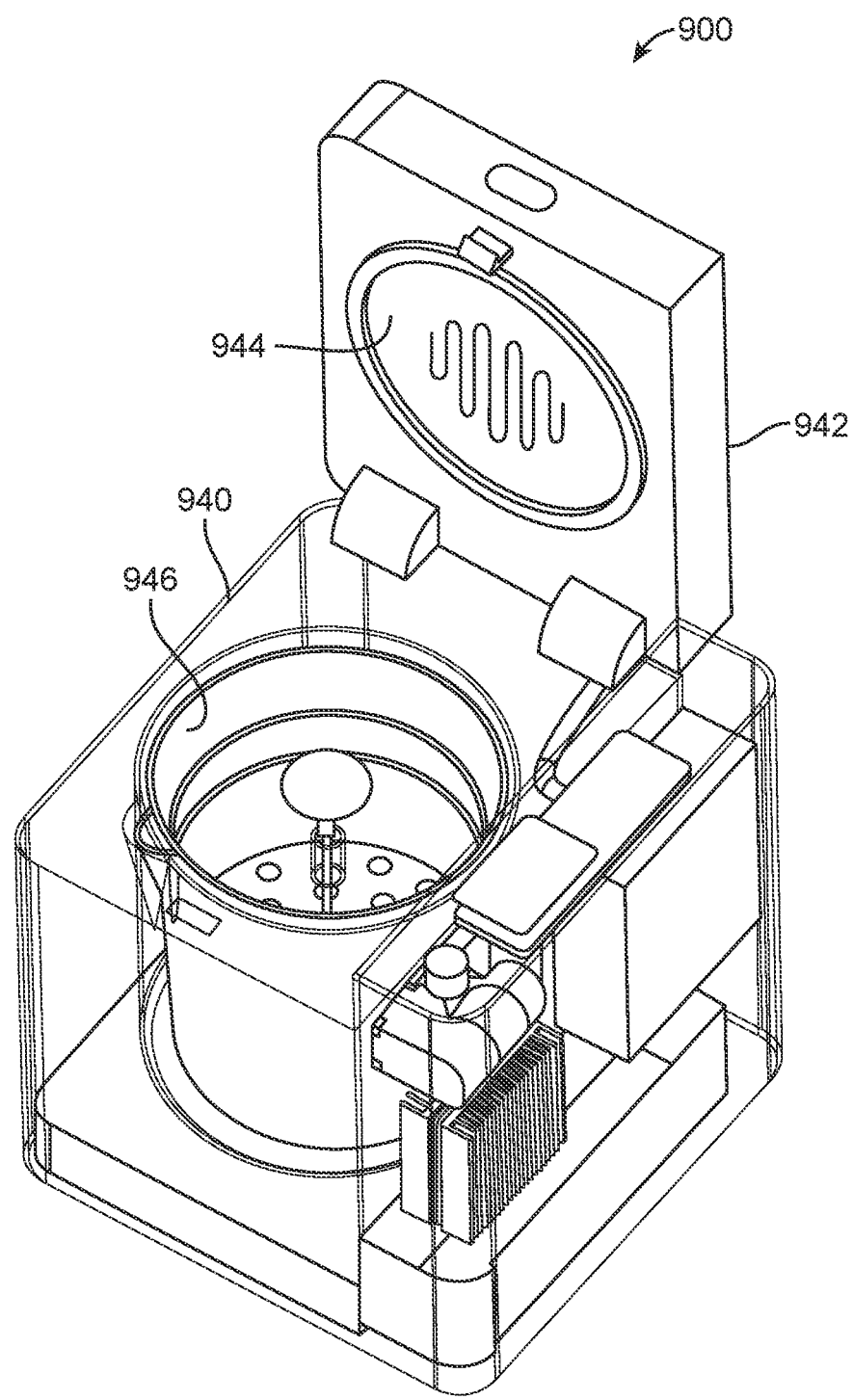

FIG. 9D illustrates another example of a food recycling appliance 900 which includes an RF component 944 configured within a lid 942 of the appliance. The food recycling case 940 is shown containing the bucket 946 and other various components.

Shielding can also be provided such that the lid 942 includes a seal in connection with the food recycler case 940 such that as microwaves are introduced into the interior of the bucket 946, the microwaves do not leak out of the contain space. Given the shape of the bucket 910, 946 and given the use of the grinding component or stirrer configured within the bucket for grinding and stirring the waste food, the waveguide 904 is configured so as to evenly heat the waste food and to avoid hot spots.

In one aspect, the present system can include a camera system or other sensor system in connection with the use of the RF component such that a configuration of the waste food can be determined in preparation for microwave heating of the waste food. For example, a sensor system, in communication with the control system, can determine sensor data which can include one or more of a shape of the waste food, an amount of the waste food, a weight of the waste food, a type of the waste food, a density of the waste food, and so forth and make adjustments with respect to any aspect of the system which participates in the food recycling process. For example, the waveguide 904 might be dynamic or adjustable such that depending on the sensor data, a particular waveguide configuration may be selected or configured in order to evenly heat the waste food and avoid hot spots. In another aspect, the system may utilize the sensor data to determine how to run the various stages of the food recycling process. For example, sensor data may be utilized to determine whether to start a grinding component in a clockwise direction or counterclockwise direction. The sensor data may be utilized to determine, as indicated by the control system, what type of microwave heating to perform, how much, how long, and under what configuration of the waveguide, to implement heating the waste food as part of the food recycling process. The sensor data can further be utilized to manage an air circulation system, the use of filters for filtering the air, the use of the heat plate, the combination of the use of the heat plate and the RF component for heating the waste food, a speed of the grinding component, a period of time in which any of these features are applied as part of a food recycling process, and so forth.

In one aspect, the RF component is an RF emitter element that is directionally oriented to induce RF energy into the food waste mass during a desiccation cycle so as to create heat within the food waste. The RF emitter element includes, either separate or in combination, an RF transmitter, an RF transmission line, and an RF radiating antenna possessing a high front-to-back radiation pattern oriented toward the food waste mass so as to create heat within the food waste mass when energized. In one aspect, a flat or parabolic reflective element is located behind the radiating element so as to reflect the back energy toward the food waste mass, so as to increase the front-to-back transmission ratio of the energy radiating element.

In one aspect, the RF transmitter emits at a frequency of 2.45 GHz coupled to an antenna tuned to radiate at a 12.2 cm wave length. In an alternate aspect, the RF transmitter emits at a frequency of 915 MHz coupled to an antenna tuned to radiate at a 32.7 cm wave length. The RF transmitter is configured within the lid and integrated into the antenna array on a planar circuit assembly. In one aspect, the RF transmitter and radiating antenna are separate elements connected via an RF interconnection cable with the RF transmitter located in the lid assembly or within the food recycler case 940. In another aspect, the RF emitter element is replaced by an electrically-heated infrared heater element includes a carbon material or other suitable material optimized to emit a wavelength of 3000 nm for targeted absorption of the food waste water component and untargeted reflection by the bucket material components.

It should be noted that the disclosed frequencies and wavelengths are offered for reference to allow the food recycling appliance to operate within Institution of Electrical Engineers (IEE) and Institute of Electrical and Electronics Engineers (IEEE) standards. However, the application of RF energy to a food waste mass as part of the described conversion process should not be restricted by frequency or wavelength.

In one aspect, within the cavity of the food recycling appliance 900 that is configured to receive the vessels, the food recycling appliance 900 includes a set of wires configured to induce electro-magnetic energy into the vessel within the cavity once the wires are energized.

The cost of input energy can be managed through user program selection of an external contact switch dry contact closure to an external thermostat to draw heat from an external source or mechanical connection to a contact relay for time of use energy management. Costs can also be reduced through operator-selected time of day cycle selection via the operating application which can be programmed to time of day energy costs and offer user selectable batch energy costing and alternatives based on batch prioritization and time of use energy input costs.

Figure 10A:
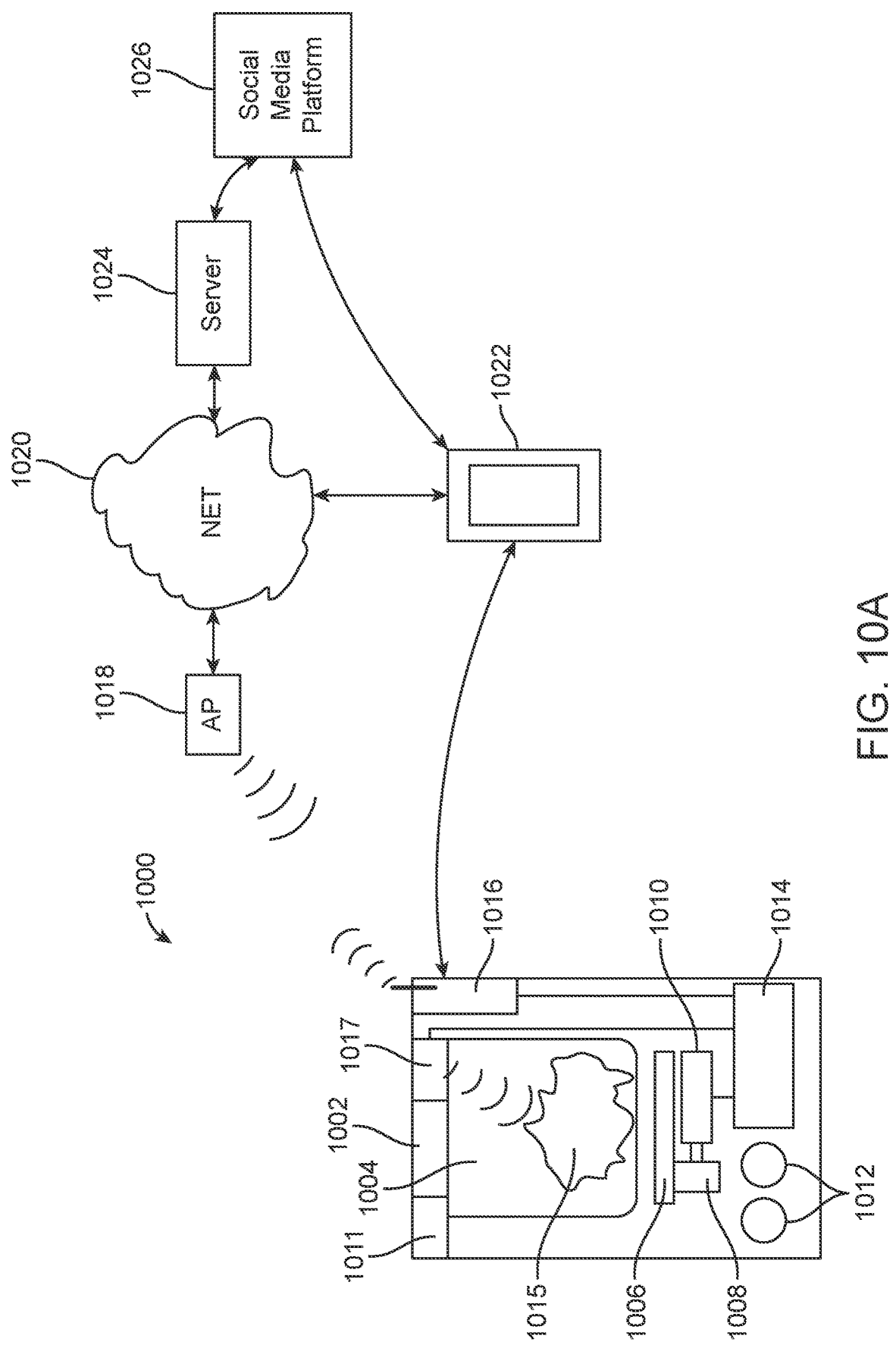
FIG. 10A illustrates an Internet of Things example configuration for the food recycler appliance.

FIG. 10A illustrates another example configuration of the system 1000 and includes an "Internet of Things" concept with respect to a food recycling appliance. This configuration includes a food recycling appliance 1002 that is configured with some of the components discussed above. In general, the following improvements to the traditional food recycling appliance enables the appliance to identify types of waste food and amounts of waste food and communicate such data to a network server for analysis and processing. By adding technical elements to the food recycling appliance that enables this type of analysis, and connecting one or more food recycling appliances to a network-based server, an overall ecosystem can be developed in which business intelligence data can be gleaned and evaluated for the purpose of providing opportunities for gamification, social media interactions, promotions, advertising, sales opportunities, regional or geographic-based communications, and so forth.

For example, the food recycling appliance 1002 includes a bucket 1004 contained within a food recycling appliance case. A gearbox 1006 communicates with a transfer case 1008 and the motor 1010. A control system 1014 communicates with the motor 1010 and other components as well, such as a wireless communication module 1016 and a sensor 1017. Feature 1006 can also represent a scale which can be used to weigh or determine the weight of the waste food 1015 placed within the bucket. A user interface 1011 is included which enables the user to provide input to the system in connection with performing a cycle of processing waste food. The filter system 1012 is also shown in connection with an air circulation system.

Waste food 1015 is placed within the bucket 1004 by a user of the system. This advanced version of the food recycling appliance 1002 has some additional features which provide increased usability and efficiency of the system. Generally speaking, including a sensor component 1017 and an enhanced user interface 1011 into the food recycling appliance 1002 can enable the system to determine the characteristics of the waste food 1015 placed within the bucket 1004. The sensor component 1017 can also sense a temperature of the waste food 1015 and determine whether it is hot or cold, whether it is frozen, and so forth. Either manually or automatically, by determining the characteristics of the waste food, sensor data can be communicated via a wireless communication module 1016 with an access point 1018 either in a user's home, or via a cell tower, or any kind of wireless component which can receive the data from the food recycling appliance 1002. The node 1018 will communicate a data through a network such as the Internet 1020 to a server 1024 associated with the food recycling appliance 1002. The server 1024 can communicate data to social media network 1026, which can also represent an advertising entity, game application entity, communication entity, and so forth. The server 1024 can communicate data through the Internet 1020 back to a device 1022 of the user. The alternate entity 1026 can also communicate data to the device of the user 1022.

The wireless communication component 1016 can communicate via WiFi, cellular technologies, 5G, Bluetooth, or any communication protocol that is desirable. The particular wireless protocol is not necessarily material to the present disclosure. With the capability of sensing characteristics of the waste food 1015, coupled with the capability of communicating data wireless lead to a network server 1024, the disclosed infrastructure enables new capabilities particularly with respect to the user experience in recycling waste food.

For example, the following scenario is enabled by virtue of the system disclosed in FIG. 10A. The food recycling appliance 1002 senses using the sensor component 1017 that the user of the recycling appliance has thrown away or consumed approximately 10 grapefruits within a one-week period of time. Either on a per cycle basis, or on an aggregated basis over a period of time, the food recycling appliance 1002 transmits sensor data or manual data provided by the user via a wireless communication component 1016 to network server 1024. The network server 1024 can evaluate the sensor data and apply, in one example, machine learning algorithms to evaluate and determine characteristics associated with the waste food of the user.

For example, a machine learning algorithm can be trained on visual data of typical or expected waste food. Banana peels, chicken bones, bread, grapefruit rinds, and so forth, can all be used to train a machine learning algorithm such that when new waste food is placed within the bucket 1004, the system can retrieve images of the waste food and make a classification decision or determination regarding the type of waste food that has been placed within the bucket 1004. The sensor 1017 can include a camera for taking images, video, a light for eliminating the contents of the bucket 1004, and so forth. The controller 1014 can include also machine learning data such that an evaluation of the contents of the bucket 1004 can be performed locally on the food recycling appliance 1002. For example, the machine learning algorithm can be trained on clean chicken bones and identify where there might be edible meat left on a chicken bone. By training the machine learning algorithm on what are known to be clean chicken bones as well as chicken bones that have some edible meat left thereon, the system can learn how to characterize edible portions of waste food and non-edible portions. This process can apply to any type of food in which there is a combination of an edible component and a non-edible component. For example, an apple may have remaining edible portions. A grapefruit might have some sections that are not eaten and can be identified as edible, etc. In another example, a machine learning algorithm can be trained and developed to learn about generally what good waste is in the appliance. The output of such a model could be, for example, 5% bone, 20% fat, 25% meat, 30% vegetable, 10% bread, and 10% water.

However, in general, the computer processing that is described herein can be performed either locally on the food recycling appliance 1002 or remotely on a server 1024. The processing may also be partially performed on a local basis and partially be performed remotely. The system may also balance the computational location based on factors such as bandwidth availability, energy consumption, speed or a timing of when computational results are necessary, and so forth.

The machine learning training can also be based on moisture within particular foods. Thus, in addition to a visual representation of waste food, a machine learning algorithm can also be trained on the amount of moisture that is extracted from the waste food. For example, half-eaten grapefruit will have more moisture than a fully eaten grapefruit. The system can ultimately report to the user on a per cycle basis how much food waste has been processed and can provide a more particular report which can include an estimate of the edible food that was processed relative to the non-edible food that was processed.

In another aspect, the system, when sensing the contents or the characteristics of the waste food 1015, may cause the motor to rotate the bucket 1004 such that the sensor component 1017 can receive different views of the contents of the bucket 1004. Sensor data can thereby include multiple angles of use of the waste food 1015. The system could include a scale 1006 that also provides data with respect to a weight of the waste food 1015. The user may also provide additional intelligence regarding the waste food the communication with the food recycling appliance 1002 via a user interface 1011. For example, the food recycling appliance 1002 can include an automatic speech recognition system as part of its controller 1014 such that the user can open a lid, place several grapefruit halves into the bucket, and merely say "grapefruit". The additional simplified user input can enable user data to be coupled with the sensor data to improve the likelihood or the probability of successfully characterizing the waste food placed within the bucket.

The server 1024 can receive the various kinds of sensor data, user data, waste food weight, temperature of waste food, and/or any combination of such data and use that data to drive further communications with the user. For example, the system could coordinate with other network entities to determine a location of the user device 1022. If the user goes into their standard grocery store, for example, the system could utilize an analysis of the received data which provides insight into the characteristics of the waste food 1015 that the user has been placing within their food recycling appliance 1002, and could present either in advance or in real time food purchasing suggestions on a user device 1022. For example, because the system knows that the user has been eating a relatively high volume of grapefruit, the system could suggest to the user that they need to purchase additional grapefruit. The system could present recipes to the user which are coordinated with the type of food they are eating, or in one aspect, the type of food they should be eating, which might be more healthy than the food that has been identified as part of the waste food. For example, the system may evaluate one or more of the types of food that is recycled, an amount of moisture that is extracted from recycled food, a time associated with the recycled food, an amount of energy used to recycle the food, and so forth, and based on this data as well as optionally user profile data or aggregated data associated with a social networking group, to present suggested recipes or food items to the user for future purchases. The recipes could be tailored for improving food efficiencies. For example, the recipes might indicate a shift in the type of food that the user is eating or may focus on the types of foods that the user or household eats more of. In other words, if the first type of food is recycled with a relatively large proportion of still edible food, a recipe my focus on a second type of food that is recycled within the household, but that has a less amount of edible food remaining on average.

In another example, the system could be fine-tuned to identify which aisle the user is in within grocery store and can suggest items for purchase within that aisle. This aspect of the disclosure would include coordination with a server associated with a particular grocery store which identifies a location of respective items within the store. Knowing the food recycling history for a particular user, the system can make more tailored and specific advertisements or promotions for specific foods which are physically near the user in an in-store shopping experience. Such items can be suggested in connection with a recipe or just general items that the user is likely to desire to purchase.

The system 1024 can also generate a database of user profiles that can be based on the waste food data received from the food recycling appliance 1002. This data could be coupled with other data such as social networking data, data input from the user, and so forth to provide business intelligence that can drive advertising decisions to the user, friends or relatives of the user, and so forth.

The user could download an "app" from a server 1024 onto their mobile device 1022 which can also be used to communicate with the food recycling appliance 1002. For example, via a Bluetooth connection, the communication between the appliance 1002 and the user device 1022 could result in the following scenario. Assume that the food recycling appliance 1002 has received a new input of waste food 1015 into the bucket 1004. A preliminary analysis indicates that there is a relatively high likelihood that the waste food 1015 is grapefruit. However, the probability of classification has not reached an appropriate threshold. The appliance 1002, to communicate its pulmonary findings to the user device 1022, which could launch the app and simply request a 1-Click or simplified confirmation from the user of what the food waste consisted of. The user could receive a notification asking them to click on "1" if the food waste is grapefruit or "2" if the food waste represents oranges. The system could utilize the top N best list of possible options to present data to the user for disambiguating purposes. Furthermore, the user could of course enter or speak into their mobile device 1022 the waste food items as they are placing them into the appliance 1002 at the proper coordination between the user device 1022 and one or more of the appliance 1002, the server 1024, or end or entity can occur to coordinate the analysis of the waste food 1015 with the intelligence gained from the user input.

Further machine learning can be achieved by training models based on user profiles which can combine data regarding user characteristics (age, sex, hobbies, social media habits, purchasing habits, athletic activity, family circumstances, etc.) and food waste characteristics obtained by the food recycling appliance 1002. The machine learning data can also include aspects of timing. For example, given the particular user profile, and given the known timing associated with food recycling cycles that runs in connection with the type of food waste that the user is throwing away, the system can determine when a best time to advertise a particular food, or a particular recipe, or to make some other type of communication to the user. For example, an evaluation of the wasted food can lead to a suggestion that the user needs to exercise or workout given the fat content of the food that they are recycling.

Intelligence gained and stored by the server 1024 can also be coordinated with sales of food products. For example, the server 1024 to receive information from a grocery store chain the grapefruits are on sale for the next 2 days or that a large amount of grapefruit have been received at several locations and needs to be moved to the public and thus will have the price reduced. The system could select, based on the various user profiles, which users have been eating some or a lot of grapefruit and which are probable targets who would act upon a grapefruit sale.

Advertisements and information could be distributed either directly to the user device 1022 or through social media networks such as Facebook™ or Instagram™. Any social media outlet is contemplated as potentially receiving such data.

It is noted that the food recycling appliance 1002 is of the type and size that are disclosed herein rather than a larger commercial model. Accordingly, the intelligence that is gained is based on a bucket size typically between 2.51 Liters and 10 Liters a volume and within the confined space of an appliance case of approximately a total volume of 35 Liters or less. The reason for this restriction is that the food recycling appliance 1002 is designed for home use on a countertop. Configuring such a system requires additional innovations with respect to the size and positioning of the internal components and the business intelligence that can be obtained for such a system is more tailored to individual or family use within the home and the type of waste food and the amount of waste food which is processed in a single recycling cycle.

Currently, it is predicted that the average household wastes $2200 in food per year. One application of the technology disclosed herein includes the ability to train or notify users regarding the characteristics of their waste food, particularly with respect to an amount of edible food contained within the waste food relative to the non-edible food within the waste food. The information presented to the user device 1022 from the server 1024 can include such details as an estimate of the amount of edible chicken that has been thrown away over the past 2 months. For example, the system could determine that $30 of edible chicken was left on the bones that were recycled within the system over the last several months. A notification can include information of that analysis which could be presented to the user on the user device 1022 which can encourage them to be more efficient with respect to cleaning the chicken bones as they eat. The system could evaluate the edible/nonedible components of the waste food, arrive at a dollar value of the edible component, and provide aggregate reports on the amount of food waste for the household.

In one aspect, the app operating on the user device 1022 would enable an opt in feature in which the user could control the sensing and transmission of data regarding the waste food to the server 1024. The user would have control over privacy issues and be able to disengage the sensor 1017 as desired. Any control of the system could also be performed remotely by the user 1022 such as turning the device on, starting a cycle, controlling the use of the sensing component 1017, turning off the cycle, and so forth.

Another aspect of the system includes competition. For example, a group of users could start a game in which they were competing for some reward. The competition could be related to healthy foods eaten, the least amount of edible food wasted, the amount of wasted food, and so forth. Assume, for example, that 5 individuals signed up for a given competition project in which a six-month period will be evaluated with respect to their waste food and a prize will be given to the individual who wastes the least amount of food. Of course a trust factor is built-in in which the users are trusted to properly place their waste food into the food recycle appliance 1002. The system can then evaluate and track the characteristics of the waste food of the individuals over the predetermined period of time. Running data can be provided to each individual as well as to the individuals in the group with respect to how well they are doing and comparison to others in the group. A prize might be a gift certificate at a local grocery store or at a restaurant. At the end of the period of time, the center data retrieved from each of the food recycling appliances 1002 of the respective users is evaluated and compared to identify a winner in the particular category as it is defined. Such competitions can be also communicated through social media networks or individuals can be connected with other individuals with similar interests in improving their health or the type of food that they eat. The ability to understand and evaluate the food that is recycled within particular homes enables this type of game application. In general, a gamification concept includes receiving data from at least 2 independent food recycling appliances 1002 each with a respective individual, comparing and evaluating the respective data and then providing incentives or game application options to the individual users in ways that can encourage them to engage in particular behaviors which are beneficial to their health or improves the efficiency of their food intake.

In one aspect, the determination of edible food, nonedible food, a classification of food, and so forth can be determined by a detection of an amount of humidity that is within the bucket or within the food. For example, if one were to put an apple in the bucket and run a food recycling cycle, the system could evaluate how much humidity was withdrawn from the apple and thereby calculate or determine that it was an apple that was recycled. Thus, the amount of moisture that the system extracts from waste food is one aspect of how the system can determine or classify a type of the waste food. From such calculations, the system can determine how much food waste weight can be saved. The food recycling appliance 1002 can, for example, include the amount of humidity or moisture extracted from the waste food as part of the center data that is transmitted to the server 1024. Visual sensor data, user input data, and so forth can be supplemental data which can further refine the probability of successfully categorizing or characterizing the waste food.

Another aspect of sensing the type of waste food that is placed within the bucket can include sensing the waste food as it is being placed within the bucket. The sensing module 1017 can be included in a lid that is lifted to an open position as waste food is entered into the bucket. A top portion of the food recycling appliance 1002 could also include a camera sensor. The system could begin to evaluate a food type as the user brings the food to the bucket. For example, if the user has one half of a grapefruit that is being placed within the bucket, the system could begin to capture images of the half grapefruit as the user is holding the half grapefruit above the appliance and is moving towards placing the half grapefruit in the bucket. The system could even provide feedback to the user to show a different side of the food items or to rotate the food item and then provide a light or an audible beep when the system has properly identified the item. This could be helpful particularly where multiple items are placed within the bucket and the sensory system might have difficulty characterizing the food within the bucket if, for example, there is a combination of a grapefruit and a chicken bone. Where multiple items might be placed within the bucket, having the system sense the items as they are being placed within the bucket can be helpful. Again, the user could also simultaneously say "chicken" or "grapefruit" or "soup" as they place items within the bucket which data would further be coordinated with the machine learning algorithms to quickly identify the waste food.

In another aspect, the user could utilize the app on the user device 1022, to take pictures of the food that is going to be recycled. For example, if a couple has finished their meal and is going to recycle the food on their plates, they could simply take a picture of the food on their plates via the app or via their camera app. That image could be coordinated with other sensory data from the food recycling appliance 1002 (humidity, weight, other images, other user input, and so forth), to classify or characterize the waste food.

In one aspect, the server 1024 can store profiles based on individual users, households, groups of users, and so forth. The data can be aggregated and/or anonymous and be sold to advertising entities or other entities that might be interested in such business intelligence data. For example, restaurant advertisers or grocery store advertisers might be able to utilize the data for targeting a particular demographic which is known, via the center data gathered herein from the food recycling appliances, for eating a certain amount of food. The system could also provide geographic business intelligence data. For example, if a number of individuals in a city utilize the food recycler appliance 1002, the system could identify that the amount of grapefruit recycled in a given neighborhood or a given portion of the city, has spiked in the last month. This information could be utilized to drive an advertising campaign by a grocery store for a discount on grapefruit which could be targeted to that geographic region.

Another aspect of this disclosure involves prediction algorithms. Historical usage of food recycling appliances 1002 can be processed and evaluated for prediction purposes. For example, advertising, gamification, or other notifications can be provided to users based on a predictive algorithm that in the following month, the amount of grapefruit or chicken that is recycled is likely or predicted to spikes. Discounts, coupons, rebates, and so forth can be provided to users on a profile basis, geographic basis, and so forth, according to or based on predicted food waste.

The sensor data associated with waste food can also be received and coordinated with other data regarding shopping habits, whether online or in store. For example, users might be able to coordinate data regarding their grocery store purchases and make such data available to the app under device 1022 or to the server 1024 such that an overall global view of their purchasing habits as well as their disposal or recycling habits can be evaluated. In this regard, reports might be presented to the users which can help to identify the fact that they purchased a certain amount and type of food, but did not recycle as much of that food as was predicted or that should have happened. In this regard, the system can provide reports to users which present a comparison of food purchased by a household relative to food recycled by the household, with the appropriate estimation of timing or an expectation of recycled food relative to food purchase. For example, the system can take into account perishables relative to canned food. Thus, by tapping into food purchases, the server 1024 can give an even a better picture for individual households with respect to potential additional food recycling, which can occur.

Advertisements can also be presented directly on the user interface 1011 of the food recycling appliance 1002. A graphical interface can include a touchscreen, like the touchscreen of an iPhone for example, that users can access and accept offers or promotions. Such offers and promotions can be coordinated with an app on their device 1022 for redemption.

Any subsystem (motor, air circulation, filtering system, heating system, sensor, etc.) can have its status remotely checked from the server 1024. For example, a central control operated from the server 1024 can report that 10 filters in a particular region need to be replaced. The central control 1024 can coordinate and aggregate status data of a plurality of distributed appliances 1002. In another aspect, the filters 1012 on the appliance 1002 can be removable. For example, a removable filter might be expected to function in removing odor from the air for a period of 6 months. The system could sense the effectiveness of the filters based on air data, number of cycles used, amount of waste food processed in the plurality of cycles, amount of humidity extracted from waste food, and so forth. The appliance 1002 could report to a centralize server 1024 the status of the subsystem, such as the filter system, and could provide a notice to the user via the user interface 1011, an app or user interface on a device 1022 or in some other fashion to notify them to change their filter in a certain amount of time, such as 2 weeks. In one aspect, the server 1024 could coordinate with a merchant site represented by 1026, such as Amazon.com, to pre-order or preconfiguring an order, which can be presented to the user, simply to confirm the purchase. For example, if a new filter should be delivered within 2 weeks to the user, the system 1024 could communicate the data to the merchant site 1026, who could configure a presentation of a user interface through which a purchase of the needed filter could easily occur. The user could simply confirm the purchase via a fingerprint. The system could then access their user address information such that no manual entry would be needed for the purchase. The user interface 1011 could also include a biometric reader for facial recognition or fingerprint recognition or the like.

The user interface 1011 can include a touchscreen with menu-driven user-selectable options and visual and/or sonic user feedback. Further, the user interface 1011 can include a wireless interface to provide for external input, feedback, and control for the various features described above. Through the user interface 1011, a user can select the particular function and/or cycle for performing either desiccation of food waste present within a bucket vessel inserted into the appliance 1002 or for creating stocks and broths through an infusion process.

Figure 10B:
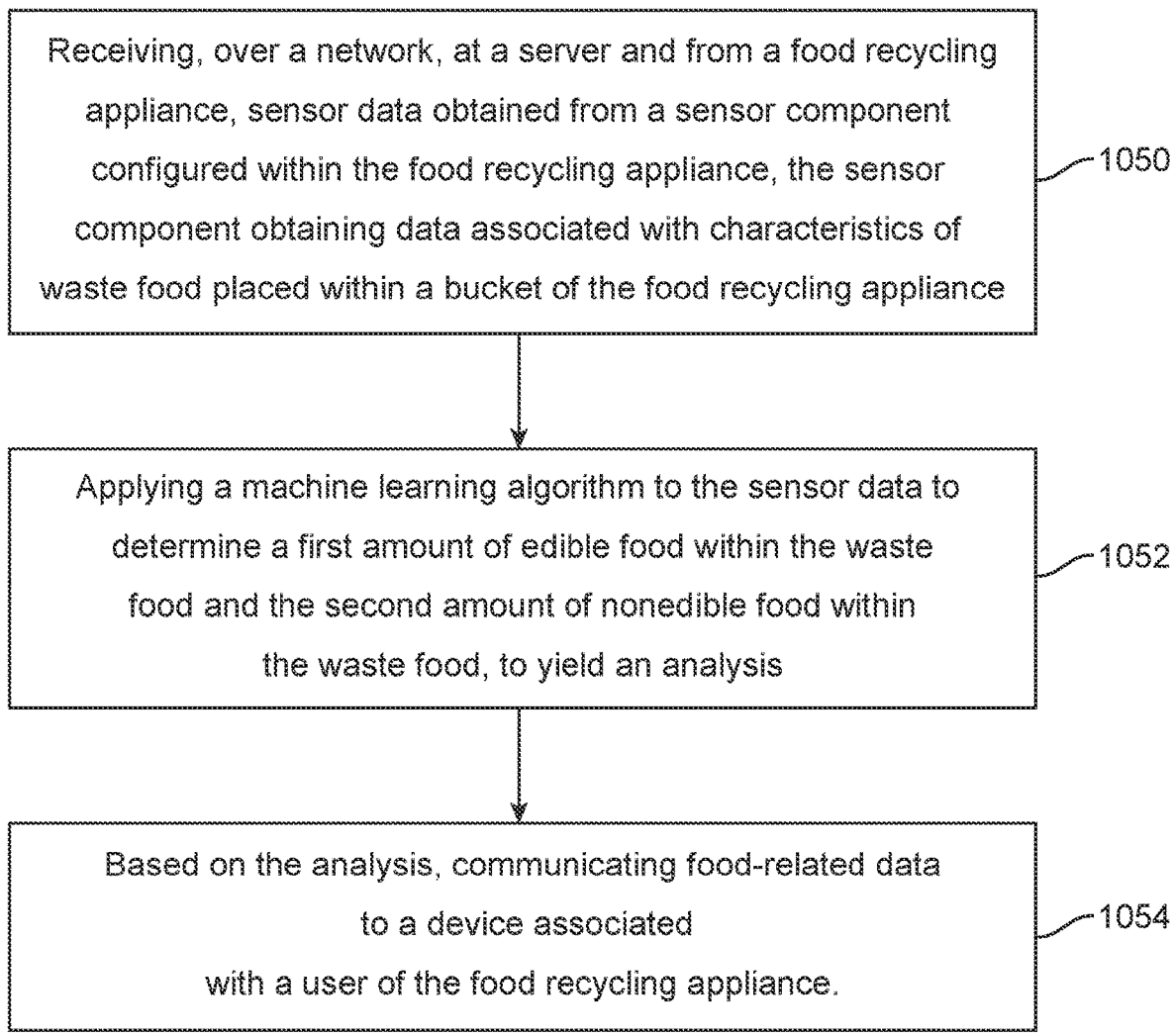
FIG. 10B illustrates an example method associated with an Internet of Things example of the food recycler appliance.

FIG. 10B illustrates an example method according to an aspect of this disclosure. A method includes receiving, over a network, at a server and from a food recycling appliance, sensor data obtained from a sensor component configured within the food recycling appliance, the sensor component obtaining data associated with characteristics of waste food placed within a bucket of the food recycling appliance (1050), applying a machine learning algorithm to the sensor data to determine a first amount of edible food within the waste food and the second amount of nonedible food within the waste food, to yield an analysis (1052) and, based on the analysis, communicating food-related data to a device associated with a user of the food recycling appliance (1054).

The food-related data can be one of associated with a gamification process which encourages the user to purchase certain foods, a social media campaign in which the user is compared to other users in a social media group with respect to food recycling practices. The method can further include communicating data to a social networking platform which, based on the data, presents information to the device associated with the user within the social networking platform.

The sensor data can relate to one or more of an amount of humidity withdrawn from the waste food, a temperature of the waste food, a weight of the waste food, and a type of the waste food. In another aspect, the machine learning algorithm can be trained on example waste food items having a first known amount of an edible component and the second known amount of non-edible component.

The method can include receiving user input data received at the food recycling appliance, the user input data characterizing the waste food. The method can also include generating, based on the analysis, a value of an amount of edible food that was contained within the waste food and presenting the value of the amount of edible food was contained within the waste food to the device. In another aspect, the system can calculate the value of the amount of edible food that was contained within the waste food as associated with a plurality of food recycle cycles over a given period of time. In another aspect, communicating the food-related data to the device associated with the user of the food recycling appliance can further include indicating a recipe to the device based on the sensor data.

In another aspect of this example, the network-based server 1024 could provide control over a group of food recycling appliances. For example, energy usage per cycle could be evaluated for one or more food recycling appliances and a corresponding cost of energy on a geographic basis could be evaluated such that the network-based server 1024 could transmit a modification of part of the food recycling process for a particular group of food recycling appliances, which causes them to use less energy per cycle. A service level agreement is to be provided to individual users which could maintain a certain cost of energy, were certain energy usage on average for cycles. In another aspect, for example, a food recycling process could be modified based on the detection of a temperature of the waste food deposited within the bucket. If hot food is deposited within the bucket, then less energy might be needed in the cycle to heat the food as part of the recycling process. Such modifications to a standard food recycling cycle can be handled locally based on sentenced data, could be controlled remotely from a network-based server 1024, or may be coordinated between the two entities in which final modifications to a food recycling process can be determined in a coordinated effort.

The network-based server 1024 can retrieve an aggregate data about the waste food processed in a plurality of respective food recycling appliances and process this data to enable both business intelligent reports which can provide intelligence with respect to the type of food that is being recycled, an amount of energy required to recycle a purchase particular amount of food, and so forth. In one example, predictive algorithms can be used which can predict for an individual, a social networking group, a geographic region, and so forth, what type of food is expected to be processed in the food recycling appliances. Based on this prediction, the network-based server 1024 could communicate a revised food recycling cycle to particular food recycling appliances. For example, if it is expected over the next month given the weather, holiday seasons, events and the news, economic conditions, or so forth, that more of a particular type of food will be recycled, and less energy per cycle might be required for that particular type of food. The network-based server 1024 could cause an adjustment to the food recycling cycle in preparation for the expected type of food. For example, if less waste food containing bone is expected, then less grinding and chopping would be required to process such food. Similarly, if a greater amount of energy might be expected, then an increased cycle might be communicated to food recycling appliances. Again, this process could also occur locally where the amount of energy used per cycle could be adjustable based on a sentencing or detection, or through user input, of the type of food that is in a given bucket and ready to be recycled. Using these techniques, the overall system can improve and tailor the amount of energy used per cycle to be more closely aligned with the type of food that is placed within the bucket to be recycled. This can provide an overall improvement in energy usage.

Claims can be directed exclusively to steps that occur in the examples set forth above on one or more of the food recycling appliance, a device separate from the food recycling appliance and which is operated by the user, a network-based server that communicates with the food recycling appliance, or a separate network-based entity that receives data from the network-based server and provides advertisements, discounts, medications, or other data to a user or a group of users. The separate network-based entity can be a social media network as set forth above. All of the transmissions, requests, responses, analysis of data, the graphical user presentations, and so forth are included as within the scope of this disclosure from the standpoint of each separate node or entity disclosed herein. In other words, one claims that could be directed to a social media network that receives the type of data that is gathered from the analysis of waste food at a food recycling appliance of the type disclosed herein, and wherein the social media network performs certain actions by way of postings, promotions, advertisements, or coordinated communications to users in a particular social media group or to individuals. Other claims could be directed to actions purely performed by the food recycler appliance and data that it receives through its analysis of the waste food as well as other inputs from the user and processes, transmissions, data received, control information it receives, and so forth.

Figure 11A:
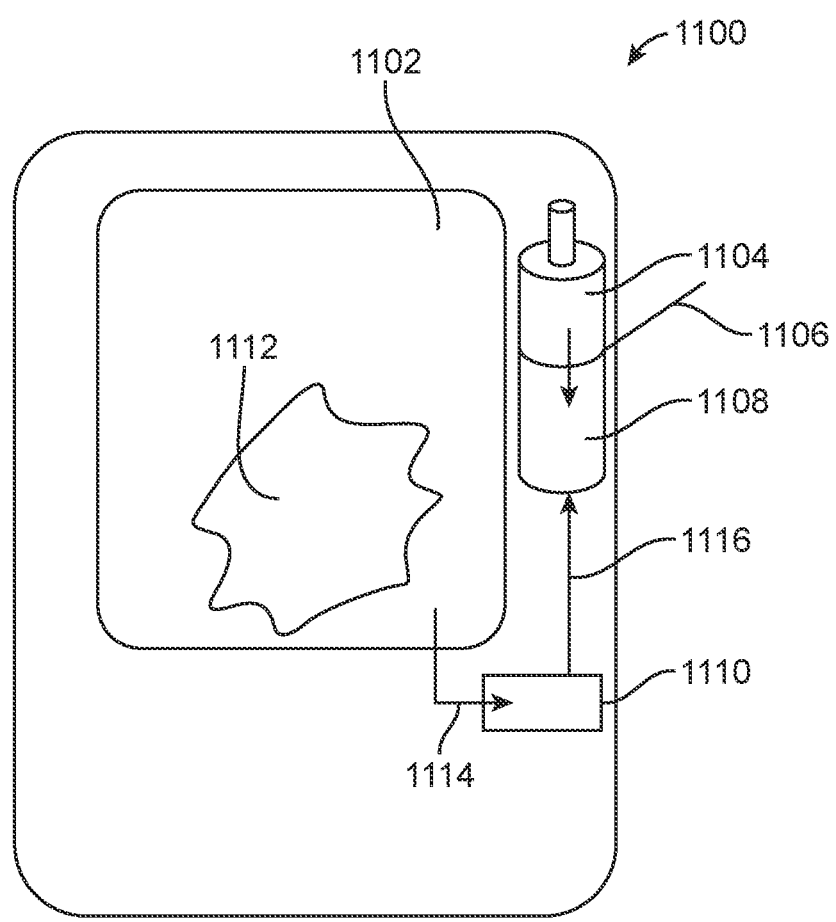
FIGS. 11A-11F illustrate various aspects of using a replaceable filter in a food recycler appliance.

Another aspect of this disclosure relates to odor control. In the previous version of the food recycler, the filters are built into the food recycler case and are essentially permanent. There is no easy mechanism of replacing the filters. Where a technician may need to go in and replace the filters, the filters are hardened cylindrical objects. FIG. 11A illustrates or another aspect of this disclosure in which a new food recycler appliance 1100 is provided with the ability to receive a replaceable filter. The food recycler appliance 1100 includes the bucket 1102, waste food shown as feature 1112, an air circulation system 1110 which retrieves air 1114 from the bucket and provide the air 1116 to a filter 1108 which includes a replaceable filter bag 1104. A door 1106 opens to reveal a filter receiving structure 1108 that receives the filter bag 1104. The filter is configured to have a structure with an air permeable outer covering or mesh which contains active carbon or any other type of filter material. A handle can be configured on the filter bag 1104 as well. The location of the filter receiving structure can be anywhere within the case of the food recycler appliance 1100. The air circulation system 1110 only needs to be able to be configured to cause air to flow through the replaceable error filter 1104.

Figure 11B:
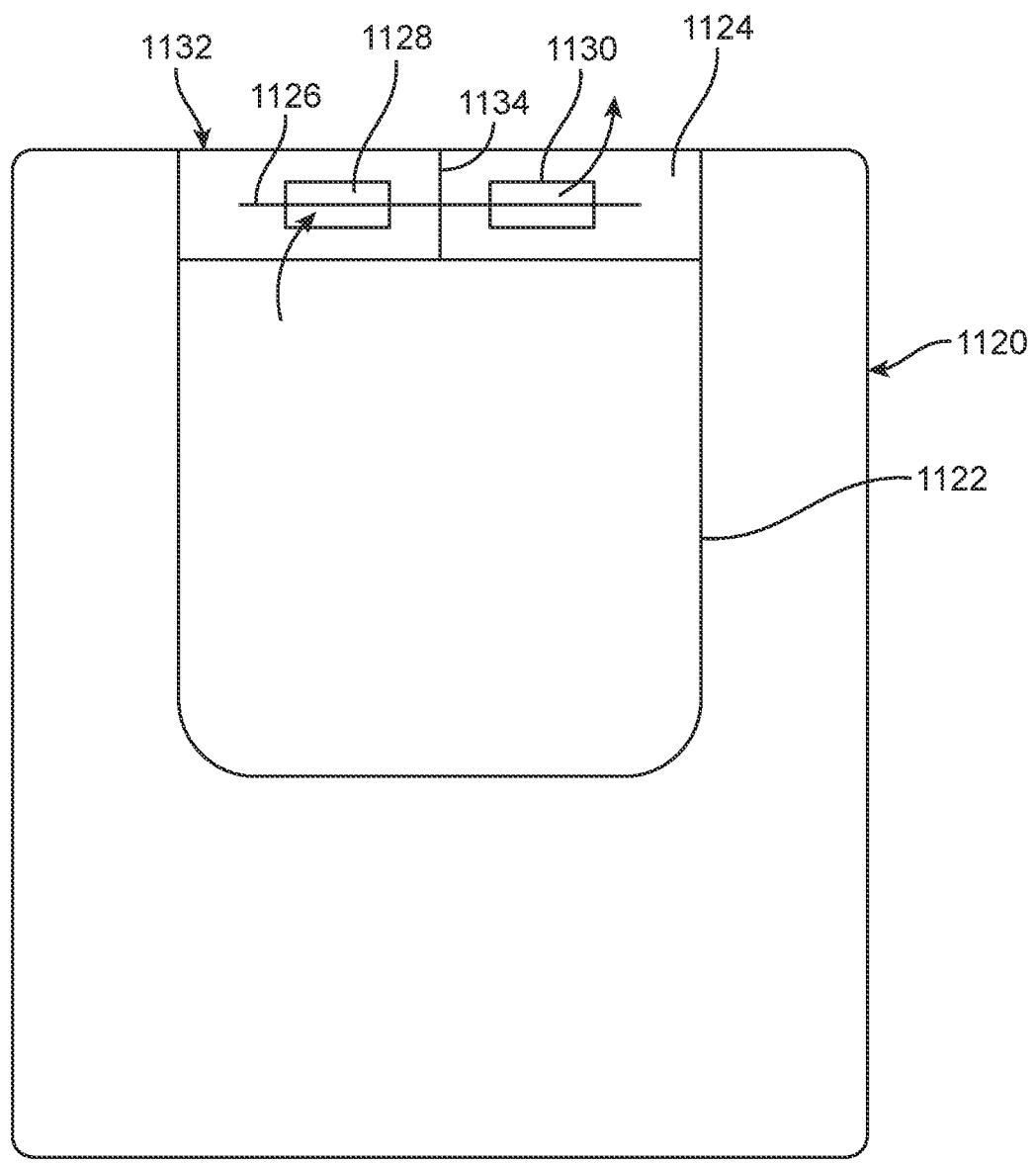

FIG. 11B illustrates an aspect of this disclosure in which a filter 1126 is configured within a lid 1132 of a food recycler appliance 1120. The lid 1132 is typically configured above the bucket 1122. The filter 1126 can be ring-shaped, circular and can, in one aspect, include slits or complimentary structures to barriers or structures within the lid 1132. One benefit of positioning a replaceable filter 1126 within the lid 1132 is an efficient use of space within the food recycler appliance 1120. The current lid in the recycler shown in FIGS. 2A and 2B is essentially just plastic with no other structural use. A lid which contains a replaceable filter is restructured such that an intake opening 1128 is provided to receive air from the interior of the bucket 1122 such that the air can flow through the filter 1126. A barrier 1134 is provided in which the airflow can move through the filter 1126 and out and exhaust opening 1130 and into the atmosphere. An interior portion 1124 of the lid 1132 is reconfigured to enable air flow through the lid and ultimately out into the atmosphere. In one scenario, an upper portion of the food recycling appliance 1120 is also reconfigured to provide the air circulation system which will draw air from the interior of the bucket 1122 and guide it through air ducts to the lid for filtering.

Another aspect of FIG. 11B includes the ability to open a panel either on the top of the lid or below the lid for accessing and replacing the replaceable filter 1126.

Figure 11C:
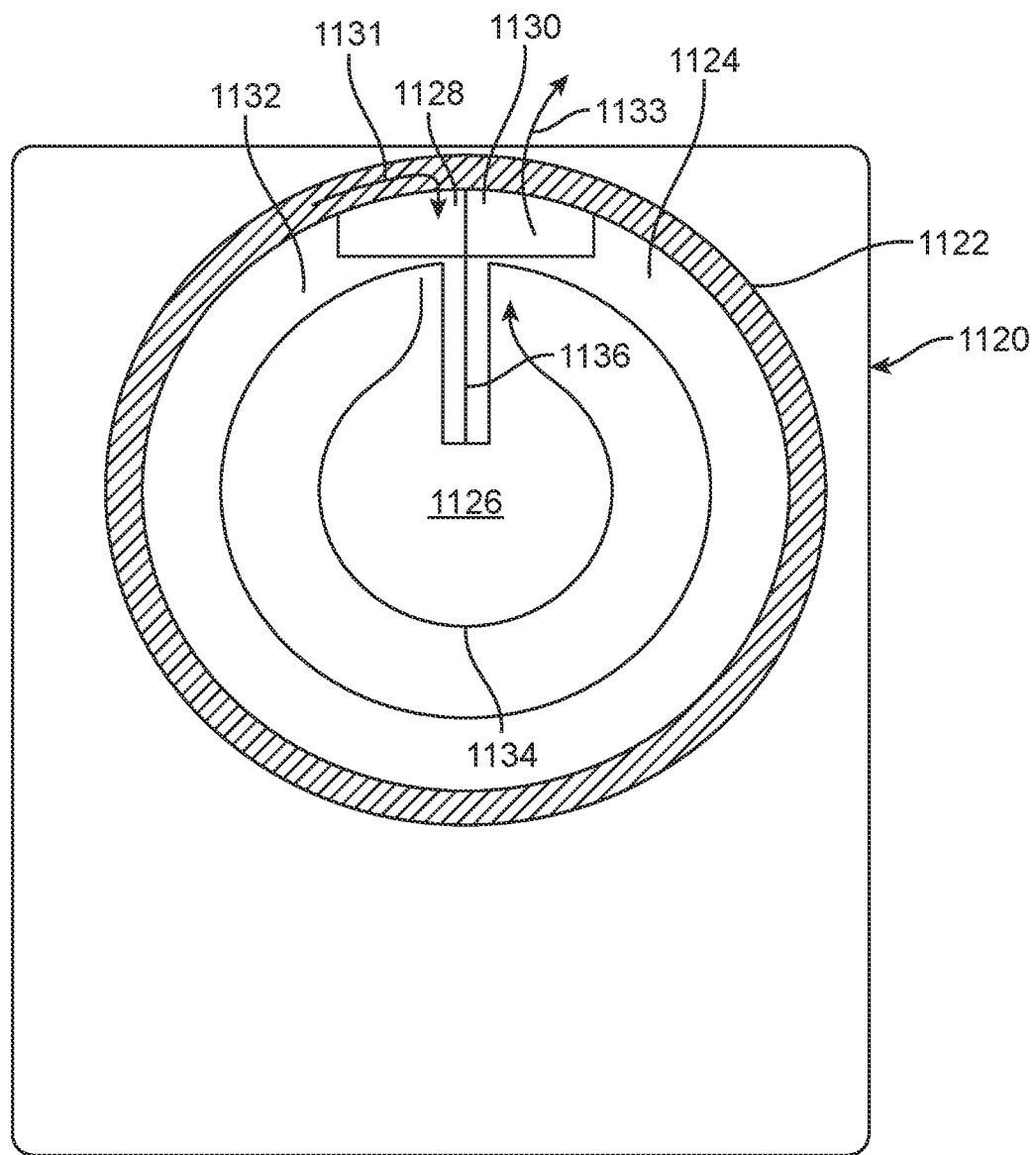

FIG. 11C illustrates a top view of the lid 1132 position within the food recycling appliance 1120. The bucket is shown 1122 and an arrow 1131 representing airflow from the bucket 1122 into the intake opening 1128 which represents air being received from the air circulation system for processing through the air filter 1126. The barrier 1132 is also shown which can be used to guide or control the flow of air through the lid having the filter 1126.

The arrow 1134 illustrates generally the airflow path through the filter and which ultimately leads to the exit port opening 1130 and the arrow 1133 representing the exit of air into the atmosphere. As can be appreciated, the air filter 1126 shown in this figure can be generally pancake shaped with a slit built into the filter which is complementary to the barrier 1136. Other structures within the interior 1124 of the lid 1132 can also be adjusted to manage or control the airflow through the interior of the lid in the space which is designed to receive the replaceable error filter 1126. It is noted that arrow 1131 and arrow 1133 only generally represents the flow of air into the lid for filtering and the flow of filtered air from the lid. The air circulation system can be configured within the interior of the food recycler appliance 1120 in any manner for retrieving the air from the bucket 1122, and controlling the flow of the air into the lid 1128, through the filter 1126, and through an exit port 1130.

In one example, while FIG. 11C shows the entrance port 1128 adjacent to the exit port 1130, the positioning of the entrance port 1128 in the exit port 1130 can be at any location within the lid. For example, the lid 1132 may consist of an entrance port generally in the position of port 1128, and include no barrier 1136, but have an exit port on the side opposite the entrance port 1128. The overall air circulation system can be adjusted to provide the air at any position of the lid and to retrieve the filtered air from any position of the lid. A brief reference to FIG. 3A notes the position of an opening 360 on a side of the lid 304. The upper portion of the food recycler 300 in that figure has been removed and some of the internal structure of the casing is shown. In this example where in the lid 304 is reconfigured to receive a replaceable filter, the air intake or air export openings can be configured on a side of the lid as is shown by feature 360. As other internal air circulation system, air ducts can be connected to such side openings configured within the lid.

Figure 11D:
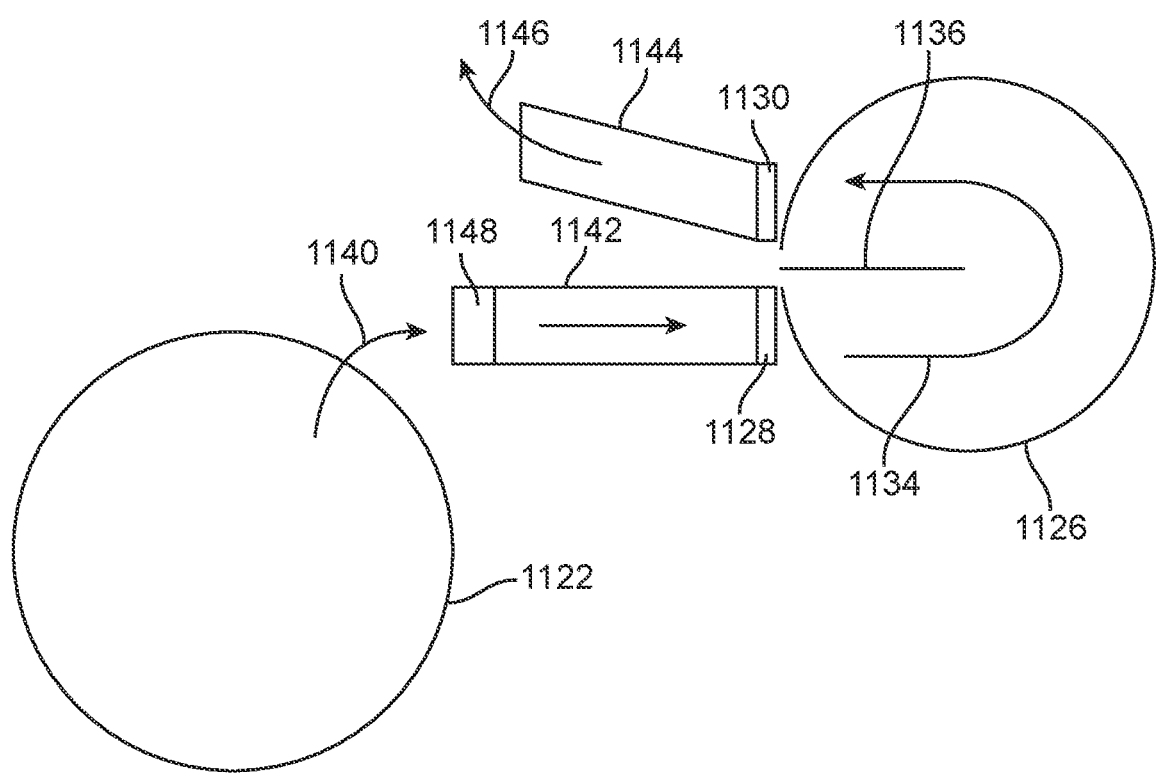

FIG. 11D shows another aspect of the air circulation system. The bucket 1122 is shown with air flow from the bucket 1140 to a fan 1148 that is part of an air circulation system 1142. The heirs directed to the intake port 1128 which causes the air to flow through the filter 1126 and a pattern or pathway shown by feature 1134. The barrier 1136 is shown in this example as well. The exit port 1130 can direct the air to another air duct 1144 which ultimately directs the air 1146 to the exterior of the food recycler appliance 1120. As noted above, the position of the air intake port 1128 in the air export port 1130 can be anywhere in the lid. It is preferable that these ports be configured on a side portion of the lid. It is also preferable that the fan 1141 is configured within the food recycler appliance 1120 outside of the lid and the bucket 1122. However, in other configurations, the fan 1141 could be configured within the lid with an air intake opening 1128 on the underside of the lid so as to draw air directly from the bucket 1122 into the lid for filtering. In other words, one opening could be on and under side of the lid and another opening could be on a side portion of the lid, or even on a top portion. For example, lid configuration could include a fan structure for drawing air directly from the bucket 1122 through an opening underneath the lid, the interior of the lid could be configured to force airflow over a sufficient amount of the necessary filtering material, and the lid could be configured with an exit port that is on top of the lid which causes the filtered air to exit the food recycling appliance 1120. In this configuration, one benefits of this approach is the elimination of a need for an air circulation system within other parts of the food recycling appliance 1120 which can enable an increase in the size of the bucket 1122 for improved efficiency.

Figure 11E:
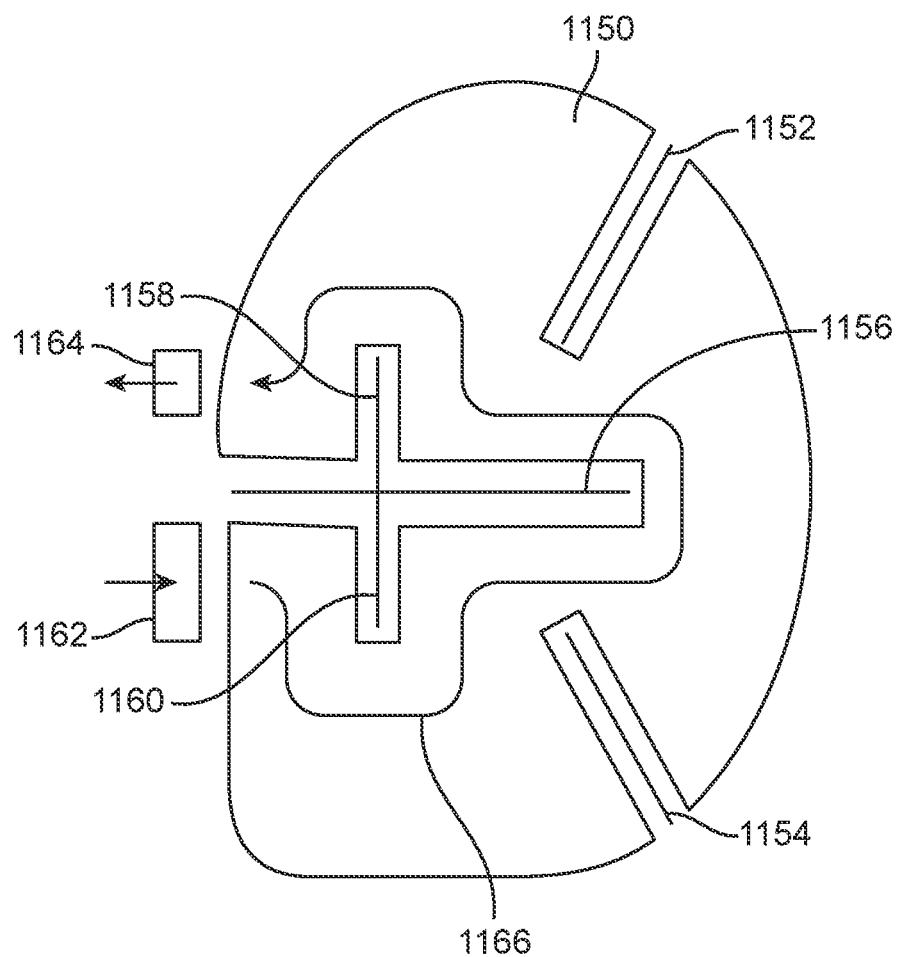

FIG. 11E illustrates another aspect of this disclosure and which a filter configured for the lid is generally pancake shaped, but wherein the lid includes additional barriers 1152, 1154, 1156, 1158 and 1160. These are example barriers which cause a particular path 1166 of the air to flow from an intake port 1162 through the filter 1150 around the various respective barriers and to an exit port 1164. This example shows how a particular airflow could be designed within the lid of the food recycling appliance 1120. With this design, the air intake opening 1162 and the air exit opening 1164 could similarly be configured on a side of the lid, or on a respective top and bottom portion of the lid, and so forth. The lid in this scenario could also include one or more fans which could be configured at any location along the path 1166 and for drawing air from the interior of the bucket, through the filter 1150 and to the exterior of the food recycling appliance 1120. The pathway 1166 can essentially be configured as a maze in which the path of the air is controlled to move through the maze in a particular order as one would traverse through a maze.

Figure 11F:
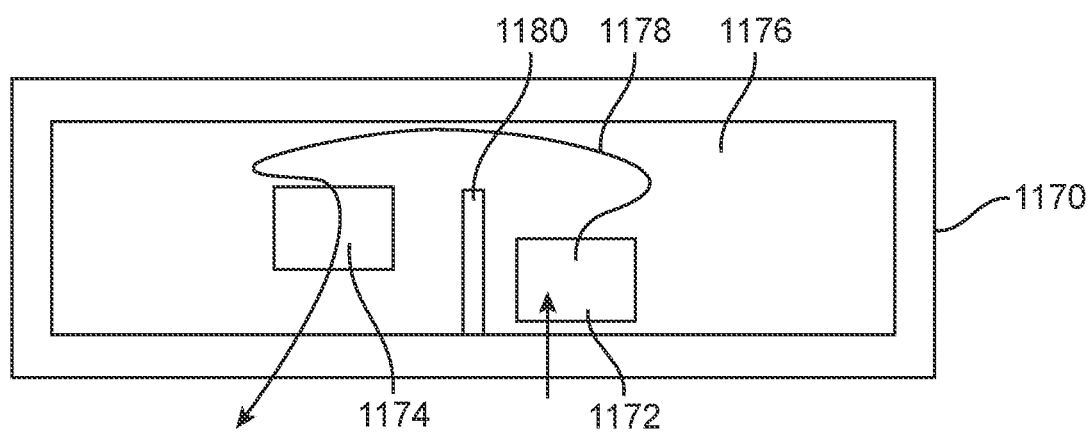

The above examples of a replaceable filter typically contemplate a generally pancake shaped filter that fits within the lid or a filter that might be shaped like a tea bag and that has positions within a filter receptacle within an interior of the food recycler appliance 1120. FIG. 11F illustrates another approach in which the lid 1170 is shown with an interior portion in which a filter 1176 is provided in which a spiraling effect with respect to airflow 1178 can be experienced. In this scenario, the filter can be considered not shaped like a pancake, but more as a stack of pancakes or, more generally, like threads of the screw. In this manner, air would flow into the air intake port 1172 at one elevation and the air would travel along a path 1178 in which it might travel numerous times around a central structure 1180 in a spiral fashion and ultimately exit and exit port 1174 at a higher elevation than the intake port 1172. One benefit of this type of approach is that it can enable air to flow over more active carbon material (relative to the pathway envisions in FIG. 11D) and thus improve the filtering of the air. In this case, the structure of the filter 1176 is modified such that it may include its own barriers between layers of the filter such that some aspects of the control of the path of the air is built into the filter itself. Shapes of the filters described herein are generally considered to be circular, but they can be square shaped, rectangular shaped, arbitrarily shaped, oval-shaped, and so forth.

In one aspect, the lid 1170 is configured to receive more than one filter such that multiple filters processed the air within the lid 1170. Access to the interior cavity can be from a top of the lid, a bottom of the lid, or even from a side portion of the lid for a user to access the interior filter cavity and for removing all filter and inserting a replacement filter.

In another aspect, it is generally assumed that the amount of active carbon within the filter is uniformly applied across the filter. In other aspects, the amount of active carbon within the filter could vary, particularly along a complicated pathway. For example, the filter 1126 shown in FIG. 11D can have a larger or thicker component near the intake opening 1128 and be thinner or have less active carbon near the exit port 1130. Included within this disclosure is the concept of varying the thickness or the physical amount of active carbon within the filter either up or down along the pathway of airflow through the filter. In one aspect, for example, an overall filtering system might include one filter configured within the lid of the food recycling appliance 1120, but also include another filter at another location within the food recycling appliance case prior to the air exiting into the atmosphere. This may be a requirement where additional filtering is needed to properly control for odor. This approach still increases the available space within the food recycling appliance 1120 for an enhanced bucket size. In this respect, the overall air circulation system and filtering operation could include a first filter having a first shaped and configured within a lid of a food recycling appliance 1120, which would process first air to yield first filtered air. The air circulation system could then communicate the first filtered air to a second filter contained within the food recycling appliance 1120 that is contained within the interior portion of the food recycling appliance 1120, but external to the lid. The air circulation system could also first cause the air to flow through a first filter that is external to the lid and then complete the filtering process by forcing the filtered air through a filter configured within the lid. It is contemplated within this disclosure that these various air circulation systems could be configured in which each of the filters is replaceable and easily accessible by a user.

In another example aspect, the lid of the food recycling appliance 1120 includes a sealing gasket to seal in the presence of vacuum to a pot vessel rim so as to facilitate the generation of a vacuum or otherwise low pressure environment within the pot vessel during operation of the food recycling appliance 1120. A port with a connecting tube that communicates to the low pressure side of the vacuum pump located in the main body of the food recycling appliance 1120 via a flexible connection is provided so as to allow the lid of the appliance 1120 to open and close. The port includes a liquid check valve which prevents liquid water from entering the port tube and stops condensate from dripping from the vent hole when the lid is open. The lid can also include an infrared laser temperature sensor probe aperture and probe positioned so as to allow for thermal visualization of the food mass during processing. The lid can also include additional and/or alternative sensors, such as a sonic proximity sensor to detect the presence of food waste, a negative pressure sensor, an exhaust air humidity sensor, and a lid closure and safety latch sensor.

In one aspect, the lid further includes an emergency over-vacuum relief valve set that is triggered at a pre-set safety factor. A vacuum relief interphase between the lid operating handle and the vacuum relief valve is provided to release vacuum and to allow the food cycler lid to be safely opened in the event of a power interruption or cycle failure condition such as in the case of required operator intervention to clear a jam.

Figure 12:
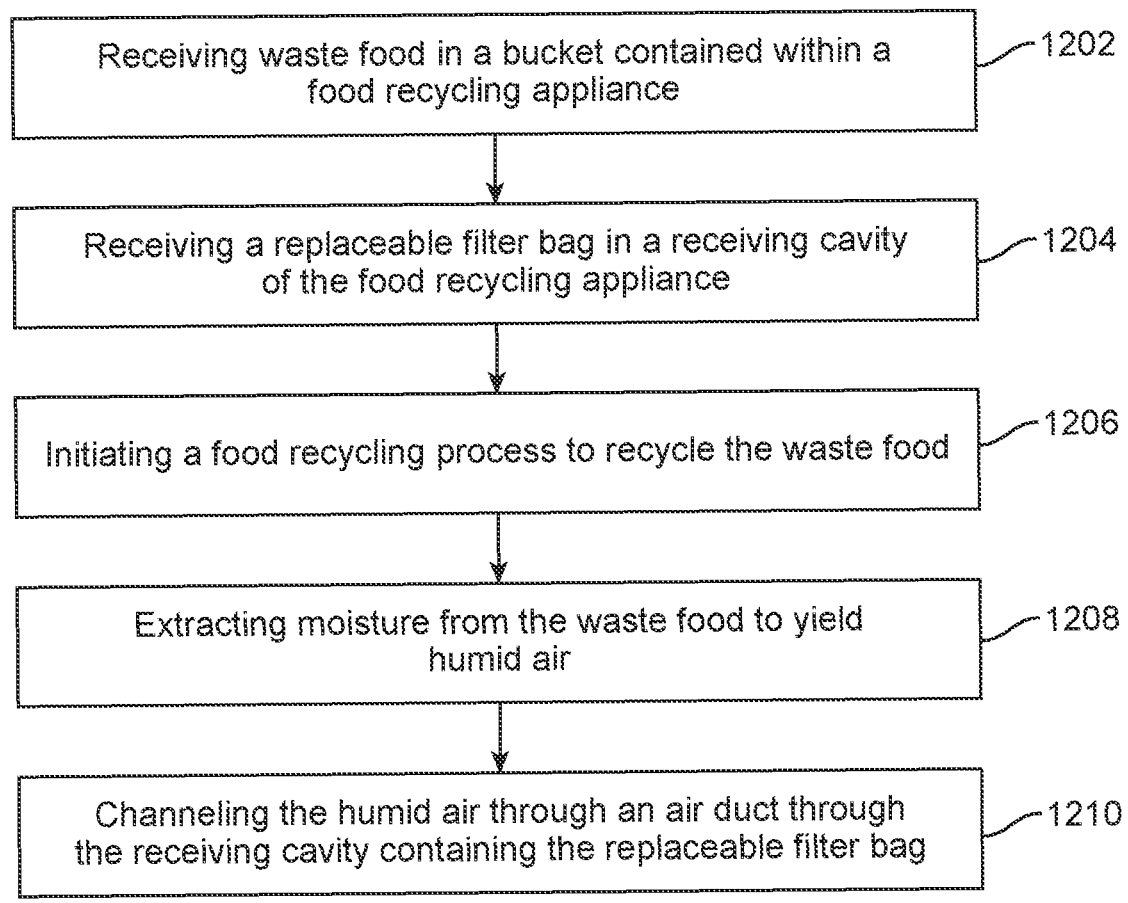
FIG. 12 illustrates a method example.

FIG. 12 illustrates a method example with respect to using replaceable filters in a food recycling appliance. The method includes receiving waste food in a bucket contained within a food recycling appliance (1202), receiving a replaceable filter bag in a receiving cavity of the food recycling appliance (1204), initiating a food recycling process to recycle the waste food (1206), extracting moisture from the waste food to yield humid air (1208) and channeling the humid air through an air duct through the receiving cavity containing the replaceable filter bag (1210). As noted above, channeling the humid air can include directly receiving the air into the lid from the interior of the buckets for filtering or through a separate air circulation system. Replaceable filter bag can represent a replaceable filter position within the food recycling appliance exterior to both the bucket and the lid structure or if it can include a filter configured to be position within the lid.

A ratio of a volume of the bucket relative to an overall volume of the food recycler can be between 0.0717 and 0.2857. The food recycler can, in one aspect, have particular dimensions which are beneficial for a home appliance. As noted above, the food recycler is configured to have an overall appliance volume of 35 liters or less and the bucket has a capacity to receive waste food of between 2.51 liters to 10 liters, inclusive. Thus, the volume of the bucket can be between 2.51 liters or 10 liters, in size. Based on the ratio of the first volume of the bucket relative to the overall volume of the food recycler, the overall volume of the food recycler can be between 8.79 liters and 35 liters. In some instances, the configuration can include one or more of a height of approximately 380 millimeters, a width of approximately 270 millimeters and a length of approximately 310 millimeters.

The replaceable filter bag can be one of ring-shaped, circular, square or configured to fit within the receiving cavity contained with the lid. The replaceable filter bag can have a structure which enables a spiral airflow through the replaceable filter bag within the lid of the food recycler appliance. An air circulation system can be configured to pass air received from the bucket through an air channel to an intake opening in the lid, through the receiving cavity containing the replaceable filter bag, and out an exit opening in the lid. The air, as it travels through the receiving cavity containing the replaceable filter bag, can move in one or more of a spiral configuration, a circular configuration, a maze-shaped configuration, and a multi-layered configuration. The method can include receiving a first replaceable filter and a second replaceable filter within the food recycling appliance.

Figure 13:
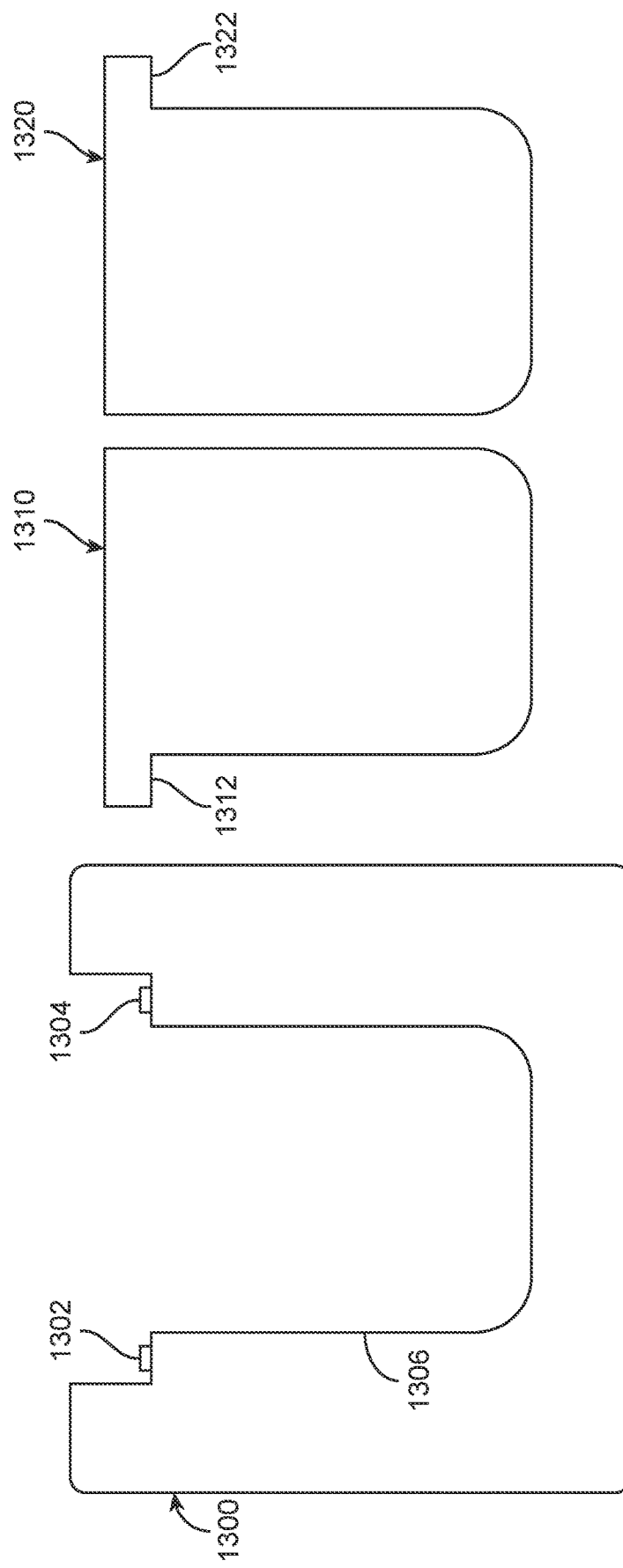
FIG. 13 illustrates an example of a food recycler comprising a set of sensors to detect a type of vessel inserted into the food recycler for either infusion of flavor and nutrients from surplus food to create a foodstuff or conversion of food waste into nutrient preserved stable granular media.

FIG. 13 illustrates an example of a food recycler 1300 including a set of sensors 1302, 1304 to detect a type of vessel 1310, 1320 inserted into the food recycler 1300 for either infusion of flavor and nutrients from surplus food to create a foodstuff or conversion of food waste into nutrient preserved stable granular media. In one aspect, the food recycler 1300 includes a series of wires configured so as to induce electro-magnetic energy into a vessel 1310, 1320 when the vessel 1310, 1320 is placed within the cavity 1306 of the food recycler 1300 and the wires are energized.

In one aspect, placement of a vessel 1310, 1320 into the cavity 1306 of the food recycler 1300 causes the food recycler 1300 to identify the structure and purpose of the particular vessel inserted into the cavity 1306. For instance, the vessels 1310, 1320 may be distinct in appearance and purpose, each including one or more distinct features that, upon being detected by the food recycler 1300, cause the food recycler 1300 to determine whether to perform a desiccation or infusion cycle. For example, as illustrated in FIG. 13, a pot vessel 1310 can include a lip feature 1312 that has a unique shape or configuration that, if detected by the food recycler 1300, causes the food recycler 1300 to recognize the pot vessel 1310 as an indication that a user wishes to initiate an infusion cycle to produce a stock or broth. A bucket vessel 1320 can include a different lip feature 1322 or other component that has a unique shape or configuration that is distinct when compared to the lip feature 1312 of the pot vessel 1310. In some aspects, the bucket vessel 1320 additionally has a different shape or form factor compared to that of the pot vessel 1310. The food recycler 1300 may detect these features of the bucket vessel 1320 and recognize the bucket vessel 1320 as an indication that a user wishes to initiate a desiccation cycle to produce a granular material.

In one aspect, the food recycler 1310 includes, within the cavity 1306, one or more sensors 1302, 1304 that are usable to detect the distinct features of the pot vessel 1310 and of the bucket vessel 1320. The one or more sensors 1302, 1304 may be positioned within the cavity 1306 such that, when a vessel 1310, 1320 is inserted into the cavity 1306, at least one sensor detects the unique features of the inserted vessel 1310, 1320. For example, if a pot vessel 1310 is inserted into the cavity 1306, the sensor 1302, as a result of its positioning within the cavity 1306, may detect the lip feature 1312 of the pot vessel 1310. The sensor 1302 may transmit a signal to the controller of the food recycler 1300 to indicate presence of the pot vessel 1310 within the cavity 1306. If a bucket vessel 1320 is inserted into the cavity 1306, another sensor 1304, as a result of its positioning within the cavity 1306, may detect the lip feature 1322 of the bucket vessel 1320. Similar to the sensor 1302, the sensor 1304 may transmit a signal to the controller of the food recycler 1300 to indicate presence of the bucket vessel 1320 within the cavity 1306.

The sensors 1302, 1304 may include pressure sensors, proximity sensors, infrared sensors, flex sensors, or any other type of sensor that is capable of detecting differing features of the vessels 1310, 1320 that may be inserted into the cavity 1306. These sensors 1302, 1304 are in electrical communication with the controller to enable the transmission of signals to the controller upon detection of a vessel 1310, 1320 within the cavity 1306 or of removal of a vessel 1310, 1320 from the cavity 1306. In one aspect, the sensors 1302, 1304 are microswitches contacts that can detect the presence of a mechanical-coded tab which indicates, to the controller, whether a vessel is present and, if so, whether the vessel is a pot vessel 1310 or a bucket vessel 1320.

The controller, based on the signals obtained from the sensors 1302, 1304, may update a user interface of the food recycler 1300 to present a user with various options for the cycle to be performed using the vessel 1310, 1320 inserted into the cavity 1306. For instance, if the user has inserted a pot vessel 1310 into the cavity 1306, the user, via the user interface, may be presented with one or more programs (e.g., functions, recipes, etc.) that may be executed to produce a desired stock, broth, or other food item using the food present within the pot vessel 1310. In one aspect, in response to detecting the presence of a pot vessel 1310 within the cavity 1306, the controller may activate one or more other sensors of the food recycler 1300 to identify the contents of the pot vessel 1310. This data garnered through identification of the contents can be used to further identify the programs that may be executed to infuse the contents of the pot vessel 1310 into a liquid solution to produce a desired food item. Upon user selection of a program via the user interface, the controller may engage one or more components of the food recycler 1300 to grind, shear, hold at a specific and/or safe temperature, stir, or otherwise perform operations for creation and maintenance of the desired food item within the pot vessel 1310. The controller, via the user interface, may provide the user with feedback and alerts during the infusion process.

If the user has inserted a bucket vessel 1320 into the cavity 1306, the user, via the user interface, may be presented with a variety of different desiccation cycle profiles that can be used to create different types of granular media. These different desiccation cycles may differ based on the time required for completion of the cycle, the energy use for the cycle, and other factors that are external to the food recycler 1306 (e.g., exhaust temperature, noise levels, etc.). Similar to the example described above, in one aspect, the controller may activate one or more other sensors of the food recycler 1300 to identify the contents of the bucket vessel 1320, as well as the volume and water content of these contents. This data may be used to determine the different factors for the different cycle profiles, which can be presented to the user via the user interface. Based on the user selection of a particular desiccation cycle, the controller may engage one or more components of the food recycler 1300 to grind, stir, mix, heat, vacuum, move air, condense, filter air, control and monitor humidity and temperature, and the like in accordance with the cycle profile. In one aspect, the food recycler 1300, via the user interface, provides users with modes of a rapid condensing cycle to produce a liquid condensate or a normal cycle to produce a moist warm air exhaust.

In one aspect, the pot vessel 1310 is manufactured or constructed from a ferromagnetic material, such as a ferromagnetic stainless steel material or a cast alloy including ferromagnetic elements. This ferromagnetic material is utilized in order to generate heat within the pot vessel 1310 in an induced electromagnetic field.

In one aspect, the bucket vessel 1320 includes a lower inlet port that is configured to allow incoming warm air to rise through a food waste column to provide surface dissociation of the waste material. Further, the bucket vessel 1320 provides a negative atmospheric pressure environment to create a positive intercellular pressure differential to facilitate passage of water vapor through the cellular membrane of waste material to accelerate desiccation and to lower the water boiling point within the cell to elevate vapor pressure. The bucket vessel 1320 can be depressurized and returned to atmospheric pressure in a repeating pulsatile cycle following a program prescribed sequence of time and negative pressure delivered by the vacuum and purge pump and operation of negative pressure release valves. The pulsatile vacuum process accelerates rupture of the cellular membrane of the waste material and provides a drive force for intercellular moisture to evacuate the cell, thereby accelerating cellular desiccation.

The vacuum and purge air pump is an electrically powered air pump capable of producing low air flow rates but high negative front-end pressure and is so designed as to permit passage of condensate laden air either above or below the dew point. In one aspect, the pump is a positive displacement pump with the attribute of being able to act as a closed valve in the non-running state so as to maintain a negative pressure forward of the pump in the enclosed bucket vessel 1320. Alternate embodiments include, but are not limited to, axial flow or turbine compressors with a one way valve. The vacuum and purge air pump serves dual functions of producing a negative pressure environment within the enclosed bucket vessel 1320 during the draw down and hold function and to remove moisture laden air during purge cycles. In the vacuum phase the pump is capable of producing sustained negative pressure to 30 inHg and in to purge phase capable of displacing four times the cavity volume per minute at ambient pressure.

The food recycler 1300, at a prescribed position of rotation, auger air ports align with corresponding air ports located on the auger bearing support tube to allow an air communication between the interior of the bucket vessel 1320 and an exterior of the bucket vessel 1320. This facilitates neutralization of a contained negative pressure by permitting free passage of air into the bucket vessel 1320 to equalize the contained negative pressure to the external environmental pressure.

In another aspect, the bucket vessel 1320 includes a vacuum relief port that is located in the bucket vessel body. The vacuum relief port is a valve that can be activated by mechanical or electrical communication so as to create communication between the interior of the bucket vessel 1320 and the exterior of the bucket vessel 1320 in a location in the lower regions of the bucket vessel 1320 so as to create an airflow through the waste media.

In one aspect, the bucket vessel 1320 further includes a port located in the base of the bucket vessel 1320. This port includes a valve which serves as a seal to render the bucket vessel 1320 water tight for the storage of food waste. The valve can also serve as a seal for the creation of a negative pressure atmosphere within the bucket vessel 1320 when vacuum is applied, which can be externally operated to open and provide drainage for liquid condensate or can be opened to provide an inflow of air so as to neutralize the internal negative pressure within the bucket vessel 1320. The valve is so positioned to allow external operation, and the port is so located as to provide air communication to a region under the waste media so as to create air flow through the waste media with air inflow.

In one aspect, the bucket vessel 1320 further includes a rotor that can perform various functions. For instance, via clockwise rotation, the rotor produces material reduction through shearing and pulverization between the rotor arm blades and a stationary macerator blade. A close clearance between the agitator arms and the bucket vessel bottom provides a scouring action and the rotor shape is such as to provide uplift for waste material from the bottom, toward the macerator blade to provide the described mechanical reduction through shearing and pulverization. The swept shape of the blade is such as to provide a hold and shear action between the rotor and the stationary macerator blade. In the counter-clockwise rotation, the swept blade design forces waste material outward to the bucket vessel wall where it engages with a plurality of uplifting protrusions that are so placed as to create an upward mix flow in non-aqueous materials through their upward facing planar shape, and in aqueous materials by the creation of vortex currents.

In one aspect, the food recycler 1300, through the controller, measures the motor current in combination with a Hall effect position sensor to determine agitator rotation speed versus current or motor winding phase delay. This is performed to determine a rotor over torque or rotor stall condition created by a waste food jam between the rotor and macerator blade. The food recycler 1300 will stop clockwise rotation of the rotor and enter into a clearing cycle by reversing to counter-clockwise rotation following a prescribed clearing cycle. In the event the food recycler 1300 is unable to autonomously clear the jam, it will enter into a safe shut down mode and produce an alarm.

In one aspect, the food recycler 1300 further includes a Hall effect sensor near an input coupler between the food cycler 1300 and the bucket vessel 1320. The bucket vessel rotor includes a magnet to communicate to the Hall effect sensor and indicate to the food recycler 1300 the relative position of the rotor assembly to the controller, thus allowing the operation of the rotor so as to provide opening and closure of the rotor air inlet port for the pulsatile vacuum.

In another aspect, instead of the Hall effect sensor and the rotor port, the food recycler 1300 includes a vacuum relief port. The vacuum relief port is located in the base of the bucket vessel 1320 so as to provide relief air under the mass within the bucket vessel 1320. The valve is normally closed so as to provide a liquid barrier for the storage of wet waste and provide a seal to facilitate the creation of vacuum within the bucket vessel. The valve can be externally operated by applying a magnetic field or via solenoid plunger located within the cavity 1306.

The pot vessel 1310 may also include a rotor. Similar to the rotor of the bucket vessel 1320, the rotor of the pot vessel 1310 rotates in both a clockwise and counter-clockwise fashion. Its wedge shape provides lift of solids from the bottom to a vertical rising central fluid vortex in the clockwise direction, with its close tolerance to the pot vessel bottom creating a scouring action. In the counter-clockwise direction, solids are pushed to the outside of the pot vessel 1310 to create a rising column of solids and fluids along the pot vessel interior sides to facilitate even heating of the solution to promote infusion while minimizing temperature differential within the solutions entity.

In both the pot vessel 1310 and the bucket vessel 1320, agitation, proportionate heat application, and active mass temperature feedback are under the control of the controller to create a narrow temperature hysteresis range. Within the pot vessel 1310, this creates a preferred infusion temperature. Within the bucket vessel 1320, this creates a preferred desiccation temperature without carbonization. Thus, the controller can use the temperature hysteresis range to maintain an ideal temperature within the pot vessel 1310 or the bucket vessel 1320 based on the corresponding cycle being performed.

With regard to the pot vessel 1310, at the end of an infusion cycle, the pot vessel 1310 may contain solids that have a higher density than water and sink to the bottom, infused aqueous liquid mid-layer at a relatively equal density to water, and floating fats which are generally at a lower density than water. Fats can vary from a liquid state above their melting temperature to a solid state below their melting temperature. However, these fats generally remain at a lower density than water. The melting point of these fats may vary based on their composition. The bottom layer is a waste stream, the mid later is a desired product, and the top layer is a fat-based waste stream.

The food recycler 1300, in one aspect, includes a dual concentric separator that facilitates separation of these three layers. The dual concentric separator includes two filter plates, a lower filter mesh plate with a metal backer that allows the lower filter mesh plate to act as a plunger/filter, separating the solids from the infused solution, forcing the solid waste to the bottom of the pot vessel 1310 and holding it in the lower region of the pot vessel 1310. The upper filter is similarly constructed with the addition of an upward facing outer containment ring for the containment of solidified fats and is attached to a concentric shaft so as to allow independent movement of the shaft of the lower plate filter and its shaft, both of which communicate upward to operated.

In use, upon completion of an infusion cycle, the food recycler 1300 holds the contents of the pot vessel 1310 at a specified temperature so as to facilitate safe food storage and to allow the fats to be held in a liquid state above their melting temperature. The operator places the dual concentric separator into the pot vessel 1310 passing through the liquid fat layer with both the upper and lower filter plates. The lower filter plate forces the solids to the bottom, and the second filter plate rests on top of it. The solution is permitted to cool below the melting point of the fats which undergo a state change from liquid to solid. The operator elevates the upper filter plate through the liquid solution and is able to capture and remove the fat solids from the pot vessel 1310 for disposal. The infused solution product may be poured from the pot vessel 1310 with the waste solids restrained by the lower filter plate. Upon completed extraction of the infused solution product, the waste solids can be transfused to the bucket vessel 1320 for processing as food waste. The fats can be retained as sanitized fats for use or disposal. The infused solution is stored and used as foodstuff.

In one aspect, for a desiccation cycle, the critical end-of-cycle parameter is the moisture content within the waste material. Process sensing inputs are available to the controller from a humidity sensor located in the lid and in the outbound air stream from the compressor of the food recycler 1300. Thus, based on the amount of humidity detected using the humidity sensor, the controller can determine whether the desiccation cycle has been completed. For instance, the controller may evaluate the humidity level within the vessel to determine whether this humidity level is below a minimum humidity threshold. If the humidity level is below the minimum humidity threshold, the controller may determine that the desiccation cycle is complete.

In one aspect, the food recycler 1300 includes an external cycle controller contact connector, which provides a contact interface between the controller and an external environment to provide coordination of exothermic machine cycles with external environmental needs. The interface, in one aspect, is a dry contact closure at 24 VDC current limited to interface with a standard thermostat.

In one aspect, the food recycler 1300 includes an external air duct interface to couple the food recycler 1300 to an external duct system using a 2 or 3-inch round duct suitable for HVAC exhaust air. This can provide optional ducting of the exhaust air to an external environment.

During a desiccation cycle, air exhaust can be directly vented to an exhaust air stream or internally diverted through a condenser. In one aspect, the condenser is a two-stage process with the first stage being a venturi condensate separator and the second stage being a pressure vessel with an end-of-cycle condensate purge. In an alternate aspect, the condenser is a Peltier chiller condenser, wherein the condenser uses the cool side of the Peltier circuit bridge and the heat side produces a warm air stream for reintroduction into the bucket vessel 1320 via the air makeup port during the purge portion of the pulsatile cycle.

In one aspect, within the wall of the cavity 1306 is a thermal and acoustic insulation layer to reduce heat transfer from the pot vessel 1310 or bucket vessel 1320 to the interior of the food recycler 1300 and to reduce acoustic transmission resulting from the mechanical operations performed therein. The outer case of the food recycler 1300 can include an acoustic damping material layer to reduce acoustic transmission from the internal mechanical processes to the outside environment, thereby reducing noise. In one aspect, within the air exhaust port of the food recycler 1300, the food recycler 1300 includes a series of acoustic baffles tuned to the operating frequency of the air pump compressor output. These acoustic baffles are used to dampen pulsatile noise transmission from the exhaust air.

Figure 14:
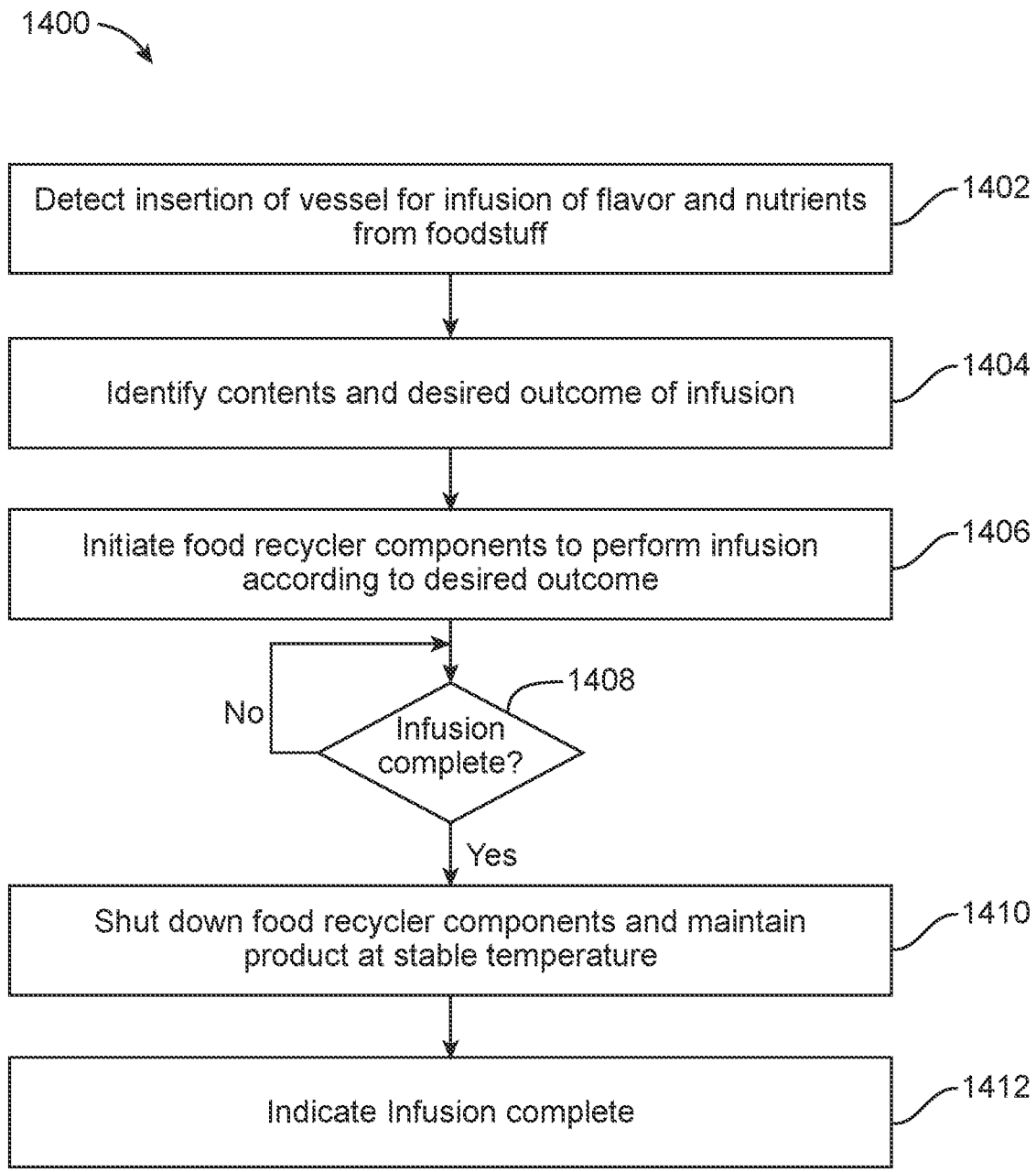
FIG. 14 illustrates an example method associated with infusion of flavor and nutrients from surplus food to create a foodstuff.

FIG. 14 illustrates an example method 1400 associated with infusion of flavor and nutrients from surplus food to create a foodstuff. The method 1400 may be performed by a controller of the food recycler. The method 1400 includes detecting insertion of a pot vessel for infusion of flavor and nutrients from foodstuff into an aqueous solution (1402), identifying the contents of the pot vessel and the desired outcome of the infusion (1404), and initiating various food recycler components to perform infusion according to the desired outcome (1406). Upon initiating the various food recycler components to perform infusion according to the desired outcome, the controller may monitor the infusion cycle to determine whether the infusion cycle has been completed (1408). If the infusion cycle has not been completed, the controller may continue to monitor the infusion cycle. However, if the infusion cycle is complete, the controller shuts down the food recycler components and maintains the product at a stable temperature (1410). Further, the controller indicates, via a user interface or through other indicators of the food recycler, that the infusion cycle is complete (1412).

Figure 15:
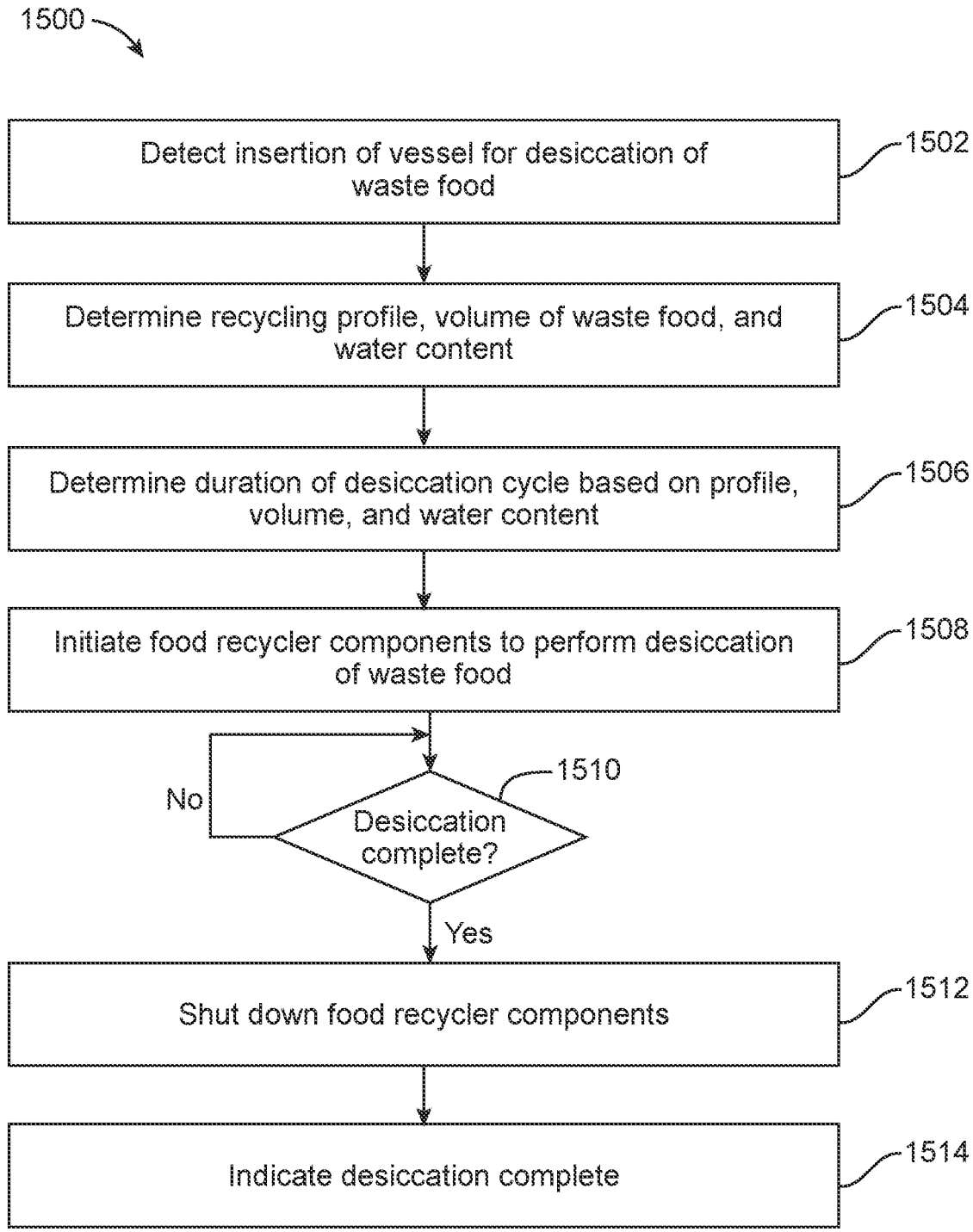
FIG. 15 illustrates an example method associated with conversion of food waste into nutrient preserved stable granular media.

FIG. 15 illustrates an example method 1500 associated with conversion of food waste into nutrient preserved stable granular media. The method 1500 may be performed by a controller of the food recycler. The method 1500 includes detecting insertion of a bucket vessel into the food recycler for desiccation of food waste (1502). A user of the food recycler may be required to remove the bucket vessel lid so as to facilitate closure of the food recycler. In an aspect, closure of the food recycler results in an enclosed atmosphere in which the bucket vessel is encapsulated. In an aspect, upon receiving a start command to initiate a desiccation cycle, the food recycler performs a system diagnostic check to ensure that the desiccation cycle can be initiated. Further, the food recycler may confirm that the lid has been closed.

The method 1500 further includes determining a recycling profile, volume of food waste, and water content of the food waste (1504), determining the duration of the desiccation cycle based on the recycling profile, volume of food waste, and water content of the food waste (1506), and initiating the food recycler components to perform desiccation of the food waste (1508).

In an aspect, the food recycler begins a grind cycle by activating the bucket vessel auger to apply a torque to the food waste within the bucket vessel. This may cause the food waste mass to engage against a stationary feature shaped to reduce the food waste mass by mechanical compaction, laceration, and pulverization. In the event of a torque stall, the food recycler can perform a blade clearing cycle, whereby the auger is rotated in an opposite direction to push the food waste mass into the stationary mixing elements. If the torque stall is cleared, the grind cycle is activated to continue the desiccation cycle. In an aspect, if the food recycler is unable to resolve the torque stall or a maximum number of torque stall events is reached, the food recycler halts the desiccation cycle and produces an alarm or other indication of the issue. A user may be required to manually clear the jam within the bucket vessel to resolve the torque stall issue.

Upon completion of the grind cycle, the food recycler commences a heat phase in which the lid-mounted radiant heat array is activated to raise the temperature of the food waste mass to a climax desiccation temperature. The climax desiccation temperature, in some aspects, is 115 degrees Celsius. During this heat phase, the bucket vessel auger turns counter-clockwise at a reduced speed. The counter-clockwise rotation agitates the food waste mass and forces the food waste mass into a set of stationary features so shaped as to create upward material flow and create mixing to facilitate even heating of the food waste mass.

When the food waste mass desiccation cycle set point temperature is reached, the process is advanced to the desiccation cycle at which time the radiant lid heater is deactivated. The desiccation cycle commences with the inductive heater elements coming under the control of the infrared lid sensor and being cyclically activated or modulated to maintain the set desiccation temperature of the food waste mass. Further, the bucket vessel auger is activated to turn the food waste mass in a counter-clockwise direction and is brought to a stop at the vacuum relief port closed position. Once in position, the vacuum draw down cycle commences.

During the vacuum draw down cycle, the vacuum pimp is engaged to draw down bucket vessel within the food recycler to a vacuum pressure set by the pump displacement and speed in full cycle mode. Full vacuum is held for a set time with the purpose of creating hemorrhagic fractures in the cellular membranes of the waste material so as to accelerate moisture transmission from within the cell through the cellular membrane fractures.

Upon completion of the vacuum draw down cycle, the auger resumes rotation in the counter-clockwise direction at a speed set as to open and close the vacuum relief port at a particular cycle as to create a pulsatile vacuum cycle rising to atmospheric pressure and falling to 1.5 mbar and creating air flow within the bucket vessel from the vacuum relief port location at the bottom of the food waste mass to the top of the bucket vessel in a convective air stream moving toward the low pressure source. In an aspect, an alternate rapid cycle option can be selected at the time of start up, and a secondary process is engaged where a Peltier process recycle accelerator condensing cooler/heater is engaged.

Air output is measured by hygrometers located in the lid and exudate air tube. Using these measurements, the controller determines whether the desiccation of the contents within the bucket vessel is complete (1510). When a series of consecutive readings or a period of time that concur and confirm that the food waste mass has reached a predetermine moisture content, the cycle is complete and the food recycler is transitioned into a cool down phase. The controller may shut down various food recycler components as part of the cool down phase (1512). For instance, in the cool down phase, all heat sources are shut down. The auger is moved to the port open position and the vacuum pump continues to run at a reduced speed so as to create air movement within the bucket vessel so as to provide cooling.

When temperature sensors in the lid and air exudate tube produce a series of concurrent readings over time that concur and confirm that the bucket vessel and its contents have reached a predetermined temperature, the food recycler machine moves to the ready to open state, indicating that the desiccation cycle is complete (1514) and moving the food recycler to a standby mode.

Figure 16A:
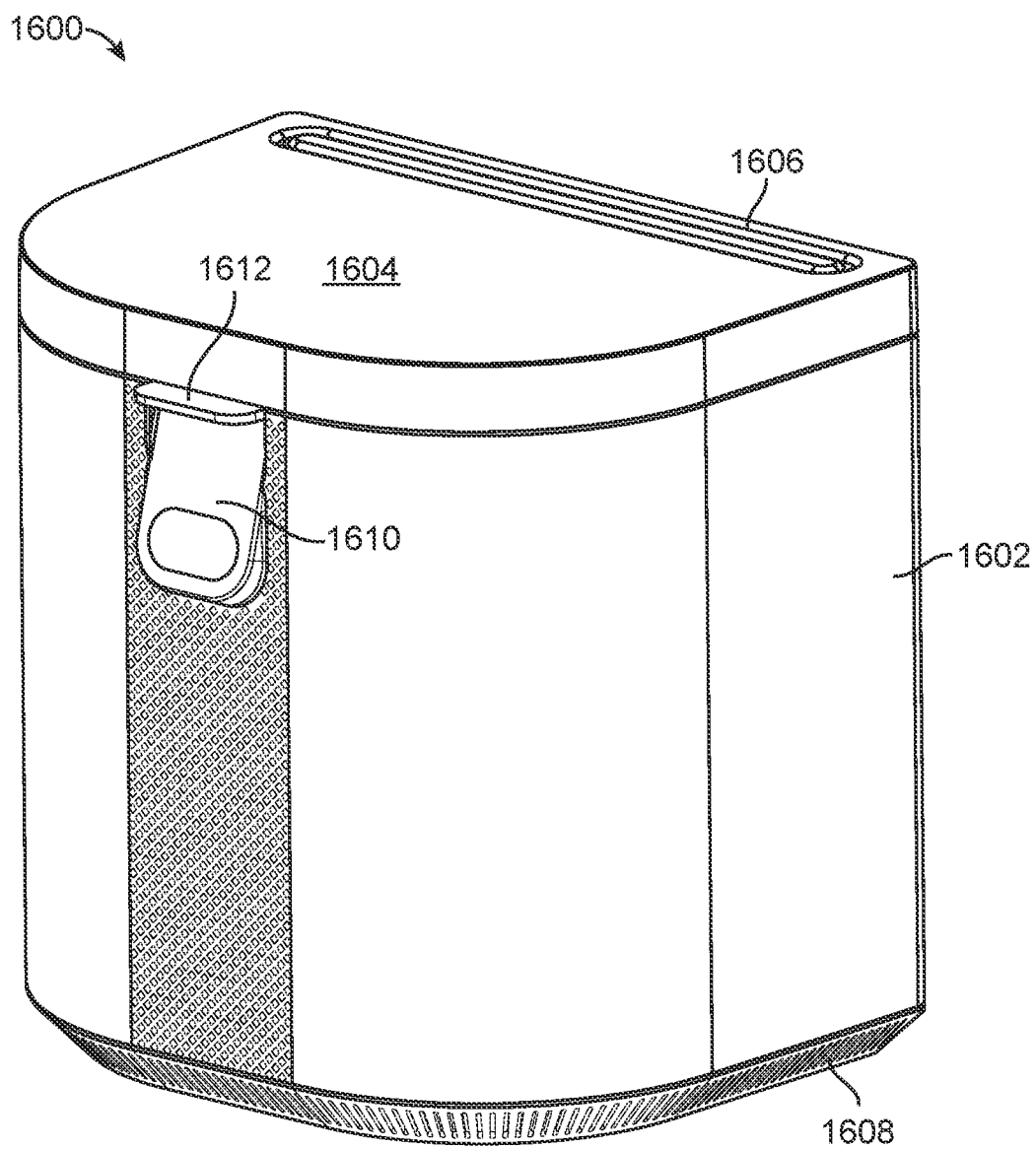
FIG. 16A illustrates a front view of an example food recycler.

FIG. 16A illustrates a front view of an example food recycler 1600. The food recycler 1600 can have a side housing or casing 1602 which on the left side and a right side can be generally flat and on the front portion of the food recycler 1600 can have rounded edges. A lid 1604, which can form a top surface of the food recycler 1600, can be part of the lid structure and can include an exhaust vent 1606. This exhaust vent 1606 can be typically configured within 2 cm from a hinge associated with the lid 1604 or from the top rear edge of the lid 1604. The lid 1604 can be released by the user interacting with a latch 1612 configured in a front portion of the housing 1602. Right below the latch 1612 can be configured a control button 1610. The positioning of the latch 1612 and the control button 1610 are designed to be adjacent to one another such that the user only needs to go to one particular area of the food recycler 1600 in order to interact with or control the food recycler 1600. The user can open the lid 1604 or turn the food recycler 1600 on or off by focusing on one location of the system. To turn the food recycler 1600 on or off, the user only needs to depress the button 1610. The positioning of these two control components simplifies the user interaction with the food recycler 1600. The latch 1612 and the control button 1610 can be, for example, within 2 mm of each other physically. While the latch 1612 is shown as configured above the control button 1610, they could also be configured side by side or with the latch 1612 below the control button 1610.

Air intake vents 1608 are positioned along an angled lower surface of the food recycler 1600. In one aspect, the vents 1608 are configured in some or all of the angled surface which is defined between a bottom surface (not shown in FIG. 16A) and a vertical side housing 1602. The air intake vents 1608 are used to draw the air into the food recycler 1600 such that the air follows a particular path around components, a bucket containing food waste, and air filter, and ultimately into the lid 1604 and out an exhaust vent 1606. There are several configurations for the location of the exhaust vent disclosed herein.

Figure 16B:
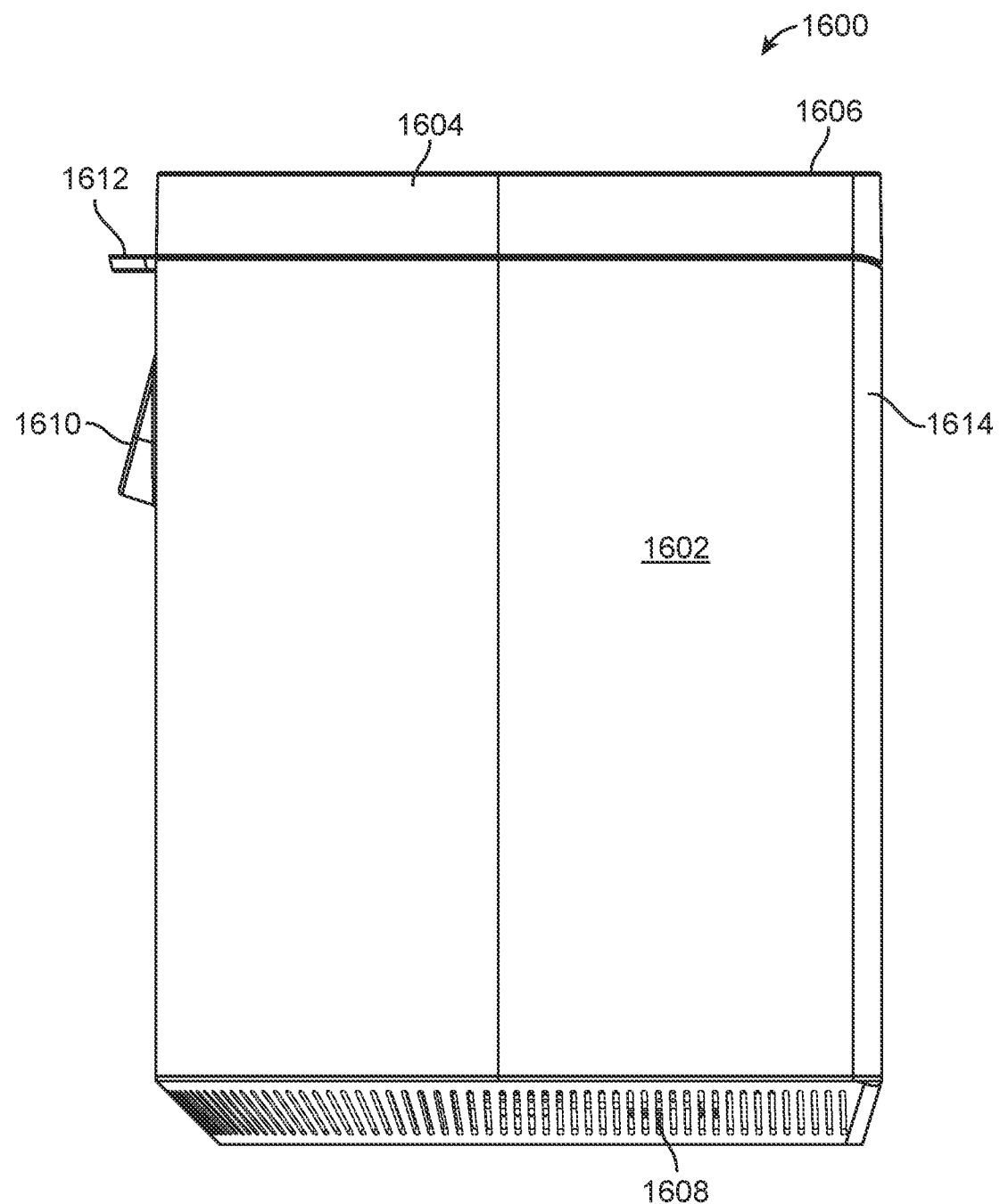
FIG. 16B illustrates a side view of an example food recycler.

FIG. 16B illustrates a side view of the food recycler 1600. In this view, the air intake vents 1608 are shown as being configured along the angled surface near the bottom of the food recycler 1600. In one aspect, the rear surface 1614 is vertical such that the food recycler 1600 can be leaned up or positioned against a wall. With a vertical rear surface 1614, it is expected that the exhaust vent 1606 would be configured to cause air to flow out a top surface of the lid 1604.

A side profile of the latch 1612 and the control button 1610 are provided. It is noted that the control button 1610 extends away from the front surface of the food recycler 1600.

Figure 16C:
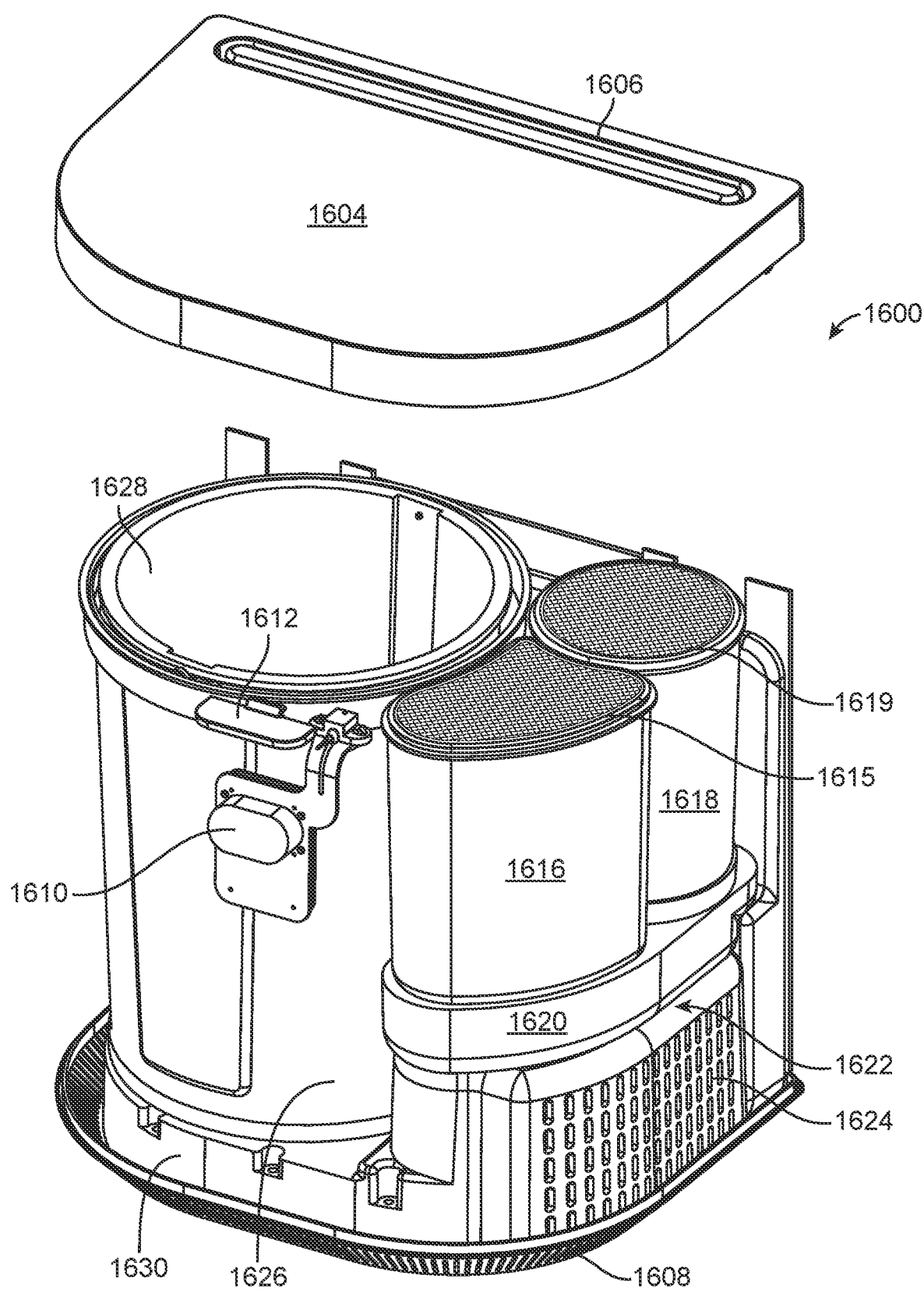
FIG. 16C illustrates some of the internal components of an example food recycler.

FIG. 16C illustrates some of the internal components of an example food recycler. The lid 1604 and exhaust vent 1606 are shown as being separated from the rest of the food recycler 1600. Component 1622 represents a cover or motor housing that contains a motor that will drive a gear system configured within the component represented by feature 1630. Air vents 1624 in the motor housing 1622 can enable air received via air vents 1608 to flow through the motor housing 1622. The entire airflow through the unit will be described in more detail below.

A bucket 1628 is shown as being configured within a bucket housing 1626. The bucket 1628 is removable by a user and is configured to be complementary to and fit within the bucket housing 1626. Generally speaking, the motor contained within the motor housing 1622 will drive a gear system in compartment 1630 which will cause a blade system to rotate within the bucket and process the waste food. Heat will also be provided through a heating plate or other component as part of the base unit 1708 such that the food can both be chopped up and heated. The heater can be configured in or part of compartment 1630. Component 1616 contains a fan that draws the air from a top region of the bucket 1628 either directly or through an air channel configured within the lid 1604. The airflow will draw moisture from the bucket area 1628 and ultimately out of the food recycler 1600. The fan will pull air down through component 1616 and through an open channel in compartment 1620. Filter component 1618 includes a compostable filter which will filter the air and which is easily removable. The filter component 1618 it can be a compostable filter system. An example height of the filter system might be approximately 144 mm. In one aspect, a screen cover 1615 can be used to cover the fan component 1616 and a screen cover 1619 can be used to cover a top portion of the filter component 1618.

Figure 16D:
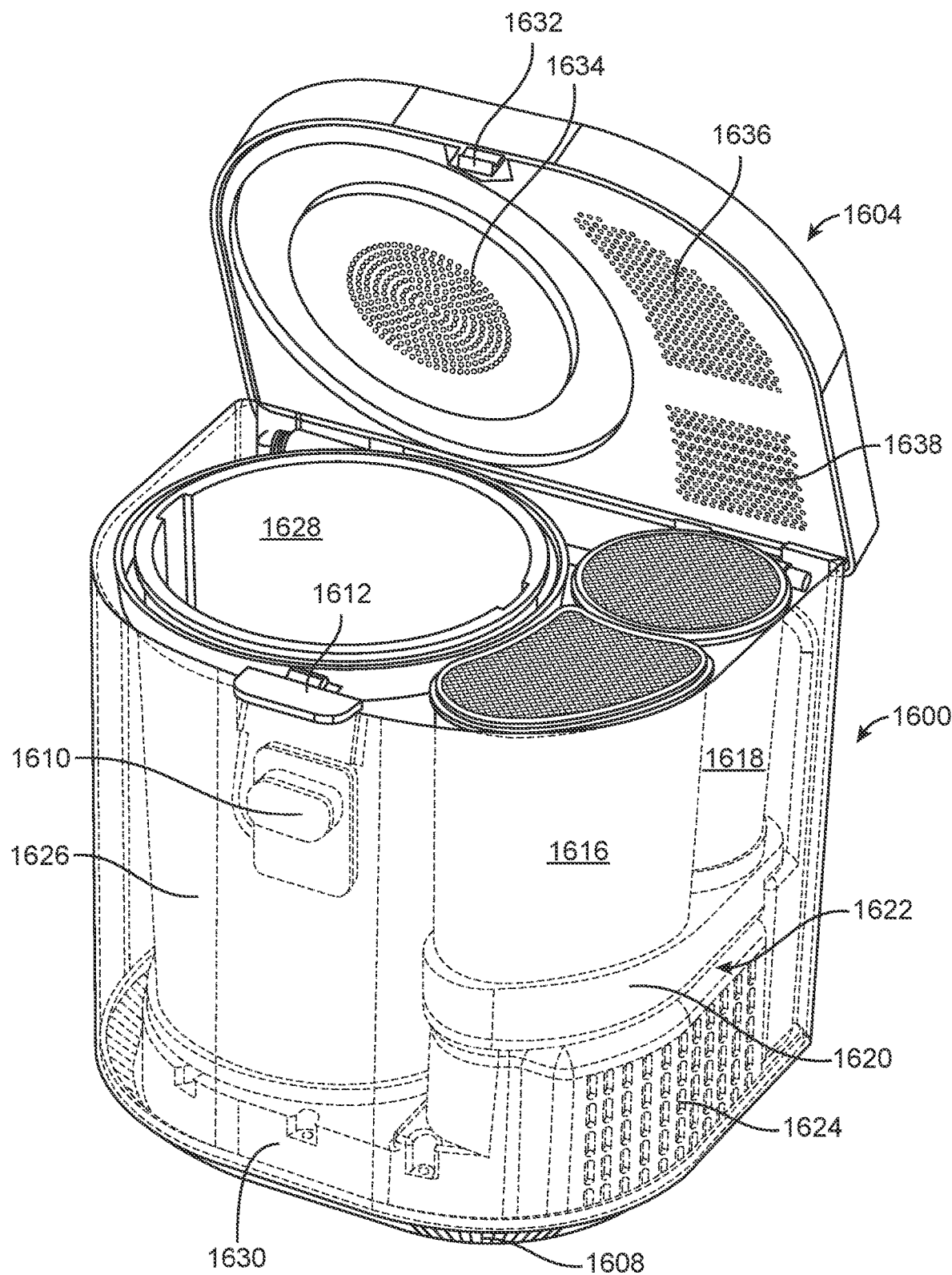
FIG. 16D illustrates some of the internal components of an example food recycler.

FIG. 16D illustrates some of the internal components of an example food recycler 1600. In this figure, more details about the lid 1604 are provided. For example, air flowing up from the bucket 1628 can enter into an airflow region 1634 in the lid 1604. The configuration of the lid 1604 can control the airflow to an exit region 1636 that causes the air to flow down into component 1616 which contains the fan. The fan forces air into component 1620 and up through the filter component 1618 back into the lid through the region 1638. These airflow regions 1634, 1636, 1638 can be created by forming a number of small openings or holes in a bottom surface of the lid 1604 and configuring internal airflow channels within the lid 1604 to control the flow of air to and from the lid 1604. A locking component 1632 is shown as part of the lid 1604 and which is complementary to and interacts with the latch 1612. The locking component 1632 can be used to either lock or release the lid 1604 upon interaction with the latch 1612 by a user.

Figure 16E:
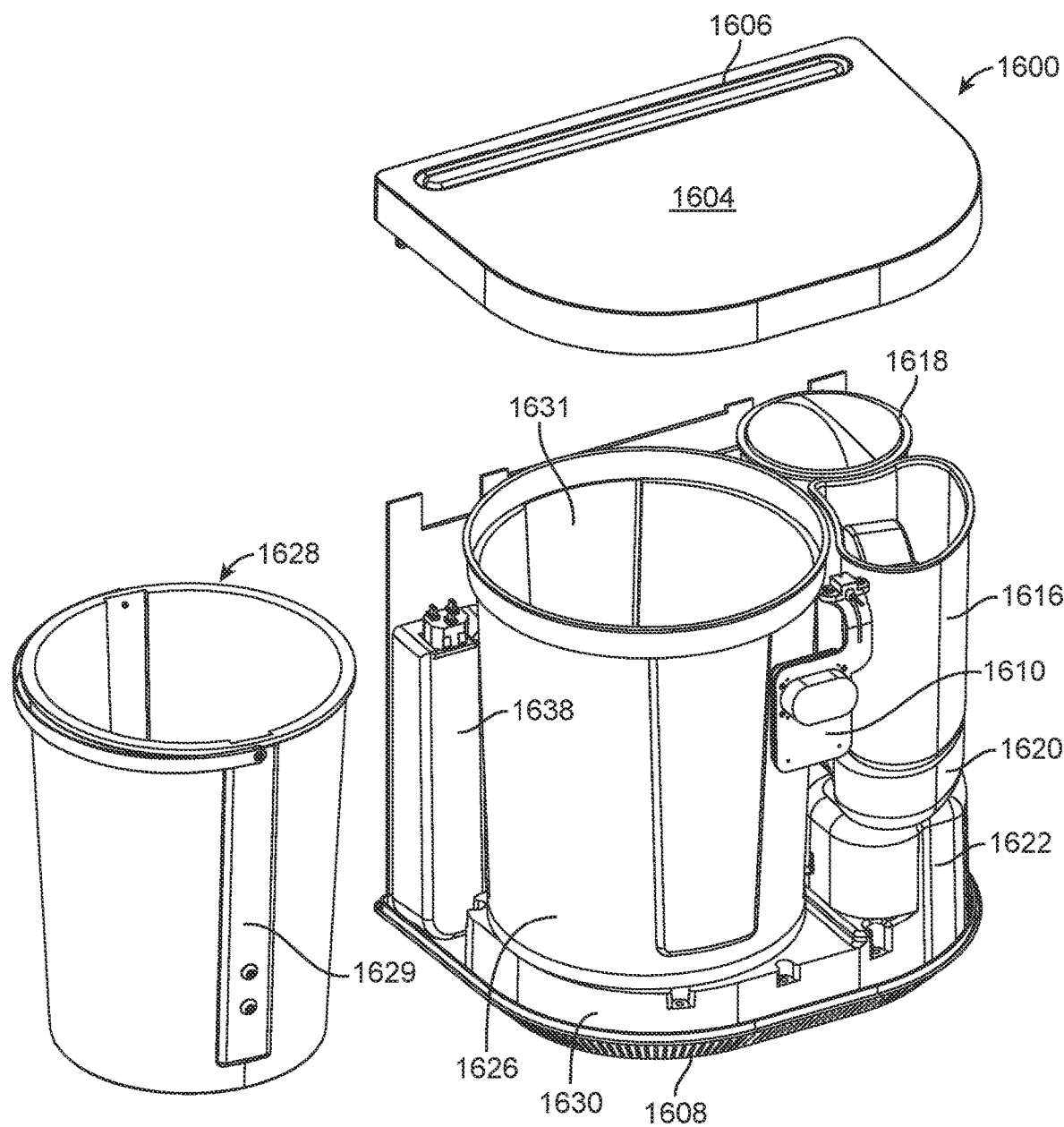
FIG. 16E illustrates some of the internal components of an example food recycler.

FIG. 16E illustrates some of the internal components of an example food recycler 1600. In this figure, the bucket 1628 is shown as being separated from the bucket housing or bucket receptacle 1626. The bucket 1628 is removable and is configured with a complementary sidewall with sidewall extensions 1629 that can be complementary to interior wall indentations 1631 in the bucket housing 1626. In this manner, the bucket 1628 can be easily placed into the bucket housing 1626 and seated properly for use. FIG. 16E also shows a compartment 1638 that can be configured to store the power cord for powering the food recycler 1600.

Figure 16F:
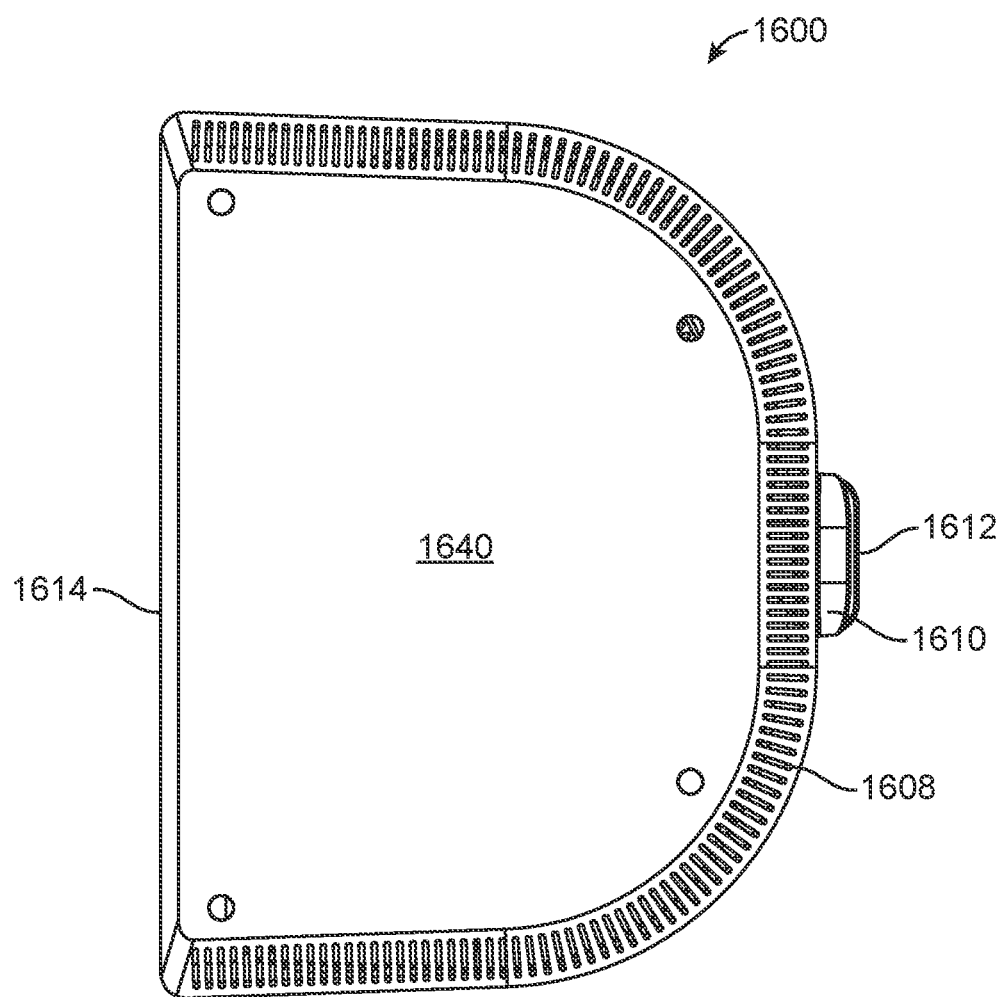
FIG. 16F illustrates a bottom view of an example food recycler.

FIG. 16F illustrates a bottom view of an example food recycler 1600. A bottom surface 1640 is shown as well as a bottom view of the control button 1610 and the latch 1612. In this figure, the air intake vents 1608 are shown as encompassing the lower portion of the food recycler 1600 except for the rear surface 1614. To further control the airflow into the food recycler 1600, the air intake vents 1608 could be positioned intermittently or in specific regions of the surface in which the air intake vents 1608 are configured.

Figure 16G:
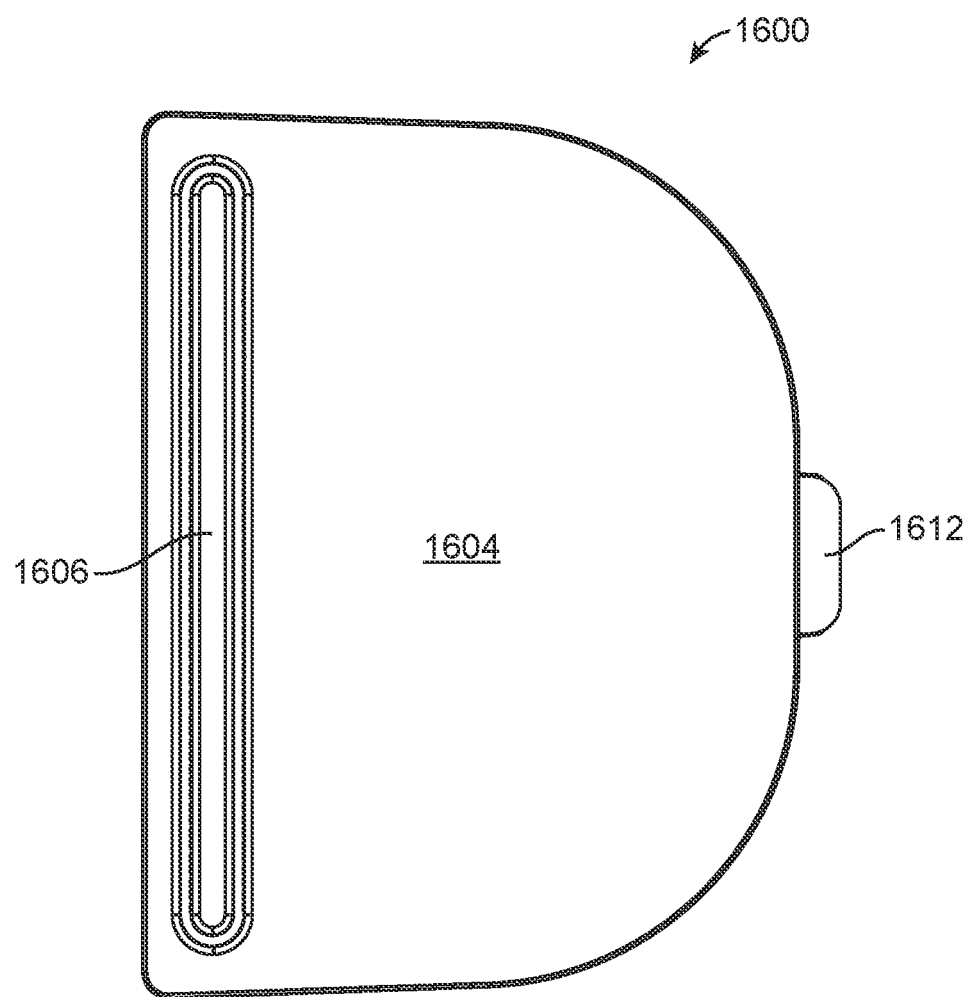
FIG. 16G illustrates a top view of an example food recycler.

FIG. 16G illustrates a top view of an example food recycler 1600. The exhaust vent 1606 is shown as well as a top view of the latch 1612. The top view of FIG. 16G illustrates the angled nature of the left and right edges of the food recycler 1600. These are provided by way of example but illustrate a preferred shape of the housing of the food recycler 1600. Other configurations are contemplated as well and are discussed below.

Figure 16H:
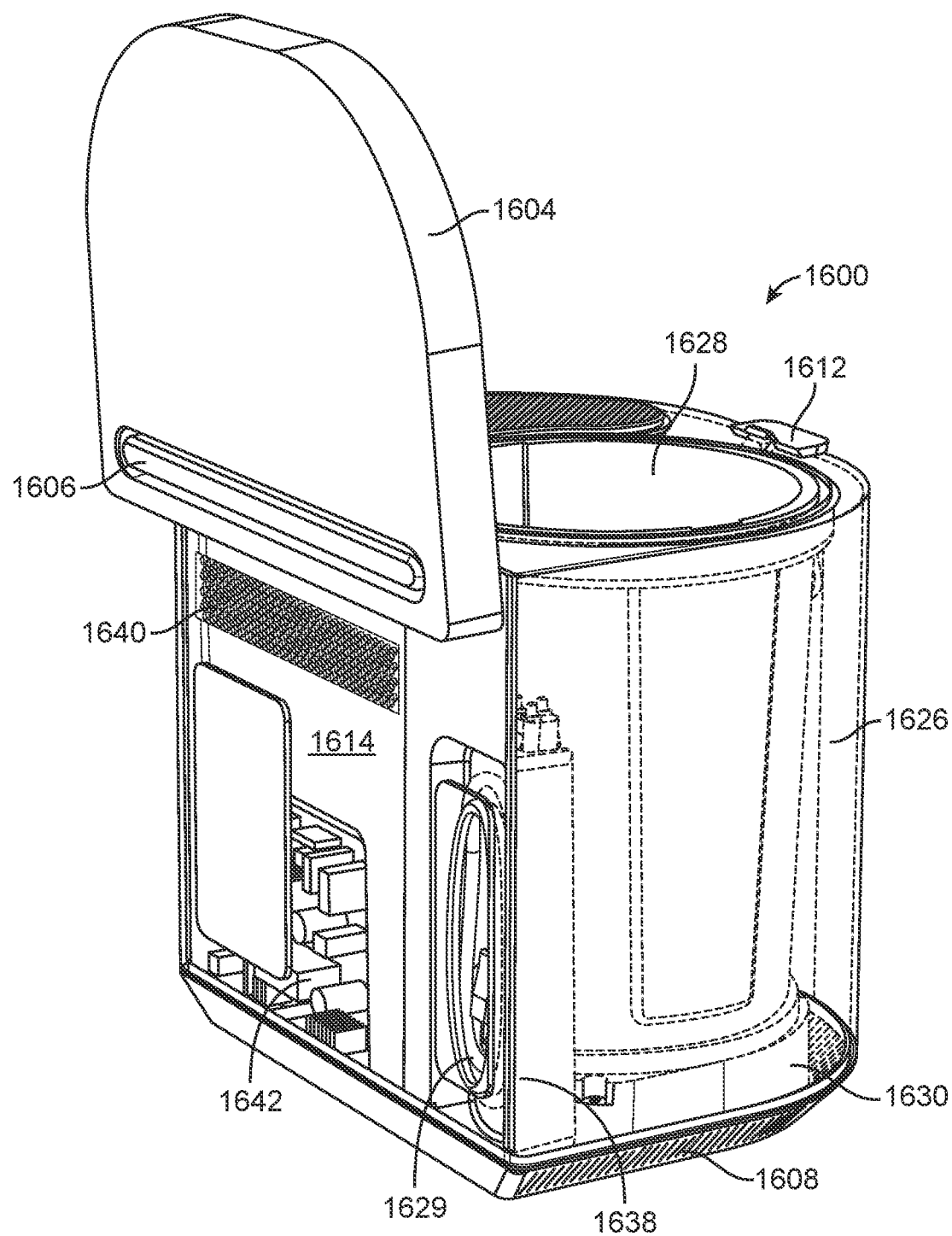
FIG. 16H illustrates a side and rear view of an example food recycler.

FIG. 16H illustrates a side and rear view of an example food recycler 1600. Configured within the rear surface 1614 of the food recycler 1600 can be several features. An exhaust vent 1640 is shown by way of example. It is preferable that the exhaust vent be configured within the lid 1604 as is shown by feature 1606. However, an alternate channeling of air from the food recycler 1600 can include a structure that channels air out of the rear surface 1614. In one aspect, the exhaust vents 1606 are configured within the lid to cause the air to be channeled out a top portion of the lid, and preferably in a back region of the lid. Other regions could be used as well. In this aspect, air is not vented out of a back wall of the food recycler 1600. In yet another aspect, the air is not vented out of a back surface of the lid 1604 but is channeled out of a top surface of the lid 1604.

Feature 1642 represents generally the configuration of the electrical components which are used to operate the food recycler 1600. Compartment 1638 is shown as storing an extension cord 1629.

Figure 17A:
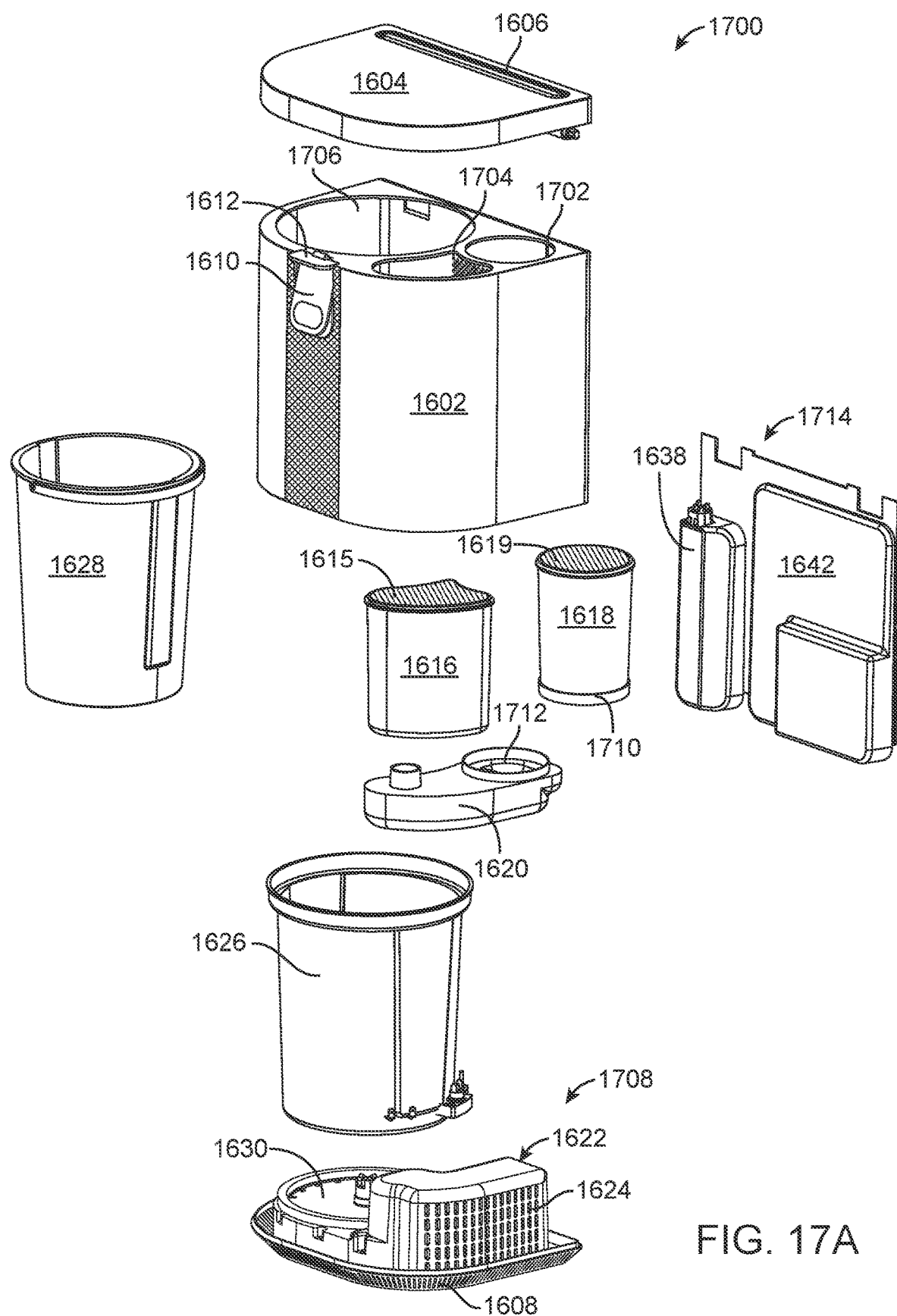
FIG. 17A illustrates various modular components of an example food recycler.

FIG. 17A illustrates various modular components of an example food recycler 1700. One aspect of the food recycler 1700 is that its components can be accessed and replaced in a modular fashion. The various components can be swapped in and swapped out. FIG. 17A shows the various modules that can be easily removed and replaced. For example, the system 1700 can include configuring the various components such that they can easily be accessed and replaced. For example, a base component 1708 can include a motor housing 1622, and a gear casing 1630 which can be configured with air intake vents 1608 and motor compartment air intake vents 1624. This configuration can be generated such that an outer casing 1602 can easily sit on or attach to the base component 1708. A bucket container 1626 can be configured to sit on the gear housing 1630. The bucket container 1626 can be configured to receive a bucket 1628.

Sitting on top of the motor housing 1622 can be a component 1620 that is configured to receive air flowing from a fan component 1616 and cause the air to flow through the component 1620 and into a filter component 1618. The housing 1602 is shown with a volume or an interior cavity 1704 which is complementary to and can receive the fan component 1616. Another volume or cavity 1702 is shown within the housing 1602 and which is complementary to a configuration of the filter component 1618. Below the cavity 1704 and the cavity 702, and built into the structure of the casing 1602, can be another cavity that is complimentary to the airflow component 1620. Another component 1714 is shown, which is at least part of the configuration of a rear surface of the system 1700. This component 1714 can include a cavity 1638 for holding an extension cord and another portion 1642 that can contain a control system and other electrical components. The housing 1602 can also include an interior cavity or volume 1706 which is configured to enable the bucket container 1626 to be positioned inside the housing 1602. The lid 1604 is shown as well as an exhaust vent 1606 as part of the lid structure.

The bucket container 1626 and/or the base 1708 shown in FIG. 17A can also be characterized as a bucket receptacle. A heating element or heat can be provided either within the region 1630 of the base 1708 or in the bucket container 1626 to transfer heat to or cause the bucket 1628 to be heated as part of the processing of the waste food placed within the system.

The electrical control system and the communication of power and control signals to the motor, heating elements, the fan, or other elements are not shown but would be understood to one of skill in the art.

The latch 1612 is shown as well as the control button 1610 configured on the front portion of the exterior surface of the housing 1602. The various components shown in FIG. 17A are configured such that the accessibility and removability of various components is easy for an end user. For example, the system can be configured such that the user could access the fan component 1616 from a top portion of the cavity 1704 and remove the fan component and replace it with a new fan component in case the original fan stopped working. Not shown in this figure, but included within the structure, would be the proper electrical connections that would power the fan and provide control data from the control system housed in the component 1642. In another aspect, the user may remove the housing element 1602 and thus reveal the fan component 1616 that could then be removed and easily replaced by the user.

Similarly, the user could access and replace the filter component 1618 either from the opening 1702 and a top portion of the casing 1602 or upon accessing the filter 1618 after lifting the housing component 1602 off of the base component 1708.

Figure 17B:
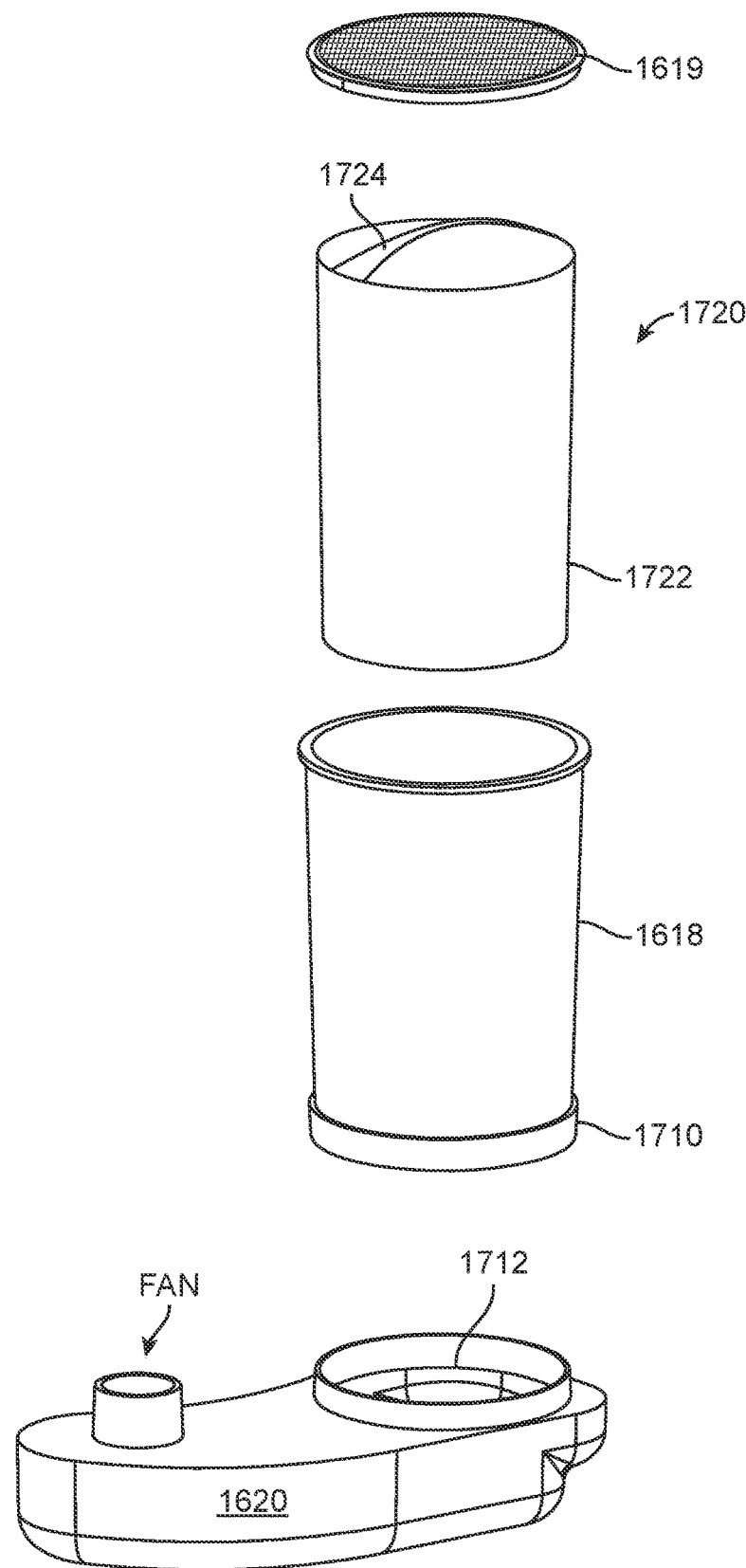
FIG. 17B illustrates in more detail the filter system.

FIG. 17B illustrates in more detail the filter system 1720. The filter container 1618 is positioned with a base structure 1710 into an opening or configuration represented as feature 1712. Feature 1712 is part of the component 1620 which receives air from the fan and which directs the air through the interior portion of the component 1620 to the opening or output port 1712 so that the air can be filtered using filter 1722. The filter 1722 is compostable and is configured to be removably inserted into the filter component 1618. A handle 1724 can be configured with the filter 1722 for easy insertion and removal from the component 1618. A top cover or filter screen 1619 can have many air flow vents or openings to enable air to flow through the filter and out the top. Replacing the air filter 1722 can be achieved by opening the lid 1604, removing the top cover or filter screen 1619, and utilizing the handle 1724 to pull the filter 1722 out of the component 1618. The user can then replace the old filter with a new filter in a similar manner.

Figure 17C:
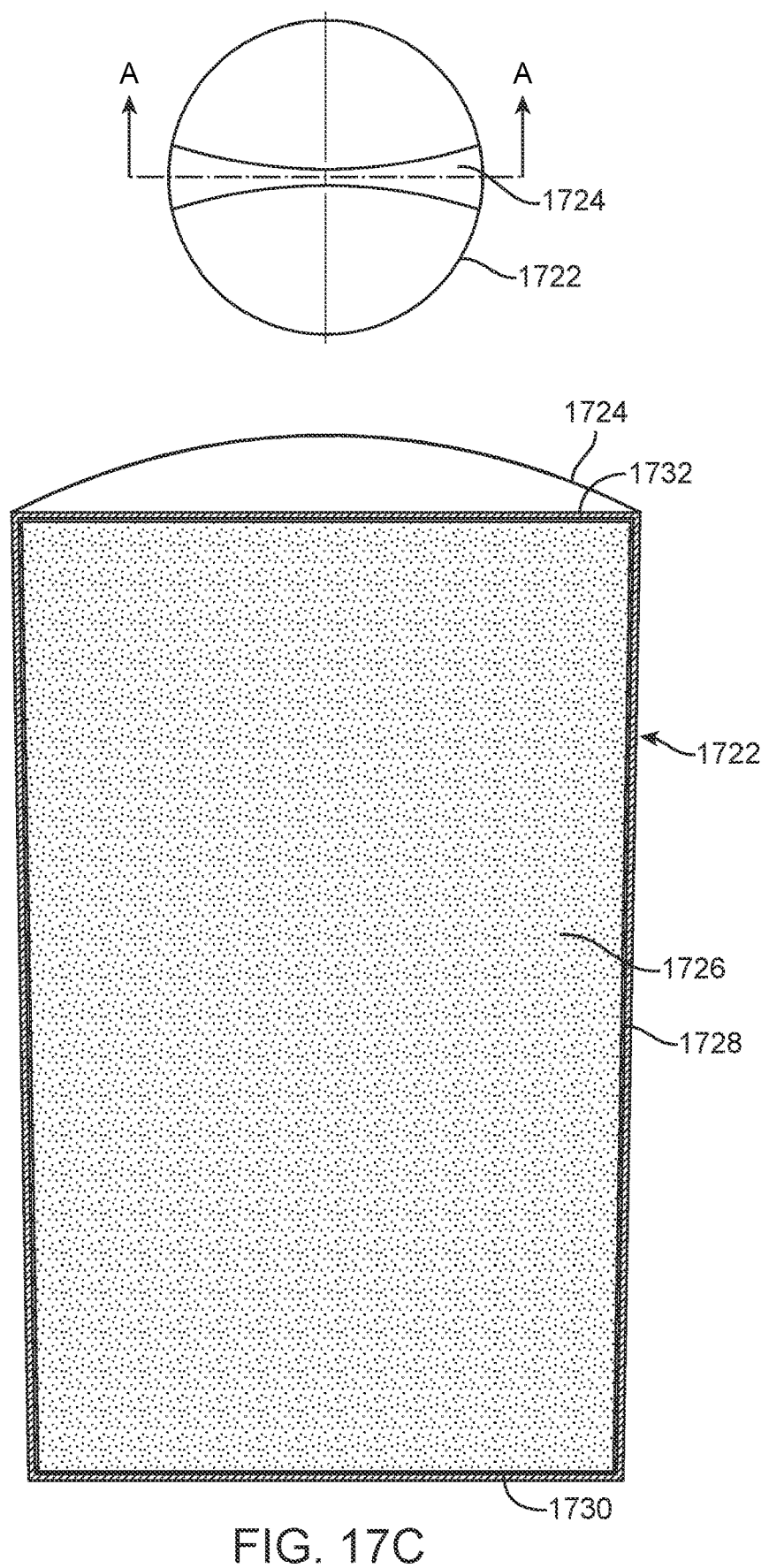
FIG. 17C illustrates in more detail the filter itself.

FIG. 17C illustrates the filter 1722 with more detail. The filter 1722 can be configured with cylinder walls 1728 that are non-porous and can be made from a material such as pasteboard or heavy paper. The design controls the flow of air through the filter and not out the side walls of the filter. A bottom surface 1730 and a top surface 1732 can be made from a permeable filter material to allow airflow while containing the internal charcoal pieces 1726 that filter the warm moist air. Other materials can be used as well for the filter. Note that using pasteboard or heavy paper can enable the entire filter to be compostable. Other materials can be used as well to maintain the functionality of the filter 1722 and remain compostable as an entire unit.

Figure 18A:
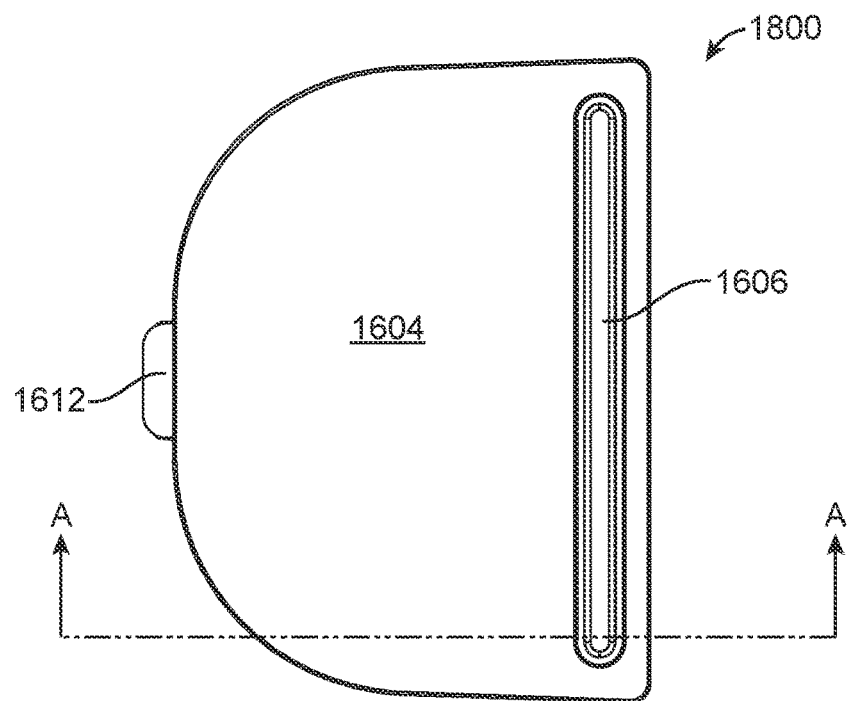
FIG. 18A illustrates a top view of an example food recycler and a cross-sectional view of some of the components.
Figure 18A:
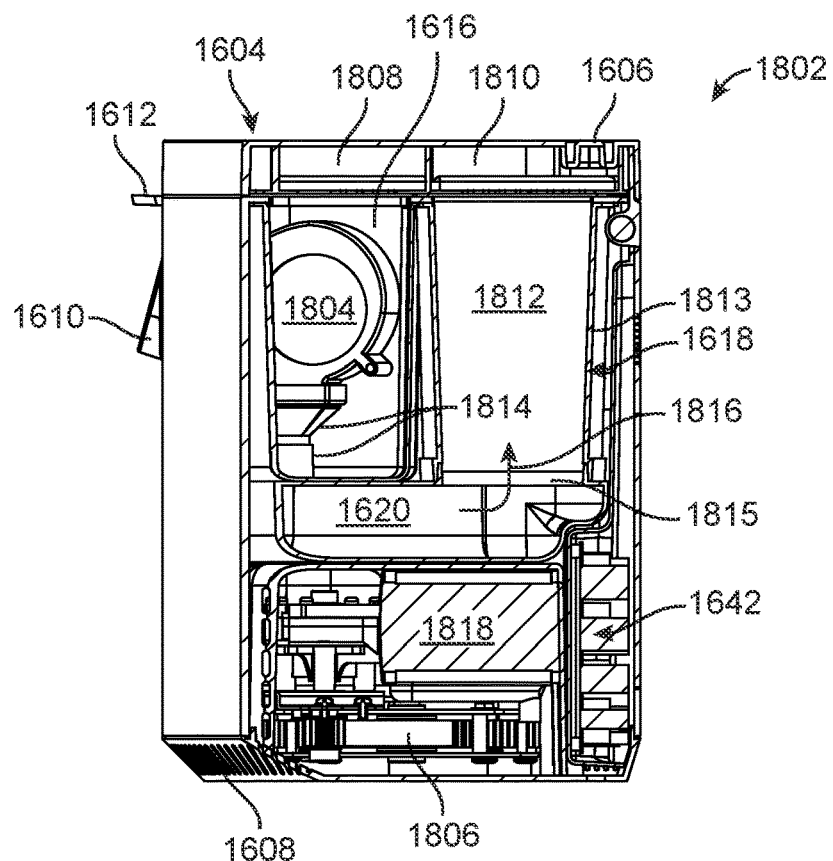

FIG. 18A illustrates a top view 1800 of an example food recycler and a cross-sectional view of some of the components. This figure illustrates a top view of the lid component 1604 including the exhaust vent 1606. A top view of the latch 1612 is also provided. A cross-sectional line A-A illustrates the location of the view of system 1802.

As shown with system 1802 in FIG. 18A, various features are shown which further illustrate aspects of this disclosure. The lid 1604 is shown with a first cavity 1808. The cavity 1808 generally represents a channel or volume in which air would flow from a top of the bucket (not shown) through the cavity 1808 to the fan component 1616. A fan 1804 is shown that can be used to cause the air to flow or to be drawn from the region 1808 and into the fan component 1616. The fan 1804 forces the air down through a final channel 1814 into the cavity or channel defined by component 1620. The air then flows to the filter component 1618 in which a compostable filter is positioned in region 1812. In one aspect, the filter 1812 includes a particular structure for improving the performance of the filter. For example, non-permeable sidewalls 1813 can be configured in connection with the filter 1812 for the purpose of maintaining the airflow through a middle portion of the filter 1812. Airflow shown by arrow 1816 illustrates a flow through the component 1620 and into the filter 1812. A casing can be provided for the filter component 1618 into which removable compostable filter can be positioned. For example, the user may access the filter component 1618 through the opening 1702 discussed above and shown in FIG. 17A. The removable filter 1812 can include sidewalls that do not have openings but are closed and which can force air through the middle portion of the filter 1812.

As air will be moving in the direction shown by arrow 1816, it may also be important for the filter 1812 to be properly seated in position and prevented in some degree from moving or being pushed upward by the flow of air. Thus, one aspect of this disclosure, includes a configuration of the filter 1812 with a seating structure and a material that properly adheres to a base of the filter component 1618. For example, tape, Velcro® or other hook-and-loop fasteners, or a magnetic structure might be used to help firmly seat a filter 1812 into the filter component 1618. The element 1710 is representative of a seating structure which can be used to seat a filter on to a receiving structure 1712 shown in FIG. 17A.

FIG. 18A further shows example gearing components 1806, electrical control components 1642 and a motor 1818.

Figure 18B:
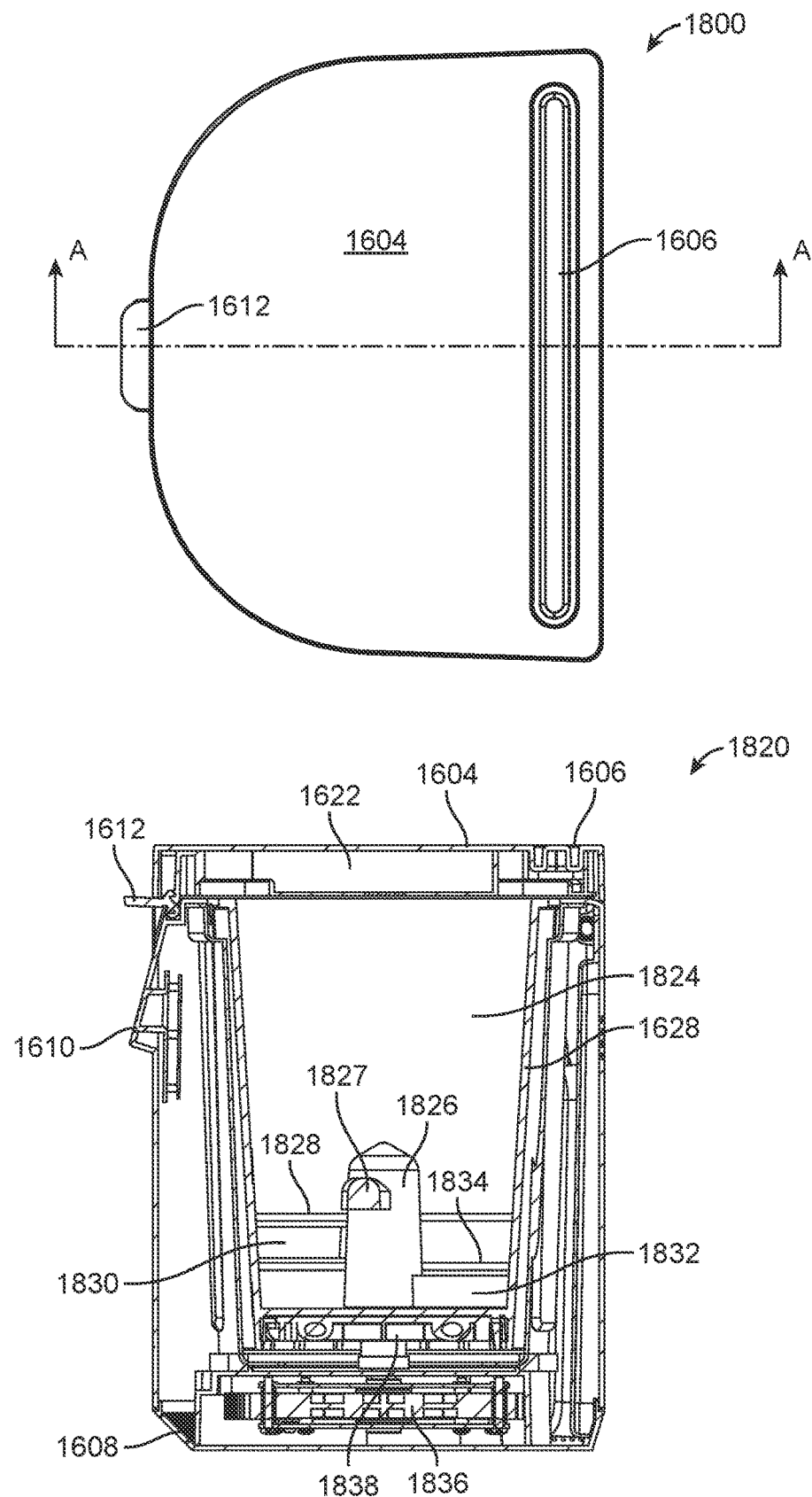
FIG. 18B illustrates a top view of an example food recycler and a cross-sectional view of some of the components.

FIG. 18B illustrates a top view 1800 of an example food recycler and a cross-sectional view 1820 of some of the components. In a top view, the lid 1604 is shown with a line A-A illustrating the location of the cross-sectional view through the system 1820. In system 1820, a cavity 1622 is shown in the lid 1604. The cavity 1622 can be used to draw moist air through the air vents 1634 (as shown in FIG. 16D) and into the region 1622. Cavity 1622 can connect with cavity 1808, as shown in FIG. 18A, to cause the air to flow through the air vents 1636 into the fan component 1616 (as shown in FIG. 16D) as controlled by the fan 1804.

FIG. 18B also illustrates the latch 1612 and the control button 1610 as well as the front portion of the air intake vents 1608. An interior cavity of the bucket is shown as feature 1824. A blade structure is shown by way of example. A central column 1826 supports a number of different cutting blades such as blade 1827, blade 1830 and blade 1832. Cross blades 1828, 1834 are attached to a wall of the bucket 1628 and can be further deployed to improve the chopping capability of the blade system. Further example details of the gearing and heating mechanisms are shown as features 1836, 1838.

Figure 18C:
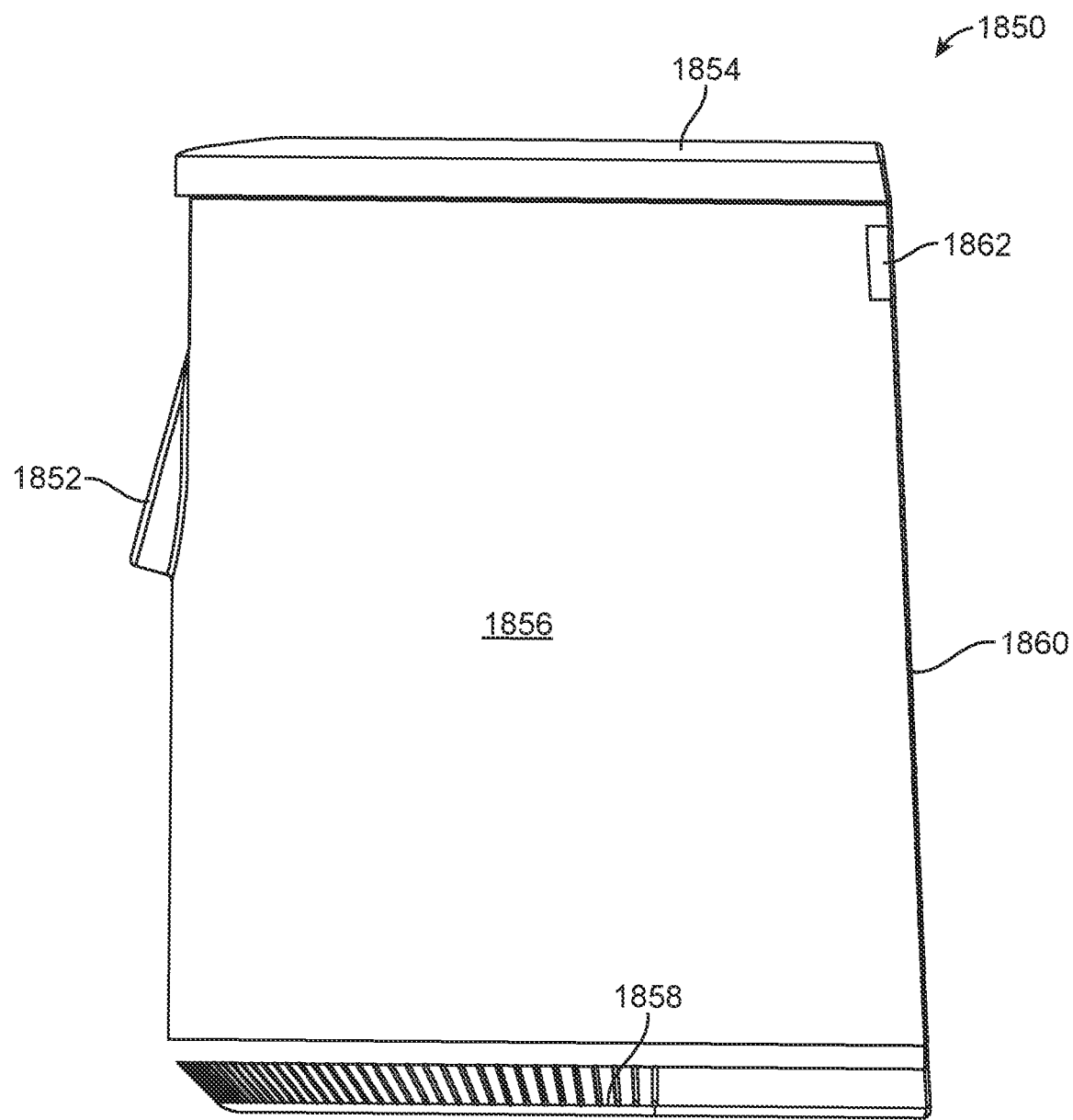
FIG. 18C illustrates a side view of an example food recycler.

FIG. 18C illustrates a side view of an example food recycler 1850. Food recycler 1850 includes exterior housing 1856, air intake vents 1858, a lid 1854, and a control button 1852. In one example, exhaust vents could be configured near region 1862. In an alternate embodiment in which the exhaust is configured to flow out the back of the food recycler 1850, an issue might arise where the food recycler 1850 is positioned against a wall. It would be undesirable for the heated and moist air to be forced out of a rear surface of the food recycler 1850 and immediately impact the wall. Accordingly, this figure illustrates a tilted or angled rear wall or surface 1860 of the system 1850. The angle of the tilted surface 1860 can be anywhere from between 1° and 30° relative to a vertical line. The purpose of the tilted surface 1860 is to maintain a desirable profile associated with the system 1850 as well as provide sufficient space between the region 1862 and the wall behind the system 1850. Moist and heated air can be vented from openings in region 1862 and would not damage the wall or be forced to some degree back into the system 1850 because the exhaust vents 1862 are too close to the wall.

Note that interior airflow channels can be modified such that the air flowing through the filter 1618 described above would properly be directed to the exhaust vents 1862. Such an airflow may or may not be caused to travel through the lid 1854. In other words, the region 1862 could be configured within the housing 1856 of the system 1850. In another aspect, the region could be configured as part of the lid 1854 such that the interior structure of the lid 1854 causes the air to flow out a back portion of the lid rather than a top portion of the lid as is shown in other figures.

Figure 19:
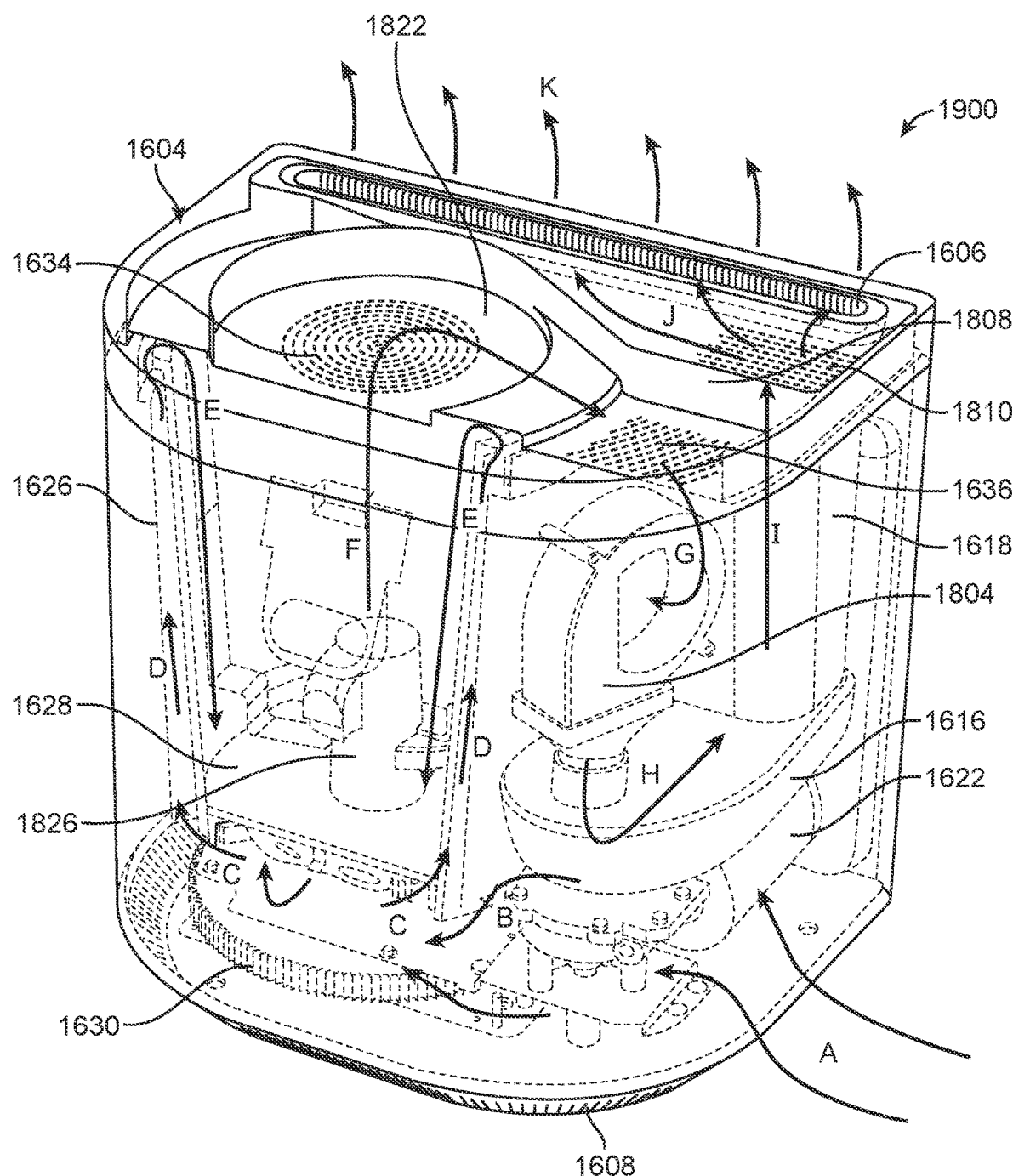
FIG. 19 illustrates an internal air flow pathway through an example food recycler.

FIG. 19 illustrates an internal air flow pathway through an example food recycler 1900. In this example, cold air is drawn into the air intake vents 1608 on a bottom portion of the housing of the system 1900. In one example, the entire structure of the system 1900 can also be reversed where the bucket is configured on the right side and the air intake vents 1608 are configured on the left side.

The initial airflow is shown by way of example through the A arrows in FIG. 19. Once inside the housing, the air can flow through vents 1624 (not shown in FIG. 19) and into the motor housing 1622. The B arrows represent the cool air flowing over the motor and other components towards a region configured below the bucket container 1626 and bucket 1628. The air can cool the motor as the cool air is heated by the motor. The C arrows represent the flow of the air from the region of the gear system 1630 and up through channels represented by the D arrows that are configured between the bucket 1628 and the bucket container 1626. The C arrows represent lightly warmed air traveling between the gears and the heat plate and can be used to cool the gears as well. The D arrows show the flow of air, which might be slightly heated by the motor and the gearing system, up the side of the bucket 1628 to further heat the air. At the top of the bucket 1628, the E arrows illustrate the flow of the air from the channel between the bucket 1628 and the bucket container 1626 and down into the interior portion of the bucket 1628. The air inside the interior portion of the bucket 1628 will be further heated and receive moisture from the waste food. The blade system represented by feature 1826 is used to chop the waste food.

The F arrow represents the air flowing from the interior of the of the bucket 1628 up through air vents 1634 configured within the lid 1604 and defined by cavity 1822 over into cavity 1808 also configured in lid 1604. From cavity 1808, the G arrow represents the flow of air through air vents 1636 and to the fan 1804. The H arrow illustrates the flow of air from the fan 1804 and through component 1616 and into the filter component 1618. One aspect of the component 1616 is that it can be considered a cold pan where some of the moisture in the air condenses. In one aspect, not shown, condensed moisture from the component 1616 can remain in the component 1616 and generally evaporate or can be removed via another channel or exhaust port configured in a rear wall or elsewhere within the housing of the system 1900. The I arrow shows the air flowing from component 1616 and through the filter component 1618 and into the cavity 1810 configured within the lid 1604. In one aspect, the filter component 1618 includes an active charcoal filter that filters the warm moist air. The J arrows show the flow to the cavity 1810 and to the exhaust port 1606. The K arrows illustrate the flow of the air out the top rear portion of the lid 1604.

As noted above, the channel 1810 can be reconfigured to cause the heated and moist air to exit exhaust port and a back wall or back facing portion of the lid 1604. In another aspect, a channel can be configured to cause the air to flow out an exhaust vent 1640 configured, for example, in an upper portion of the housing represented by feature 1862 of FIG. 18C.

Figure 20A:
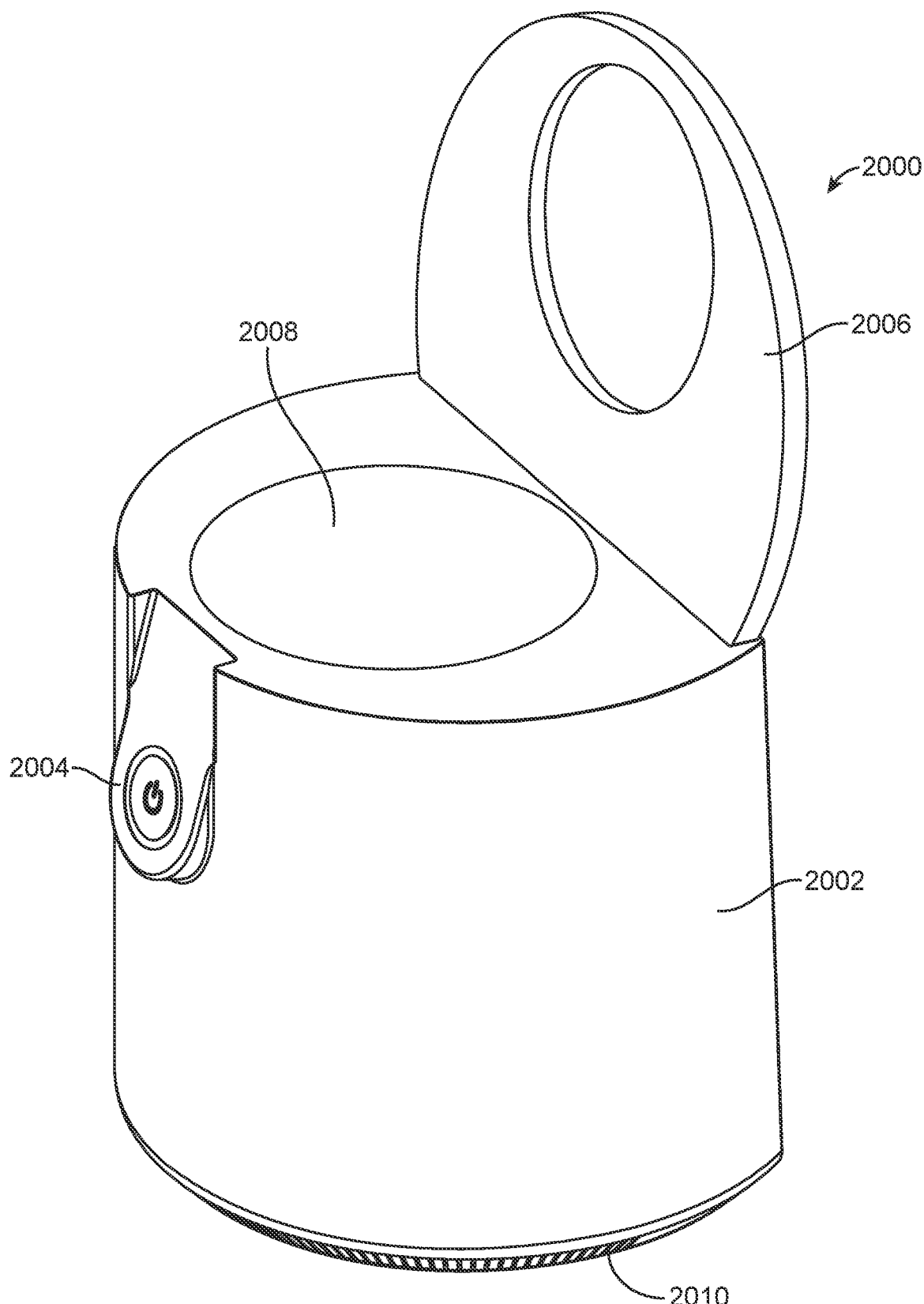
FIG. 20A illustrates a side view of another example food recycler.

FIG. 20A illustrates a side view of another example food recycler 2000. In this example, the general configuration of the system 2000 differs. Note that the exterior housing 2002 is generally curved along the entire front and side portion of the housing. A rear surface can be flat and vertical or can be angled similar to the angled rear wall discussed above. An opening 2008 can receive a bucket for processing waste food. A lid 2006 can include similar components discussed above for receiving moist air and communicating moist air through to a filter system and to support the release of the filtered air out into the environment. Lower intake air vents 2010 are shown as well. The purpose of this figure is to illustrate that another shape of the overall system 2000 that can be provided with other interior components and structures being similarly situated. An on/off control button 2004 is also shown.

Figure 20B:
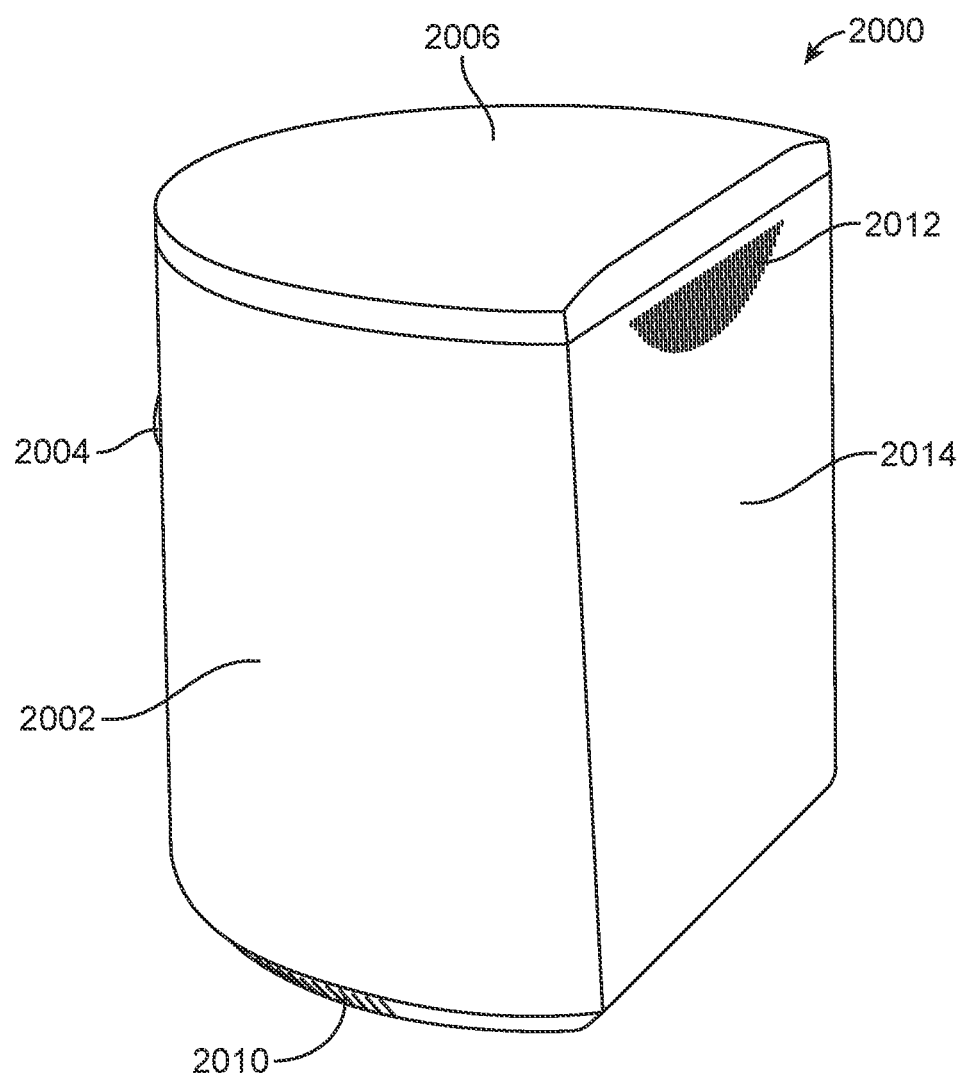
FIG. 20B illustrates a side and rear view of another example food recycler.

FIG. 20B illustrates a side and rear view of another example food recycler 2000. In this example, a rear surface 2014 is shown as generally being flat and can be vertical or can be tilted as is shown in the figure. In one aspect where the exhaust vent is configured in region 2012, the interior fan and channels designed to control the airflow through the system would cause the heated moist air described above to be vented out of the exhaust vents 2012 in the rear wall 2014 of the system 2000. The closed lid 2006 is shown as well as a portion of the control button 2004.

Figure 20C:
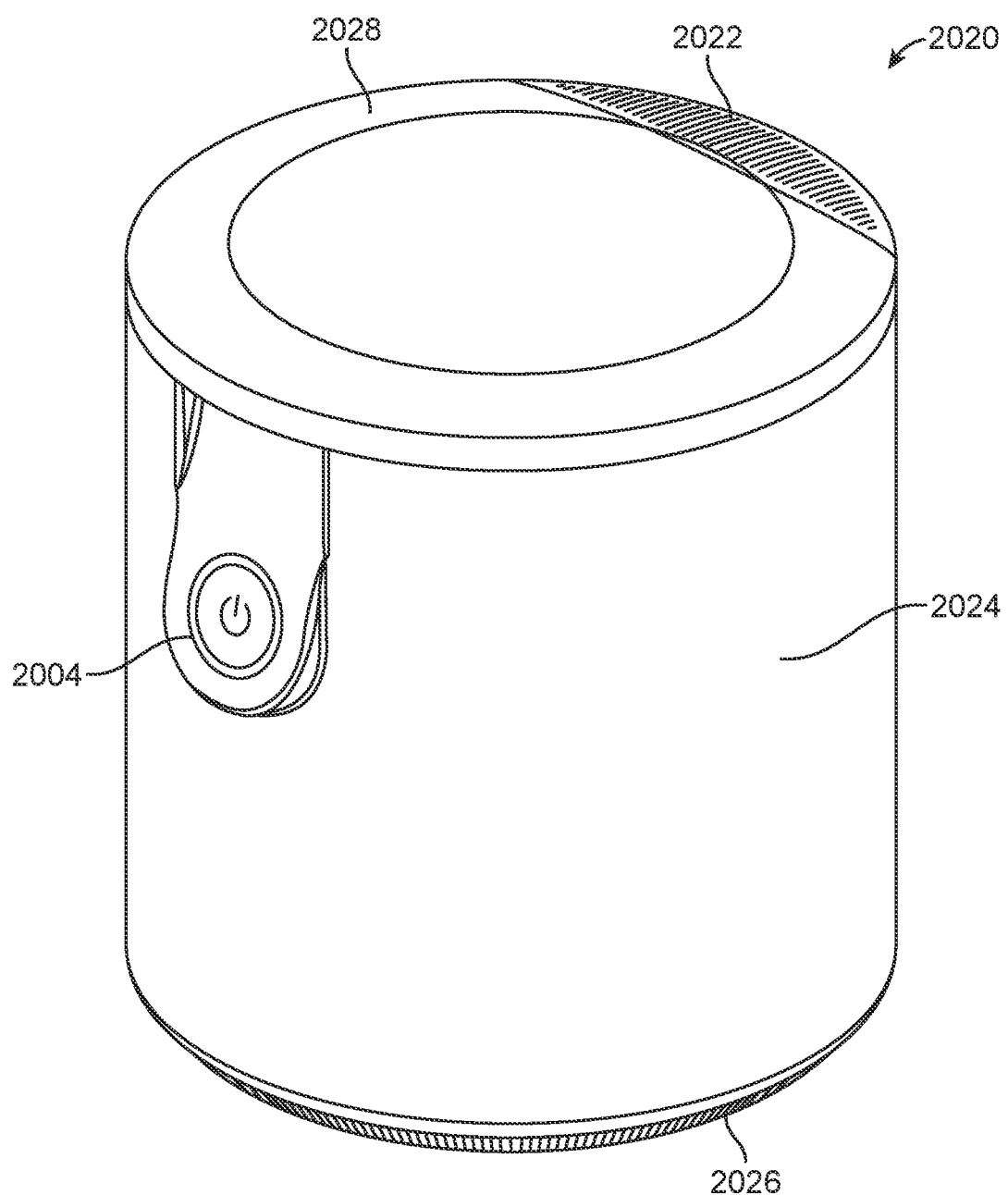
FIG. 20C illustrates a side view of another example food recycler.

FIG. 20C illustrates a side view of another example food recycler 2020. In this example, the exterior housing wall 2024 is circular on all sides. In this example, the lid 2028 is also circular and as is shown, the exhaust vents 2022 are shown as configured within a rear portion of the lid 2028. The intake vents 2026 are shown as well along the bottom portion of the system 2020. The on/off control button 2004 is also shown.

Figure 21A:
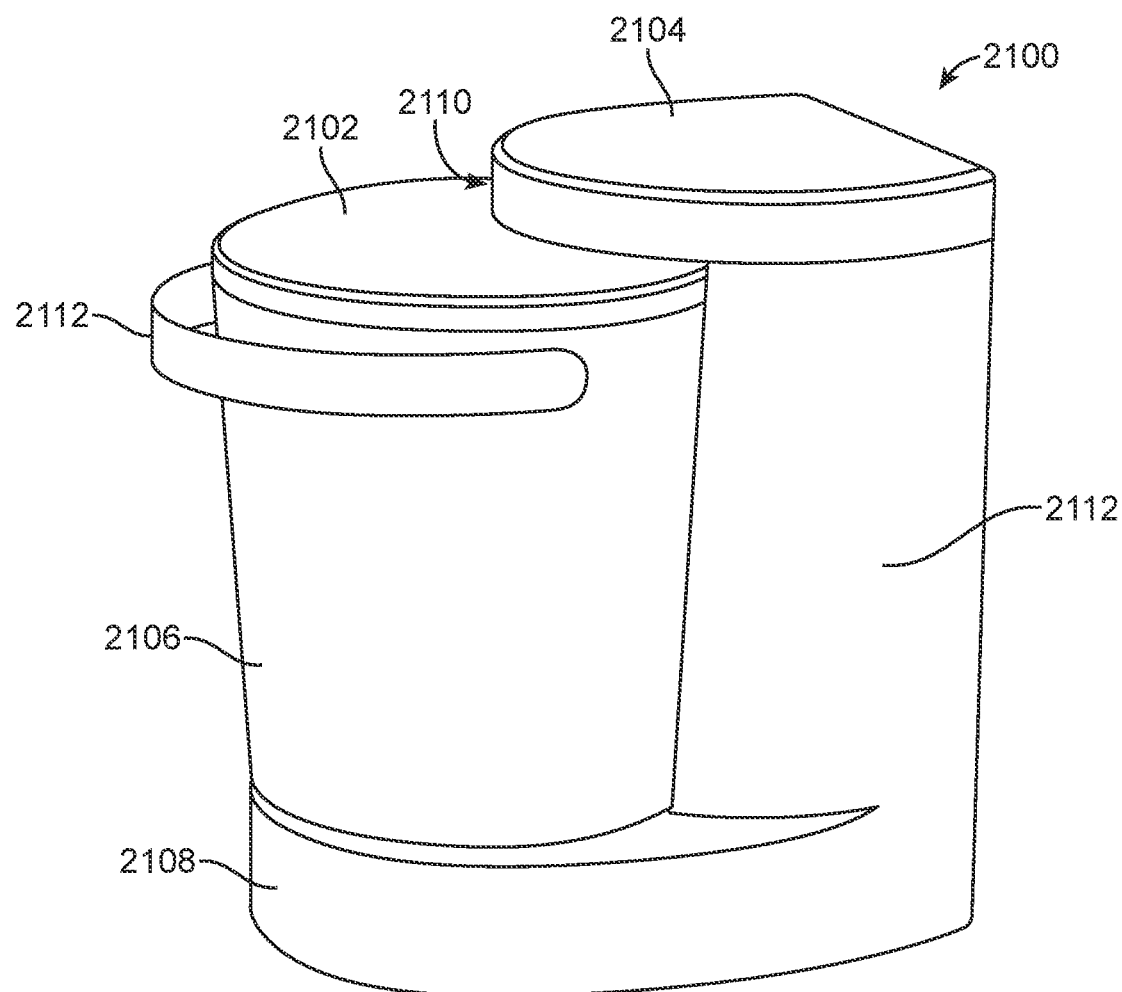
FIG. 21A illustrates a side view of another example food recycler.

FIG. 21A illustrates a side view of another example food recycler 2100. In this alternate embodiment, the bucket 2106 is configured to be placed on a surface 2108 for processing waste food. Rather than placing the bucket 2106 completely inside the units, in this alternate embodiment, the bucket 2106 sits mostly on the outside of the unit. The handle of the bucket 2112 is shown as well as a lid 2102. The bucket is positioned on a platform 2108 that would include at least a portion of the components described above. A portion of the system 2112 is shown which would contain at least some of the components described above, such as the motor, a fan, a filter system, and so forth. A region 2110 can be configured to be positioned at least in part over the lid 2102 of the bucket 2106 to help maintain the bucket on the system while the food recycling process occurs. A top region 2104 is shown of the system 2100 which can include some of the cavities described above for receiving moist air and communicating the moist air through a fan and filter system for exhausting out of the system either through a top portion or rear portion of the system 2100.

Figure 21B:
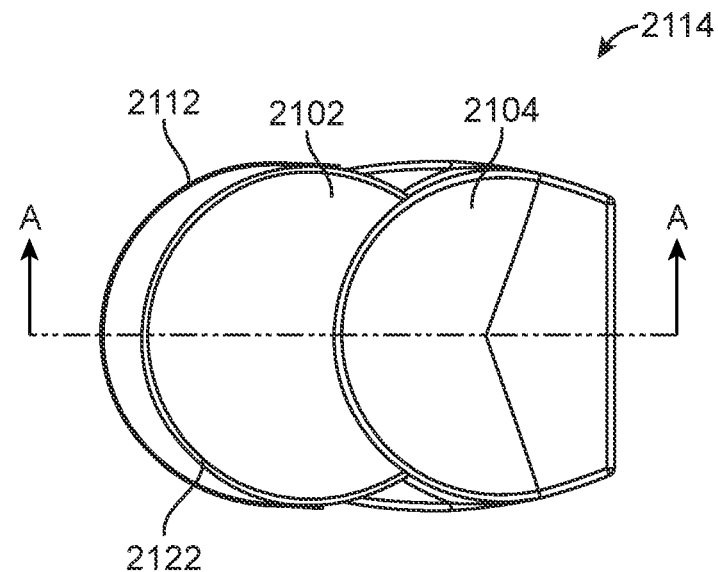
FIG. 21B illustrates a top view of an example food recycler and a cross-sectional view of some of the components.
Figure 21B:
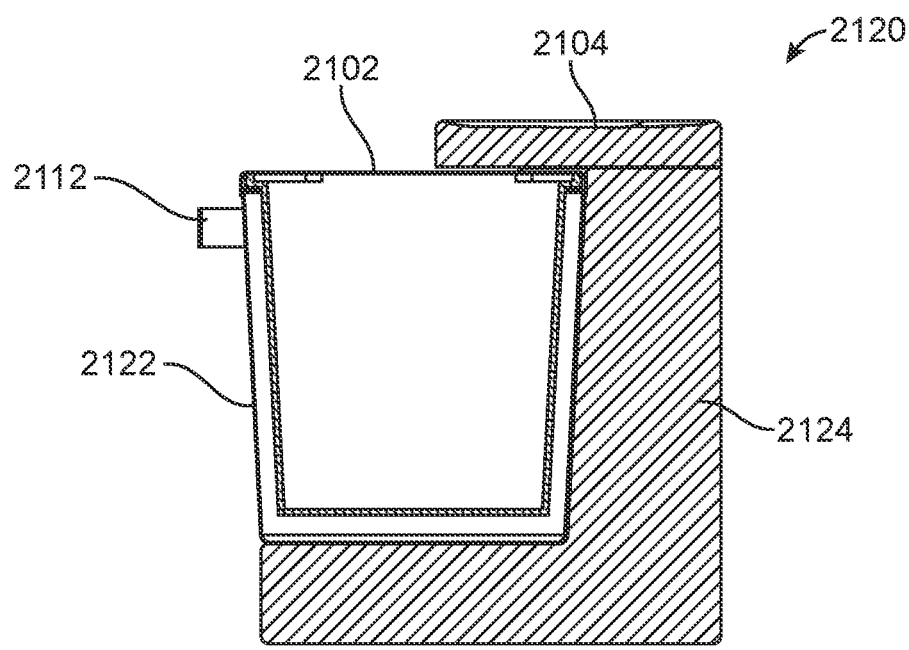

FIG. 21B illustrates a top view of an example food recycler 2114 and a cross-sectional view 2120 of some of the components. System 2114 illustrates a top view having a top portion of the bucket 2102, the handle 2112 and a top portion of the system 2104. Line A-A illustrates the position of the cross-sectional view of system 2120. With system 2120, the user can position the bucket 2122 with a top portion 2102 at least partially underneath a top portion of the system 2104. The region 2124 generally represents the location where the various components are configured in order to process the waste food through heating and chopping and to enable airflow through the system as part of the recycling process. The bucket is a double wall bucket allowing heated air to travel between the inner wall 2126 and outer wall 2128 of the bucket. This double wall bucket eliminates the need for a bucket compartment within the food recycling unit.

Figure 22A:
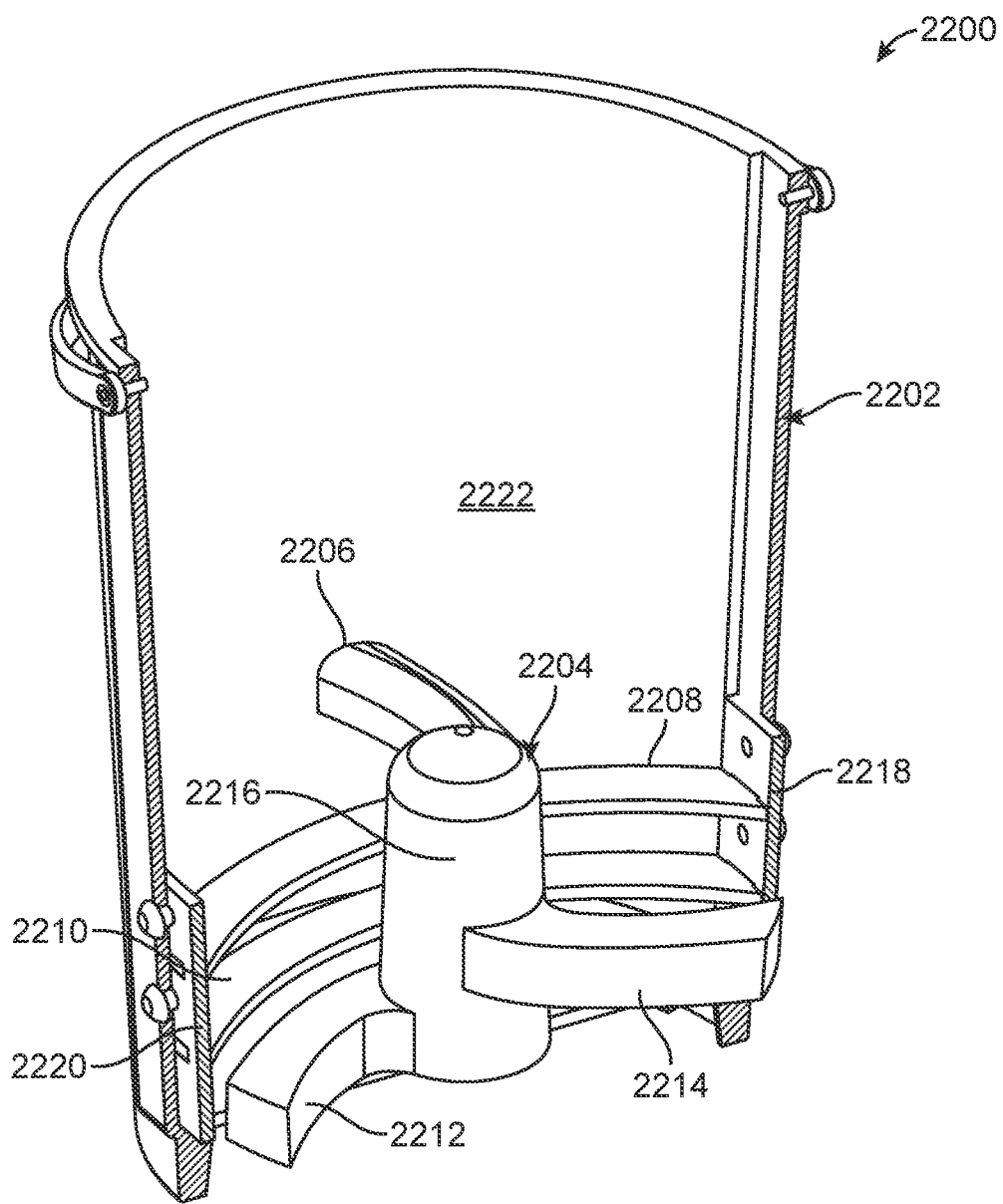
FIG. 22A illustrates an example blade structure for a food recycler.

FIG. 22A illustrates an example blade structure 2200 for a food recycler. As shown, a cutting blade system 2204 is configured in interior portion 2222 of the bucket 2202. Various cutting blades are shown as extending from a central column 2216. A top cutting blade 2206, a middle cutting blade 2214 and a lower cutting blade 2212 extend from the central column 2216 at different levels. These cutting blades are configured to extend from the column 2216 and configured such that there is vertical space between the respective blades such that cross blade members 2208, 2210 can be configured and attached to a respective attachment components 2218, 2220. The attachment components 2218, 2220 are configured on the interior portion 2222 of the bucket 2202. In this manner, as the blade Assembly 2204 is caused to rotate by the motor and gearing mechanism of the system (not shown), the waste food can be property chopped up by the motion of the blade system 2204 and the respective cutting blades with their movement with respect to the cross blade members 2208, 2210.

A bucket can include a blade system 2204. In one aspect, the blade system 2204 includes a central column 2216, at least one cutting member 2206, 2212, 2214 each extending at a different level from the central column 2216 and at least one cross blade 2208, 2210 attached to opposite sides (or different sides that are not necessary positioned opposite of each other) of the bucket. The at least one cross blade 2208, 2210 can be configured between two of the at least one cutting member 2206, 2212, 2214 as is shown in FIG. 22A. Three cutting members are shown but the disclosure is broad enough to encompass just one cutting member as well as more than one as illustrated.

Figure 22B:
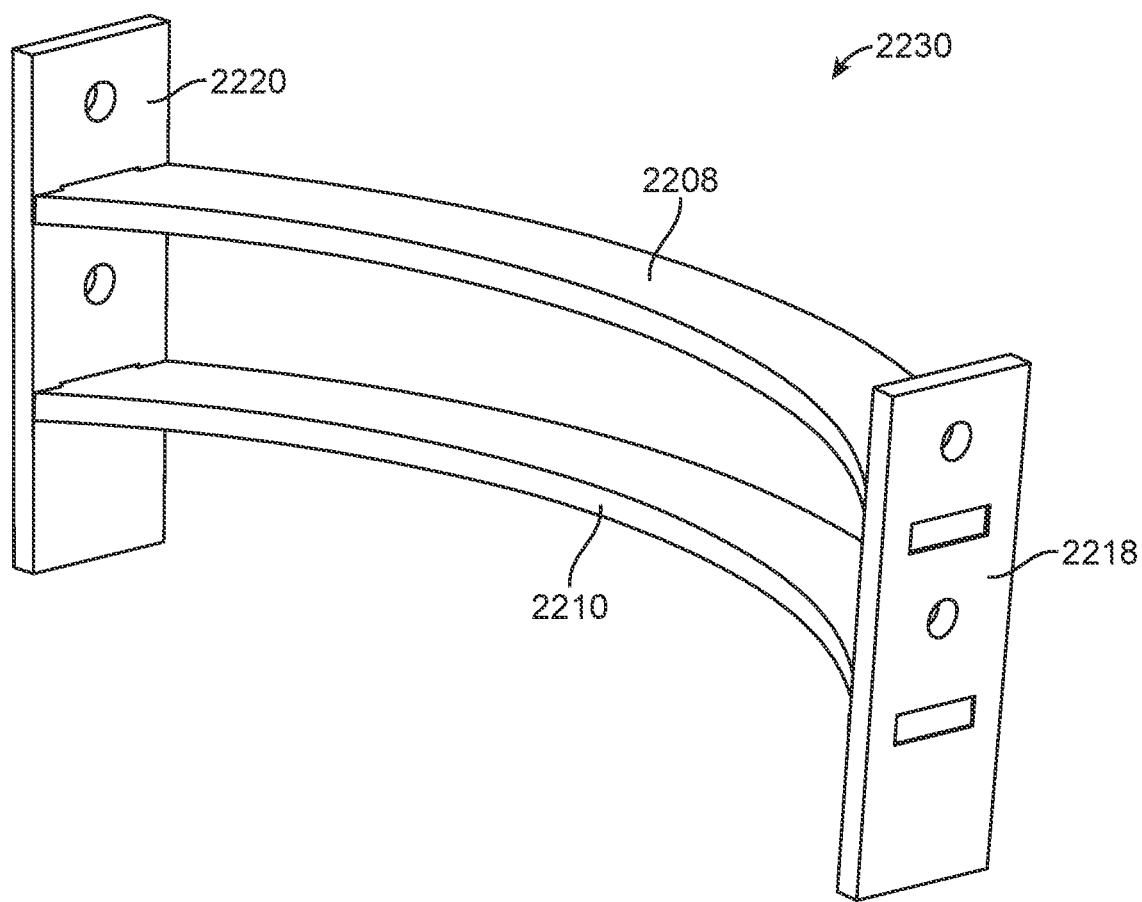
FIG. 22B illustrates example cutting components for a food recycler.
Figure 22C:
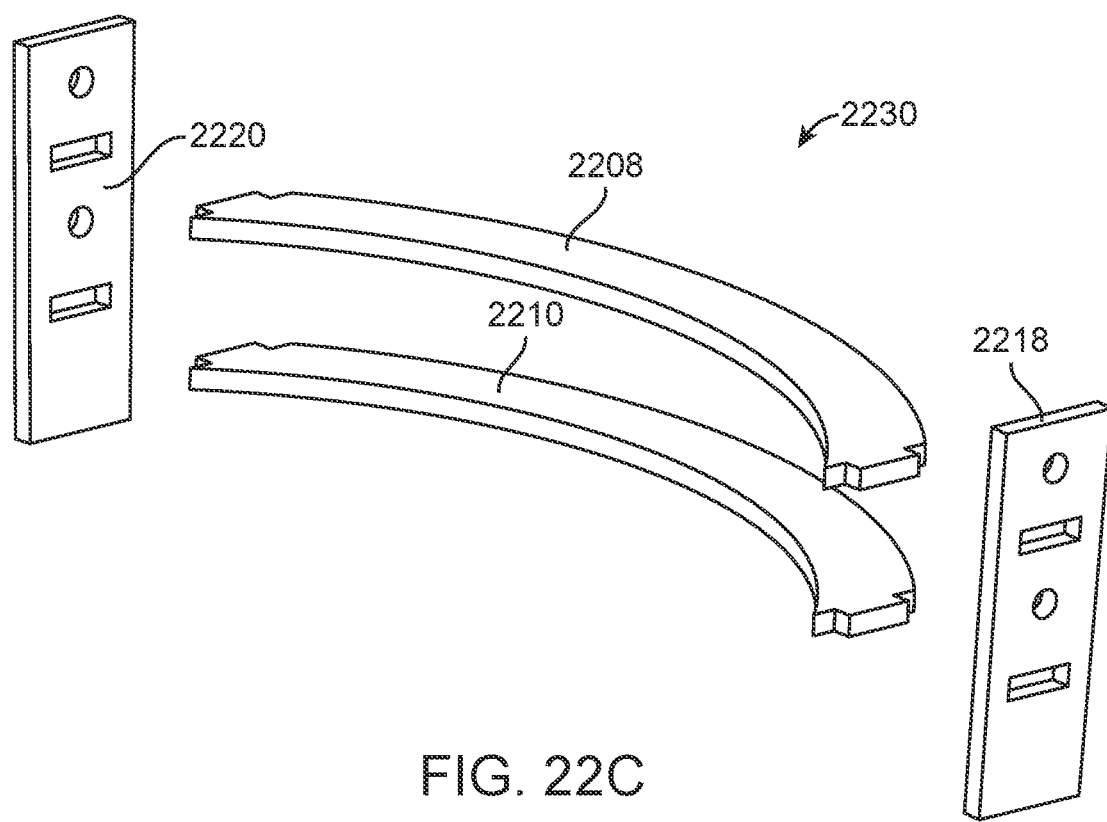
FIG. 22C illustrates example cutting components for a food recycler.

FIG. 22B illustrates example cutting components 2230 for a food recycler. A top cutting blade 2208 is shown as being configured above the bottom cross blade member 2210. The attachment components 2218, 2210 are shown in more detail. FIG. 22C illustrates example cutting components 2230 for a food recycler. This figure illustrates the removable nature of the cross blades 2208, 2210 and how they can be removed from attachment components 2218, 2220.

Figure 22D:
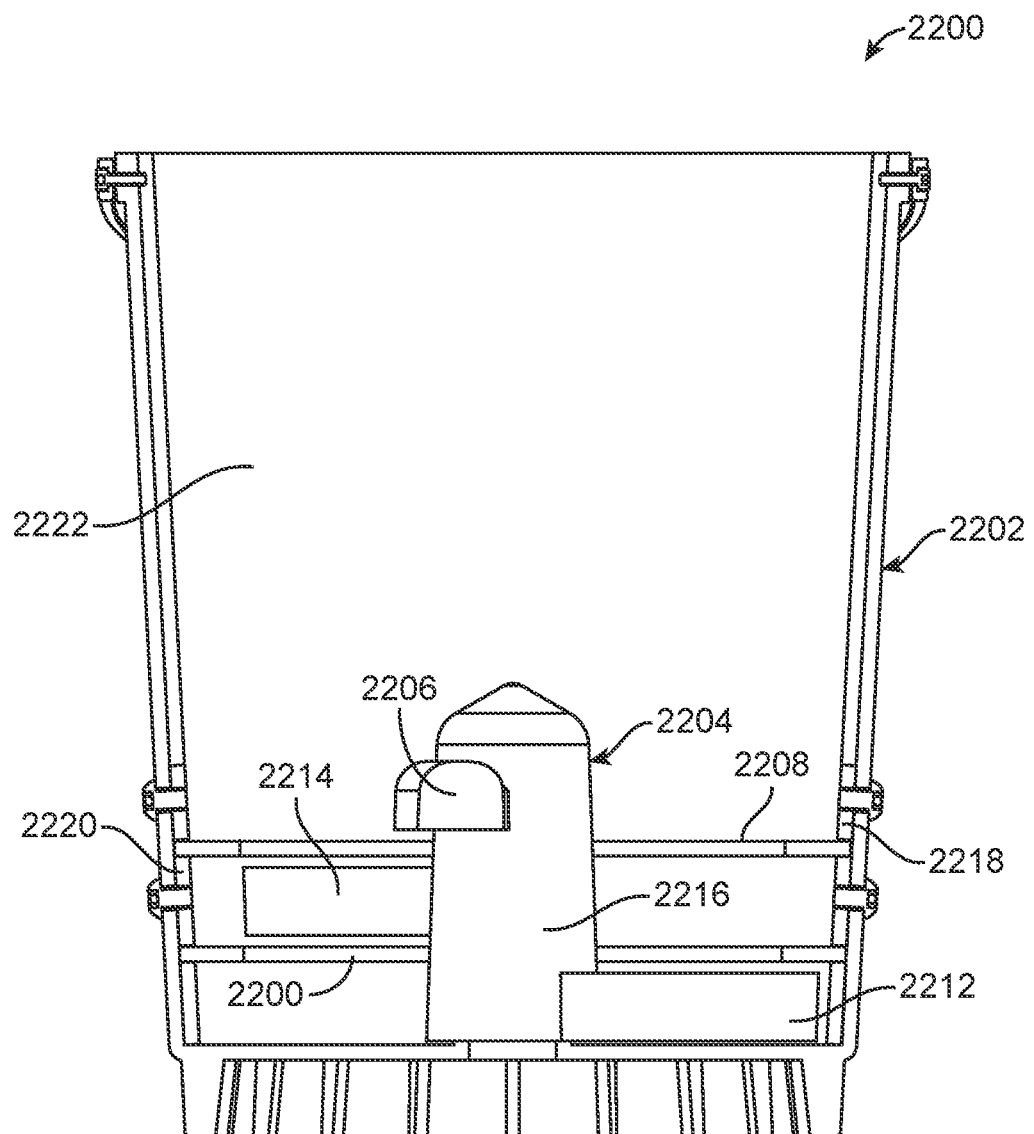
FIG. 22D illustrates an example blade structure in a cross sectional view of a bucket structure for a food recycler.

FIG. 22D illustrates an example blade structure in a cross sectional view 2200 of a bucket structure 2202 for a food recycler. The blade system 2204 includes a central column 2216 with a top plate 2206, a middle blade 2214 for a lower blade 2212. The vertical spacing of these blades is illustrated in this figure to allow proper space for the upper cross blade member 2208 and the lower cross blade member 2210 which are attached to the attachment components 2218, 2220 to the sidewall of the bucket 2202.

Figure 22E:
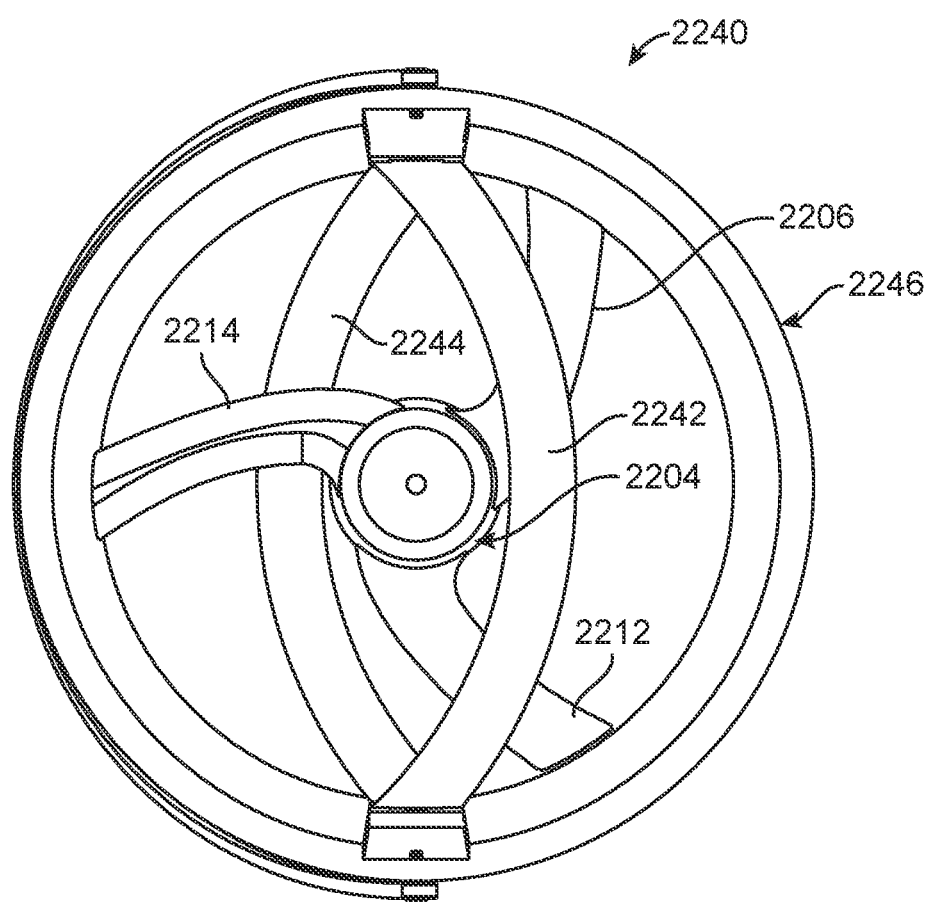
FIG. 22E illustrates an example blade structure from a top view for a food recycler.

FIG. 22E illustrates an example blade structure 2240 from a top view for a food recycler. In the earlier described structures, the cross blade components 2208, 2210 each were generally configured on top of one another and having the same shape. In this figure, a top blade 2242 is not configured to be over a bottom blade 2244 but they are configured to be mirror images of each other such that they do not overlap. This different configuration can cause a different kind of chopping operation as the blade system 2204 operates. The various cutting blades 2214, 2206, 2212 are also shown in this figure as part of the blade system of bucket 2246.

Figure 22F:
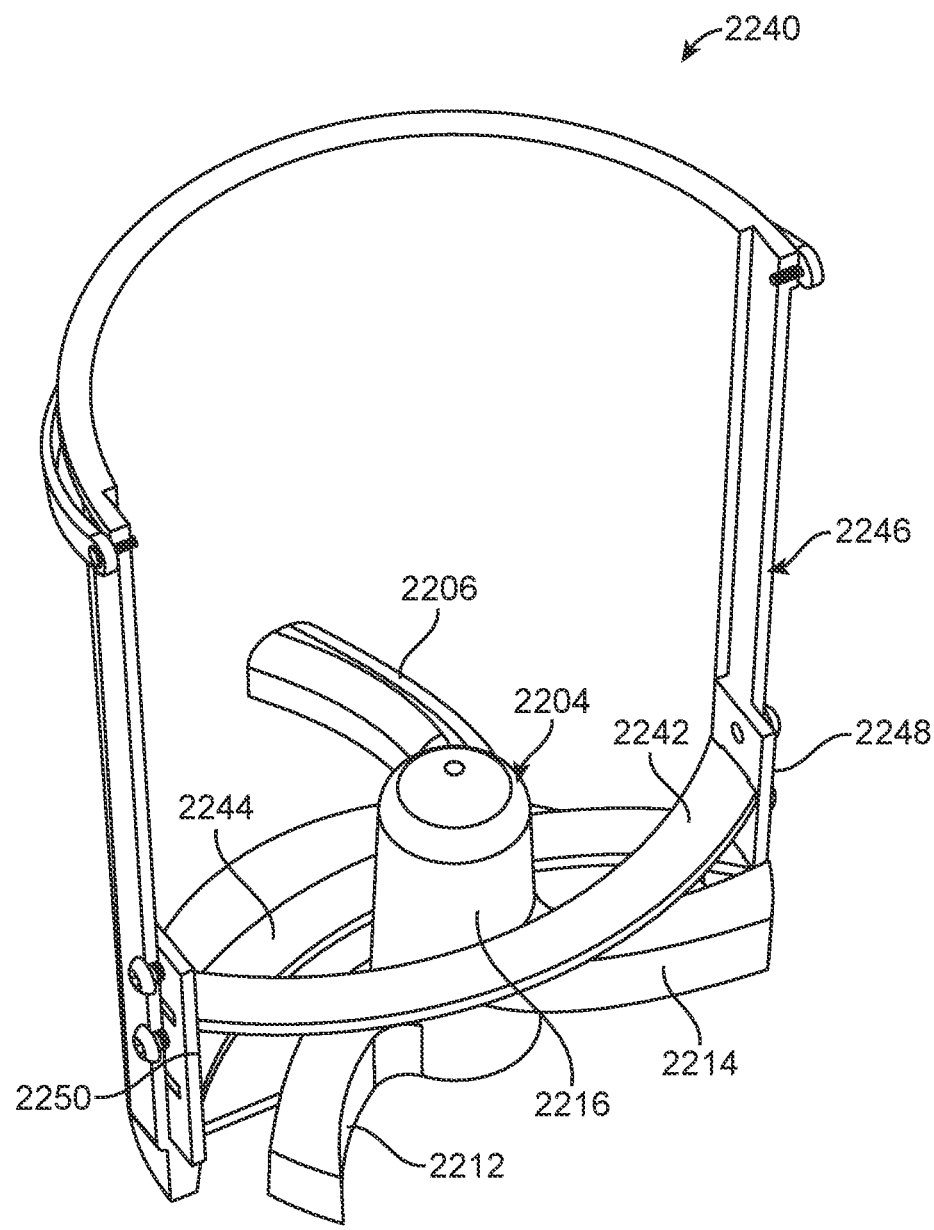
FIG. 22F illustrates an example blade structure from a side view for a food recycler.

FIG. 22F illustrates an example blade structure 2240 from a side view for a food recycler. In this view, the top blade 2242 is seen from a different angle with respect to the bottom blade 2244. The top cutting member 2206 extends from the central column 2216 and is configured to travel above the upper blade 2242. The middle cutting member 2214 is configured to travel between the upper blade 2242 and a lower blade 2244. The lower cutting member 2212 is configured to rotate from the central column 2216 such that it is configured below the lower blade 2244.

Figure 22G:
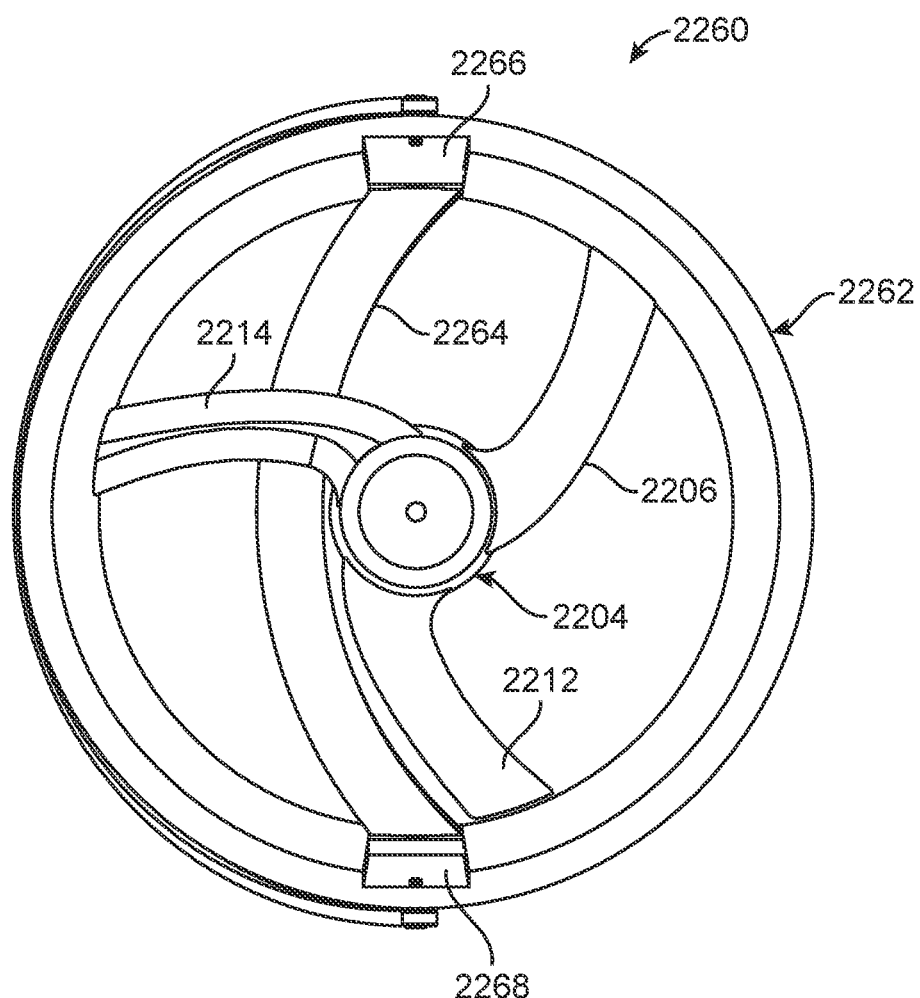
FIG. 22G illustrates an example blade structure from a top view for a food recycler.

FIG. 22G illustrates an example blade structure 2260 from a top view for a food recycler. In this structure, a bucket 2262 includes a blade system 2204 and a cross blade member 2264 which is attached to attachment components 2266, 2268. The respective cutting blades 2214, 2212, 2206 can travel above or below the cutting member 2264. The cutting member 2264 shown in this figure may also represent stacked cutting members as is shown in FIG. 22D.

Figure 22H:
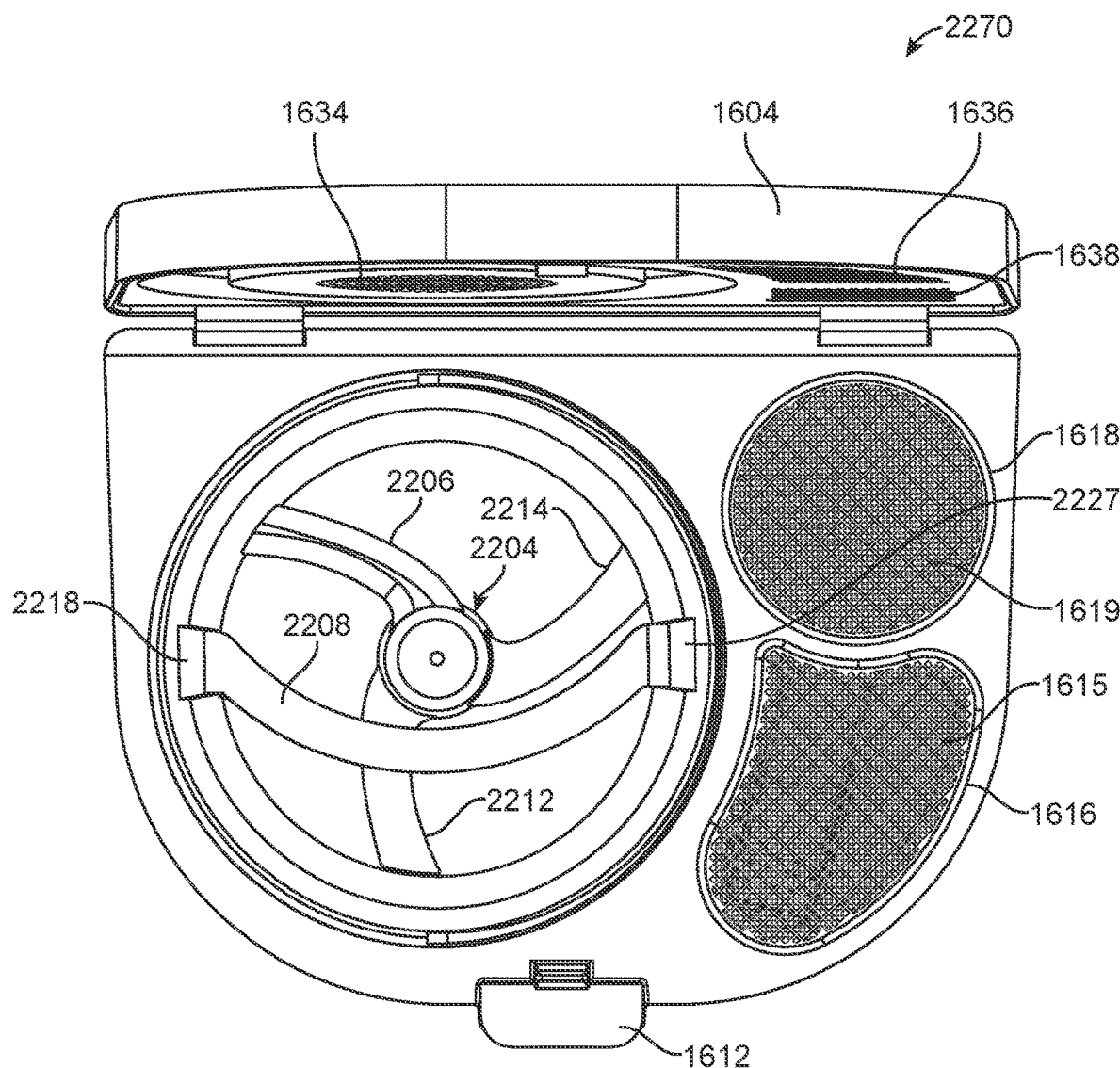
FIG. 22H illustrates an example blade structure from a top view for a food recycler.

FIG. 22H illustrates an example blade structure 2204 from a top view for a food recycler 2270. In this example, the cutting member 2208 is shown in connection with the blade structure 2204 with its cutting arms 2206, 2214, 2212. The attachment components 2218, 2220 (shown as 2227 on the drawing) are also shown. In this top view, the lid 1604 is open and the various air flow channels 1634, 1636, 1638 are shown as part of the lid structure 1604. A top view of the fan component 1616 is shown as well as a top view of the filter component 1618 and the latch 1612.

Figure 22I:
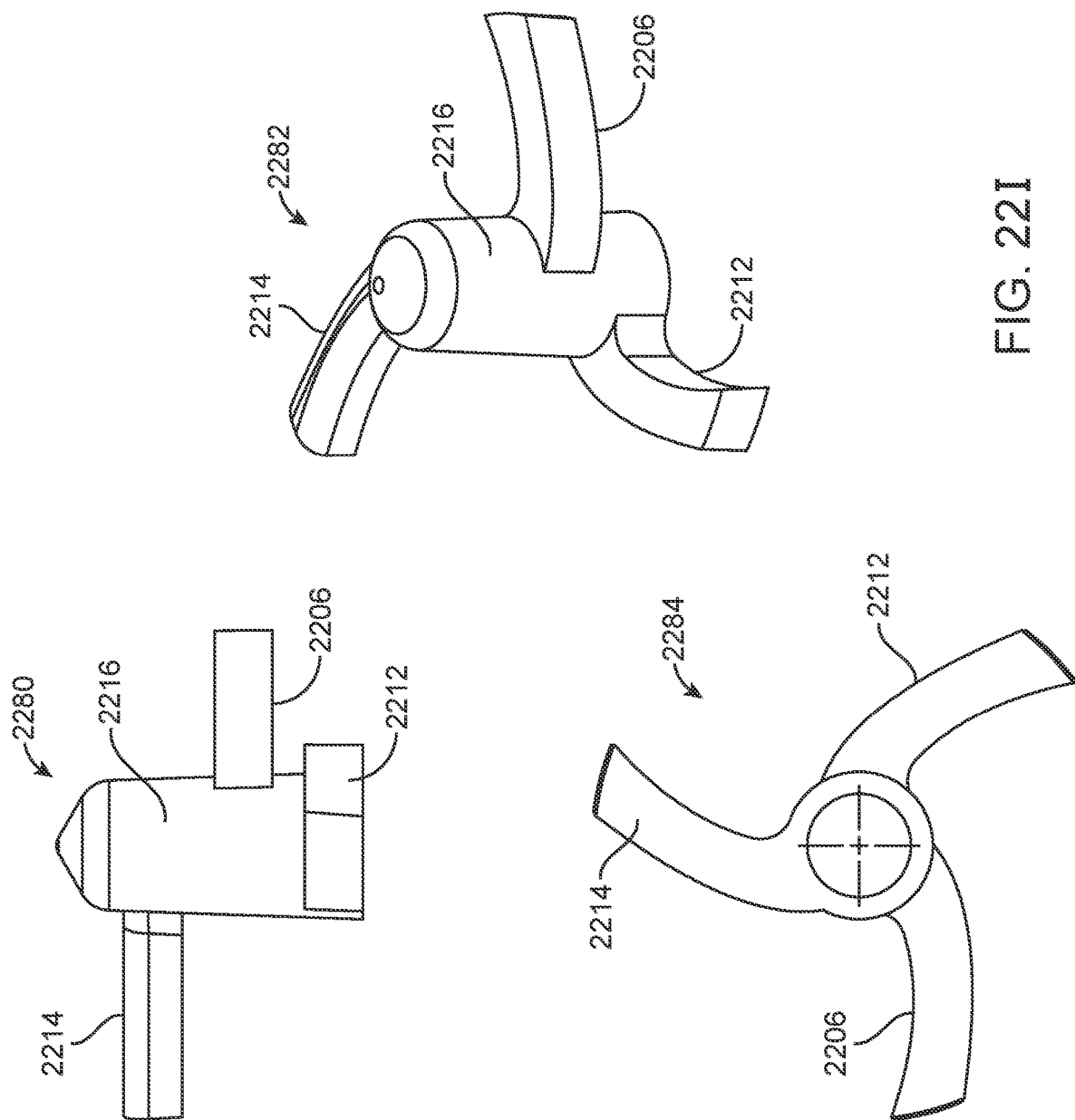
FIG. 22I illustrates various views of an example blade structure for a food recycler.

FIG. 22I illustrates various views of an example blade structure for a food recycler. For example, blade structure 2280 illustrates the central column 2216 with the top cutting blade 2214, middle cutting blade 2206 and lower cutting blade 2212 to each extending from the central column 2216. Blade system 2282 illustrates another angle of the central column 2216 and the top cutting blade 2214, central cutting blade 2206 and lower cutting blade 2212. This view illustrates the different structures of the respective cutting blades 2214, 2206, 2212. For example, a top portion of the cutting blade 2214 is angled or curved. A top surface of cutting blades 2206, 2212 are not curved but are shown as flat. The bottom portion or bottom surface of each cutting blade 2214, 2206, 2212 is shown as being flat. Each cutting blade is shown as curved as well. The curved nature of each blade is illustrated by cutting blade 2284 that illustrates a top view of the cutting blades 2214, 2212, 2206.

Figure 22J:
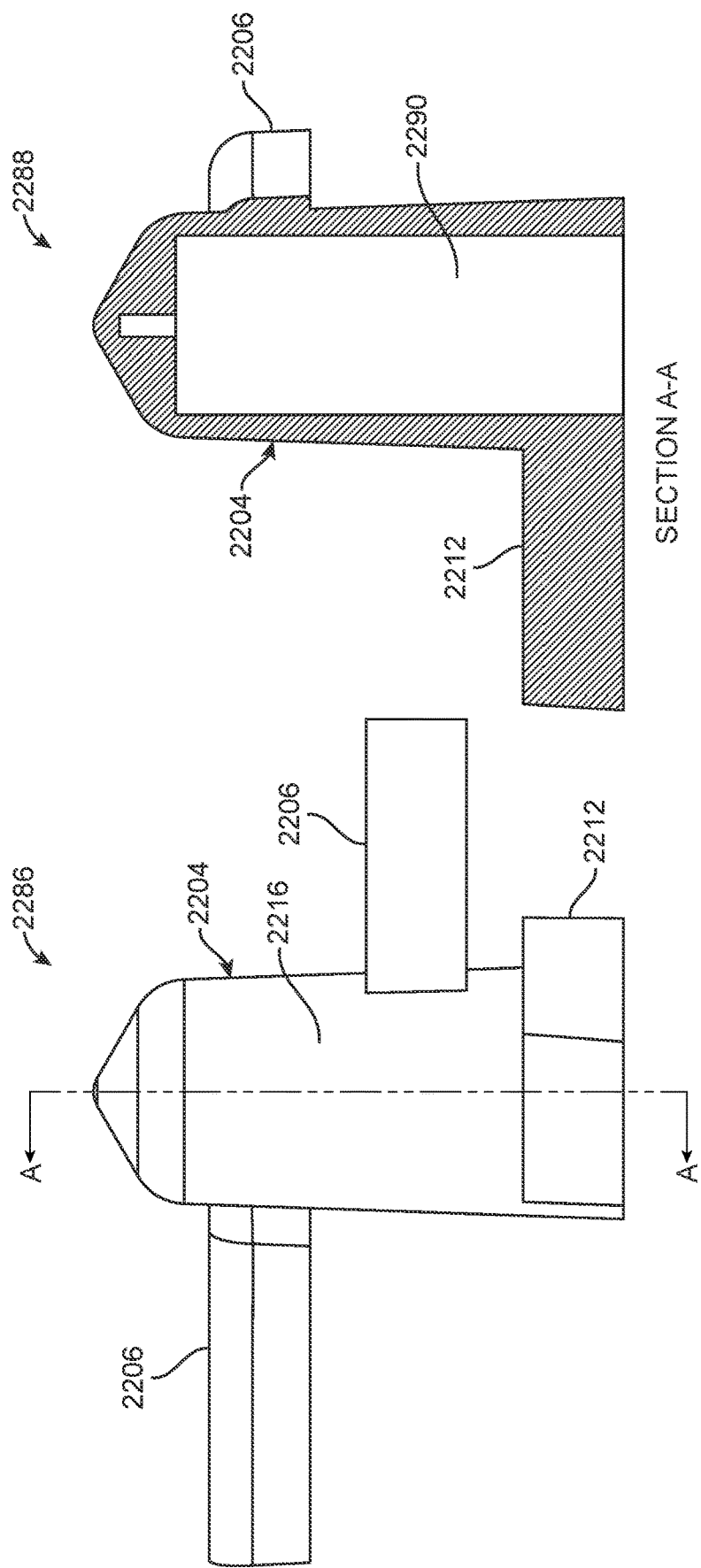
FIG. 22J illustrates various views of an example blade structure for a food recycler.

FIG. 22J illustrates various views of an example blade structure for a food recycler. Feature 2286 represents an example blade structure 2204 with a central column 2216, a top cutting member 2206, a middle cutting member 2206 and a lower cutting member 2212. The cross sectional indicator A-A illustrates the cross-sectional view for feature 2288. An interior cavity 2290 is shown by way of example for the cutting blade structure 2204 as well as a cross sectional view of lower cutting member 2212 and the top cutting member 2206.

Figure 23:
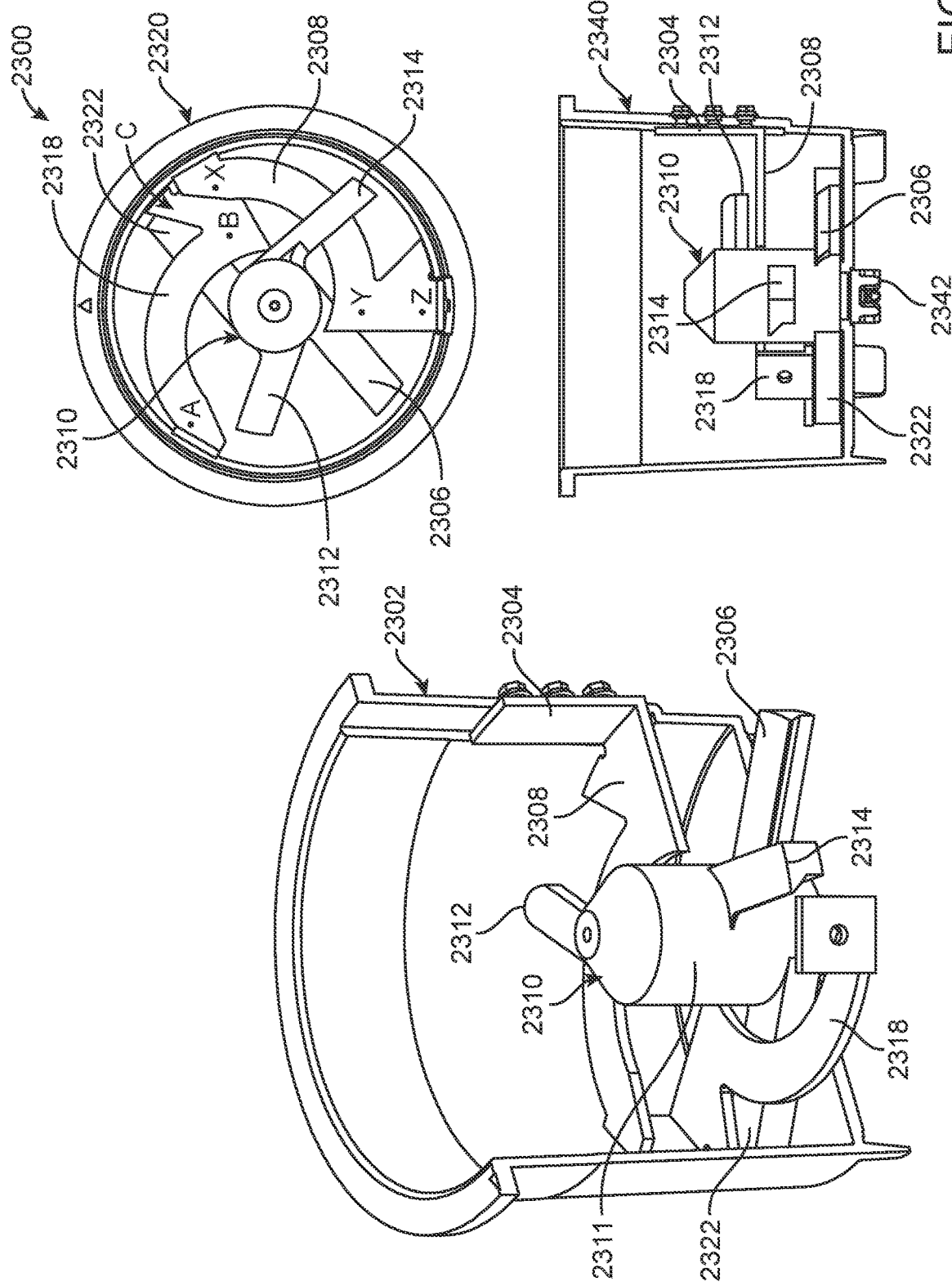
FIG. 23 illustrates various views of an example blade structure for a food recycler.

FIG. 23 illustrates various views 2300 of an example blade structure for a food recycler. In one example, a bucket 2302 is shown with a blade structure 2310. A top cutting member 2312 is shown as well as a middle cutting member 2314 and lower cutting member 2306. Another cutting member 2322 is also shown on the lower level. Thus, the blade structure 2310 in this example includes four cutting blades extending from the central column 2311. While the lower level is shown as having two cutting blades 2322, 2306, the other layers of cutting blades could be configured with more than one blade as well. Cross cutting blade 2308 is shown having a different shape from earlier cutting blades 2208, 2210. Similarly, cross cutting blade 2318 is also shown which is of a different shape than the earlier cutting blade 2208, 2210. A supporting bracket 2304 is also shown for cross cutting blade 2308.

A top view is shown as feature 2320. The blade structure 2310 is shown as well as cutting blades 2312, 2314, 2306 and 2322. Note the different shapes of the cross cutting blades. For example, cross cutting blade 2318 has a curved shape from point A to point B in a clockwise direction. At point B, the cross cutting blade 2318 makes a sharp turn back to point C forming a "V" shape with the point B at the vertex. Cross cutting blade 2308 has a similar shape, although the shape does not have to be the same. From point X on the cutting blade 2308 to point Y, the cutting blade has a circular shape but it point Y the cross cutting blade 2308 turned sharply towards point C such that the point Y becomes a vertex. Note that the position of cross cutting blades 2318, 2308 are such that point B of cross cutting blade 2310 is configured near to point X of cross cutting blade 2308. Cross cutting blades 2308, 2318 can be configured and other positions on the interior of the bucket 2320. Similarly, the shape and extending configuration of each of the cutting blades 2312, 2314, 2306, 2322 can also vary. For example, the cutting blade shown with feature 2320 are generally straight whereas others disclosed herein are generally curved. The cutting blade could be configured such that some or curved and somewhere straight. In one example, cutting blade 2322, 2306 generally extend in opposite directions from the central column 2311. However, they can also extend in different directions as do cutting blades 2312, 2314. Thus, there are a number of variations to the example configuration shown in FIG. 23 in the other figures as well.

Feature 2340 illustrates a bucket having a cutting blade structure 2310 with a central column 2311 and a top cutting blade 2312, essential cutting blade 2314, and a lower cutting blade 2306 as well as a secondary lower cutting blade 2322. Structure 2342 is used to engage with components of a motor and gearing system to drive the rotation of the cutting blade structure 2310. A first cross cutting blade 2308 is shown as well as a portion of a second cross cutting blade structure 2318. A supporting bracket 2304 is shown as an example of the kind of structure which can be configured on a side wall of the bucket 2340 to support in a removable fashion the cross cutting blades 2308 and 2318.

Figure 24:
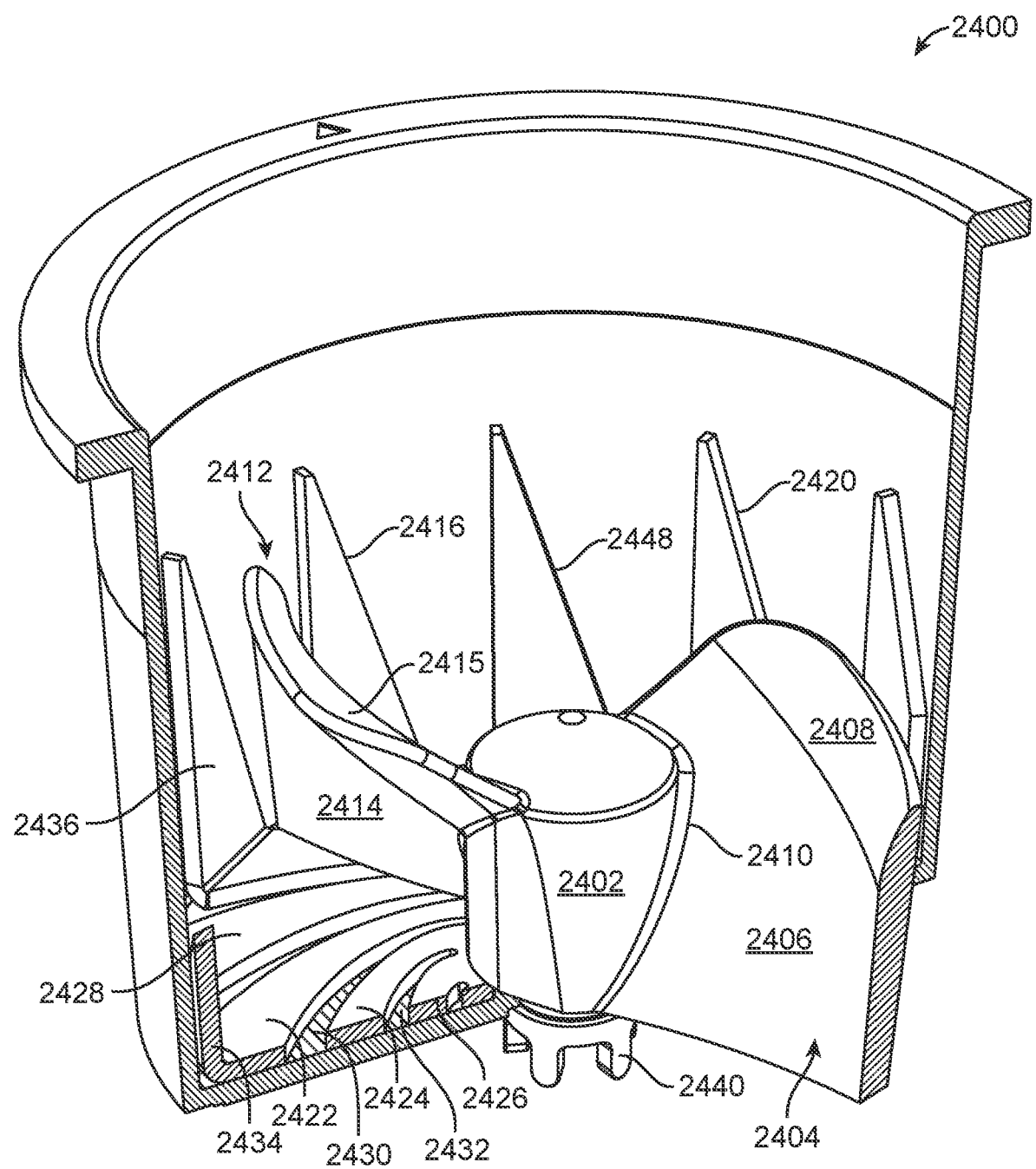
FIG. 24 illustrates a view of another example blade structure for a food recycler.

FIG. 24 illustrates a view of another example blade structure in a bucket 2400 for a food recycler. In this example, a central column 2402 is the support for a first cutting member 2404 and a second cutting member 2412. The first and second cutting members 2404, 2412 each are attached along an angled surface 2410 of the column 2402. The first and second cutting members 2404, 2412 are each angled at least in part. A front surface 2414 is shown on member 2412. A back surface 2414 is also shown in an upper region or top portion of the member 2412. Member 2404 has a back surface 2406 and a top edge 2408. While two cutting members are shown with their structure in FIG. 24, the system may include one or more of such members.

In one example, the cutting members 2406, 2412 rotate in a counterclockwise direction such that the first and second cutting members 2404, 2412 pass by wall cutting members 2436, 2416, 2418, 2420. The wall cutting members 2436, 2416, 2418, 2420 are shown by way of example in a triangular shape with the base of the triangle at a bottom portion of the bucket 2400. The wall cutting members 2436, 2416, 2418, 2420 extend inwardly from an interior surface of the bucket 2400 such that the rotation of the cutting members 2412, 2404 causes a distal end of each cutting member 2412, 2404 to pass close to an interior surface of each of the wall cutting members 2436, 2416, 2418, 2420. The close interaction can trap food waste components and cause them to be cut or crushed in an efficient manner.

At a bottom portion of the bucket 2400 are base cutting members 2422, 2424, 2426, 2428. The base cutting members 2422, 2424, 2426, 2428 extend from a base surface 2430, 2432 of the bucket 2400 and provide other areas where food waste can be cut or processed as the a lower portion of the cutting members 2412, 2404 passes over the base cutting members 2422, 2424, 2426, 2428. A wall cutting member 2434 is shown at a different height than the other wall cutting members 2436, 2416, 2418, 2420 showing that the wall cutting members 2436, 2416, 2418, 2420 can have a varying height. The wall cutting members 2436, 2416, 2418, 2420 can also have different configurations such as rectangular, circle, trapezoid, square, or a combination of different shapes.

An attachment component 2440 mechanically connects the central column 2402 of the cutting blade system with a gearing component and motor shown in other figures.

Figure 25:
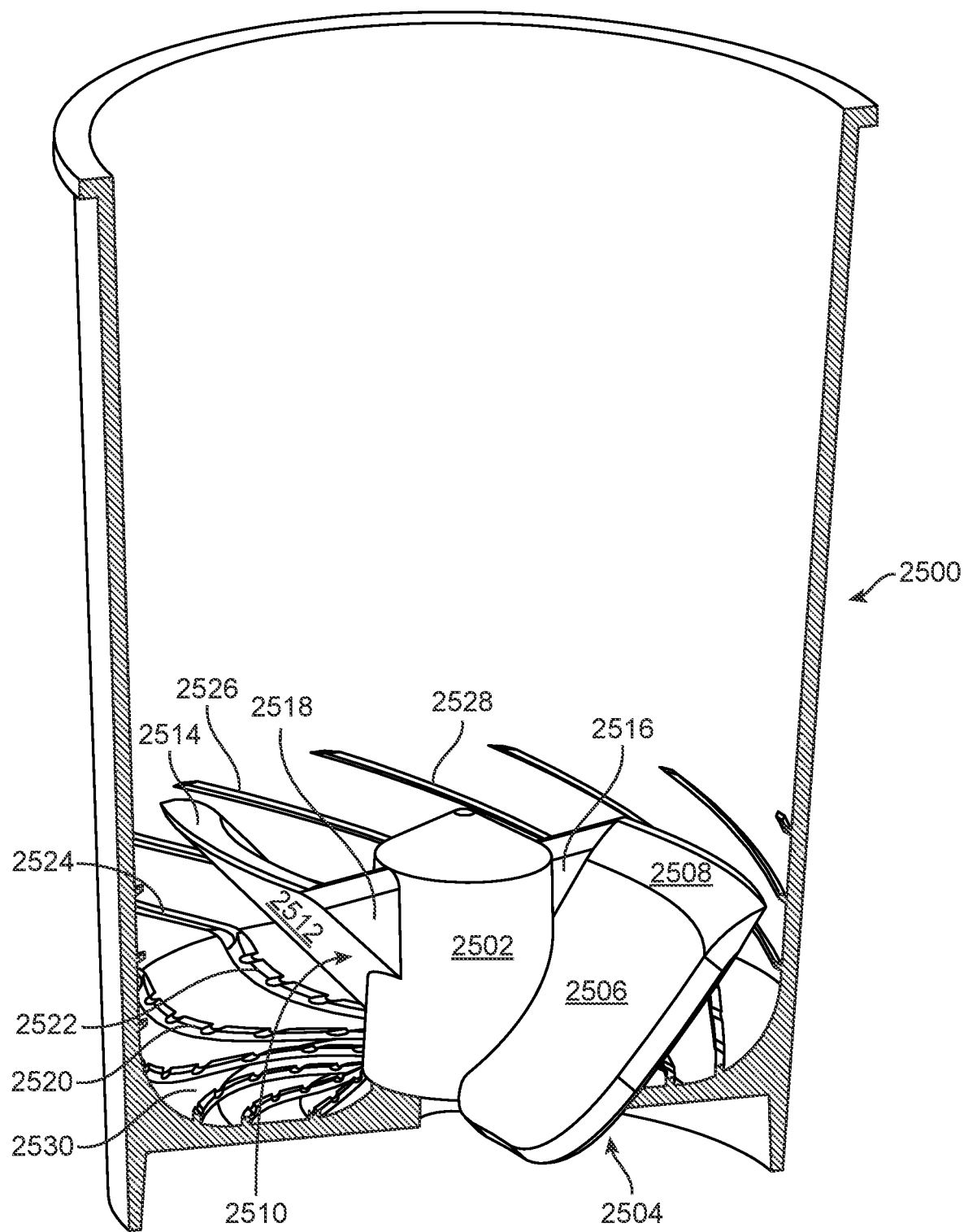
FIG. 25 illustrates a view of another example blade structure for a food recycler.

FIG. 25 illustrates a view 2500 of another example blade structure for a food recycler. A central column 2502 supports a first cutting member 2504 and a second cutting member 2510. The first cutting member 2504 has a first surface 2506 and a second surface 2508. A connecting member 2516 connects the central column 2502 with an upper portion of the first cutting member 2504. A second connecting member 2518 connects an upper portion of the second cutting member 2510. A surface 2512 is shown of the second cutting member 2510. A top surface 2514 is also shown of the second cutting member 2510. The first and second cutting members 2504, 2510 are primarily angled and connected to the central column 2512 along as much as the entire column. Wall cutting members 2524, 2526, 2528 are shown by way of example. These can represent thin cutting strips that extend a distance from an interior surface of the bucket 2500. In one aspect they are smooth, and another aspect they can be serrated or have gaps or sharp edges configured along the member. A distal end of the first or second cutting members 2504, 2510 can be configured to pass closely by each respective wall cutting member 2524, 2526, 2528 in order to cut food waste as the blade structure rotates. The blade structure can rotate in a clockwise or counterclockwise manner as with any example cutting structure disclosed herein.

A bottom portion of the bucket 2500 can have rounded edges and along the bottom additional base cutting members 2522, 2520 are shown by way of example. These base cutting members extend from a portion of a base surface 2530 of the bucket 2500. The base cutting members 2520, 2522 are shown as being serrated or having notches therein and also shown as having a thin structure. In one example, a base cutting member 2522 is extended to be connected to a wall cutting member 2524 with one portion being serrated or having notches in the other portion not having such features. This is an example structure which could be duplicated for the other wall and base cutting members as well. The general configuration of the wall cutting members and base cutting members is complementary to surfaces of the first cutting member 2504 and the second cutting member 2510 such that a rotation of the central column 2502 causes the first and second cutting members 2504, 2510 to rotate and cause waste food to be chopped up or cut via interaction between the first and second cutting member 2504, 2510 and the respective wall cutting members and base cutting members.

In some embodiments, the computer-readable storage devices, mediums, and/or memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data that cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates that one member of the set or multiple members of the set satisfy the claim. For example, claim language reciting "at least one of A, B, and C" or "at least one of A, B, or C" means A alone, B alone, C alone, A and B together, A and C together, B and C together, or A, B and C together.

Food Recycler Bank of Statements

The following disclosure provides various claims covering concepts related to food recyclers. A corresponding application, Provision Application Ser. No. 62/844,421, filed on May 7, 2019, includes further underlying technology and figures. That application is incorporated herein by reference in its entirety. The following provides a listing of various claim sets focusing on different aspects of improvements to food recyclers. The claims, in connection with the incorporated disclosure, cover various embodiments or examples configurations, methods, algorithms, and structures related to the improvements defined herein. Furthermore, features may be mixed between the various claim sets. For example, a volumetric efficiency concept might be combined with an energy efficient method to provide an improved energy usage in a food recycler that also has volumetric efficiency. According, the various concepts covered in these claims that can be integrated into different embodiments.

The statement sets below are organized into different concepts. However, each statement can be combined with any other statement provided below. References to "any previous statement" expressly extend beyond just the particular subset of statements but refers to any of the statements below.

Food Recycler Having Volumetric Efficiency

Statement 1. A food recycler comprising:
a controller;
a motor in communication with the controller;
a grinding mechanism in mechanical communication with the motor;
a bucket contained within the food recycler that is configured to contain the grinding mechanism and configured to receive waste food; and
a drying component configured to remove water from the waste food, wherein the food recycler is configured to have an overall appliance volume of 35 liters or less and wherein the controller, the motor, and the drying component are configured within the food recycler to enable the bucket to have a capacity to receive waste food of between 2.51 liters to 10 liters, inclusive.

Statement 2. The food recycler of statement 1, wherein the food recycler has a height of 395 millimeters or less.

Statement 3. The food recycler of any previous statement, wherein the food recycler has a height of approximately 360 millimeters, a width of approximately 270 millimeters and a depth of approximately 310 millimeters.

Statement 4. The food recycler of any previous statement, wherein the motor is configured to not be below the bucket within the food recycler.

Statement 5. The food recycler of any previous statement, further comprising:
a gear box configured below the bucket, and wherein at least a portion of the motor is adjacent to a side of the bucket in the food recycler.

Statement 6. The food recycler of any previous statement, further comprising:
a gear box configured below the bucket, and wherein the motor is positioned to a side and below the bucket in the food recycler.

Statement 7. The food recycler of any previous statement, further comprising:
at least one air filter configured to a side of the bucket and near a top portion of the food recycler.

Statement 8. The food recycler of any previous statement, further comprising:
a gear box configured below the bucket, wherein the controller is configured below the gear box.

Statement 9. The food recycler of any previous statement, wherein the drying component comprises a fan, a filter system, and a heating component.

Statement 10. The food recycler of any previous statement, wherein a ratio of a first volume of the bucket relative to a second volume comprising an overall volume of the food recycler is between 0.0717 and 0.2857.

Statement 11. The food recycler of any previous statement, wherein a filter system is built into a lid of the food recycler.

Statement 12. A food recycler comprising:
a food recycler case that contains a controller;
a motor in communication with the controller and configured within the food recycler case;
a bucket contained within the food recycler case that is configured to receive waste food; and
a drying component configured to remove water from the waste food, wherein the food recycler case has an overall volume and wherein a ratio of a first volume of the bucket relative to the overall volume of the food recycler case is between 0.07 and 0.29.

Statement 13. The food recycler of statement 12, wherein the overall volume comprises 30-35 liters.

Statement 14. The food recycler of any previous statement, wherein the ratio comprises between 0.8 and 0.33.

Statement 15. The food recycler of any previous statement, wherein the first volume of the bucket comprises 2.51 liters to 10 liters.

Statement 16. The food recycler any previous statement, wherein a height of the food recycler case is approximately 370 millimeters or less.

Statement 17. The food recycler any previous statement, wherein the food recycler is configured to be used on a countertop.

Statement 18. The food recycler of any previous statement, further comprising:
a grinding mechanism configured within the bucket and mechanically connected to the motor.

Statement 19. The food recycler of any previous statement, wherein the overall volume comprises a height of approximately 360 millimeters, a width of approximately 270 mm and a depth of approximately 310 mm.

Statement 20. The food recycler any previous statement, wherein this food recycler case includes an opening on a top surface of the food recycler and wherein the opening receives a removable lid.

Statement 21. The food recycler of any previous statement, further comprising a heating component for heating the waste food and the drying component for drying the waste food.

Food Recycler Operating with Improved Heating Efficiency

Statement 1. A food recycler comprising:
a controller;
a motor in communication with the controller;
a grinding mechanism in mechanical communication with the motor;
a bucket contained within the food recycler that is configured to contain the grinding mechanism and configured to receive waste food; and
a heating component, in electrical communication with the controller, the heating component configured to provide heat into the bucket for heating the waste food as part of a food recycling process, wherein the food recycling process consumes 0.1 kilowatt hours of energy or less per 100 grams of waste food.

Statement 2. The food recycler of statement 1, wherein the heating component comprises at least one of an RF heating element configured within a lid of the food recycler and an induction heating component heating the bucket.

Statement 3. The food recycler of any previous statement, wherein the food recycling process is controlled by controlling instructions provided from a machine learning algorithm or an artificial intelligence algorithm based on sensor data from one or more sensors which identifies one or more of a type of waste food in the bucket, a temperature in the bucket, humidity in the bucket and/or density of the waste food.

Statement 4. The food recycler any previous statement, further comprising:
a sensor configured to sense a type of waste food is contained within the bucket to yield sensor data; and
a computer-readable storage device storing instructions which, when executed by the controller, cause the controller to control one or more of the motor, the grinding mechanism, and the heating component to manage a heating and grinding process according to the sensor data.

Statement 5. The food recycler any previous statement, wherein the computer-readable storage device stores additional instructions which, when executed by the controller, cause the controller to control one or more of the motor, the grinding mechanism, and the heating component to manage a heating and grinding process according to a machine learning algorithm trained to operate the food recycler to use a determined amount of energy tailored to different types of waste food in the bucket.

Statement 6. The food recycler of any previous statement, wherein the heating component comprises a cavity magnetron.

Statement 7. The food recycler of any previous statement, further comprising:
a sensor configured to sense a type of waste food is contained within the bucket to yield sensor data;
a communication module configured to transmit the sensor data to a network-based server, wherein the network-based server generates controlling instructions based on the sensor data; and
a computer-readable storage device storing instructions which, when executed by the controller, cause the controller to control one or more of the motor, the grinding mechanism, and a heating component to manage a heating and grinding process according to controlling instructions received from the network-based service.

Statement 8. The food recycler of any previous statement, wherein the controlling instructions represent results from a machine learning algorithm or an artificial intelligence algorithm trained to optimize or improve energy use by the food recycler according to one or more of a type of waste food, a temperature in the bucket, humidity in the bucket and/or a density of the waste food.

Statement 9. The food recycler of any previous statement, wherein the heating component is configured in a top portion of the food recycler separate from a lid configured in the food recycler for access to the bucket.

Statement 10. The food recycler of any previous statement, further comprising:
an air circulation system that comprises a fan and an exhaust duct that removes air from the bucket and passes the air through an air filter system to an exhaust port such that the air exits the food recycler into a surrounding environment.

Statement 11. The food recycler of any previous statement, further comprising:
a sensor configured to sense a type of waste food is contained within the bucket to yield sensor data; and
a computer-readable storage device storing instructions which, when executed by the controller, cause the controller to control one or more of the motor, the grinding mechanism, the air circulation system and the heating component to manage a heating and grinding process according to the sensor data.

Statement 12. The food recycler of any previous statement, further comprising:
a drying component configured to remove water from the waste food, Statement 13. The food recycler of any previous statement, further comprising:
a sensor configured to sense a type of waste food is contained within the bucket to yield sensor data; and
a computer-readable storage device storing instructions which, when executed by the controller, cause the controller to control one or more of the motor, the grinding mechanism, the drying component and the heating component to manage a heating and grinding process according to the sensor data.

Statement 14. The food recycler of any previous statement, wherein a machine learning algorithm provides instructions to the controller to manage how much energy is used in the food recycling process according to data generated by a machine learning algorithm trained on types of waste food.

Statement 15. The food recycler of any previous statement, wherein the machine learning algorithm operates on one of the food recycler or a network-based server.

Statement 16. The food recycler of any previous statement, further comprising:
a sensor configured to sense a type of waste food is contained within the bucket to yield sensor data, wherein the controller receives controlling instructions for managing the food recycling process of the food recycler according to a machine learning algorithm operating on the sensor data.

Statement 17. The food recycler of any previous statement, wherein the sensor data identifies a first type of waste food and a second type of waste food in the bucket.

Statement 18. The food recycler of any previous statement, wherein the sensor data identifies a first percentage of the first type of waste food within the bucket and a second percentage of the second type of waste food within the bucket Statement 19. The food recycler of any previous statement, wherein the air circulation system comprises a variable speed controller for the fan to manage fan usage for heating efficiency.

Statement 20. The food recycler of any previous statement, wherein the controller provides instructions to the variable speed controller for managing the fan usage.

Statement 21. A food recycler comprising:
a food recycler case that contains a controller;
a motor in communication with the controller and configured within the food recycler case;
a bucket contained within the food recycler case that is configured to receive waste food;
a drying component configured to remove water from the waste food; and
a heating component that heats the bucket for heating the waste food as part of a food recycling process, wherein the food recycling process consumes 0.1 kilowatt hours of energy or less per 100 grams of waste food.

Statement 22. The food recycler of statement 21, wherein the food recycler process is managed by the controller according to controlling instructions provided from a machine learning algorithm trained on managing energy usage of a food recycler per cycle and based on a one or more of a type of waste food being recycled, a temperature, humidity and a density of the waste food.

Statement 23. The food recycler of any previous statement, further comprising a fan run by a variable speed fan controller which receives instructions from the controller for managing usage of the fan in a food recycling process.

Statement 24. The food recycler of any previous statement, further comprising insulation configured to reduce heat loss from the bucket.

Statement 25. A food recycling method comprising:
receiving waste food within a bucket contained within a food recycling appliance;
heating the waste food within the bucket using a heating component;
drying the waste food within the bucket; and
grinding the waste food with a grinding component contained within the food recycling appliance, wherein the food recycling method consumes 0.1 kilowatt hours of energy or less per 100 grams of waste food.

Statement 25. The food recycling method of statement 24, wherein the heating of the waste food, the drying of the waste food and the grinding of the waste food are managed by a controller operating on controlling instructions generated by an algorithm trained on energy usage by a food recycler according to a type of waste food being recycled.

Statement 26. The food recycling method of any previous statement, wherein the food recycling method comprises one or more of: generating controlling instructions from an algorithm trained on energy efficient use of a food recycler according to a type of waste food, wherein the controlling instructions cause a controller to manage an application of heat via the heating component, manage air flow rates in a venting system, and optimize of one or more of a timing of various stages of the food recycling method, temperatures applied to the waste food, and a continuous or non-continuous nature of an application of heat to the waste food.

Food Recycler Having a Grinding Tool

Statement 1. A grinding component within a food recycler, the grinding component comprising:
a primary column mechanically attached to a motor system;
a first curved arm extending from the primary column, the first curved arm having a first structure; and
a second curved arm extending from the primary column, the second curved arm having a second structure, wherein the first structure differs from the second structure and wherein the first structure and the second structure are configured such that movement of the primary column in a first direction and then in a second direction causes a grinding by the grinding component a large food waste item and a hard food waste item.

Statement 2. The grinding component of statement 1, wherein the first curved arm extends from the primary column at a first elevation and wherein the first structure comprises a first vertical surface and a second vertical surface, the first curved arm having a flat top surface that is configured to travel beneath a fixed chopping projection from the wall of the bucket when the primary column rotates as controlled by the motor system, and the first curved arm having a sharp edge projecting from the flat top surface on a side of the first curved arm that is opposite the first vertical surface.

Statement 3. The grinding component of any previous statement, wherein the second curved arm extending from the primary column at a second elevation, wherein the second structure comprises a first curved vertical surface and a second flat vertical surface, the second curved arm configured to travel above the fixed chopping projection from the wall of the bucket when the primary column rotates as controlled by the motor system.

Statement 4. The grinding component of any previous statement, wherein the second curved arm is configured with a plurality of teeth configured in the first curved vertical surface at a distal end of the second curved arm.

Statement 5. The grinding component of any previous statement, further comprising: the second curved arm having an upper component and a lower component.

Statement 6. The grinding component of any previous statement, wherein the upper component of the second curved arm comprises the plurality of teeth.

Statement 7. The grinding component of any previous statement, wherein the upper component extends further from the primary column and over the fixed chopping projection and wherein the lower component travels adjacent to a grinding component vertical side of the grinding component when the primary column rotates as controlled by the motor system.

Statement 8. The grinding component of any previous statement, wherein the large food waste item comprises a bone, a fruit, a potato, or other food item, generally have a diameter of greater than 2 inches.

Statement 9. The grinding component of any previous statement, wherein the first curved arm has a first end connected to the primary column and having a first arm distance between a first end vertical surface at the first end and a wall of a bucket containing the grinding component, the first curved arm having a second end that is distal from the primary column and having a second arm distance between a second end vertical surface at the second end and the wall of the bucket, and wherein the first arm distance is greater than the second arm distance.

Statement 10. The grinding component of any previous statement, wherein the first curved vertical surface of the second curved arm has a first end connected to the primary column and has a first curved arm distance between a first end vertical surface at the first end and the wall of the bucket containing the grinding component, the second curved arm having a second end that is distal from the primary column and having a second curved arm distance between a second end vertical surface at the second end and the wall of the bucket.

Statement 11. The grinding component of any previous statement, wherein the hard food waste item comprise a bone.

Statement 12. The grinding component of any previous statement, wherein the second curved arm is further configured to have a first portion that travels above the fixed chopping projection from the wall of the bucket and a second portion that travels adjacent to the fixed chopping projection when the primary column rotates as controlled by the motor system.

Statement 13. A food recycler comprising:
 a food recycler case;
 a motor system configured within the food recycler case;
 a bucket configured within the food recycler case; and
 a grinding component configured within the bucket and mechanically connected to the motor system, wherein the grinding component comprises:
  a primary column;
  a first curved arm extending from the primary column, the first curved arm having a first structure; and
  a second curved arm extending from the primary column, the second curved arm having a second structure, wherein the first structure differs from the second structure and wherein the first structure and the second structure are configured such that movement of the primary column in a first direction and then in a second direction causes a grinding by the grinding component of a combination of large food waste items and hard food waste items.

Statement 14. The food recycler of statement 13, wherein the first curved arm extends from the primary column at a first elevation and has a first vertical surface and a second vertical surface, the first curved arm having a flat top surface that is configured to travel beneath a fixed chopping projection from the wall of the bucket when the primary column rotates as controlled by the motor system, and the first curved arm having a sharp edge projecting from the flat top surface on a side of the first curved arm that is opposite the first vertical surface.

Statement 15. The food recycler of any previous statement, wherein the second curved arm extends from the primary column at a second elevation and has a first curved vertical surface and a second flat vertical surface, the second curved arm configured to travel above the fixed chopping projection from the wall of the bucket when the primary column rotates as controlled by the motor system, and wherein the grinding component further comprises the second curved arm having an upper component and a lower component.

Statement 16. The food recycler of any previous statement, wherein the large food waste items comprise bones, fruit items, potatoes, or other food items having a diameter of at least 2 inches.

Statement 17. The food recycler of any previous statement, wherein the upper component extends further from the primary column and over the fixed chopping projection and wherein the lower component travels adjacent to a chopping component vertical side of the grinding component when the primary column rotates as controlled by the motor system.

Statement 18. The food recycler of any previous statement, wherein the hard food waste items comprise bones.

Statement 19. The food recycler of any previous statement, wherein the first curved arm has a first end connected to the primary column and having a first arm distance between a first end vertical surface at the first end and a wall of a bucket containing the grinding component, the first curved arm having a second end that is distal from the primary column and having a second arm distance between a second end vertical surface at the second end and the wall of the bucket, and wherein the first arm distance is greater than the second arm distance.

Statement 20. The food recycler of any previous statement, wherein the first curved vertical surface of the second curved arm has a first end connected to the primary column and has a first curved arm distance between a first end vertical surface at the first end and the wall of the bucket containing the grinding component, the second curved arm having a second end that is distal from the primary column and having a second curved arm distance between a second end vertical surface at the second end and the wall of the bucket.

Statement 21. The food recycler of any previous statement, wherein the first curved arm distance is greater than the second curved arm distance.

Statement 22. The food recycler of any previous statement, wherein the second curved arm is further configured to have a first portion that travels above the fixed chopping projection from the wall of the bucket and a second portion that travels adjacent to the fixed chopping projection when the primary column rotates as controlled by the motor system.

Statement 23. A method of recycling waste food, the method comprising:

receiving waste food in a bucket of a food recycling unit;

chopping the waste food in the bucket using a chopping component as part of a food recycling process, wherein the chopping comprises rotating the chopping component in a first direction as part of the food recycling process and in a second direction as part of the food recycling process, and wherein the chopping component comprises:

a primary column;

a first curved arm extending from the primary column, the first curved arm having a first structure; and a second curved arm extending from the primary column, the second curved arm having a second structure, wherein the first structure differs from the second structure and wherein the first structure and the second structure are configured such that movement of the primary column in a first direction and then in a second direction causes a grinding by the grinding component of large food waste items and hard food waste items.

Statement 24. The method of recycling waste food of statement 23, wherein the first curved arm extends from the primary column at a first elevation and wherein the first structure comprises a first vertical surface and a second vertical surface, the first curved arm having a flat top surface that is configured to travel beneath a fixed chopping projection from the wall of the bucket when the primary column rotates as controlled by the motor system, and the first curved arm having a sharp edge projecting from the flat top surface on a side of the first curved arm that is opposite the first vertical surface.

Statement 25. The method of recycling waste food of any previous statement, wherein the second curved arm extending from the primary column at a second elevation, wherein the second structure comprises a first curved vertical surface and a second flat vertical surface, the second curved arm configured to travel above the fixed chopping projection from the wall of the bucket when the primary column rotates as controlled by the motor system.

Statement 26. The method of any previous statement, wherein the large food waste items comprises bones having a diameter of at least 2 inches.

Food Recycler Having an RF Component

Statement 1. A food recycler comprising:

a food recycler case;

a control system configured within the food recycler case;

a bucket configured within the food recycler case and for receiving waste food; and an RF component configured within the food recycler case and in communication with the control system, wherein the RF component transmits microwaves into the bucket as part of a food recycling process.

Statement 2. The food recycler of statement 1, further comprising a heating plate configured below the bucket and within the food recycler case.

Statement 3. The food recycler of any previous statement, wherein the RF component is configured within a lid of the food recycler that provides access to the bucket.

Statement 4. The food recycler of any previous statement, wherein the lid comprises an electro-mechanical connection to the control system.

Statement 5. The food recycler of any previous statement, further comprising shielding to prevent microwave leaking.

Statement 6. The food recycler any previous statement, further comprising a wave guide which receives microwaves from the RF component and which guides the microwaves into the bucket.

Statement 7. The food recycler any previous statement, wherein the RF component comprises a magnetron.

Statement 8. The food recycler any previous statement, further comprising a heat plate which communicates heat to the bucket, wherein the waste food is heated by a combination of heat from the heat plate and heat from microwaves generated by the RF component.

Statement 9. The food recycler any previous statement, wherein the food recycling process comprises heating the waste food at least in part using microwaves from the RF component, without burning the food.

Statement 10. The food recycler any previous statement, further comprising an air circulation system which comprises a fan for drawing air from the bucket and communicating the air through a filtering system as part of the food recycling process.

Statement 11. The food recycler of any previous statement, wherein the fan is controlled by a variable speed fan controller.

Statement 12. A method of heating waste food in a food recycling appliance, the method comprising:

receiving waste food in a bucket of the food recycling appliance;

receiving an indication from a user of the food recycling appliance to begin a food recycling process;

heating, as directed by a control system, the waste food by an RF component to yield heated waste food; and grinding the heated waste food to yield recycled food.

Statement 13. The method of statement 12, further comprising:

initiating a further heating of the waste food via a heat plate in connection with the bucket to yield the heated waste food.

Statement 14. The method of any previous statement, further comprising:

retrieving air from the bucket via an air circulation system;

Statement 15. The method of any previous statement, wherein the air circulation system further comprises filters through which air flows.

Statement 16. The method of any previous statement, when the RF component further comprises a wave guide configured to control an introduction of microwaves into the bucket.

Statement 17. The method of any previous statement, wherein the wave guide further controls the introduction of microwaves into the bucket such that the waste food will be evenly heated.

Statement 18. The method of any previous statement, further comprising:

grinding the heated waste food utilizing a grinding component in mechanical communication with a motor system of the food recycling appliance.

Statement 19. The method of any previous statement, wherein the RF component is configured within a lid of the food recycling appliance.

Statement 20. The method of any previous statement, wherein the lid comprises an electro-mechanical connection to the control system.

Statement 21. The method of any previous statement, where the heating further comprises using a heat plate which communicates heat to the bucket, wherein the waste food is heated by a combination of heat from the heat plate and heat from microwaves generated by the RF component.

Statement 22. The method of any previous statement, further comprising retrieving air from the bucket via an air circulation system which includes a fan for drawing air from the bucket and communicating the air through a filtering system as part of the food recycling process.

Statement 23. The method of any previous statement, wherein the air circulation system comprises a fan having a variable speed controller for efficiently controlling air flow.

An Internet of Things Device as a Food Recycler

Statement 1. A food recycler comprising:
a controller;
a motor in communication with the controller;
a grinding mechanism in mechanical communication with the motor;
a bucket contained within the food recycler that is configured to contain the grinding mechanism and configured to receive waste food;
a drying component configured to dehydrate the waste food in the bucket;
a sensor component that senses a characteristic of waste food being recycled in the food recycler to yield sensor data; and
a communication component connected to the controller which communicates with an external device, wherein the sensor data is transmitted to the external device via the communication component and wherein the sensor data characterizes the waste food.

Statement 2. The food recycler of statement 1, wherein the sensor component further comprises a one or more of a torque sensor associated with the motor and/or an air velocity sensor.

Statement 3. The food recycler of any previous statement, wherein the sensor comprises one or more of a humidity sensor, a temperature sensor, a pressure sensor, a microphone, a camera, a scale, and an infrared sensor.

Statement 4. The food recycler of any previous statement, wherein the food recycler is configured to have an overall appliance volume of 35 liters or less and wherein the controller, a motor, and a drying component are configured within the food recycler to enable a bucket to have a capacity to receive the waste food of between 2.51 liters to 10 liters.

Statement 5. The food recycler of any previous statement, wherein the food recycler has a height of 395 millimeters or less.

Statement 6. The food recycler of any previous statement, further comprising:
a user interface that enables a user to provide data regarding the waste food.

Statement 7. The food recycler of any previous statement, wherein the user interface comprises a microphone that receives audible input from the user to describe the waste food.

Statement 8. The food recycler of any previous statement, wherein the communication component transmits a status of a subsystem of the food recycler to the external device.

Statement 9. A method comprising:
receiving, over a network, at a first device and from a food recycling appliance, sensor data obtained from a sensor component configured within the food recycling appliance, the sensor component obtaining data associated with characteristics of waste food placed within a bucket of the food recycling appliance;
analyzing the sensor data to determine a characteristic of the waste food, to yield an analysis; and
based on the analysis, communicating food-related data to a second device associated with a user of the food recycling appliance.

Statement 10. The method of statement 9, wherein the sensor component comprises one or more of a humidity sensor, a temperature sensor, a pressure sensor, a microphone, a camera, a scale, a torque sensor, an air velocity sensor and an infrared sensor.

Statement 11. The method of any previous statement, wherein the sensor data identifies a first portion of a first type of food within the waste food and a second portion of a second type of food within the waste food.

Statement 12. The method of any previous statement, wherein the sensor data relates to one or more of an amount of humidity withdrawn from the waste food, a temperature of the waste food, a weight of the waste food, and a type of the waste food.

Statement 13. The method of any previous statement, further comprising receiving user input data received at the food recycling appliance, the user input data characterizing the waste food.

Statement 14. The method of any previous statement, wherein communicating the food-related data to the device associated with the user of the food recycling appliance further comprises indicating a recipe to the device based on the sensor data.

Statement 15. The method of any previous statement, wherein communicating the food-related data to the device associated with the user of the food recycling appliance further comprises indicating a recipe to the device based on the sensor data.

Statement 16. A method comprising:
obtaining, via a sensor component configured within a food recycling appliance, sensor data, the sensor component obtaining data associated with characteristics of waste food placed within a bucket of the food recycling appliance;
transmitting, over a network and to an external device, the sensor data, wherein the external device analyzes the sensor data to determine a characteristic of the waste food to yield an analysis and communicates the analysis to a second device associated with a user of the food recycling appliance.

Statement 17. The method of statement 16, wherein the sensor component comprises one or more of a humidity sensor, a temperature sensor, a pressure sensor, a microphone, a camera, a scale, a torque sensor, an air velocity sensor and an infrared sensor.

A Food Recycler Having Odour Control

Statement 1. A food recycler comprising:
a receiving cavity which is configured to receive a replaceable filter bag, wherein the replaceable filter bag contains an odor control material and wherein the replaceable filter bag is made from a non-plastic and flexible material; and
an air circulation system configured to circulate air from a bucket through the receiving cavity containing the replaceable filter bag.

Statement 2. The food recycler of statement 1, wherein the non-plastic and flexible material comprises a compostable and biodegradable material.

Statement 3. The food recycler of any previous statement, wherein the replaceable filter bag is shaped to fit within the receiving cavity.

Statement 4. The food recycler of any previous statement, wherein the replaceable filter bag is shaped like a tea bag.

Statement 5. The food recycler of any previous statement, wherein the air circulation system is further configured to pass air received from the bucket through an air channel to an intake opening in the food recycler, through the receiving cavity containing the replaceable filter bag, and out an exit opening in the food recycler.

Statement 6. The food recycler of any previous statement, wherein the air, as it travels through the receiving cavity containing the replaceable filter bag, moves in one or more of a spiral configuration, a circular configuration, a maze-shaped configuration, and a multi-layered configuration.

Statement 7. The food recycler any previous statement, wherein the odor control material comprises an active carbon.

Statement 8. The food recycler of any previous statement, wherein the replaceable filter bag comprises one or more of an air permeable outer mesh that contains an activated carbon for absorbing odor from the air, is made of a compostable material, is made from a non-compostable material, is recyclable, and/or is proccessable in the food recycler.

Statement 9. The food recycler of any previous statement, wherein the receiving cavity is one or more of accessible from a side wall of the food recycler, configured to receive two replaceable filter bags and accessible from a lid configured on a top portion of the food recycler.

Statement 10. The food recycler of any previous statement, further comprising:
a controller;
a motor in communication with the controller;
a grinding mechanism in mechanical communication with the motor; and
a bucket contained within the food recycler that is configured to contain the grinding mechanism and configured to receive waste food.

Statement 11. A method comprising:
receiving waste food in a bucket contained within a food recycling appliance;
receiving a replaceable filter bag in a receiving cavity of the food recycling appliance, wherein the replaceable filter bag contains an odor control material and wherein the replaceable filter bag is made from a non-plastic and flexible material;
initiating a food recycling process to recycle the waste food;
extracting moisture from the waste food to yield humid air; and
channeling the humid air through an air duct through the receiving cavity containing the replaceable filter bag.

Statement 12. The method of statement 11, wherein the replaceable filter bag has a shaped configured to fit within the receiving cavity.

Statement 13. The method of any previous statement, wherein the non-plastic and flexible material comprises one or more of a compostable and biodegradable material, a recyclable material and/or a material that can be processed in the food recycler.

Statement 14. The method of any previous statement, wherein the replaceable filter bag is one of ring-shaped, circular, square, tea-bag shaped or configured to fit within the receiving cavity contained with the food recycler.

Statement 15. The method of any previous statement, wherein an air circulation system is configured to pass air received from the bucket through an air channel to an intake opening in the food recycler, through the receiving cavity containing the replaceable filter bag, and out an exit opening in the food recycler.

Statement 16. The method of any previous statement, wherein the air, as it travels through the receiving cavity containing the replaceable filter bag, moves in one or more of a spiral configuration, a circular configuration, a maze-shaped configuration, and a multi-layered configuration.

Statement 17. The method of any previous statement, wherein the replaceable filter bag comprises an air permeable outer mesh that contains an active carbon for absorbing odor from air.

Statement 18. The method of any previous statement, wherein the receiving cavity is accessible from a side wall of the food recycling appliance.

Statement 19. The method of any previous statement, wherein the receiving cavity is configured to receive two replaceable filter bags.

Statement 20. A filter bag package configured for a food recycler, the filter bag package comprising:
an outer filter bag made from a non-plastic and flexible material; and
an odor control material contained within the outer filter bag, wherein the filter bag package is replaceable and is configured to be placed within a food recycler comprising:
a controller;
a motor in communication with the controller;
a grinding mechanism in mechanical communication with the motor;
a bucket contained within the food recycler that is configured to contain the grinding mechanism and configured to receive waste food;
a receiving cavity which is configured to receive the filter bag package; and
an air circulation system configured to circulate air from the bucket through the receiving cavity containing the filter bag package.

Statement 21. The filter bag package of statement 20, wherein the non-plastic and flexible material is compostable and biodegradable.

A Food Recycler Having Odor Control in a Lid Component

Statement 1. A food recycler comprising:
a controller;
a motor in communication with the controller;
a grinding mechanism in mechanical communication with the motor;
a bucket contained within the food recycler that is configured to contain the grinding mechanism and configured to receive waste food;
a sensing component to provide data on the food recycling process;
a drying component configured to dehydrate the food waste in the bucket including an air circulation system configured to circulate air from the bucket through a receiving cavity containing a filter bag;
a lid that mounts food recycler and covers a cavity containing the bucket, the lid having a receiving cavity which is configured to receive the replaceable filter bag; and
an air circulation system configured to circulate air from the bucket through the receiving cavity containing the replaceable filter bag.

Statement 2. The food recycler of statement 1, wherein the replaceable filter bag contains an odor control material and wherein the replaceable filter bag is made from a compostable and biodegradable material.

Statement 3. The food recycler of any previous statement, wherein the food recycler has one or more of a height of approximately 380 millimeters, a width of approximately 270 millimeters and a depth of approximately 310 millimeters.

Statement 4. The food recycler of any previous statement, wherein the replaceable filter bag is one of ring-shaped, circular or configured to fit within the receiving cavity contained with the lid.

Statement 5. The food recycler of any previous statement, wherein the air circulation system is further configured to pass air received from the bucket through an air channel to an intake opening in the lid, through the receiving cavity containing the replaceable filter bag, and out an exit opening in the lid.

Statement 6. The food recycler of any previous statement, wherein the air, as it travels through the receiving cavity containing the replaceable filter bag, moves in one or more of a spiral configuration, a circular configuration, a maze-shaped configuration, and a multi-layered configuration.

Statement 7. The food recycler of any previous statement, wherein the replaceable filter bag comprises an air permeable outer mesh that contains an active carbon for absorbing odor from the air.

Statement 8. The food recycler of any previous statement, wherein the receiving cavity is accessible from a side wall of the lid.

Statement 9. The food recycler of any previous statement, wherein the receiving cavity is configured to receive two replaceable filter bags.

Statement 10. The food recycler of any previous statement, wherein the lid is configured in one of a top portion of the food recycler or a side wall of the food recycler.

Statement 11. A method comprising:
receiving waste food in a bucket contained within a food recycling appliance;
receiving a replaceable filter bag in a receiving cavity of a lid configured in the food recycling appliance;
initiating a food recycling process to recycle the waste food;
extracting moisture from the waste food to yield humid air; and
channeling the humid air through an air duct through the receiving cavity containing the replaceable filter bag.

Statement 12. The method of statement 11, wherein the replaceable filter bag contains an odor control material and wherein the replaceable filter bag is made from a compostable and biodegradable material.

Statement 13. The method of any previous statement, wherein the food recycling appliance has one or more of a height of approximately 380 millimeters, a width of approximately 270 millimeters and a depth of approximately 310 millimeters.

Statement 14. The method of any previous statement, wherein the replaceable filter bag is one of ring-shaped, circular, square or configured to fit within the receiving cavity contained with the lid of the food recycler appliance.

Statement 15. The method of any previous statement, wherein an air circulation system is configured to pass air received from the bucket through an air channel to an intake opening in the lid, through the receiving cavity containing the replaceable filter bag, and out an exit opening in the lid.

Statement 16. The method of any previous statement, wherein the air, as it travels through the receiving cavity containing the replaceable filter bag, moves in one or more of a spiral configuration, a circular configuration, a maze-shaped configuration, and a multi-layered configuration.

Statement 17. The method of any previous statement, wherein the replaceable filter bag comprises an air permeable outer mesh that contains an active carbon for absorbing odor from air.

Statement 18. The method of any previous statement, wherein the receiving cavity is accessible from a side wall of the lid of the food recycling appliance.

Statement 19. The method of any previous statement, wherein the receiving cavity is configured to receive two replaceable filter bags.

Statement 20. The method of any previous statement, wherein the lid is configured in one of a top portion of the food recycler and a side wall of the food recycler.

Built-In Food Recycling Appliance

Statement 1. A food recycler configuration within a cabinet, the food recycler comprising:
a removable bucket contained within the food recycler that is configured to contain a grinding mechanism and configured to receive waste food;
a drying component configured in the food recycler to remove water from the waste food; and
a venting system that vents humidity generated by the food recycler to one of an outside of the cabinet via a port or pipe, wherein the food recycler is mounted in the cabinet to an electrical receptacle and the drying component vents air from the cabinet via a port or pipe and the removable bucket is accessible by a user.

Statement 2. The food recycler of statement 1, wherein the port or pipe vents the air to an area outside a building containing the cabinet, to a drainage system or to a plumbing system.

Statement 3. The food recycler of any previous statement, wherein the food recycler is further configured with a sliding mechanism to enable the food recycler to slide out of the cabinet.

Statement 4. The food recycler of any previous statement, wherein sliding the food recycler out of the cabinet enables access by the user to the bucket for inputting the waste food.

Statement 5. The food recycler of any previous statement, further comprising:
an extension mechanism that enable a user to move the food recycler out from underneath the counter-top of the cabinet.

Statement 6. The food recycler of any previous statement, wherein the venting system further comprises:
a flexible port which enables the venting system to continue to vent humidity from the food recycler.

Statement 7. The food recycler of any previous statement, wherein, the venting system further comprises:
tubing which disconnects while the food recycler is moved out from underneath a counter-top of the cabinet and reconnects when the food recycler is moved back underneath the counter-top.

Statement 8. The food recycler of any previous statement, wherein the drying component comprises a fan, a filter system, and a heating component, wherein the filter system is one of configured within the food recycler or is mounted in the cabinet separate from the food recycler.

Statement 9. The food recycler any previous statement, wherein the removable bucket is attached to an underside of a counter of the cabinet.

Statement 10. The food recycler any previous statement, wherein a counter-top in the cabinet comprises an opening through which the food recycler can be accessed for receiving waste food.

Statement 11. The food recycler of any previous statement, wherein the food recycler further comprises:
a controller, wherein the controller is positioned independently of the bucket and not under a counter-top of the cabinet.

Statement 12. The food recycler of any previous statement, wherein the food recycler further comprises:
a controller; and
a motor in communication with the controller, wherein one or more of the controller, the motor and the drying component are positioned independent of a location of the bucket under the counter.

Statement 13. A method comprising:
receiving food waste at a food recycler that is configured within a cabinet, wherein the food recycler comprises:
a controller;
a motor in communication with the controller;
a grinding mechanism in mechanical communication with the motor;
a bucket contained within the food recycler that is configured to contain the grinding mechanism and configured to receive waste food; and
a drying component configured to remove water from the waste food;
processing the food waste in the food recycler to generate humidity; and
transmitting the humidity through a port that vents the humidity to one of an exterior area of a building containing the cabinet, into ambient air in a room containing the cabinet and in the building, a drainage system, a duct, a plumbing system in the building.

Statement 14. The method of statement 13, wherein receiving the food waste at the food recycler that is configured within a cabinet further comprises:
enabling the food recycler to slide out from the cabinet to provide access to the bucket for receiving the food waste.

Statement 15. The method of any previous statement, wherein the venting system further comprises a flexible tube that enables the food recycler to slide out from the cabinet.

Statement 16. The method of any previous statement, wherein the bucket of the food recycler is mounted under a counter-top of the cabinet.

Statement 17. The method of any previous statement, further comprising:
extending the food recycler out from underneath a counter-top of the cabinet to receive the waste food.

Statement 18. The method of any previous statement, wherein, when the food recycler is moved out from underneath the counter-top, the venting system has tubing which is flexible and enables the vending system to continue to vent humidity from the food recycler.

Statement 19. The method of any previous statement, wherein, when the food recycler is moved out from underneath the counter-top, the venting system has tubing which disconnects while the food recycler is moved out from underneath the counter-top and reconnects when the food recycler is moved back underneath the counter-top.

Statement 20. The method of any previous statement, wherein the drying component comprises a fan, a filter system, and a heating component.

Statement 21. The method any previous statement, wherein the port vents air outside the cabinet but within a building containing the cabinet through a piping system.

Statement 22. The method any previous statement, wherein receiving the waste food in the food recycler is performed through an opening in a counter-top.

Statement 23. The method of any previous statement, wherein the food recycler is accessible to a user through a door in the cabinet.

Food Cycler

Statement 1. A food recycler, comprising:
a housing;
a pot vessel comprising at least a first feature that, as a result of being detected, indicate a first request to execute an infusion cycle using first contents within the pot vessel;
a bucket vessel comprising at least a second feature that, as a result of being detected, indicate a second request to execute a desiccation cycle using second contents within the bucket vessel;
an interior wall that forms a cavity within the housing and configured to receive the pot vessel and the bucket vessel;
a controller within the housing, the controller comprising:
a set of indicators; and
at least one user interface component usable to at least configure the infusion cycle or the desiccation cycle, the at least one user interface component being accessible from an exterior of the housing;
a set of sensors positioned within the interior wall, the set of sensors in electrical communication with the controller and configured to detect presence of the pot vessel or the bucket vessel within the cavity;
a motor in electrical communication with the controller and within the housing; and
a set of components in mechanical communication with the motor and within the housing, the set of components configured to perform the infusion cycle in response to the first request or the desiccation cycle in response to the second request.

Statement 2. The food recycler of statement 1, wherein the pot vessel is constructed from a ferromagnetic material to allow generation of heat within the pot vessel in an electromagnetic field.

Statement 3. The food recycler of any previous statement, wherein the set of components include a vacuum and purge air pump that produce a negative pressure within the bucket vessel during the desiccation cycle and remove moisture laden air resulting from the desiccation cycle.

Statement 4. The food recycler of any previous statement, further comprising a Hall effect sensor in electrical communication with the controller, the Hall effect sensor configured to detect a jam within the food recycler resulting from the desiccation cycle or the infusion cycle.

Statement 5. The food recycler of any previous statement, further comprising an RF component in electrical communication with the controller, wherein the controller utilizes the RF component to control a temperature within the pot vessel during the infusion cycle and within the bucket vessel during the desiccation cycle.

Statement 6. The food recycler of any previous statement, further comprising a separator configured to separate waste and fats from an infused solution within the pot vessel resulting from the infusion cycle.

Statement 7. The food recycler of any previous statement, further comprising a humidity sensor in electrical communication with the controller, wherein the controller obtains inputs from the humidity sensor to determine completion of the desiccation cycle.

Statement 8. The food recycler of any previous statement, wherein the interior wall comprises a thermal layer and an acoustic insulation layer to reduce heat transfer from the pot vessel and the bucket vessel and to reduce acoustic transmission resulting from the infusion cycle and the desiccation cycle.

Statement 9. The food recycler of any previous statement, wherein the bucket vessel includes a rotor that, when in mechanical communication with the motor, pulverizes the second contents in the bucket vessel and generates a mix flow of the second contents in the bucket vessel during the desiccation cycle.

Statement 10. The food recycler of any previous statement, the set of sensors comprise:
a first sensor positioned on a first side of the interior wall, the first sensor configured to detect the at least first feature of the pot vessel; and
a second sensor positioned on a second side of the interior wall, the second sensor configured to detect the at least second feature of the bucket vessel.

Statement 11. A method, comprising:
detecting, within a food recycler, insertion of a vessel;
determining, based on one or more features of the vessel, a cycle to be performed to convert contents within the vessel into a product;
identifying the contents within the vessel;
initiating, based on the contents within the vessel, one or more components of the food recycler to perform the cycle;
detecting completion of the cycle; and
as a result of the completion of the cycle, indicating the completion of the cycle and providing, within the vessel, the product resulting from the cycle.

Statement 12. The method of statement 11, wherein the cycle is one of a desiccation cycle to generate granular material and an infusion cycle to generate an edible food solution.

Statement 13. The method of any previous statement, wherein:
the one or more features of the vessel correspond to the desiccation cycle; and
the method further comprises identifying, based on the one or more features of the vessel, that the desiccation cycle is to be performed.

Statement 14. The method of any previous statement, wherein:
the one or more features of the vessel correspond to the infusion cycle; and
the method further comprises identifying, based on the one or more features of the vessel, that the infusion cycle is to be performed.

Statement 15. The method of any previous statement, further comprising:
determining a volume and water content of the contents within the vessel; and
determining, based on the contents, the volume of the contents, and the water content of the contents, a duration of the cycle.

Statement 16. The method of any previous statement, further comprising maintaining the product resulting from the cycle at a specific temperature.

Statement 17. The method of any previous statement, further comprising:
detecting, within the vessel, a jam;
stopping the one or more components of the food recycler;
initiating a rotor within the vessel in a particular direction to eliminate the jam;
detecting, within the vessel, that the jam has been cleared; and
re-initiating the one or more components of the food recycler to perform the cycle.

Statement 18. The method of any previous statement, further comprising:
obtaining, via a user interface of the food recycler, one or more parameters of the cycle for converting the contents of the vessel in to the product; and
identifying, based on the one or more parameters, the one or more components of the food recycler to perform the cycle in accordance with the one or more parameters.

Statement 19. The method of any previous statement, further comprising:
monitoring, during performance of the cycle, agitation of the contents, heat application within the vessel, and a temperature within the vessel to generate a temperature hysteresis range; and
maintaining, based on the temperature hysteresis range, a cycle temperature within the vessel to produce the product.

Statement 20. The method of any previous statement, further comprising monitoring humidity within the vessel to detect the completion of the cycle, whereby the cycle is complete as a result of the humidity within the vessel being below a minimum threshold value.

Updated Food Cycler

Statement 1. A food recycler comprising:
a base component comprising a base rim, at least one air intake opening, a heater, a gearbox, and a motor component having a motor and a top surface, the motor being in mechanical communication with the gearbox;
an airflow component configured to be positioned on the top surface of the motor component;
a fan component comprising a fan and positioned on an intake port of the airflow component;
a filter component having an air filter configured therein, the filter component configured on an output port of the airflow component;
a bucket receptacle configured on the gearbox of the base component and configured to receive a bucket, wherein the fan component and the filter component are configured adjacent to an upper portion of the bucket receptacle;
a casing having a lower rim complimentary to the base rim and configured such that the casing sits on the base rim, the casing having a first interior volume complimentary to the bucket receptacle, a second interior volume complimentary to the fan module, and a third interior volume complimentary to the air filter component;
a control switch configured in the casing;
a lid configured with a hinge to the casing such that access to the bucket receptacle is provided by opening the lid; and
a controller configured to be in electrical communication with the motor, the fan and the control switch for operating the food recycler.

Statement 2. The food recycler of statement 1, wherein the motor is configured in the base component to be at least in part to a side of a lower portion of the bucket receptacle.

Statement 3. The food recycler of any previous statement, wherein the filter component receives air and passes the air through the air filter.

Statement 4. The food recycler of any previous statement, wherein the lid is further configured to enable air to flow from a top portion of the bucket receptacle through the lid and down to the fan component.

Statement 5. The food recycler of any previous statement, further comprising a bucket configured within the bucket receptacle.

Statement 6. The food recycler of any previous statement, wherein upon an operation of the fan, air is drawn into the casing via the at least one air intake opening in the base module, up an interior wall of the bucket receptacle, into the lid, down through the fan module, through the airflow component, and up through the filter component.

Statement 7. The food recycler of any previous statement, wherein the air flows from the filter component into the lid and wherein the lid further includes an exhaust opening in a top of the lid.

Statement 8. The food recycler of any previous statement, wherein the exhaust opening configured on the top of the lid and within 2 cm of the hinge.

Statement 9. The food recycler of any previous statement, wherein the air flows from the filter component to an exhaust opening on a rear surface of the food recycler, the exhaust opening being below the hinge.

Statement 10. The food recycler of any previous statement, wherein a ratio of a first volume of the bucket relative to a second volume comprising an overall volume of the food recycler is between 0.0717 and 0.2857.

Statement 11. The food recycler of any previous statement, wherein the air flows from the filter component to an exhaust opening on a rear surface of the lid of the food recycler, the exhaust opening being above the hinge.

Statement 12. The food recycler of any previous statement, further comprising:
a tilted control switch configured on a front surface of the casing; and
a latching mechanism configured to open the lid upon a user interacting with the latching mechanism, wherein the latching mechanism is configured above and adjacent to the tilted control switch.

Statement 13. The food recycler of any previous statement, wherein the tilted control switch has a front surface configured in a first plane that is at a 5-30 degree angle relative to a second plane defined by the front surface of the casing.

Statement 14. The food recycler of any previous statement, wherein a top edge of the tilted control switch is less than 2 mm from a bottom portion of the latching mechanism.

Statement 15. The food recycler of any previous statement, wherein the casing comprises a rear surface that is configured at an angle and wherein the rear surface comprises an exhaust opening.

Statement 16. The food recycler of any previous statement, wherein the angle is an angle defined between a vertical plane and a rear surface plane associated with the rear surface of the food recycler, and wherein the angle comprises between and including 2 degrees and 30 degrees.

Statement 17. The food recycler of any previous statement, wherein the exhaust opening in the rear surface of the casing is configured at a top portion of the rear surface.

Statement 18. The food recycler of any previous statement, wherein the bucket further comprises a blade system, the blade system comprising:
a central column;
at least one cutting member each extending at a different level from the central column; and
at least one cross blade attached to opposite sides of the bucket, the at least one cross blade configured between two of the at least one cutting member.

Statement 19. The food recycler of claim 18, wherein the blade system comprises a first cross blade and a second cross blade.

Food Cycler Switch and Latch Mechanism

Statement 1. A food recycler comprising:
a casing having a casing front surface and a lid;
a motor configured in mechanical communication with a gearbox, the motor configured within the casing;
a fan that draws air through the casing and into the lid;
a filter system that filters the air and communicates, via operation of the fan, the air to an exhaust opening;
a control system that controls the motor and the fan;
a bucket configured in the casing that receives food waste for recycling;
a tilted switch in communication with the control system for turning the food recycler on and off, wherein the tilted switch is configured in the casing front surface of the food recycler and has a switch front surface configured in a first plane that is 5-30 degrees relative to a second plane defined by the casing front surface; and
a latch positioned adjacent to and above the tilted switch, wherein the latch is configured to open the lid upon a user operating the latch.

Statement 2. The food recycler of statement 1, wherein upon a user depressing the tilted switch, when the food recycler is in an off mode, the control system turns the food recycler to an on mode, and when the food recycler is in the on mode, the control system turns the food recycler to the off mode.

Statement 3. The food recycler of any previous statement, wherein the latch is adjacent to the tilted switch.

Statement 4. The food recycler of any previous statement, wherein the tilted switch is configured at an upper portion of the casing front surface of the food recycler.

Statement 5. The food recycler of any previous statement, wherein the latch is in mechanical communication with a flange on a lower surface of the lid, such that upon interacting with the latch, the latch disengages with the flange and enables the lid to open.

Statement 6. A food recycler comprising:
a casing having a casing front surface and a lid;
a motor configured in mechanical communication with a gearbox, the motor configured within the casing;
a tilted switch in communication with a control system for turning the food recycler on and off, wherein the tilted switch is configured in the casing front surface of the food recycler and has a switch front surface configured in a first plane that is 5-30 degrees relative to a second plane defined by the casing front surface; and
a latch positioned adjacent to and above the tilted switch, wherein the latch is configured to open the lid upon a user operating the latch.

Statement 7. The food recycler of statement 6, further comprising:
a fan that draws air through the casing and into the lid.

Statement 8. The food recycler of any previous statement, further comprising:
a filter system that filters the air and communicates, via operation of the fan, the air to an exhaust opening.

Statement 9. The food recycler of any previous statement, further comprising:
a control system that controls the motor and the fan.

Statement 10. The food recycler of any previous statement, further comprising:
a bucket configured in the casing that receives food waste for recycling.

Foodcycler Airflow Method

Statement 1. A method of recycling food in a food recycler, the method comprising:
drawing air, via a fan, through an air intake opening at a base of the food recycler according to a first air path;
drawing the air, via the fan, from the first air path across a motor compartment according to a second air path;
drawing the air, via the fan, from the second air path across a gearbox and up through a channel between a bucket and a bucket receptacle of the food recycler according to a third air path;
drawing the air, via the fan, from the third air path and into the bucket according to a fourth air path;
drawing the air, via the fan, from the fourth air path out of the bucket and into a lid of the food recycler according to a fifth air path;
drawing the air, via the fan, from the fifth air path to a filter component according to a sixth air path; and
drawing the air, via the fan, from the sixth air path to away from the food recycler according to a seventh air path.

Statement 2. The method of recycling food in the food recycler of statement 1, wherein drawing the air, from the fifth air path to a filter component according to a sixth air path further comprises drawing the air through the fan, wherein the fan is configured within a fan component.

Statement 3. The method of recycling food in the food recycler of any previous statement, wherein the fan is configured between the fifth air path and the sixth air path.

Statement 4. The method of recycling food in the food recycler of any previous statement, wherein the seventh air path is configured through the lid.

Statement 5. The method of recycling food in the food recycler of any previous statement, wherein air is exhausted out the food recycler through an air vent in the top of the lid according to the seventh air path.

Statement 6. The method of recycling food in the food recycler of any previous statement, wherein air is exhausted out the food recycler through an air vent in a top portion of a rear surface of the food recycler according to the seventh air path.

Statement 7. The method of recycling food in the food recycler of any previous statement, wherein the rear-surface of the food recycler is tilted inward to enable space for the air to be exhausted out the rear surface when the food recycler is placed against a wall.

Statement 8. A method of recycling food in a food recycler, wherein the food recycler comprises a an air intake vent, a motor, a gearbox, a bucket container, a bucket, a lid, a fan, a filter and an exhaust vent, the method comprising drawing the air through various components of the food recycler using the fan according to a method comprising:
drawing air through the air intake vent to yield first air;
drawing the first air across the motor to yield second air;
drawing the second air across a gearbox and up through a channel between the bucket and the bucket container to yield third air;
drawing the third air into the bucket to yield fourth air;
drawing the fourth out of the bucket and into the lid to yield fifth air;
drawing the fifth air from the lid through the fan and thereafter through a filter component to yield sixth air; and
drawing the sixth air away from the food recycler through an exhaust vent.

Statement 9. The method of recycling food in a food recycler of statement 8, wherein the exhaust vent is one or more of (1) configured within the lid to exhaust the sixth air out a top of the lid; (2) configured within the lid to exhaust the sixth air out a back surface of the lid; and (3) configured within a top portion of a rear surface of the food recycler to exhaust the sixth air out the rear surface of the food recycler.

Statement 10. The method of recycling food in a food recycler of any previous statement, wherein the air intake vent is configured in a base portion of the food recycler.

Statement 11. The method of recycling food in a food recycler of any previous statement, wherein the second air includes heat drawn from the motor.

Statement 12. The method of recycling food in a food recycler of any previous statement, wherein the third air includes heat drawn from the gearbox.

Statement 13. The method of recycling food in a food recycler of any previous statement, wherein the third air includes heat drawn from the bucket.

Statement 14. The method of recycling food in a food recycler of any previous statement, wherein the fifth air includes heat drawn from heated waste food in the bucket.

Statement 15. The method of recycling food in a food recycler of any previous statement, wherein the fifth air includes moisture drawn from heated waste food in the bucket.

Statement 16. The method of recycling food in a food recycler of any previous statement, wherein the third air further includes heat drawn from the gearbox.

Statement 17. The method of recycling food in a food recycler of any previous statement, wherein when the exhaust vent is configured within the top portion of the rear surface of the food recycler to exhaust the sixth air out the rear surface of the food recycler, the rear surface of the food recycler is angled inward.

Statement 18. A food recycler comprising:
a base component comprising and a base rim, at least one air intake opening, a gearbox, and a motor component having a motor and a top surface, the motor being in mechanical communication with the gearbox;
an airflow component configured to be positioned on the top surface of the motor component;
a fan component comprising a fan and positioned on an intake port of the airflow component;
a filter component having an air filter configured therein, the filter component configured on an output port of the airflow component;
a bucket receptacle configured on the gearbox of the base component and configured to receive a bucket, wherein the fan component and the filter component are configured adjacent to an upper portion of the bucket receptacle;
a casing having a lower rim complimentary to the base rim and configured such that the casing sits on the base rim, the casing having a first interior volume complimentary to the bucket receptacle, a second interior volume complimentary to the fan module, and a third interior volume complimentary to the air filter component;
a lid configured with a hinge to the casing such that access to the bucket receptacle is provided by opening the lid; and
an exhaust vent, wherein the food recycler is configured such that an airflow path through the food recycler comprises a first path in through the air intake opening and across the motor followed by the gearbox, a second path from the gearbox through a first channel between the bucket and the bucket receptacle, a third path from the first channel and into the bucket, a fourth path from the bucket through a second channel in the lid, a fifth path from the second channel in the lid through the fan component to a filter component, and a sixth path from the fan component through the filter component and out the exhaust vent.

Statement 19. The food recycler of any previous statement, wherein the exhaust vent is one of (1) in a top surface of the lid, (2) in a rear surface of the lid, and (3) in a rear surface of the food recycler, and (4) at a top portion of the rear surface of the food recycler.

Statement 20. The food recycler of any previous statement, wherein the rear surface of the food recycler is tilted inwards to make room of air to flow out the exhaust vent when the food recycler is positioned next to a wall.

Modular Food Recycler

Statement 1. A modular food recycler comprising:
a base module comprising and a base rim, at least one air intake opening, a heater, a gearbox, and a motor component having a motor and a top surface, the motor being in mechanical communication with the gearbox;
an airflow module configured to be positioned on the top surface of the motor component;
a fan module configured to be removably positioned on an intake port of the airflow module;
a filter module having an air filter configured therein, the filter module configured to be removably positioned on an output port of the airflow module;
a bucket receptacle configured on the gearbox of the base module and configured to receive a bucket;
a casing having a lower rim complimentary to the base rim and configured such that the casing sits on the base rim, the casing having a first interior volume complimentary to the bucket receptacle, a second interior volume complimentary to the fan module, and a third interior volume complimentary to the air filter module; and
a lid configured with a hinge to the casing such that access to the bucket receptacle is provided by opening the lid.

Statement 2. The modular food recycler of statement 1, wherein the motor is configured in the base module to be at least in part to a side of a lower portion of the bucket receptacle.

Statement 3. The modular food recycler of any previous statement, wherein the filter module receives air and passes the air through the filter.

Statement 4. The modular food recycler of any previous statement, wherein the lid is further configured to enable air to flow from a top portion of the bucket receptacle through the lid and down to the fan module.

Statement 5. The modular food recycler of any previous statement, wherein upon a user removing the casing from being positioned on the base rim, a user can replace one or more of the base module, the airflow module, the fan module, the filter module and the bucket receptacle without needing a tool.

Statement 6. The modular food recycler of any previous statement, further comprising:
a controller, wherein in an assembled configuration, the controller is in electrical communication with one or more of the motor, a heating component and the fan.

Statement 7. The modular food recycler of any previous statement, further comprising a bucket configured within the bucket receptacle.

Statement 8. The modular food recycler of any previous statement, wherein upon an operation of the fan, air is drawn into the casing via the at least one air intake opening in the base module, up a side wall of the bucket receptacle, into the lid, down through the fan module, through the airflow module, and up through the filter module.

Statement 9. The modular food recycler of any previous statement, wherein the air flows from the filter module into the lid and wherein the lid further includes exhaust openings in one of a top of the lid.

Statement 10. The modular food recycler of any previous statement, wherein the air flows from the filter module to an exhaust opening on a rear surface of the modular food recycler, the exhaust opening being below the hinge.

Statement 11. The modular food recycler of any previous statement, wherein a ratio of a first volume of the bucket relative to a second volume comprising an overall volume of the food recycler is between 0.0717 and 0.2857.

Statement 12. A modular food recycler comprising:
a controller;
a motor in communication with the controller;
a grinding mechanism in mechanical communication with the motor;
a bucket contained within the food recycler that is configured to contain the grinding mechanism and configured to receive waste food;
a modular fan component configured to move air through an internal structure of the module food recycler, the modular fan component being removable by a user through a fan top opening in a top surface of the modular food recycler upon which a lid sits; and
a modular filter component, the modular filter component being removable by the user through a filter top opening in the top surface of the modular food recycler upon which the lid sits, wherein the food recycler is configured to have an overall appliance volume of 35 liters or less and wherein the controller, the motor, the modular fan component, and the modular filter component are configured within the food recycler to enable the bucket to have a capacity to receive waste food of between 2.51 liters to 10 liters, inclusive.

Statement 13. The modular food recycler of statement 12, wherein the food recycler has a height of 395 millimeters or less.

Statement 14. The modular food recycler of any previous statement, wherein the food recycler has a height of approximately 360 millimeters, a width of approximately 270 millimeters and a depth of approximately 310 millimeters.

Statement 15. The modular food recycler of any previous statement, wherein the motor is configured to not be below the bucket within the modular food recycler.

Statement 16. The modular food recycler of any previous statement, further comprising: a gear box configured below the bucket, and wherein at least a portion of the motor is adjacent to a side of the bucket in the modular food recycler.

Statement 17. The modular food recycler of any previous statement, further comprising: a gear box configured below the bucket, and wherein the motor is positioned to a side and below the bucket in the modular food recycler.

Statement 18. The modular food recycler any previous statement, wherein a ratio of a first volume of the bucket relative to a second volume comprising an overall volume of the modular food recycler is between 0.0717 and 0.2857.

Statement 19. A modular food recycler comprising:
a food recycler case that contains a controller;
a motor in communication with the controller and configured within the food recycler case;
a bucket contained within the food recycler case that is configured to receive waste food; and
a modular drying component configured to remove water from the waste food, wherein the food recycler case comprises a fan component opening that enable a user to replace a fan component and a filter component opening that enables the user to replace a filter component, wherein the food recycler case has an overall volume and wherein a ratio of a first volume of the bucket relative to the overall volume of the food recycler case is between 0.07 and 0.29.

Statement 20. The modular food recycler of statement 19, wherein the overall volume comprises 30-35 liters.

Statement 21. The modular food recycler of any previous statement, wherein the ratio comprises between 0.8 and 0.33.

Statement 22. The modular food recycler of any previous statement, wherein the first volume of the bucket comprises 2.51 liters to 10 liters.

Statement 23. The modular food recycler any previous statement, wherein a height of the food recycler case is approximately 370 millimeters or less.

Statement 24. The modular food recycler any previous statement, wherein the food recycler is configured to be used on a countertop.

Statement 25. The modular food recycler of any previous statement, further comprising:
a grinding mechanism configured within the bucket and mechanically connected to the motor.

Statement 26. The modular food recycler of any previous statement, wherein the overall volume comprises a height of approximately 360 millimeters, a width of approximately 270 mm and a depth of approximately 310 mm.

Statement 27. The modular food recycler any previous statement, wherein this food recycler case comprises an opening on a top surface of the food recycler and wherein the opening receives a removable lid.

Statement 28. The modular food recycler of any previous statement, further comprising a heating component for heating the waste food and the drying component for drying the waste food.

Food Cycler Filter System

Statement 1. A filter component comprising:
a filter wall made from a nonporous material;
a filter configured within the filter wall;
a top surface of the filter, the top surface comprising a permeable filter material to allow air flow through the top surface while containing filter material of the filter; and
a bottom surface of the filter, the bottom surface comprising the permeable filter material to allow air flow through the bottom surface while containing the filter material of the filter.

Statement 2. The filter component of statement 1, wherein the bottom surface of the filter further comprises an attachment component to seat the filter on a filter base component.

Statement 3. The filter component of any previous statement, wherein the filter comprises charcoal pieces.

Statement 4. The filter component of any previous statement, wherein the nonporous material comprises one of pasteboard or paper.

Statement 5. The filter component of any previous statement, further comprising: a handle configured at a top portion of the filter.

We claim:

1. A food recycler, comprising:
a housing having a housing volume;
a motor in electrical communication with a controller;
a grinding mechanism in mechanical communication with the motor;
a bucket having a bucket volume, the bucket being removable and configured with the grinding mechanism contained therein such that waste food placed in the bucket remains in the bucket during a food recycling process, wherein a ratio of the bucket volume to the housing volume is between 0.0717 and 0.2857, inclusive, and wherein the motor is configured within the housing adjacent, at least in part, to the bucket; and
a drying component configured to remove water from the waste food placed within the bucket.

2. The food recycler of claim 1, further comprising:
a controller comprising a set of indicators and at least one user interface component usable to at least initiate the food recycling process.

3. The food recycler of claim 1, further comprising:
a gearbox configured below the bucket and in mechanical communication with the motor and the grinding mechanism.

4. The food recycler of claim 1, wherein the bucket volume comprises between 2.51 and 10 liters, inclusive.

5. The food recycler of claim 1, wherein the food recycler consumes 0.1 kilowatt hours of energy per 100 grams of the waste food items.

6. The food recycler of claim 1, wherein the housing volume comprises between 8.79 liters and 35 liters.

7. The food recycler of claim 1, wherein the motor is further configured in a lower portion of the housing.

8. A food recycler comprising:
a case having a case volume between 8.79 liters and 35 liters;
a control system;
a user interface in electrical communication with the control system, wherein the user interface being usable to cause the control system to initiate a food recycling process;
a bucket being removable from the food recycler and configured with a bucket volume, wherein a ratio of the bucket volume to the case volume is between 0.0717 and 0.2857 and wherein food waste placed in the bucket remains in the bucket throughout the food recycling process;
a motor in communication with the control system, the motor being configured adjacent at least in part to the bucket;
a gearbox configured below the bucket and in mechanical communication with the motor;
a filter system; and
a drying component configured to remove water from the waste food.

9. The food recycler of claim 8, wherein the bucket volume is between 2.51 liters and 10 liters, inclusive.

10. The food recycler of claim 8, wherein:
the food recycler further comprises a sensor component in electrical communication with the control system, wherein the sensor component generates sensor data based on characteristics of the waste food; and
the control system determines operation of the drying component based on the sensor data.

11. The food recycler of claim 8, further comprising an RF component in electrical communication with the control system, wherein the RF component transmits microwaves into the bucket to heat the waste food items.

12. The food recycler of claim 8, wherein the case is configured with:
a height between 324 millimeters and 396 millimeters;
a length between 165 millimeters and 329 millimeters; and
a width between 165 millimeters and 329 millimeters.

13. The food recycler of claim 8, wherein the food recycling cycle consumes 0.1 kilowatt hours of energy per 100 grams of the waste food items.

14. The food recycler of claim 8, wherein the filter system is positioned near a top portion of the case and configured to accommodate one or more filters and wherein one or more air filters are removable from the filter system.

15. The food recycler of claim 8, wherein the drying component comprises a fan in electrical communication with the control system to draw air from the bucket and through the filter system.

16. The food recycler of claim 8, further comprising a grinding mechanism configured within the bucket and mechanically connected to the motor.

17. The food recycler of claim 8, further comprising an antenna in electrical communication with the control system, the antenna configured to allow wireless communication between the control system and other devices over a communications network.

18. A food recycler comprising:
a case having a case volume between 8.79 liters and 35 liters;
a control system;
a bucket being configured with a bucket volume, wherein a ratio of the bucket volume to the case volume of the case is between 0.0717 and 0.2857 and wherein the bucket is configured to retain food waste placed in the bucket throughout a food recycling process;
a lid configured to pivot to enable access to the bucket;
a motor in communication with the control system, the motor being configured adjacent at least in part to the bucket;
a gearbox configured below the bucket and in mechanical communication with the motor; and
a drying component configured to remove water from the waste food.

19. The food recycler of claim 18, wherein the drying component causes air to flow at least through a cavity configured in the lid of the bucket.

20. The food recycler of claim 18, further comprising:
a filter, wherein the drying component causes air to flow through the filter for filtering the air.

21. A food recycler comprising:
a case having a case volume;
a control system;
a bucket being removable from the food recycler and configured with a bucket volume, wherein a ratio of the bucket volume to the case volume is between 0.0717 and 0.2857 and wherein the bucket is configured to retain waste food during a food recycling process;
a lid configured to be movable to enable access to the bucket;
a motor in communication with the control system; and
a gearbox configured in mechanical communication with the motor.

22. The food recycler of claim 21, wherein the case volume is between 8.79 liters and 35 liters, inclusive.

23. The food recycler of claim 21, wherein the gearbox is configured below the bucket.

24. The food recycler of claim 21, further comprising:
a drying component configured to remove water from waste food items.

25. The food recycler of claim 21, further comprising:
a user interface in electrical communication with the control system, wherein the user interface being usable to cause the control system to initiate the food recycling process.

26. The food recycler of claim 25, wherein the user interface comprises a button and a single push of the button causes the control system to initiate the food recycling process.

27. The food recycler of claim 26, wherein the user interface further comprises lights that identify a status of the food recycling process.

28. The food recycler of claim 21, further comprising:
a filter having replaceable filter components.

29. The food recycler of claim 21, wherein the filter comprises charcoal components.

* * * * *